US010766795B2

(12) United States Patent
Su et al.

(10) Patent No.: US 10,766,795 B2
(45) Date of Patent: Sep. 8, 2020

(54) ELECTROCHEMICAL DEVICES OR SYSTEMS COMPRISING REDOX-FUNCTIONALIZED ELECTRODES AND USES THEREOF

(71) Applicant: Massachusetts Institute of Technology, Cambridge, MA (US)

(72) Inventors: Xiao Su, Cambridge, MA (US); Demetra S. Achilleos, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 620 days.

(21) Appl. No.: 15/336,637

(22) Filed: Oct. 27, 2016

(65) Prior Publication Data
US 2017/0113951 A1    Apr. 27, 2017

Related U.S. Application Data

(60) Provisional application No. 62/346,401, filed on Jun. 6, 2016, provisional application No. 62/246,718, filed on Oct. 27, 2015.

(51) Int. Cl.
*C02F 1/469* (2006.01)
*C02F 1/467* (2006.01)
(Continued)

(52) U.S. Cl.
CPC ............ *C02F 1/469* (2013.01); *C02F 1/4672* (2013.01); *C02F 2101/20* (2013.01);
(Continued)

(58) Field of Classification Search
CPC .... C02F 1/4672; C02F 1/461; C02F 1/46109; C02F 1/469
See application file for complete search history.

(56) References Cited

U.S. PATENT DOCUMENTS 5,776,351 A * 7/1998 McGinness ........... C02F 1/4672
134/10
6,281,006 B1    8/2001 Heller et al.
(Continued)

FOREIGN PATENT DOCUMENTS

WO    WO 2018/081653 A1    5/2018

OTHER PUBLICATIONS

International Preliminary Report on Patentability dated May 11, 2018 for Application No. PCT/US2016/059193.
(Continued)

*Primary Examiner* — Steven A. Friday
(74) *Attorney, Agent, or Firm* — Wolf, Greenfield & Sacks, P.C.

(57) ABSTRACT

Various aspects described herein relate to electrochemical devices, e.g., for separation of one or more target organic or inorganic molecules (e.g., charged or neutral molecules) from solution, and methods of using the same. In particular embodiments, the electrochemical devices and methods described herein involve at least one redox-functionalized electrode, wherein the electrode comprises an immobilized redox-species that is selective toward a target molecule (e.g., charged molecule such as ion or neutral molecule). The selectivity is based on a Faradaic/redox-activated chemical interaction (e.g., directional hydrogen binding) between the oxidized state of the redox species and a moiety of the target molecule (e.g., charged molecule such as ion or neutral molecule).

10 Claims, 82 Drawing Sheets

(51) Int. Cl.
  C02F 101/20    (2006.01)
  C02F 101/30    (2006.01)
  C02F 103/34    (2006.01)
(52) U.S. Cl.
  CPC .. *C02F 2101/301* (2013.01); *C02F 2101/306* (2013.01); *C02F 2103/343* (2013.01); *Y02W 10/37* (2015.05)

(56) References Cited

U.S. PATENT DOCUMENTS

| | | | |
|---|---|---|---|
| 7,435,362 | B2 | 10/2008 | Muraoka et al. |
| 8,436,116 | B2 | 5/2013 | Akhoury et al. |
| 8,506,779 | B2 | 8/2013 | Kahn et al. |
| 2002/0163135 | A1* | 11/2002 | Kato .............. A62D 3/115 277/459 |
| 2005/0227071 | A1* | 10/2005 | Muraoka .............. B82Y 10/00 428/403 |
| 2010/0222519 | A1 | 9/2010 | Akhoury et al. |
| 2011/0031440 | A1 | 2/2011 | Palmore et al. |
| 2014/0166485 | A1 | 6/2014 | Sailor et al. |
| 2014/0322617 | A1 | 10/2014 | Wang et al. |
| 2014/0332406 | A1* | 11/2014 | Nottke .............. C25F 7/00 205/763 |
| 2014/0346046 | A1* | 11/2014 | Andelman .............. C02F 1/4691 204/554 |
| 2016/0138174 | A1 | 5/2016 | Hatton et al. |
| 2018/0215635 | A1* | 8/2018 | Roberts .............. C02F 1/463 |
| 2019/0240595 | A1* | 8/2019 | Su et al. .......... C12Q 2523/303 |

OTHER PUBLICATIONS

Invitation to Pay Additional Fees dated Jan. 4, 2018 for Application No. PCT/US2017/058888.
International Search Report and Written Opinion dated Feb. 28, 2018 for Application No. PCT/US2017/058888.
Achilleos et al., Selective molecularly mediated pseudocapacitive separation of ionic species in solution. ACS Appl Mater Interf. 2016;8(48):32743-53. Epub Oct. 4, 2016.
Akhoury et al., Redox-responsive gels with tunable hydrophobicity for controlled solubilization and release of organics. ACS Appl Mater Interf. 2011;3(4):1167-74. Epub Mar. 16, 2011.
Alsbaiee et al., Rapid removal of organic micropollutants from water by a porous β-cyclodextrin polymer. Nature. Jan. 14, 2016;529(7585):190-4. Suppl Info, 11 pages. doi: 10.1038/nature16185. Epub Dec. 21, 2015.
Angamuthu et al., Electrocatalytic $CO_2$ conversion to oxalate by a copper complex. Science. Jan. 15, 2010;327(5963):313-5. doi: 10.1126/science.1177981.
Anzenbacher et al., Simple electrooptical sensors for inorganic anions. Org Lett. Oct. 27, 2005;7(22):5027-30. Epub Oct. 1, 2005.
Augustyn et al., Pseudocapacitive oxide materials for high-rate electrochemical energy storage. Energy Environ Sci. 2014;7(5):1597-1614. Accessed online at http://oatao.univ-toulous.fr/EprintsID:13900. 20 pages.
Aydin et al., Electrocatalytic conversion of $CO_2$ on a polypyrrole electrode under high pressure in methanol. Synth Met. Jul. 8, 2004;144(1):75-80.
Beer et al., Anion recognition and sensing: The state of the art and future perspectives. Angew Chem Int Ed Engl. Feb. 2, 2001;40(3):486-516.
Beer et al., Anion recognition and luminescent sensing by new ruthenium(II) and rhenium(I) bipyridyl calix[4]diquinone receptors. Chem Commun. 1999;0:1755-6. Comm 9/05277A.
Bernardo et al., Cyclobis(paraquat-p-phenylene) as a synthetic receptor for electron-rich aromatic compounds: Electrochemical and spectroscopic studies of neurotransmitter binding. J Am Chem Soc. Dec. 1992;114(26):10624-31.
Burkhardt et al., Tailored redox functionality of small organics for pseudocapacitive electrodes. Energy Environ Sci. 2012;5:7176-87. Epub Apr. 10, 2012.

Chen et al., Highly stable nickel hexacyanoferrate nanotubes for electrically switched ion exchange. Adv Funct Mater. Oct. 2007;17(15):2943-8. Epub Aug. 28, 2007.
DAS et al., Ru(II) and Os(II) mixed-chelates derived from imidazole-4,5-dicarboxylic acid and 2,2'-bipyridine as colorimetric sensors for anions: Synthesis, characterization and binding studies. Dalton Trans. May 7, 2010;39(17):4162-9. doi: 10.1039/b924561h. Epub Mar. 24, 2010.
Dash et al., Electrochemical separation: Promises, opportunities, and challenges to develop next-generation radionuclide generators to meet clinical demands. Ind Eng Chem Res. 2014;53(10):3766-77. Epub Feb. 20, 2014.
Evans et al., Advances in anion supramolecular chemistry: From recognition to chemical applications. Angew Chem Int Ed. Oct. 27, 2014;53(44):11716-54.
Gallei et al., Recent advances in immobilized ferrocene-containing polymers. Ch 5 in Functional Metallosupramolecular Materials. Royal Society of Chemistry, Cambridge. Jul. 2015 pp. 120-148.
Ge et al., Ion exchange properties of polypyrrole. Reactive Polymers. Oct. 1992;18(2):133-140.
Grimm et al., Review of electro-assisted methods for water purification. Desalination. 1998;115:285-94.
Hull et al., Reversible hydrogen storage using $CO_2$ and a proton-switchable iridium catalyst in aqueous media under mild temperatures and pressures. Nat Chem. May 2012;4(5):383-8. doi: 10.1038/nchem.1295. Epub Mar. 18, 2012.
Kang et al., Rapid selective electrocatalytic reduction of carbon dioxide to formate by an iridium pincer catalyst immobilized on carbon nanotube electrodes. Angew Chem Int Ed Engl. Aug. 11, 2014;53(33):8709-13. doi: 10.1002/anie.201310722. Epub Jun. 4, 2014.
Khin et al., A review on nanomaterials for environmental remediation. Energy Environ Sci. 2012;5:8075-109. Epub May 24, 2012.
Kim et al., CDI ragone plot as a functional tool to evaluate desalination performance in capacitive deionization. RSC Adv. 2015;5:1456-61. Epub Nov. 27, 2014. Accepted author manuscript, 16 pgs.
Kushi et al., Remarkable decrease in overpotential of oxalate formation in electrochemical $CO_2$ reduction by a metal-sulfide cluster. J Chem Soc, Chem Commun. 1995;0:1223-4. Epub Jan. 1, 1995.
La Mantia et al., Batteries for efficient energy extraction from a water salinity difference. Nano Lett. Apr. 13, 2011;11(4):1810-3. doi: 10.1021/n1200500s. Epub Mar. 17, 2011.
MacFarland et al., Rotor-shaped cyclopentadienyltetraphenylcyclobutadienecobalt. An advanced inorganic experiment. J Chem Educ. Jan. 2005;82(1);109-10. Epub Jan. 1, 2005.
Mao et al., Metallocene/carbon hybrids prepared by a solution process for supercapacitor applications. J Mater Chem A. 2013;1(42):13120-7. Epub Sep. 13, 2013. Author manuscript, 25 pages.
Mao et al., Polyvinylferrocene for noncovalent dispersion and redox-controlled precipitation of carbon nanotubes in nonaqueous media. Langmuir. Aug. 6, 2013;29(31):9626-34. doi: 10.1021/la401440w. Epub Jun. 25, 2013.
Oren, Capacitive deionization (CDI) for desalination and water treatment—past, present and future (a review). Desalination. Aug. 15, 2008;228(1-3):10-29.
Pasta et al., A desalination battery. Nano Lett. Feb. 8, 2012;12(2):839-43. doi: 10.1021/n1203889e. Epub Jan. 23, 2012.
Porada et al., Direct prediction of the desalination performance of porous carbon electrodes for capacitive deionization. Energy Environ Sci. 2013 Aug;6(12):3700-12. Electronic Suppl Info, 21 pages.
Porada et al., Review on the science and technology of water desalination by capacitive deionization. Prog Mater Sci. Oct. 2013;58(8):1388-442. Epub Apr. 4, 2013.
Reis et al., Single-pot conversion of methane into acetic acid in the absence of CO and with vanadium catalysts such as amavadine. Angew Chem Int Ed Engl. Feb. 17, 2003;42(7):821-3.
Ren et al., Synthesis and solution self-assembly of side-chain cobaltocenium-containing block copolymers. J Am Chem Soc. Jul. 7, 2010;132(26):8874-5. Epub Jun. 14, 2010.

(56) References Cited

OTHER PUBLICATIONS

Reynes et al., Redox sensing of anions in pure aqueous environment by ferrocene-containing 4,4'-bipyridinium-based receptors and polymer films. Chem Commun. 2004;0:428-9.

Ruttiger et al., One for all: cobalt-containing polymethacrylates for magnetic ceramics, block copolymerization, unexpected electrochemistry, and stimuli-responsiveness. Polym Chem. 2016;7:1129-37. Epub Dec. 14, 2015.

Shannon et al., Science and technology for water purification in the coming decades. Nature. Mar. 20, 2008;452(7185):301-10. doi: 10.1038/nature06599.

Smyrl et al., Electrical and electrochemical properties of electronically conducting polymers. Ch. 2 in Applications of Electroactive Polymers. First Ed. Scrosati et al (Ed). Springer Science and Business Media, BV. Jan. 2003 pp. 29-74.

Sola et al., Unprecedented 1,3-diaza[3]ferrocenophane scaffold as molecular probe for anions. Inorg Chem. May 2, 2011;50(9):4212-20. doi: 10.1021/ic102314r. Epub Feb. 14, 2011.

Su et al., Anion-selective redox electrodes: Electrochemically mediated separation with heterogeneous organometallic interfaces. Adv Funct Mater. May 2016;26(20):3394-404.

Su et al., Redox electrodes for selective electrochemical separations. Adv Coll Interf Sci. Jun. 2017;244:6-20. doi:10.1016/m.cis. 2016.09.001. Epub Sep. 9, 2016.

Subramani et al., Emerging desalination technologies for water treatment: A critical review. Water Res. May 15, 2015;75:164-87. doi: 10.1016/j.watres.2015.02.032. Epub Feb. 26, 2015.

Suss et al., Water desalination via capacitive deionization: what is it and what can we expect from it? Energy Environ Sci. 2015;8:2296-319. Epub May 5, 2015.

Takahashi et al., Electrochemical reduction of $CO_2$ at copper single crystal $Cu(S)$—$[n(111)\times(111)]$ and $Cu(S)$—$[n(110)\times(100)]$ electrodes. J Electroanal Chem. Sep. 20, 2002;533(12):135-43.

Teasdale et al., Molecular recognition using conducting polymers: Basis of an electrochemical sensing technology—Plenary lecture. Analyst. Apr. 1993;118:329-34.

Tian et al., Electrochemically nanostructured polyvinylferrocene/polypyrrole hybrids with synergy for energy storage. Adv Funct Mater. Aug. 2015;25(30):4803-13. Epub Jun. 24, 2015.

Tran et al., Incorporation of single-walled carbon nanotubes into ferrocene-modified linear polyethylenimine redox polymer films. Langmuir. Apr. 2011;27:6201-10. Epub Apr. 11, 2011.

Wang et al., Reversible multivalent (monovalent, divalent, trivalent) ion insertion in open framework materials. Adv Energy Mater. 2015;5:1401869(1-10).

Yang et al., Metal-nucleic acid cages. Nat Chem. Aug. 2009;1(5):390-6. doi: 10.1038/nchem.290. Epub Jul. 24, 2009.

Zhang et al., Electrocatalytic reduction of carbon dioxide by cobalt-phthalocyanine-incorporated polypyrrole. Electrochem Solid-State Lett. 2009;12(8):E17-19. Epub May 19, 2009.

International Search Report and Written Opinion dated Jan. 3, 2017 for PCT/US2016/059193.

Tomapatanaget et al., Calix[4]arenes containing ferrocene amide as carboxylate anion receptors and sensors. Org Lett. May 1, 2003;5(9):1539-42.

International Preliminary Report on Patentability for Application No. PCT/US2017/058888 dated May 9, 2019.

Extended European Search Report for Application No. 16860821.4 dated Aug. 5, 2019.

PCT/US2016/059193, dated Jan. 3 2017, International Search Report and Written Opinion.

PCT/US2017/058888, filed Oct. 27, 2017, Su et al.

PCT/US2016/059193, dated May 11, 2018, International Preliminary Report on Patentability.

PCT/US2017/058888, dated Jan. 4, 2018, Invitation to Pay Additional Fees.

PCT/US2017/058888, dated Feb. 28, 2018, International Search Report and Written Opinion.

PCT/US2017/058888, dated May 9, 2019, International Preliminary Report on Patentability.

EP 16860821.4, dated Aug. 5, 2019, Extended European Search Report.

* cited by examiner

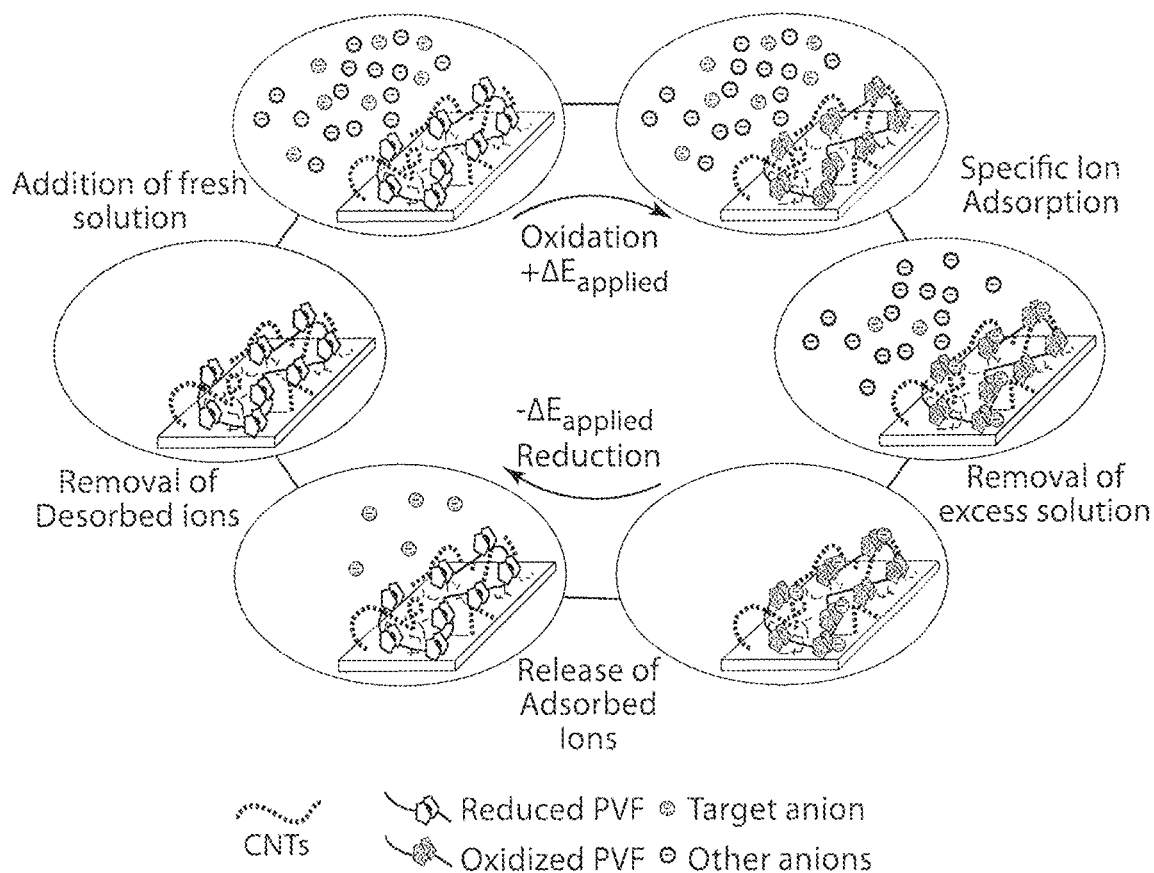
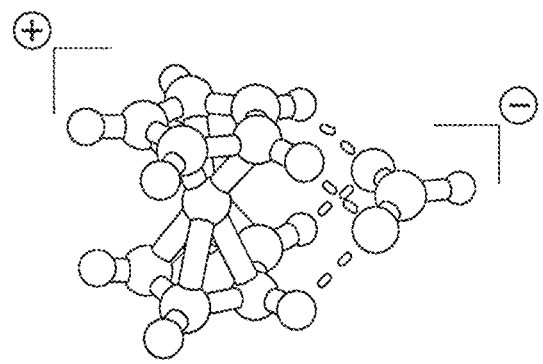
FIG. 1

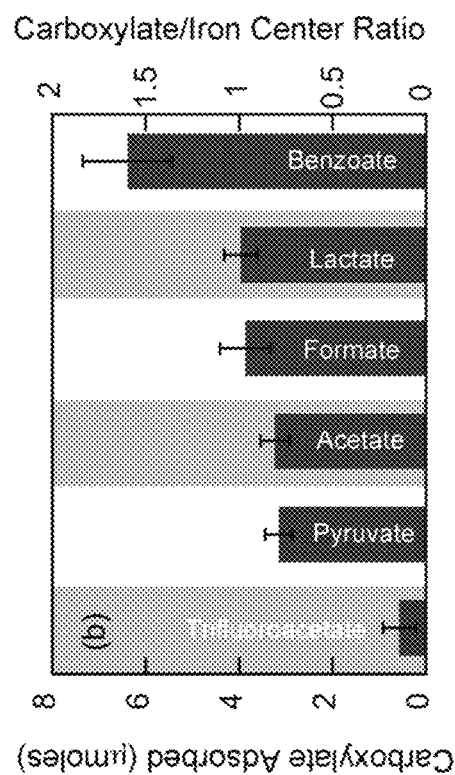
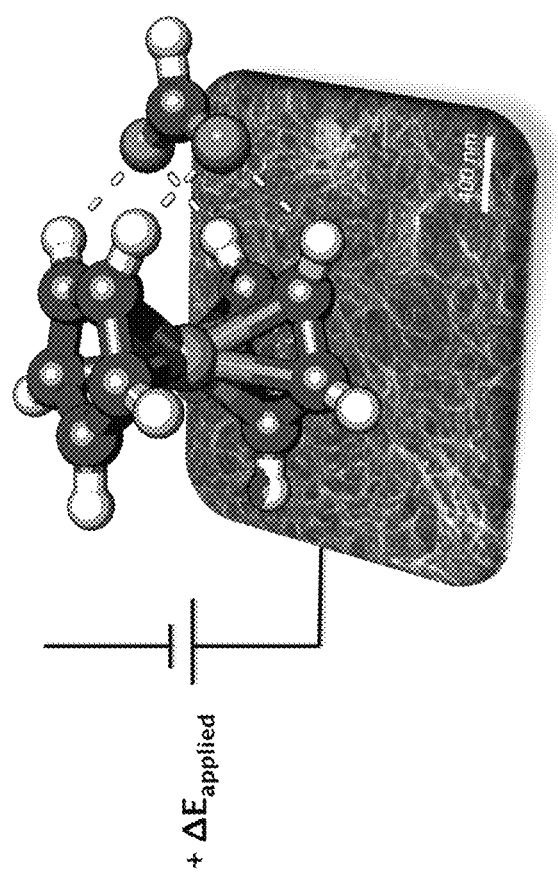
FIG. 9

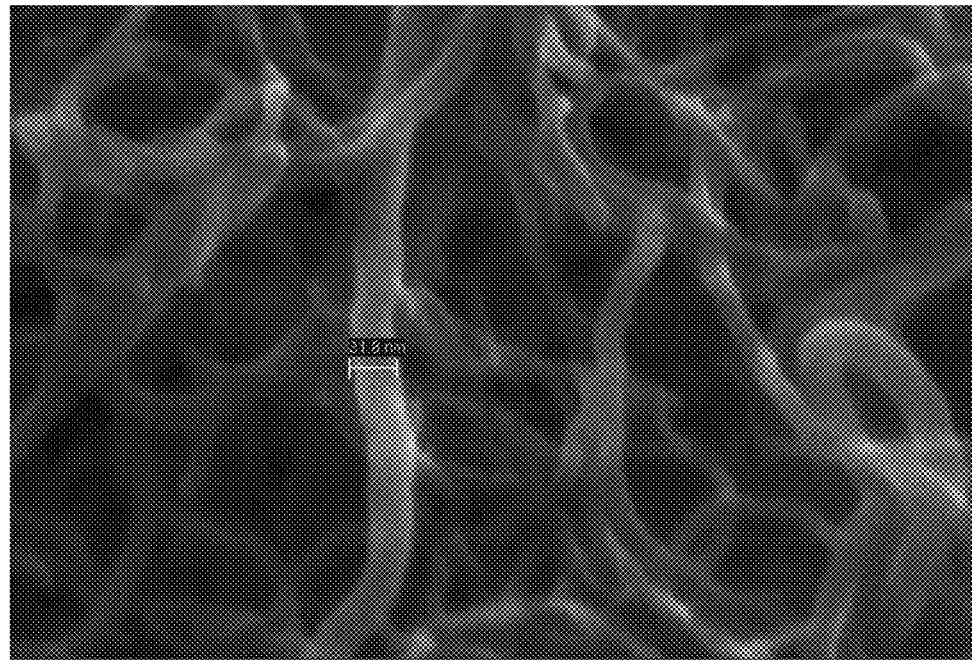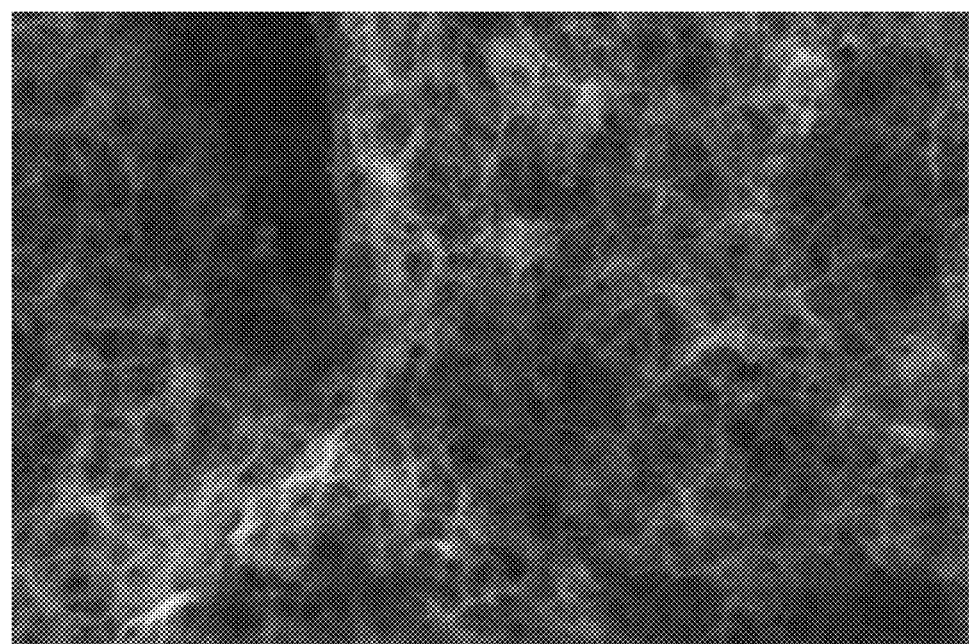
FIG. 12

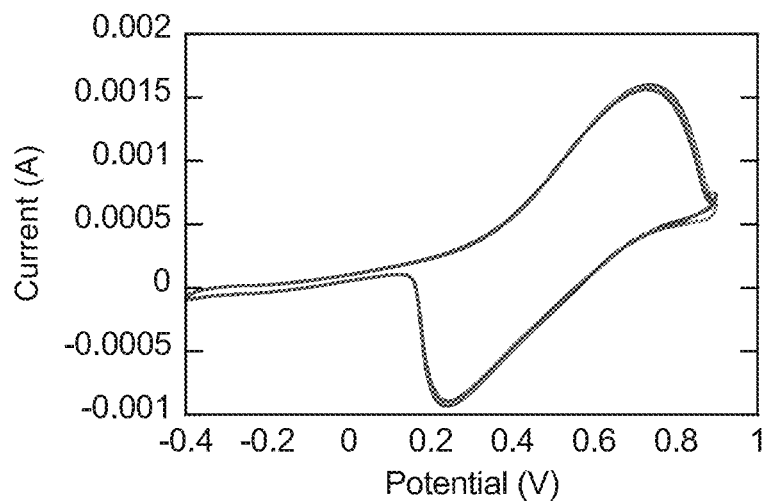
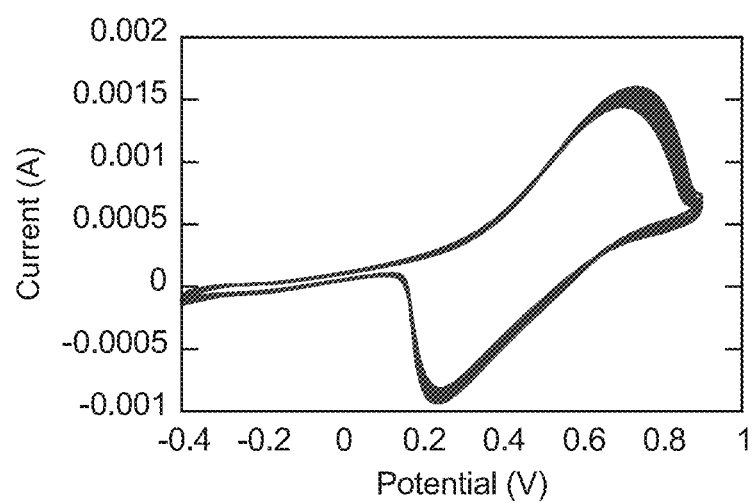
FIG. 26

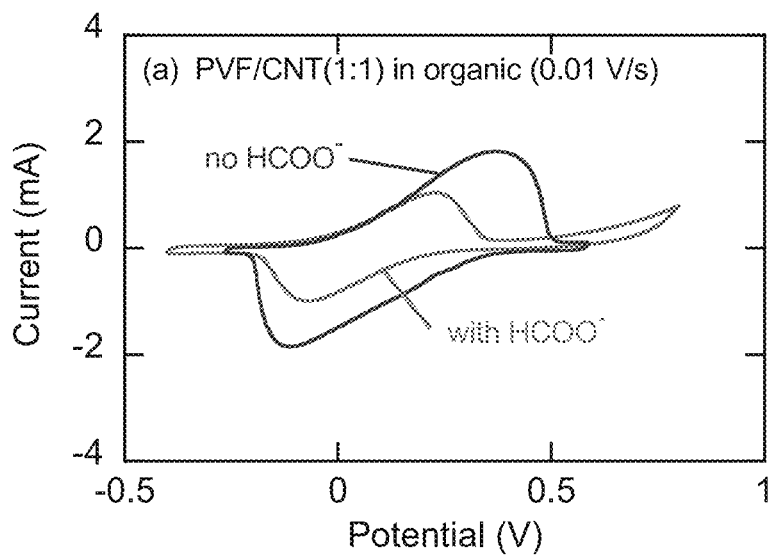
FIG. 27
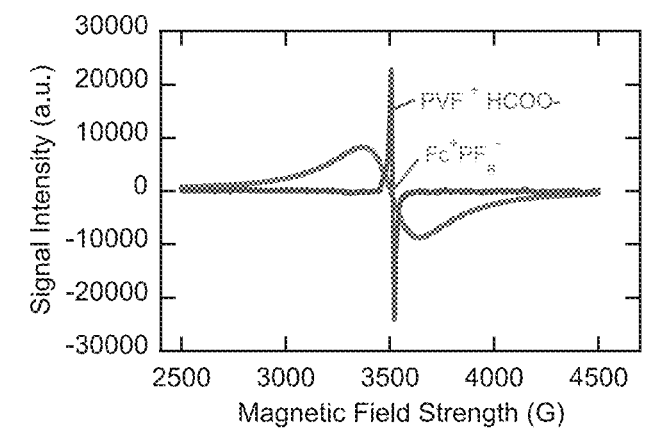
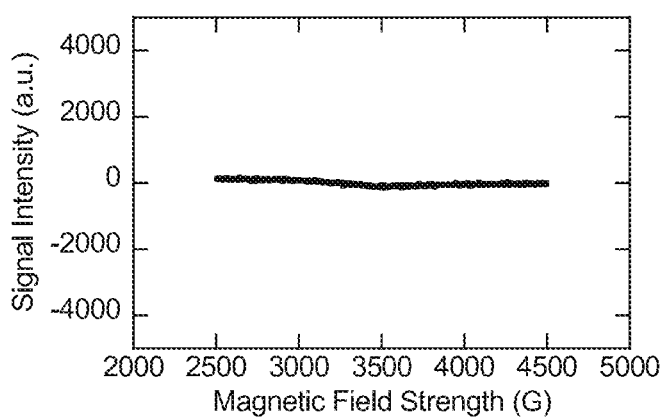
FIG. 28

| Element | Atomic Composition |
|---|---|
| Carbon | 61.9% |
| Oxygen | 30.1% |
| Iron | 6.7% |
| Chlorine | 1.2% |
| Sodium | <0.1 |

| Element | Atomic Composition |
|---|---|
| Carbon | 71.8% |
| Oxygen | 25.51% |
| Iron | 2.6% |
| Phosphorus | <0.1 % |

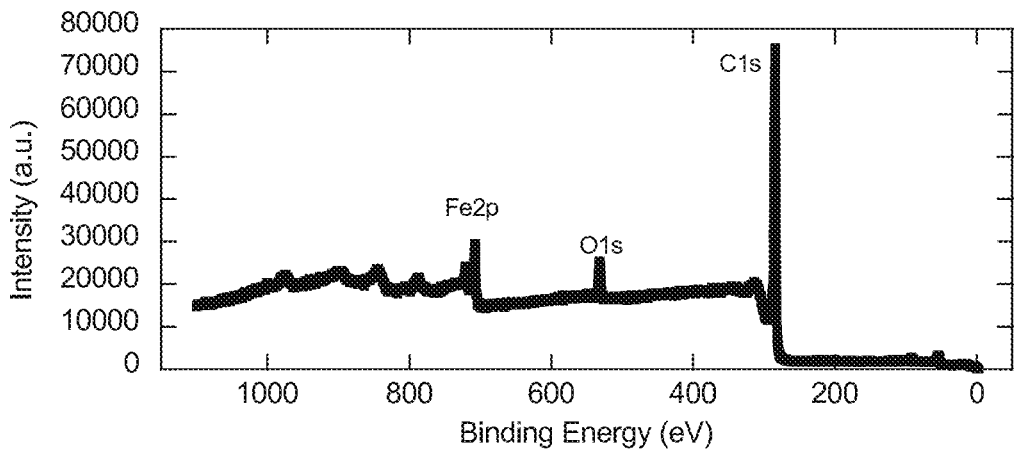
FIG. 32
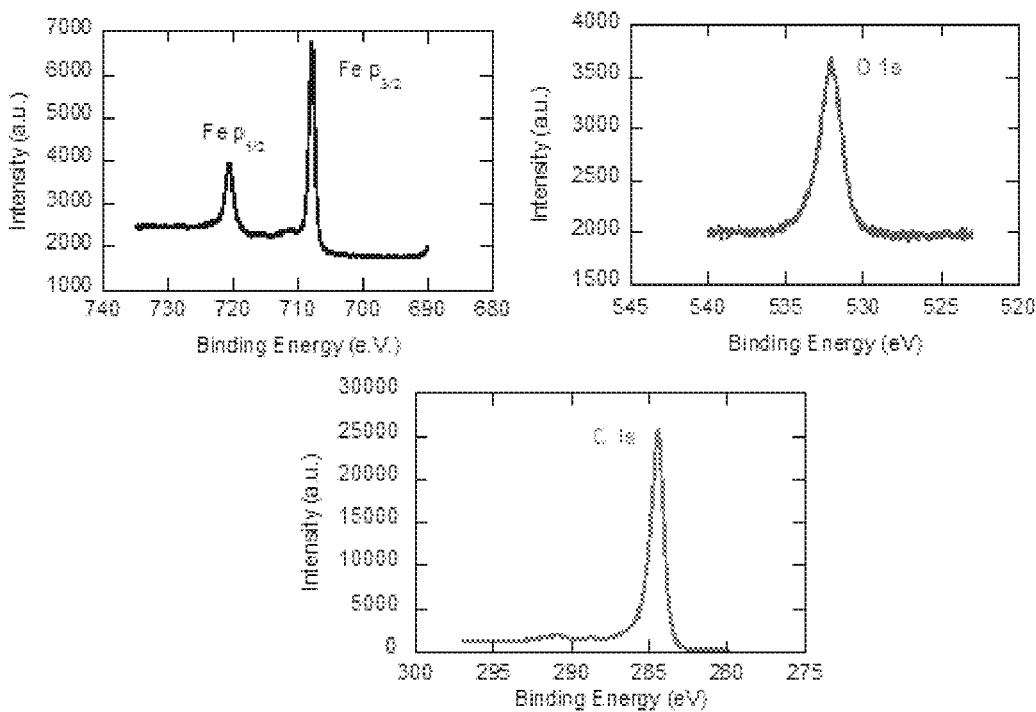
FIG. 33A
| Element | Atomic Composition |
|---|---|
| Carbon | 92.6% |
| Oxygen | 3.7% |
| Iron | 3.6% |
FIG. 33B

| | | | | | | | | |
|---|---|---|---|---|---|---|---|---|
| Angle H-C-Fe 1 | 117 | 117.4 | 120.9 | 120 | 117.5 | 116.6 | 120.8 | 121.3 |
| Angle H-C-Fe 2 | 116.7 | 116.5 | 120.3 | 116.6 | 117.6 | 115.3 | 122.5 | 121.4 |
| Angle H-C-Fe 3 | 117.6 | 117.5 | 116.4 | 123.5 | 118.9 | 118.3 | 121 | 121.1 |
| Angle H-C-Fe 4 | 117 | 116.4 | 117.4 | 119.6 | 118.9 | 119 | 122 | 121 |
| Top H1-O1 | 2.2 | 3.2 | 2.4 | 2.5 | 2.1 | 2.3 | 2.2 | 2.2 |
| Bottom H2-O1 | 2.2 | 2.2 | 2.1 | 2.1 | 2.1 | 2.1 | 3.1 | 2.2 |
| Top H3 - O2 | 2.2 | 3.2 | 2.5 | 2.7 | 2.3 | 2.3 | 2.3 | 2.4 |
| Bottom H4-O2 | 2.2 | 2.2 | 2.2 | 2.2 | 2.2 | 2.3 | 2.3 | 2.3 |
| Maximum Deflection (°) (123° - min<(H-C-Fe)) | 6.8 | 7 | 7.1 | 6.9 | 6 | 6.9 | 2.5 | 2.5 |

| Anion complexed with Ferrocenium | Maximum H-C-Fe Deflection (°) | Minimum H-anion distance (Å) |
|---|---|---|
| Perchlorate | 2.5 | 2.2 |
| Hexafluorophosphate | 2.5 | 2.2 |
| Trifluoroacetate | 6.0 | 2.1 |
| Formate | 6.9 | 2.1 |
| Acetate | 6.8 | 2.2 |
| Benzoate | 7.0 | 2.2 |
| Lactate | 7.1 | 2.1 |
| Pyruvate | 6.9 | 2.1 |

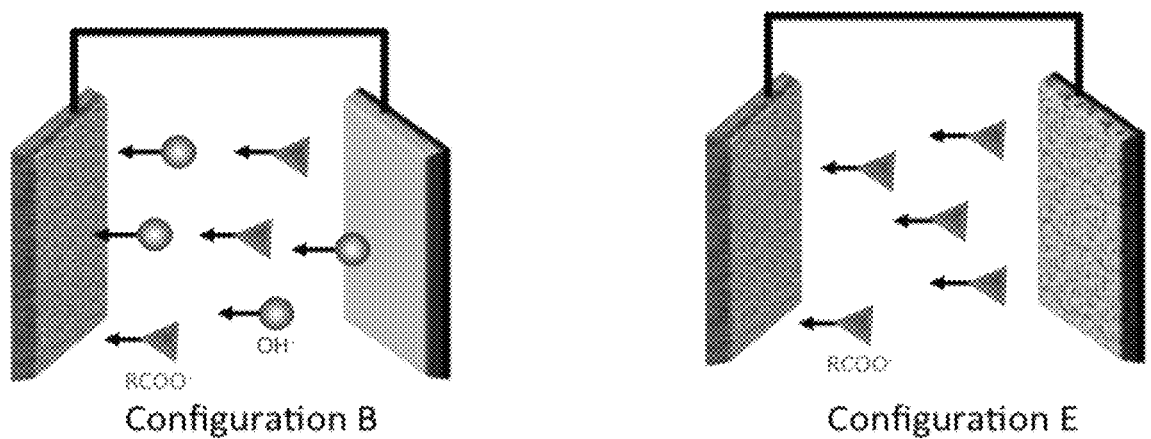
FIG. 65A
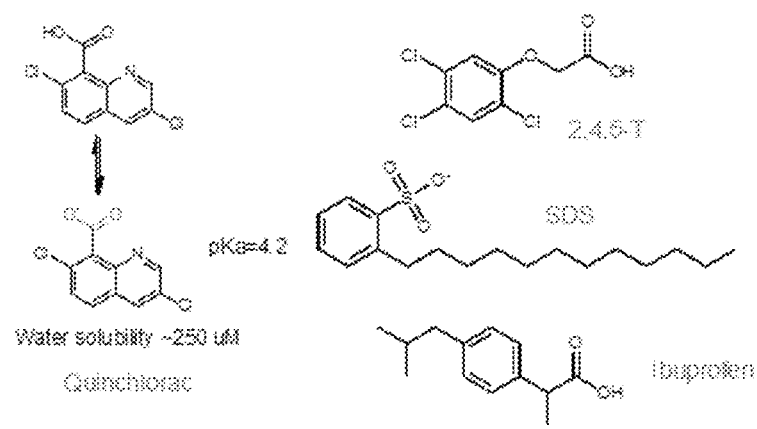
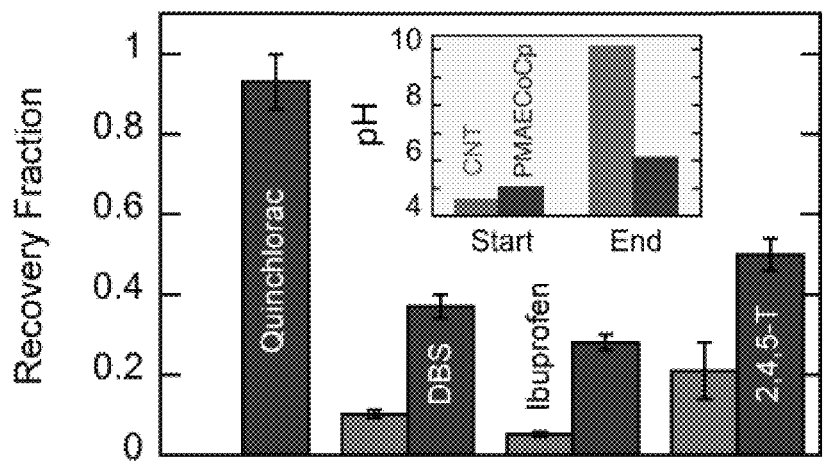
FIG. 65B (a)

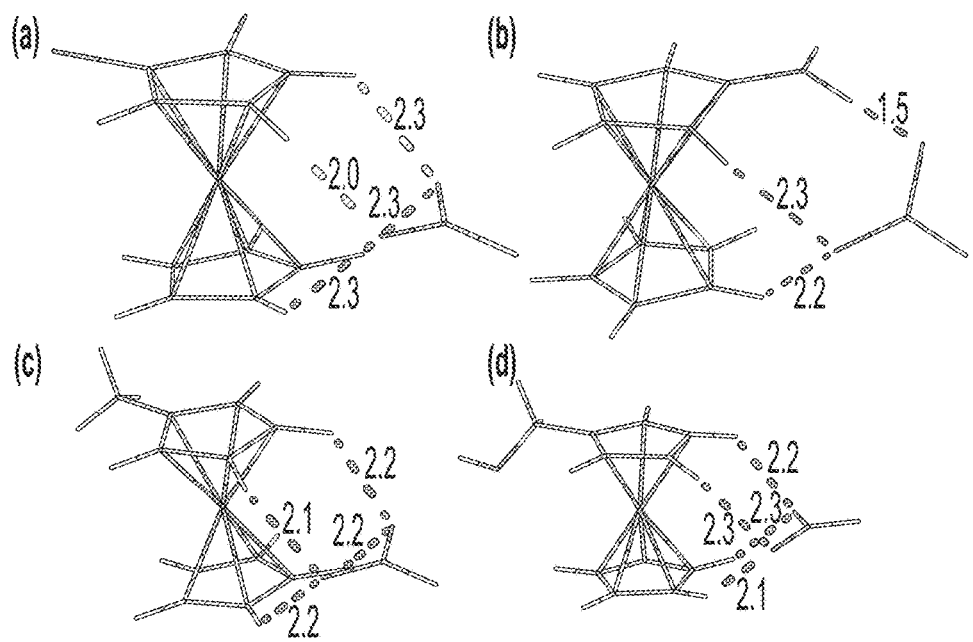
FIG. 109A-109D
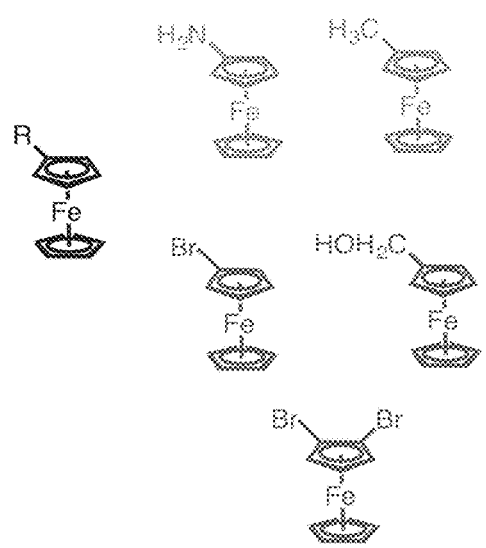
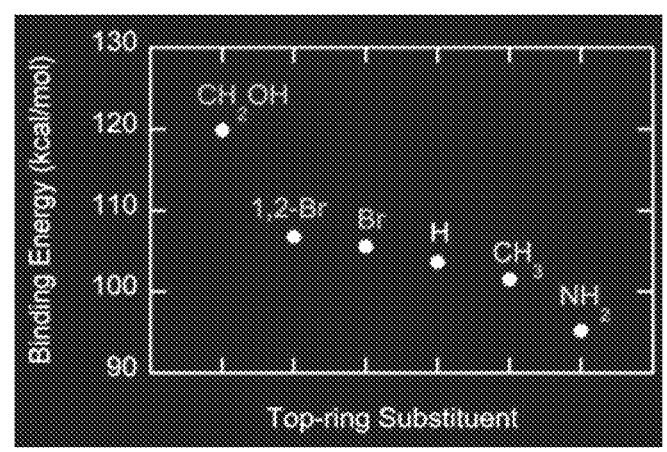
FIG. 110

ELECTROCHEMICAL DEVICES OR SYSTEMS COMPRISING REDOX-FUNCTIONALIZED ELECTRODES AND USES THEREOF

CROSS-REFERENCE TO RELATED APPLICATIONS

This application claims the benefit under 35 U.S.C. § 119(e) of U.S. provisional application No. 62/246,718 filed Oct. 27, 2015 and U.S. provisional application No. 62/346,401 filed Jun. 6, 2016, the contents of each of which are incorporated by reference herein in their entirety.

FIELD OF THE TECHNICAL DISCLOSURE

Various aspects described herein relate to electrochemical devices, e.g., for separation of one or more target molecules or ions from solution, and methods of using the same. In particular embodiments, the electrochemical devices and methods described herein involve at least one redox-functionalized electrode, e.g., for selective separation of one or more target organic ions from solution.

BACKGROUND

Selective recovery or separation of organic ions, e.g., organic anions or cations, from solution is a crucial challenge in the chemical and pharmaceutical industries, and in environmental remediation efforts such as in large-scale wastewater treatment facilities. For example, chemical pollutants in ultra-dilute concentrations (e.g., organic endocrine disruptors, pesticides, household chemicals, dyes and heavy metal cations), which are classified by the EPA as contaminants of emerging concern, pose a particularly vexing problem in wastewater treatment, since existing technologies suffer from high energetic penalties and performance limitations when confronted with pollutants at these very low concentrations (nM to $\mu$M) with competing species in excess. These compounds often originate from high-level chemical manufacturing, and can have a strong detrimental impact on the aquatic environment and human health.

Traditional separation methods, such as physiochemical adsorption, coagulation, capacitive deionization (CDI), chemical oxidation, and membrane processes (e.g., reverse osmosis, nano-filtration, electro-dialysis), typically suffer from one or more of the following drawbacks: low ion specificity and selectivity, lack of regenerability of adsorbent materials, requirement for high temperature and/or pressure, high operating costs, and generation of secondary pollutants in the process. Grimm et al. (1998) *Desalination* 115: 285-294; Suss et al. (2012) *Energy & Environmental Science* 5; 9511-9519; Subramani et al. (2011) *Water Research* 45: 1907-1920. Accordingly, efficient, affordable and robust purification technologies are needed for a range of separation contexts, from point-of-source treatment or remote in-situ purification devices to large-scale wastewater treatment facilities.

SUMMARY

The present disclosure is, in part, based on the design and construction of an electrochemical separation device with redox-functionalized electrode(s) tuned to selectively interact with a functional group of a target species (e.g., organic or inorganic anions and/or cations) during modulation of an electrical potential applied to the electrodes, thereby separating the target species (e.g., organic or inorganic anions and/or cations) from solution. In one example, a redox species (e.g., a metallocene such as ferrocene) that is selective toward a target electron donating functional group (e.g., a moiety that donates one or more electrons such as carboxylate) of an anion is immobilized to an anodic electrode. Upon application of an electrical potential, the redox species (e.g., a metallocene such as ferrocene) of the anodic electrode is oxidized, which captures target anions through the target electron donating functional group (e.g., carboxylates) of the target anions. In some embodiments where the redox species is a metallocene, the selectivity relies on the direct interaction (e.g., hydrogen bonding) of the target anion with the cyclopentadienyl ring of the metallocene. The captured target anions can be subsequently released or desorbed by reversal (partial or complete, including V=0) of the applied electrical potential, with minimal or no pH, temperature, or other changes in solution condition. The electrochemical devices or systems described herein do not rely on intercalated ions between a layered structure of an electrode that reversibly move from the electrode to another.

Accordingly, one aspect of the present disclosure features an electrochemical device or system comprising a redox-functionalized first electrode and a second electrode. The first electrode (e.g., anode) comprises a first solid substrate and a first redox species immobilized to the first solid substrate, wherein the first redox species is selective toward a target functional group of a target molecule (e.g., a neutral or charged organic molecule, or a neutral or charged inorganic molecule).

In another aspect, the present disclosure provides an electrochemical system that utilizes chemical interaction(s) to target a specific species based on redox mediation. The electrochemical system comprises (a) a first electrode comprising a solid substrate comprising a first redox-species immobilized to the solid substrate, wherein the first redox-species is selective toward a target anion based on a first specific chemical interaction between the first redox species and the target anion, wherein the first specific chemical interaction is activated by a first Faradaic/redox reaction; and (b) a second electrode.

In some embodiments of various first electrodes described herein, the first redox species in an oxidized state selectively binds to an electron-donating functional group of a target molecule (e.g., a neutral or charged organic molecule; or a neutral or charged inorganic molecule). For example, the first redox species may be oxidized to comprise an electron-receptor functional group (e.g., a moiety that accepts one or more electrons) upon application of an electrical potential. Examples of such a first redox species include, but are not limited to organometallic compounds or polymers, an organic species (e.g., polymers), or a crystalline solid. An exemplary organometallic polymer includes, but is not limited to polyvinyl(ferrocene). Other first redox species, e.g., cyclodextrin-based systems, metal-polypyrridyl systems, metal dicarbamate, cryptand, redox-active arene, dendrimer comprising a redox-active center, and/or redox-active organic macrocycles, can also be used in the first electrodes.

In some embodiments involving the devices or systems described herein, the first redox species present in the first electrode comprises a metallocene. Thus, in another aspect, the present disclosure provides an electrochemical device or system comprising a first electrode that comprises a metallocene-comprising solid substrate, wherein the metallocene is immobilized to the first electrode and selective toward a target functional group of a target molecule (e.g., a neutral or charged organic molecule; or a neutral or charged inorganic molecule); and a second electrode.

In some embodiments involving various first electrodes described herein, the first redox species or metallocene comprises a ferrocene-based redox species. In these embodiments, the cyclopentadienyl ligand of ferrocenium (oxidized state of ferrocene) can form a hydrogen bonding with an organic anion, e.g., an anion comprising a carboxylate moiety, a sulfonate moiety, or a phosphonate moiety.

In some embodiments involving various first electrodes described herein, the first redox species or metallocene may interact with a moiety of an inorganic ion (e.g., but not limited to nitrates, phosphates, fluorides, among others), or a moiety of a neutral molecule. Accordingly, some embodiments of the electrochemical devices or systems described herein can be used to separate inorganic ions or neutral molecules from other competing species (e.g., dissolved ionic and/or neutral species) in the solution.

In various embodiments involving the electrochemical devices or systems described herein, the second electrode (e.g., cathode) can be electrically conductive and electrochemically inert; or a conductive electrode functionalized with a redox species. In some embodiments, the redox species in the second electrode can be (i) the same redox species as in the first electrode; (ii) a redox species with identical chemical identity to the redox species of the first electrode, but in a different oxidation state; or (iii) a redox species that has a different charge and chemical identity from that of the redox species of the first electrode. In some embodiments where the second electrode is redox-responsive, the cathode electrode can comprise a second solid substrate and a second redox species immobilized to the solid second substrate, wherein the second redox species undergoes a self-exchange reaction within the second electrode during operation of the electrochemical system. Examples of the second redox species include, but are not limited to neutral or charged molecules comprising an electron-acceptor moiety; and charged species of the first redox species described herein.

In another aspect, an electrochemical system comprising a first electrode comprising a solid substrate comprising metallocene, wherein the metallocene is selective toward a target functional group of a target molecule; and a second electrode is provided herein.

A further aspect of the present disclosure features an electrochemical system comprising (i) first electrode comprising a solid substrate comprising a first redox-species, wherein the first redox-species is selective toward a target anion based on a first specific chemical interaction between the first redox species and the target anion, wherein the first specific chemical interaction is activated by a first Faradaic/redox reaction; and (ii) a second electrode. In some embodiments, the second electrode comprises a second redox-species that is selective toward a target cation based on a second specific chemical interaction between the second redox species and the target cation, wherein the second specific chemical interaction is activated by a second Faradaic/redox reaction.

Various embodiments and/or aspects of the electrochemical devices or systems described herein can further comprise an electrolyte disposed between the first electrode and the second electrode. In some embodiments, the electrolyte comprises an aqueous medium. In alternative embodiments, the electrolyte comprises an organic medium.

The electrochemical devices or systems described herein can be used for various applications, e.g., electrochemical separation, ion-selective capacitive or pseudocapacitive deionization, Faradaic-based devices for energy storage, redox-based sensing, electrocatalysis, and wastewater treatment.

The details of one or more embodiments of the disclosure are set forth in the description below. Other features or advantages of the present disclosure will be apparent from the following drawings and detailed description of several embodiments, and also from the appended claims.

BRIEF DESCRIPTION OF THE DRAWINGS

The following drawings form part of the present specification and are included to further demonstrate certain aspects of the present disclosure, which can be better understood by reference to one or more of these drawings in combination with the description of specific embodiments presented herein.

FIG. 1 shows a specific anion interaction based on redox-species oxidation through electrochemical control for selective electrosorption.

FIG. 3A shows the adsorption of 3.4 mM organic anions with distinct functional groups with 100 mM LiClO4 competing electrolyte by PVF/CNT with a ferrocene loading of 4 μmoles. FIG. 3B shows the adsorption of different carboxylates from water under controlled potential (+0.6 V) under same conditions, 3.4 mM with 100 mM $LiClO_4$ as the supporting electrolyte. FIG. 3C shows cyclic voltammetry at 0.02 V/s with electrodes with varying PVF and CNT loading in 95% MeCN/5% $H_2O$ in a solution of 100 mM $TBAPF_6$. FIG. 3D shows the adsorption of formate (3.4 mM) from 95% MeCN/5% $H_2O$ in 100 mM $TBAPF_6$ with varying PVF loading.

FIG. 4A shows Fe 2p spectra of PVF/CNT after adsorption of formate in aqueous and organic (95% acetonitrile/5% water) media. FIG. 4B shows Fe 2p spectra of PVF/CNT composite as-synthetized. FIG. 4C shows Fe 2p spectra after oxidation at +0.24 V with no formate present in organic media (95% acetonitrile/5% water). FIG. 4D shows Fe 2p spectra after oxidation at +0.24 V with 50% formate adsorption in organic media (95% acetonitrile/5% water). FIG. 4E shows Fe 2p spectra after adsorption with 100% formate adsorption in organic media (95% acetonitrile/5% water). FIG. 4F shows electron paramagnetic resonance (EPR) spectra of oxidized PVF complexed with formate anions compared to oxidized PVF complexed with inorganic anions.

FIG. 5A shows optimized geometries of ferrocenium-perchlorate (green) and ferrocenium formate (blue) with one key H—C—Fe angle (°) and intermolecular O—H distance (A) labeled, highlighting ring deflection under chemical interaction with formate. FIG. 5B shows the total electronic density differences for ferrocenium-formate complex and ferrocenium-perchlorate complex at an isosurface value of 0.1 (charge gain with respect to isolated fragments is denoted in blue and charge loss is denoted in red). FIG. 5C shows the solvation-corrected binding energy of ferrocenium (kcal/mol) using the polarized continuum model (pcm) with formate and perchlorate. FIG. 5D shows the gas-phase binding energy of ferrocenium-anion complexes augmented with empirical van der Waals dispersion (VdW) in grey and corrected for basis-set superposition error (BSSE).

FIG. 9 depicts heterogeneously organometallic redox-electrodes showing remarkable stoichiometric selectivity towards organic anions based on functional affinity in the presence of competing ions. The ferrocene-functionalized redox-electrode is selective for carboxylates, sulfonates and phosphonates over 33-fold excess competing electrolyte based on a redox-mediated H-bonding interaction dependent on the electronic structure of the anion. This is one of the first anion-selective redox-electrodes based on electrochemically-activated interactions.

FIG. 12 shows Zeiss SEM high-resolution imaging of the surface of PVF/CNT film.

Cyclic voltammetry (CV) was used on pristine ferrocene to investigate the formal potentials of the redox pairs. The electron transfer and anion binding process can be written as:

$$Fc+A^-\rightarrow Fc^+A^-+e^-$$

The formal potential $E_0$ for this process is estimated as (Schultz, 2005):

$$E_0 = \frac{E_{ox\,peak} + E_{red,peak}}{2}$$

Ag/AgCl reference was utilized with a Pt counter and a glassy carbon working electrode. The reversible ion-pair formation was performed with select salts with the appropriate counter-ions. In organic, tetrabutylammonium benzoate was chosen as the carboxylate species due to its greater solubility upon forming the ion-pair, with ferrocene as the starting soluble species and DMSO as the solvent. CV of in 5 mM was solubilized with 100 mM of benzoate, and compared to the CV of ferrocene in 100 mM $PF_6^-$ at 0.1 V/s and 0.01 V/s. At 0.1 V/s the reversible peaks of benzoate were significantly clearer, as seen in FIG. 20.

Figure 20:
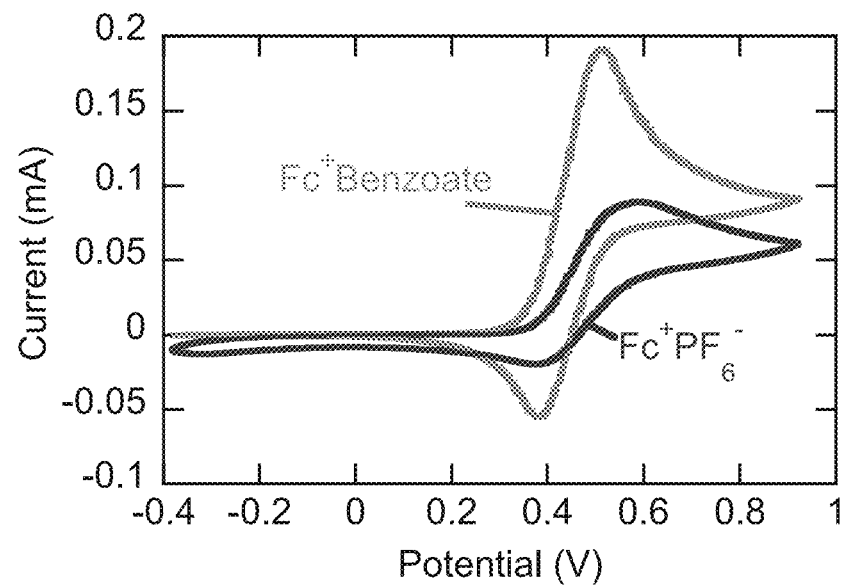

FIG. 20 shows CV at 0.1 V/s with 100 mM respective anion and 5 mM pristine ferrocene in DMSO.

$$E_{formal}(\text{anion})=(E_{peak,\,oxidation}+E_{peak,\,reduction})/2$$

$$E_{formal}(Fc^+\text{benzoate})=0.446\text{ V}$$

$$E_{formal}(Fc^+PF_6^-)=0.486\text{ V}$$

The free energy of interaction was estimated to be $\Delta G=-nF\Delta E\sim3.8$ kJ/mol for the preferential binding of benzoate over hexafluorophosphate using the formal potentials of pristine ferrocene. In water, ferrocenium tetrafluoroborate was used as the non-coordinating salt, with lithium perchlorate and lithium acetate as the anions. CVs were performed at 0.01 V/s 10 mM of ferrocenium tetrafluoroborate and 100 mM of each anion, $CH_3COO-$ (as lithium acetate) and 100 mM of lithium perchlorate. See FIG. 21.

Figure 21:
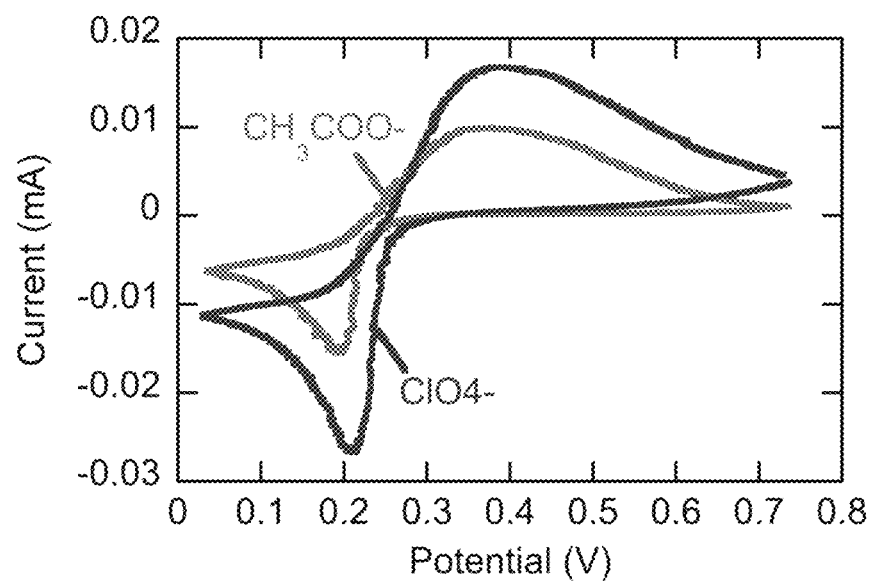

FIG. 21 shows CV at 0.01 V/s with 100 mM respective anion and 5 mM pristine ferrocenium-hexafluorophosphate in water. $E_{formal}(CH_3COO-)=0.283$ V; $E_{formal}(ClO_4^-)=$ 0.299 V; $\Delta G=-nF\Delta E\sim 1.5$ kJ/mol $$E_{formal}(CH_3COO-)=0.283\text{ V}$$

$$E_{formal}(ClO_4)=0.299\text{ V}$$

$$\Delta G=-nF\Delta E\sim 1.5\text{ kJ/mol}$$

This shift in the homogeneous phase can be attributed to a specific interaction—the lower binding energy in water than organic is probably due to the greater screening of the electrostatic and H-bonding interactions in a more polar medium. Note that the homogeneous pristine Fc study correlates in terms of binding energy and cathodic with the heterogeneous CV of the PVF/CNT film (FIG. B1). The formal potential difference can be given as 0.362 (with $ClO_4^-$) −0.355 V (with $HCOO^-$ in dilute amounts)~0.012 V~1.2 kJ/mol for a PVF/CNT, which is agreeable with a lower binding energy in a more polar solvent. [Electroanalytical Methods: Guide to Experiments and Applications, Fritz Scholz, Springer 2005.]

Figure 22:
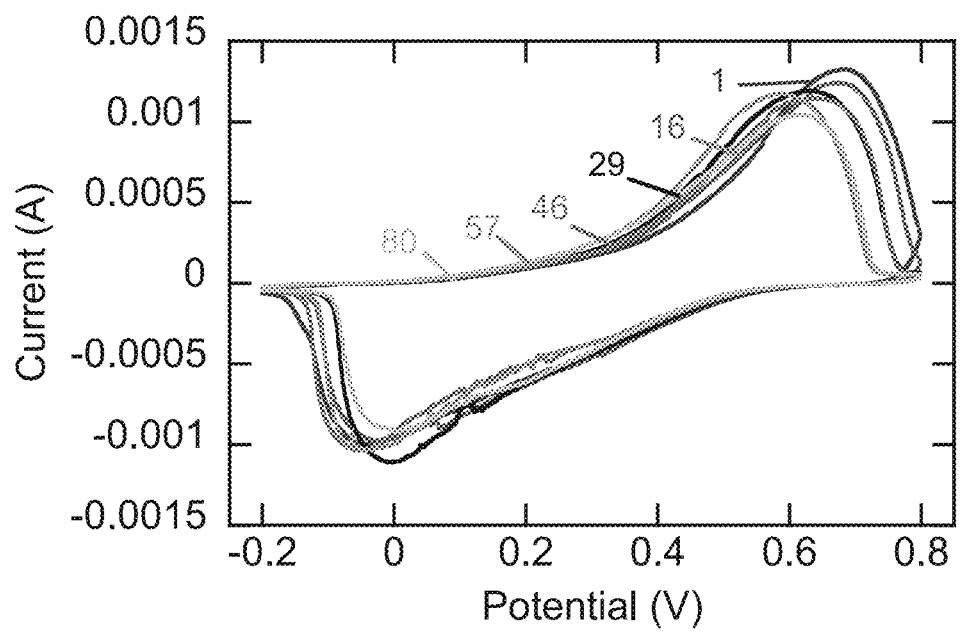

FIG. 22 shows an electrochemical stability study of PVF/CNT(1:1) in water in 0.1 M $LiClO_4$ at 0.005 V/s over 14 hours and 80 cycles.

Figure 23:
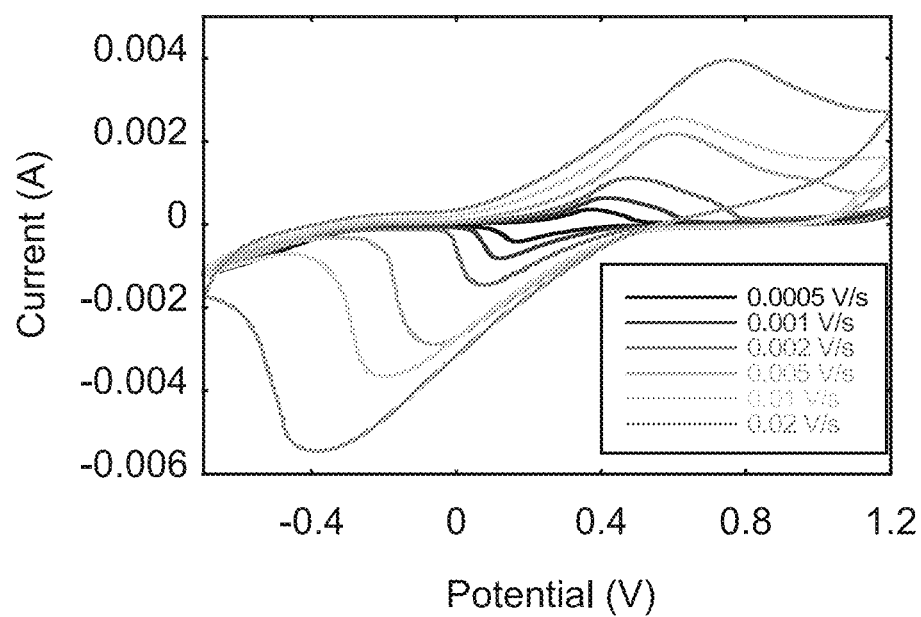

FIG. 23 shows current-voltage dependence on scan rate in 0.1 M LiClO$_4$ in water of PVFx4 sample.

Figure 24:
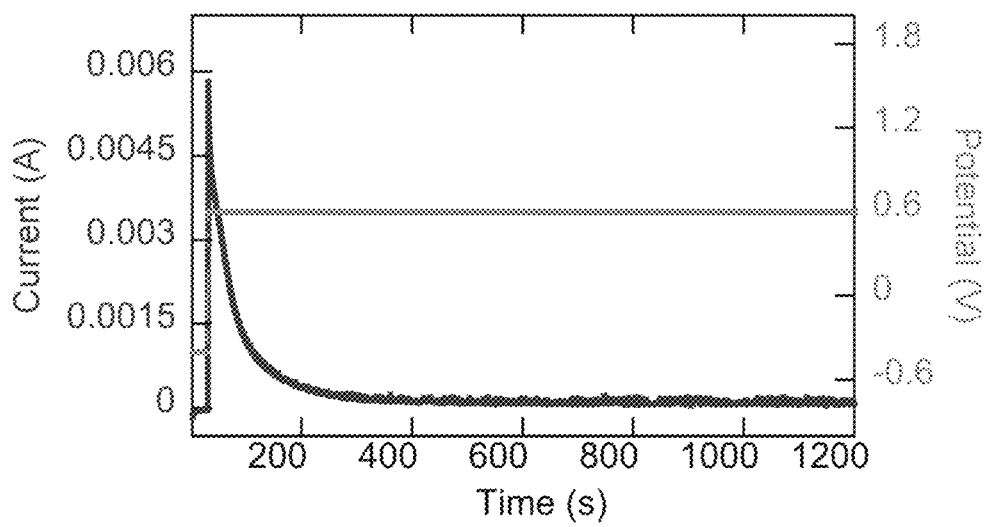

FIG. 24 shows chronoamperometry in water media for separation of formate (3.4 mM LiCOOH in 0.1 M LiClO$_4$ for adsorption).

Figure 25:
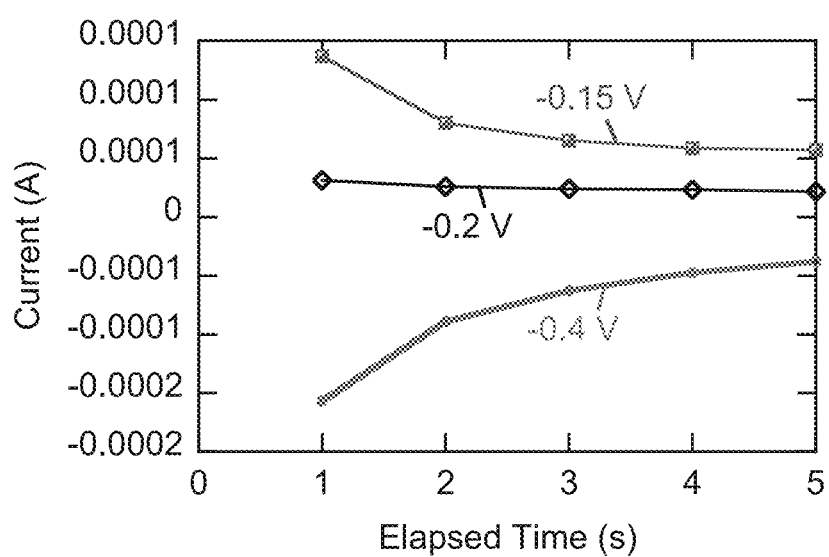

FIG. 25 shows chronoamperometry in 95% v MeCN/5% v H$_2$O for desorption of adsorbed formate on a PVF/CNT (1:1) film at different applied potentials.

FIG. 26 shows CV for system of 15 minutes performance in organic solvent with chronoamperometry in acetonitrile at 0.01 V/s. in 0.1 M TBaPF$_6$ (top), and 10 CVs for system over 1 hr at 0.01 V/s in 0.1 M TBaPF$_6$ (bottom).

FIG. 27 shows cyclic voltammetry at 0.01 V/s of PVF/CNT(1:1) in 95% v MeCN/5% H$_2$O with 0.1 M TBAPF$_6$.

FIG. 28 shows a comparison of ferrocenium hexafluorophosphate salt and PVF complexed with formate (top) and spectra of reduced PVF (bottom).

Figure 29:
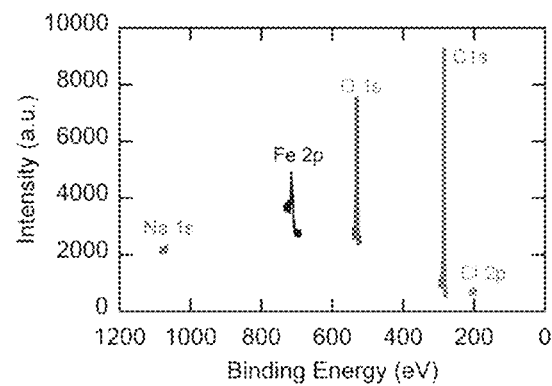

FIG. 29 shows survey spectra of lithium formate co-adsorption (3.4 mM) in water in the presence of sodium perchlorate at 0.1 M. Spectra of surface of PVF/CNT(1:1) after applied potential +0.24 V for 10 min.

Figure 30A:
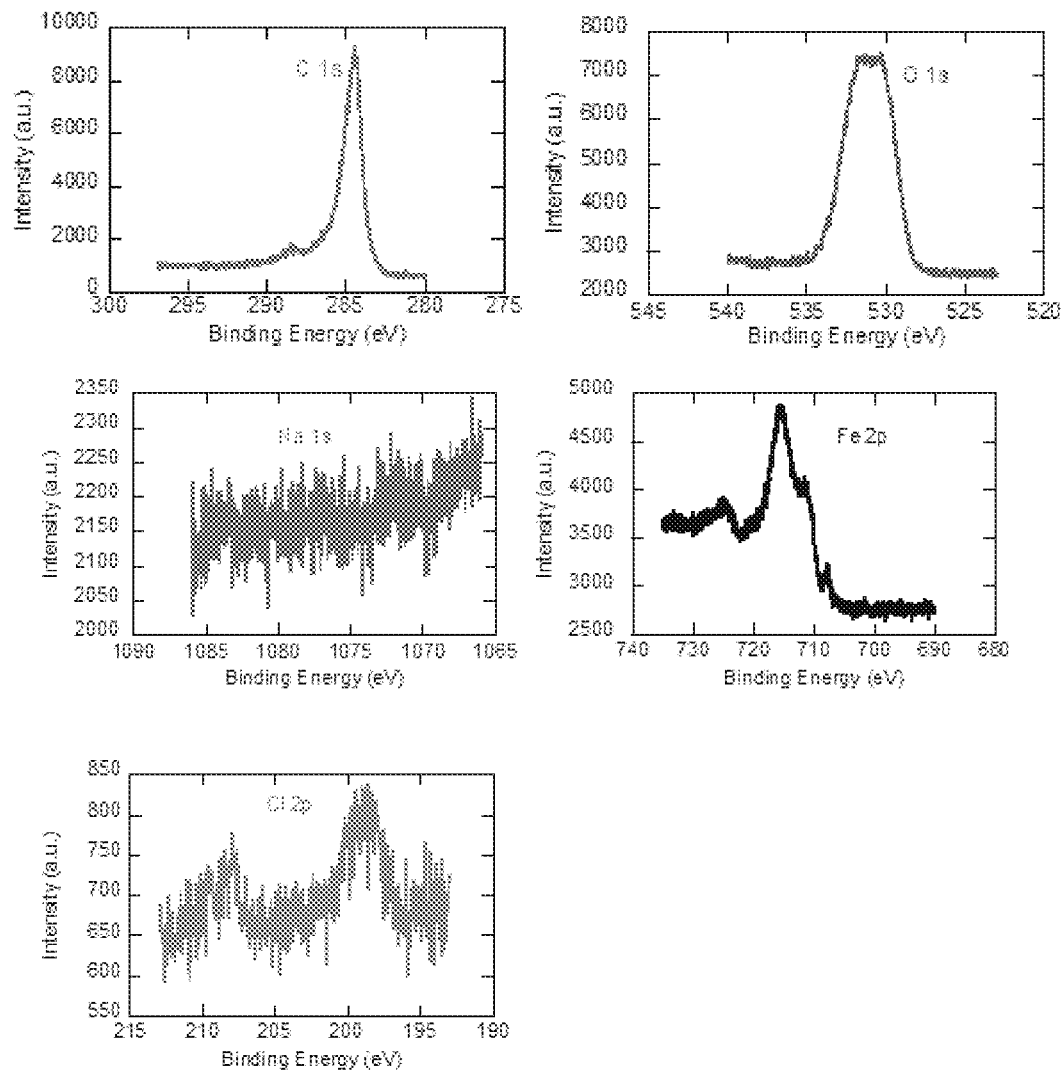
Figures 30B, 31A, 31B:
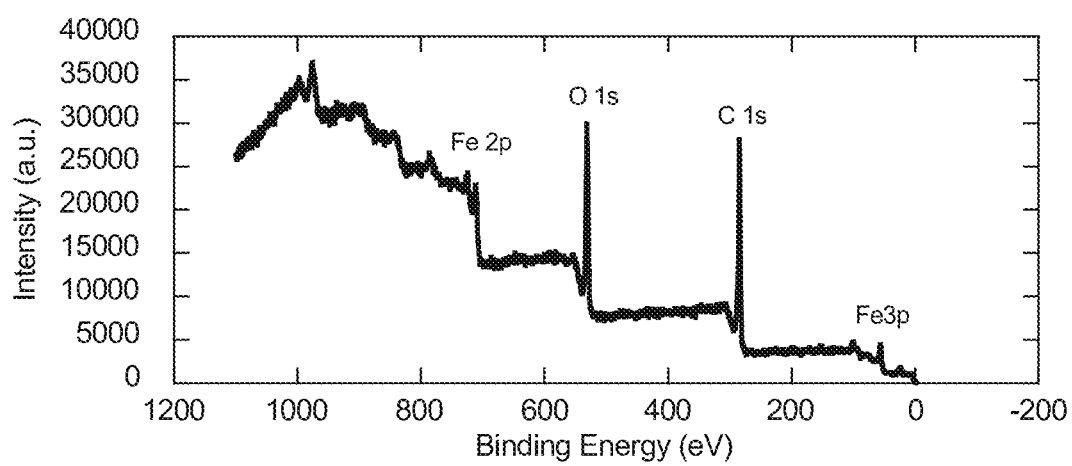

FIG. 30A shows high resolution of lithium formate co-adsorption in water in the presence of sodium perchlorate in 0.1 M. FIG. 30B is a table showing elemental composition analysis from XPS of lithium perchlorate co-adsorption with sodium formate in water (0.1 M).

FIG. 31A shows a co-adsorption study in 95% MeCN/5% water with 3.4 mM formate and 0.1 M terbutylammonium hexafluorophosphate. Spectra of surface of PVF/CNT(1:1) after applied potential+0.24 V for 10 min. FIG. 31B is a table showing elemental composition analysis from XPS of terbutylammonium hexafluorophosphate and lithium formate co-adsorption in organic solvent.

FIG. 32 shows a survey scan of PVF 33% wt/PVF as-synthesized.

FIG. 33A shows high-resolution scans of C1s, O1s and Fe 2p chemistry between different of PVF/CNT (33% PVF). FIG. 33B is a table showing elemental composition of as-synthesized PVF/CNT (33% PVF loading)

Figure 34:
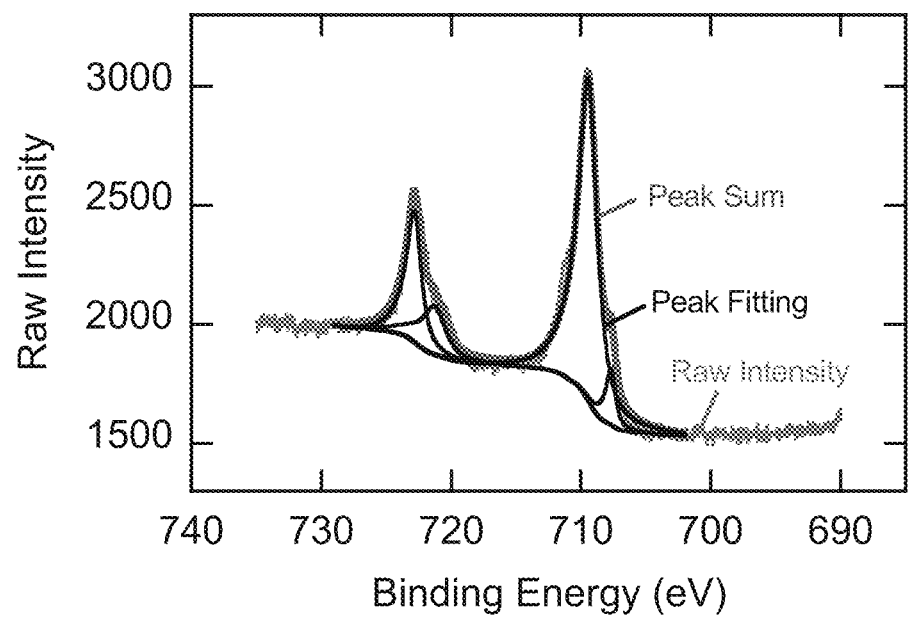

FIG. 34 shows high resolution of Fe p after adsorption at controlled potential+0.6 V of formate in aqueous phase with 3.6 mM of formate and 0.1 M of LiClO$_4$.

Figure 35:
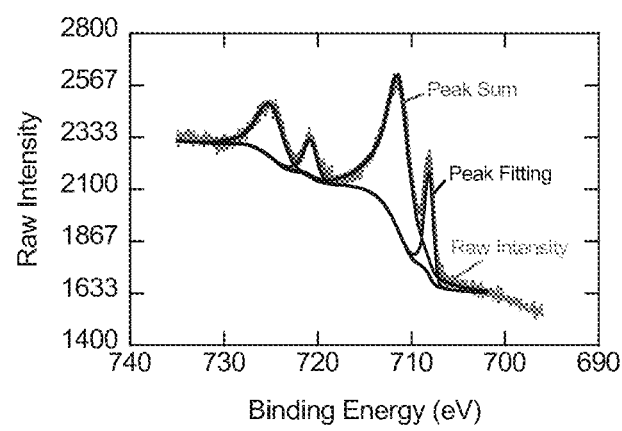

FIG. 35 shows high resolution of Fe p after adsorption under oxidation at 0.005 V/s cyclic voltammetry, in 95% acetonitrile/5% water with 3.6 mM of formate and 0.1 M of TBAPF$_6$.

Figures 36A, 36B:
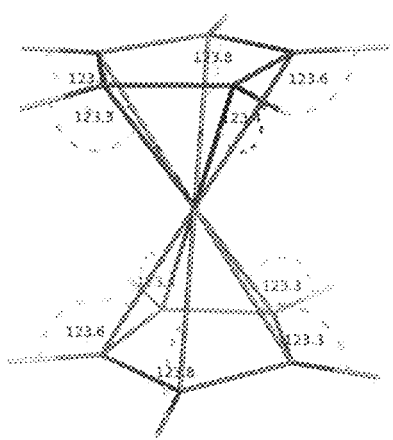

FIG. 36A shows optimized ferrocenium geometry. FIG. 36B show results from geometry optimization using DFT B3LYP/LACVP.

Figure 37:
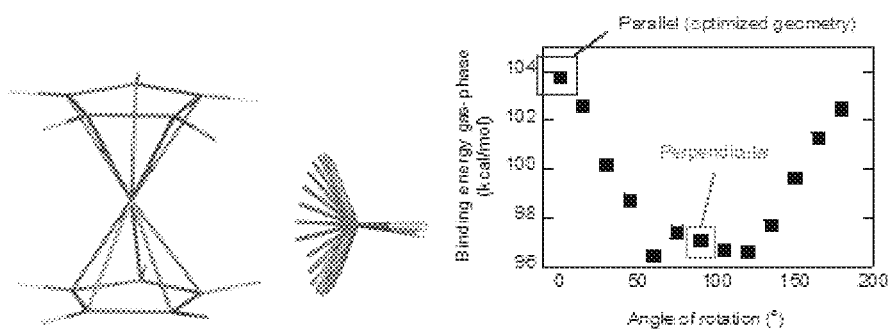

FIG. 37 is an illustration of the rotation of formate around axis with respect to ferrocenium (left) and a graph showing binding Energy with respect to rotation angle allowing for translational optimization at each rotation angle (right).

Figure 38A:
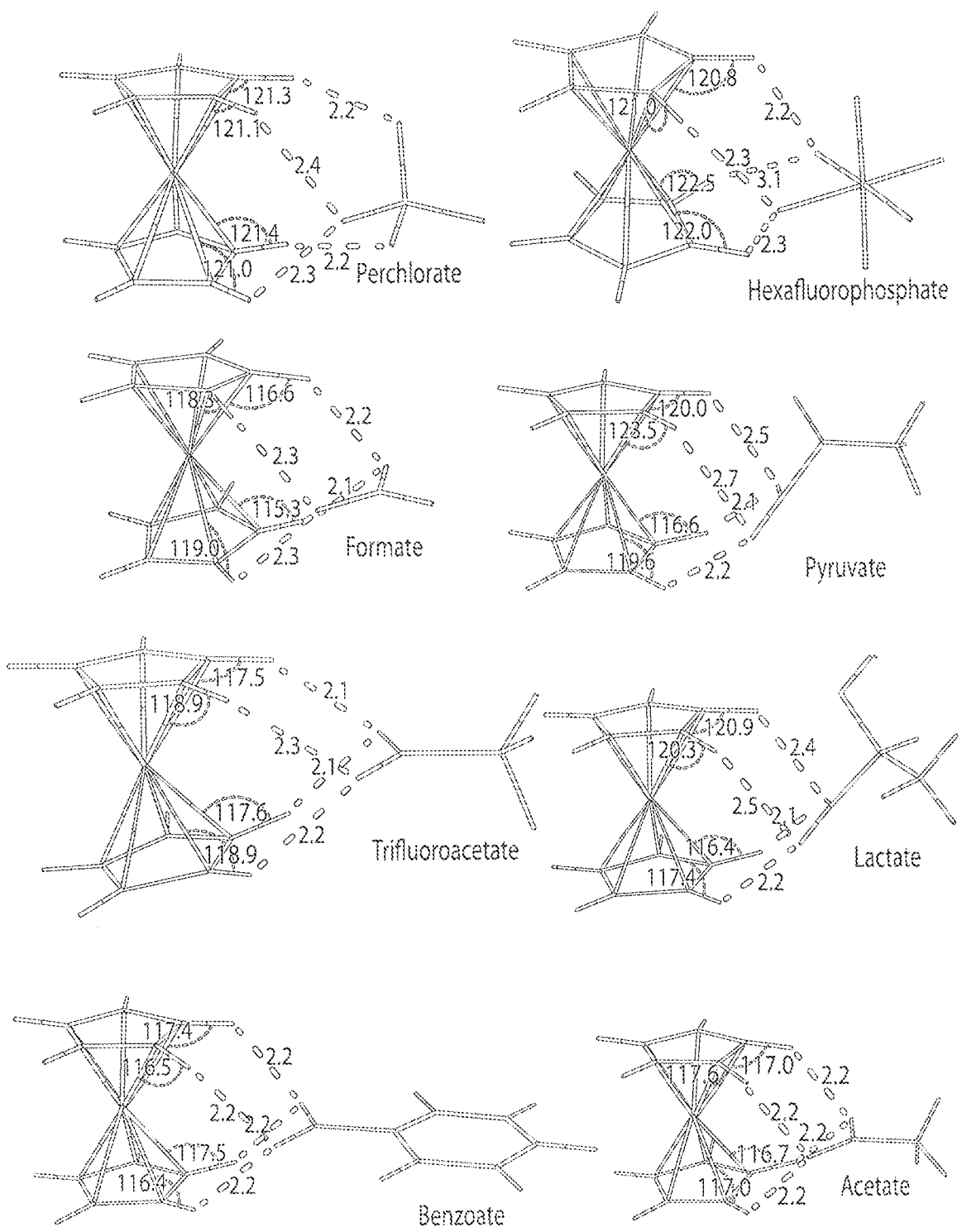
Figures 38B, 39:
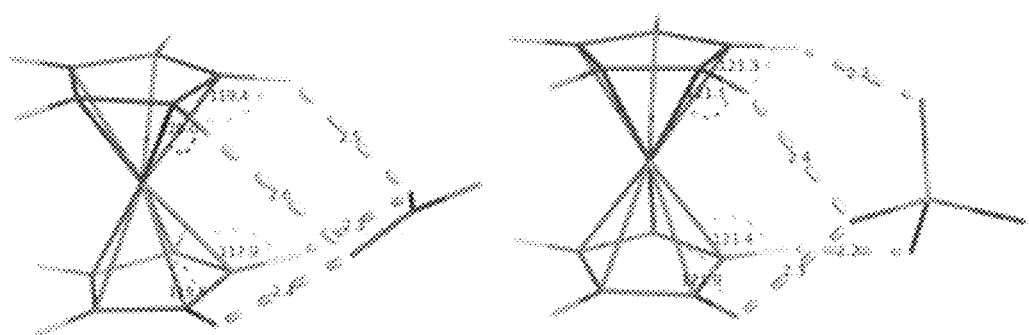

FIG. 38A shows optimized geometries of ferrocenium (fcp)—anion complexes (left to right, top to bottom): fcp-perchlorate, fcp-hexafluorophosphate, fcp-formate, fcp-pyruvate, fcp-trifluorophosphate, fcp-lactate, fcp-benzoate and fcp-acetate. FIG. 38B is a table showing summary of results for angle deflection for each of the anions interacting with ferrocenium.

FIG. 39 shows neutral ferrocene with formate interaction (left) and neutral ferrocene with perchlorate interaction (right).

Figure 40:
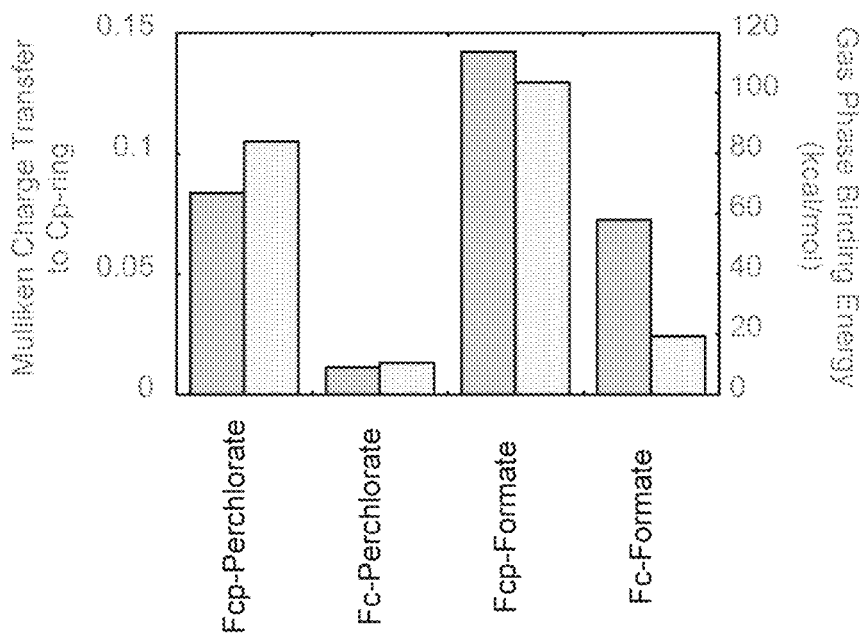

FIG. 40 shows a comparison of charge transfer to one Cp-ring from Mulliken population sums between charged ferrocenium complexed with anions and neutral ferrocene complexed with anion. Also plotted are the B3LYP gas phase binding energies without BSSE correction.

Figure 41:
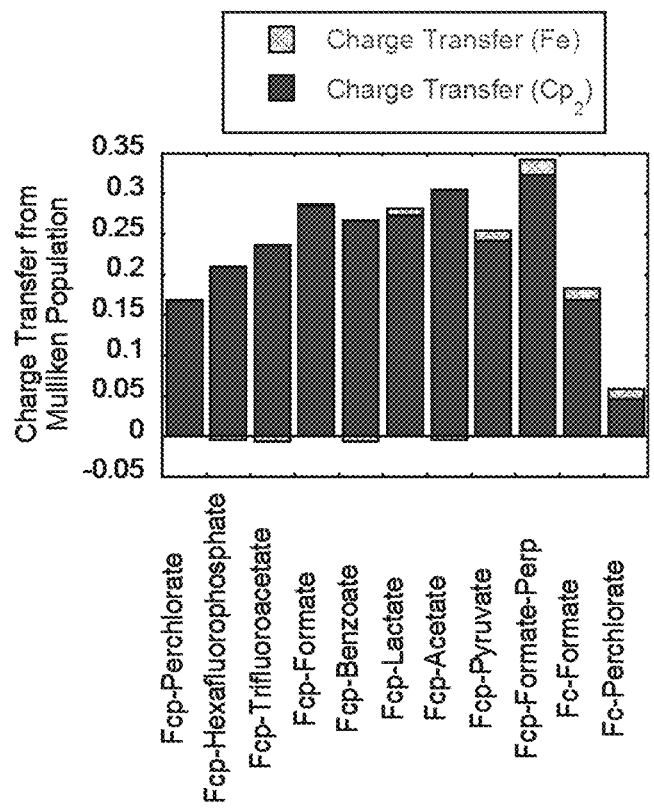

FIG. 41 shows a breakdown of charge transfer to each fragment (Cp$_2$ and Fe) calculated from Mulliken population sums. It can be seen that iron has little charge transfer with most of the electron density being accepted by the Cp rings.

Figure 42:
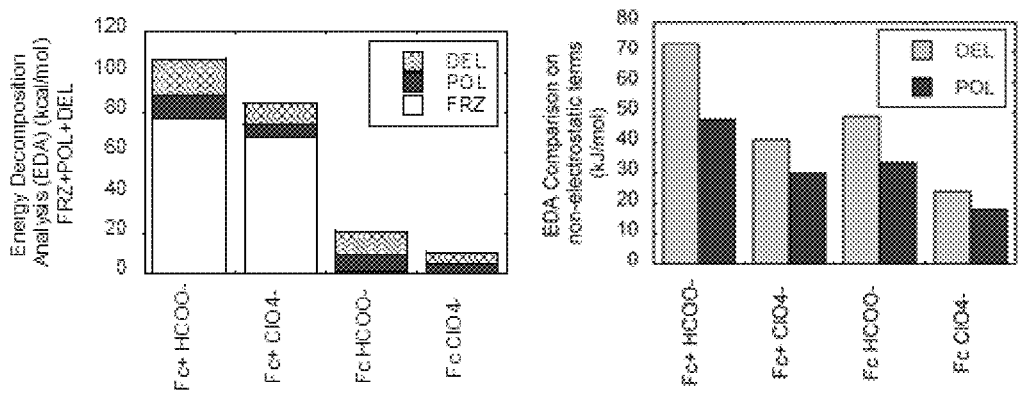

FIG. 42 is a breakdown of energies from ALMO for ferrocenium and ferrocene interacting with perchlorate and formate (FRZ=Frozen density, POL=Polarization and DEL=Delocalization).

Figure 43:
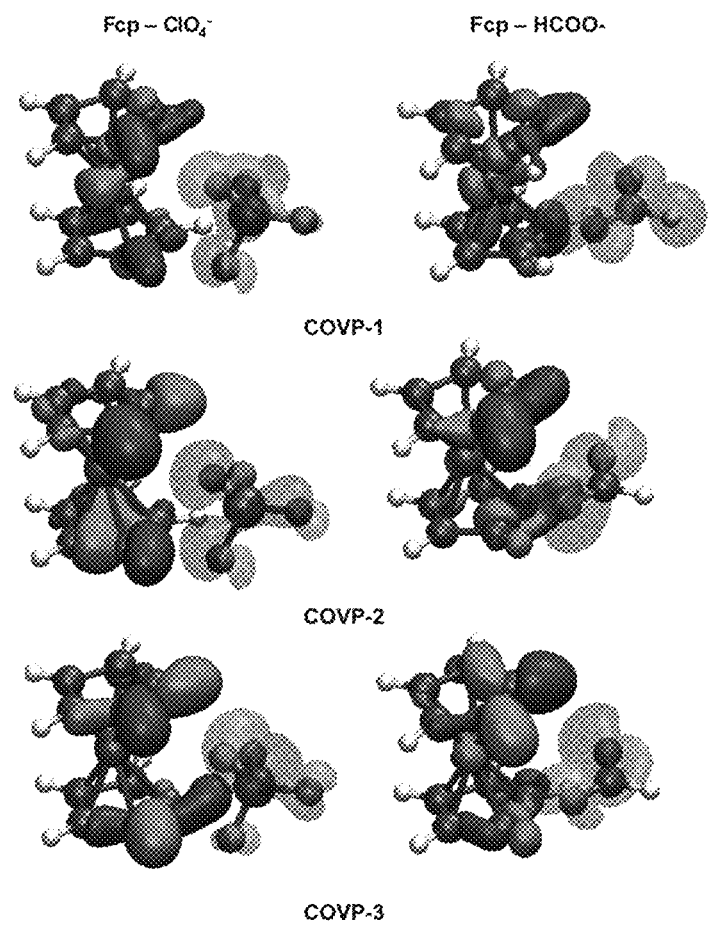

FIG. 43 shows complementary virtual orbitals from ALMO at 0.05 isosurface visualized in MOLDEN.

Figure 44:
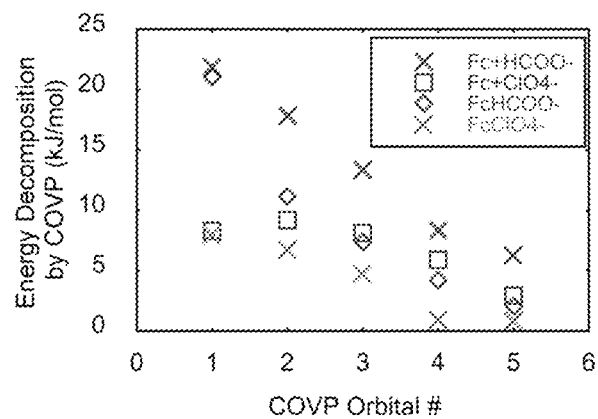

FIG. 44 shows binding energy decomposition by complementary virtual orbital pair between ferrocenium, ferrocene and formate from COVP-ALMO analysis.

Figure 45:
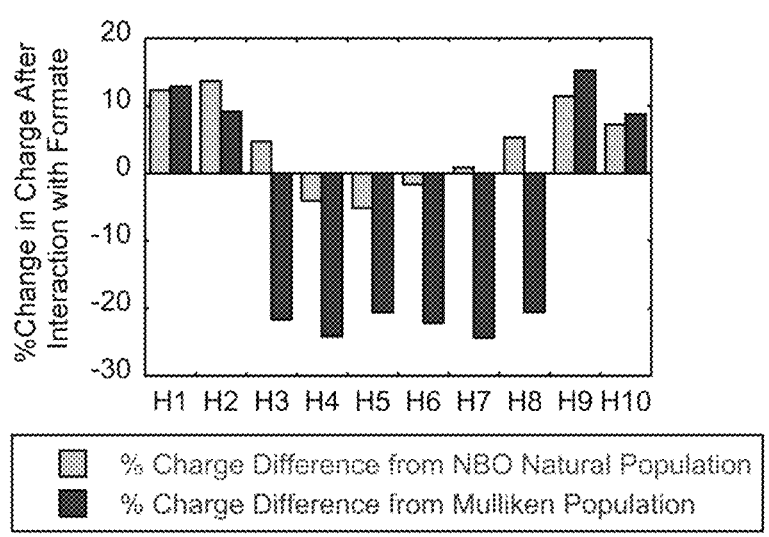

FIG. 45 shows differences in hydrogen charge from natural population analysis and Mulliken before and after interacting with formate. % charge difference=[charge of ferrocenium after interacting with formate]—[charge of ferrocenium before interacting with formate]—positive polarization in H-bonding interacting hydrogens.

Figure 46:
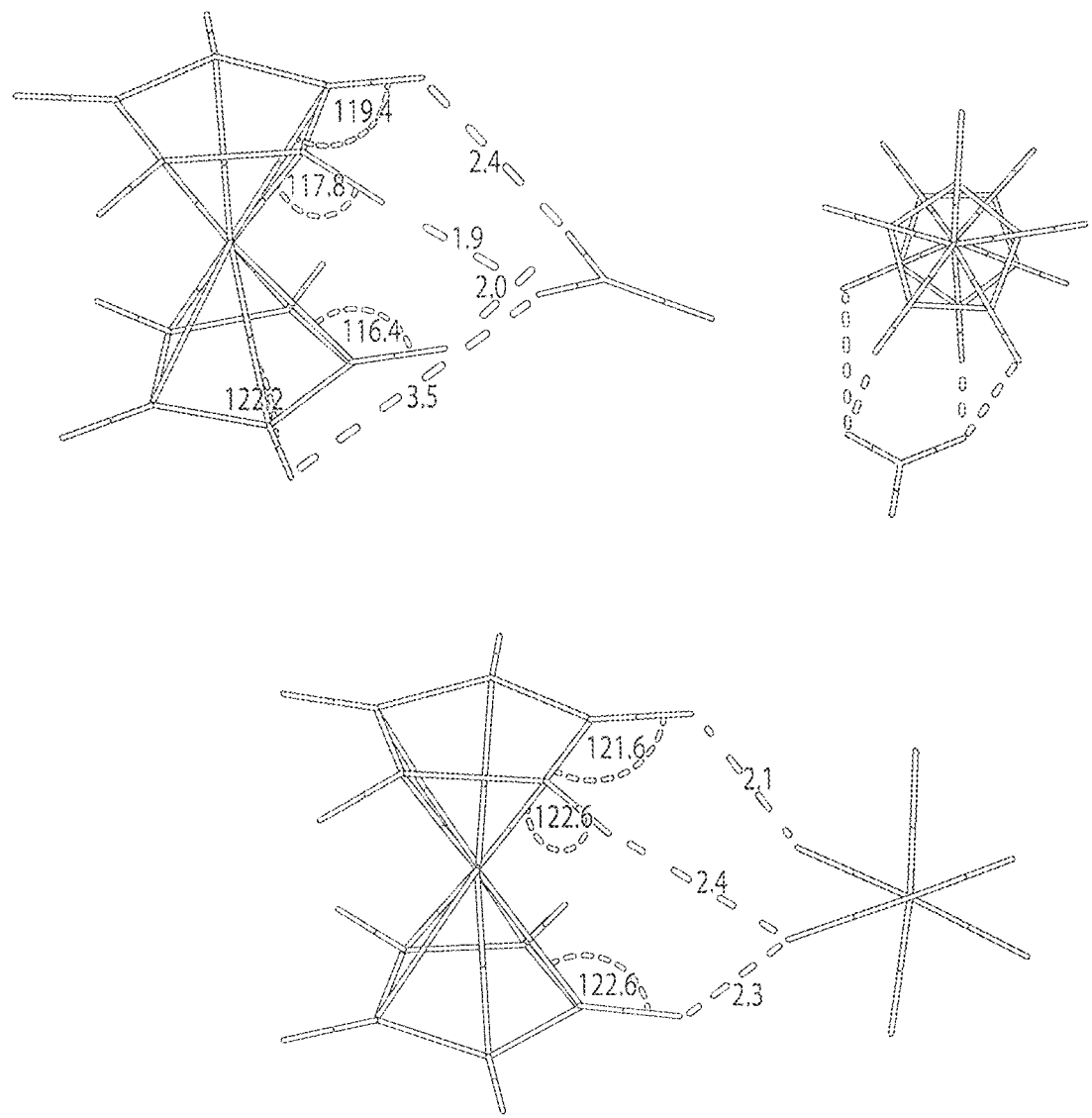

FIG. 46 shows cobaltocenium interaction with formate—6o maximum C—H bent with respect to original geometry and minimum distance 1.9 angstroms (top), and cobaltocenium interaction with hexafluorophosphate—little to no angle deflection (bottom).

Figure 47:
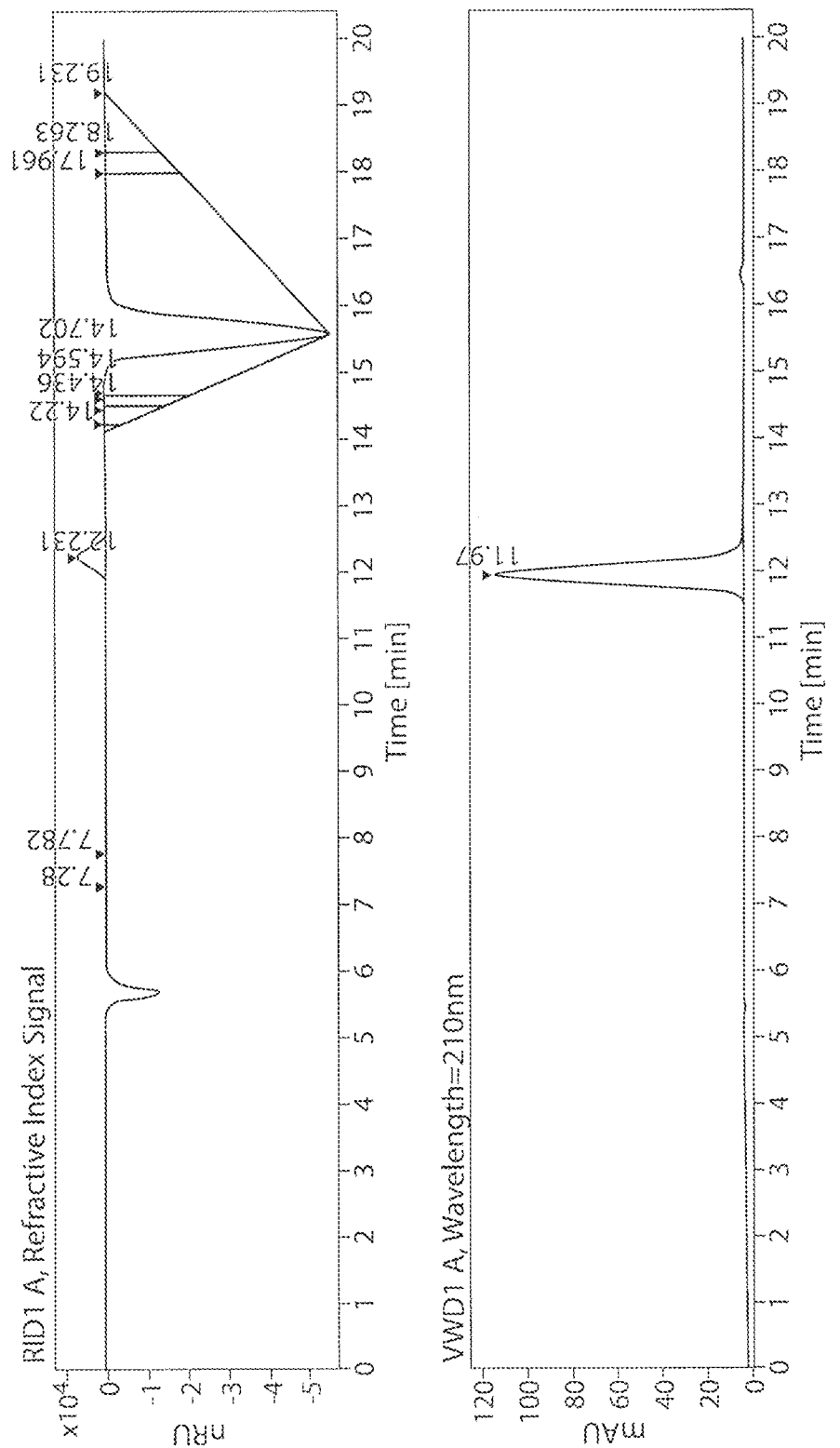

FIG. 47 shows a sample HPLC chromatograph of lithium formate solution 2.7 g/L in water (RID and UV-Vis). At 12.25 min, the formate peak appears.

Figure 48:
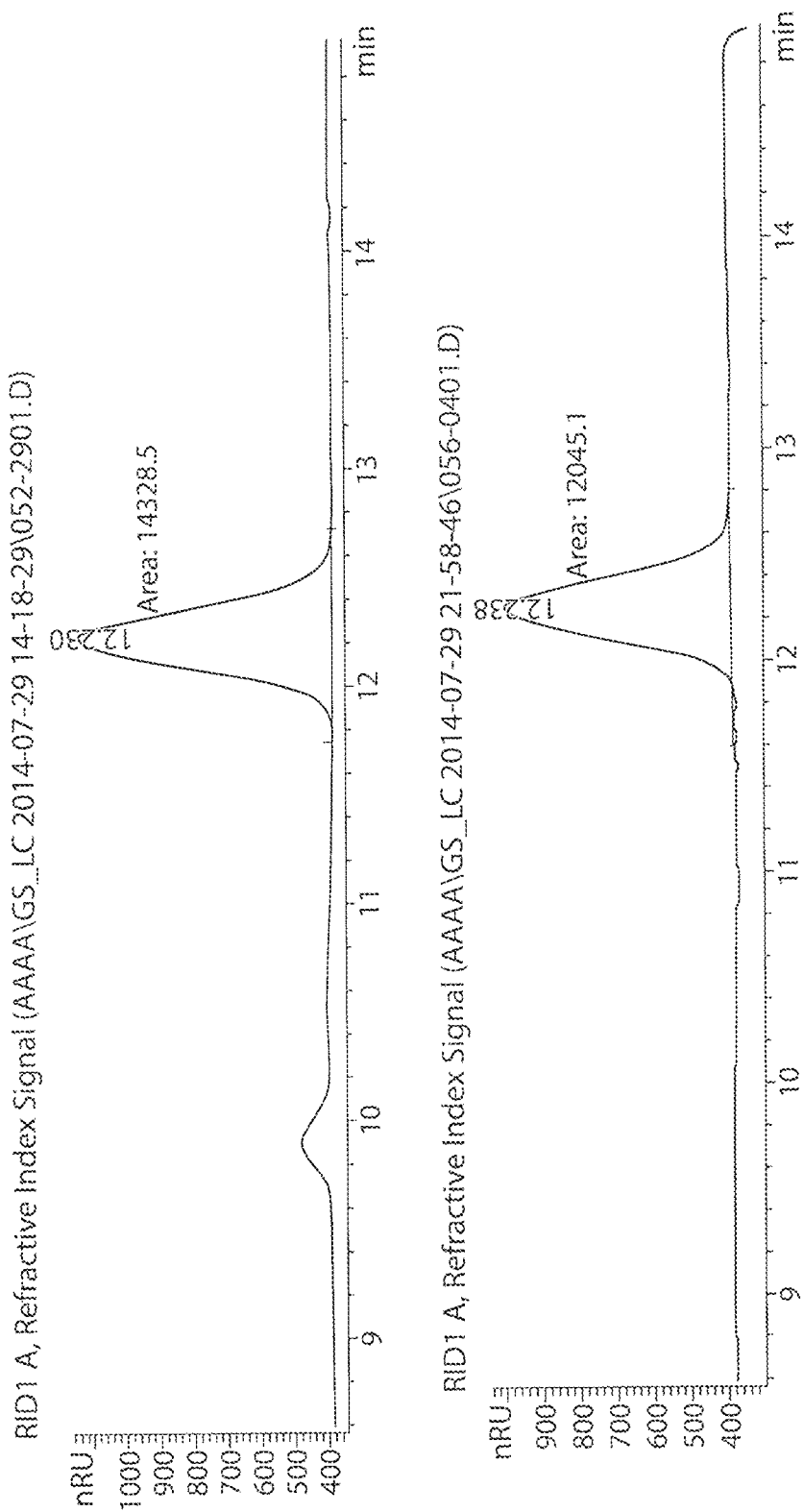

FIG. 48 shows before adsorption (stock solution) sample of formate and 100 mM LiClO4 (peak area 14328.5) (top), and the supernatant after adsorption (peak area 12045.1) (bottom). The initial concentration formate, before adsorption, at 100 mM LiClO$_4$. Nominal concentration 3.7 mM, calibrated concentration 3.07 mM. Bottom—after adsorption concentration 3.42 mM. Amount adsorbed was ~3.42 umoles, which is equivalent to 0.86:1 stoichiometry with respect to iron centers.

Figure 49:
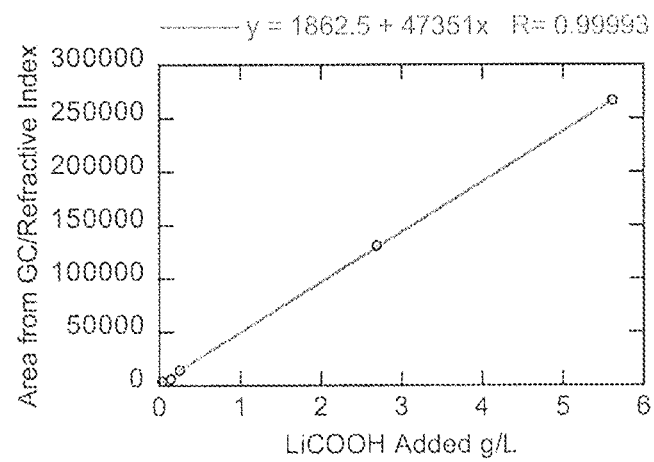

FIG. 49 shows a LiCOOH Calibration curve on Agilent HPLC.

Figure 50:
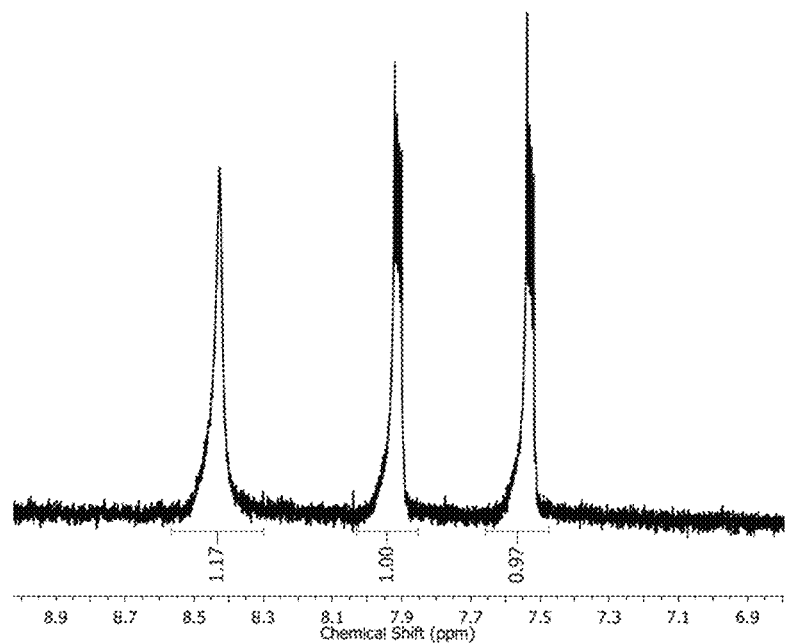

FIG. 50 shows spectra of formate (3.4 mM) before adsorption by PVF/CNT(1:1) PVFx4 in 95% MeCN/5% H$_2$O with 0.1 M TBAPF$_6$. Napthalene is used as the internal standard.

Figure 51:
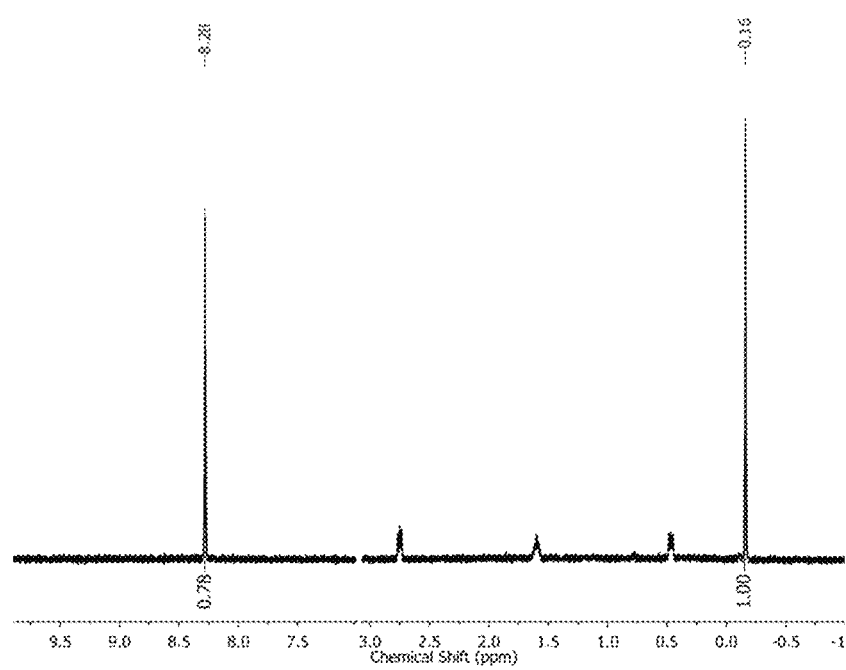

FIG. 51 shows spectra of formate before adsorption by PVF/CNT(1:1) electrode in H$_2$O and 0.1 M LiClO$_4$.

Figure 52:
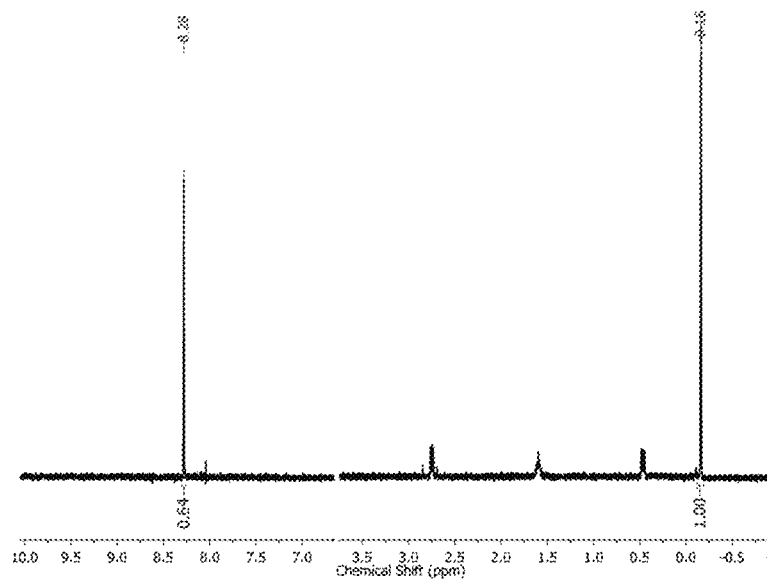

FIG. 52 shows spectra of formate after adsorption by +0.6 V applied potential by PVF/CNT(1:1) electrode in H$_2$O and 0.1 M LiClO$_4$.

Figure 53:
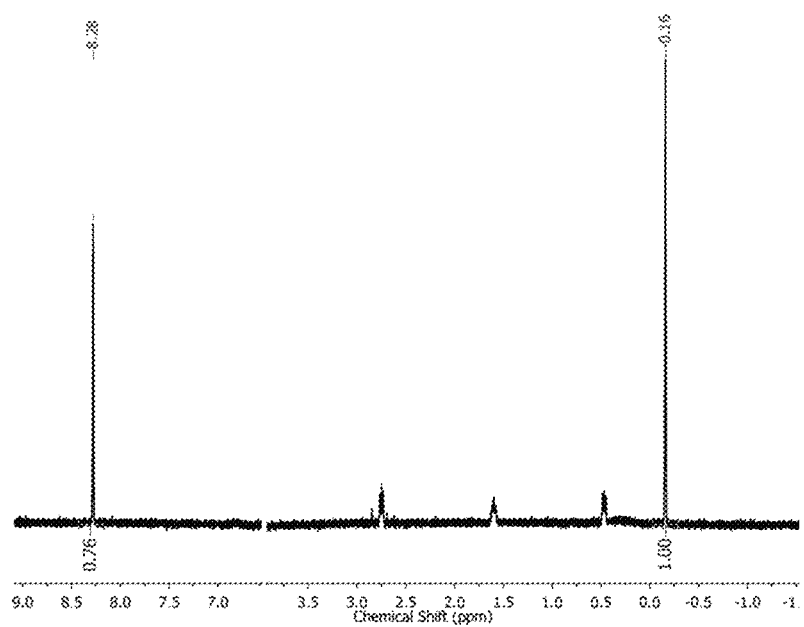

FIG. 53 shows spectra of formate after desorption by +0.2 V applied potential by PVF/CNT(1:1) electrode in H$_2$O and 0.1 M LiClO$_4$.

Figure 54:
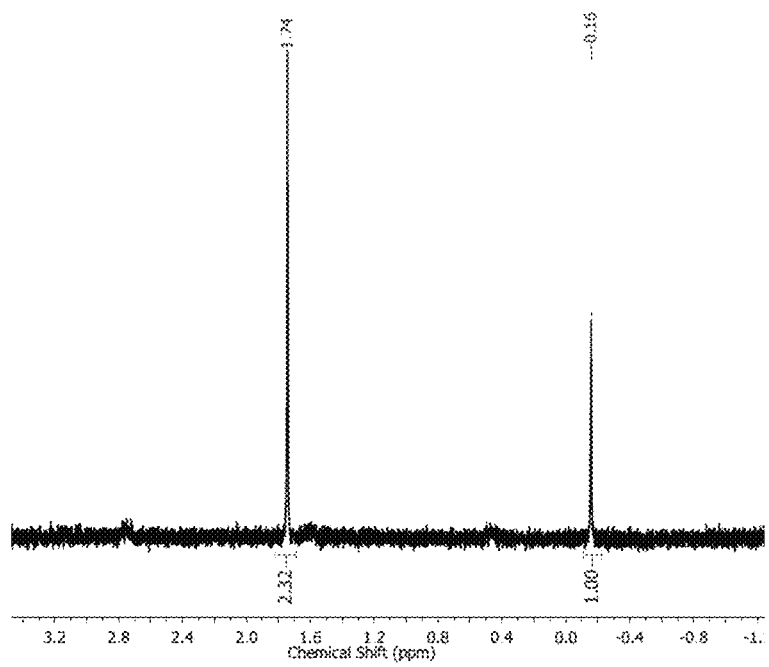

FIG. 54 shows spectra of acetate before adsorption by PVF/CNT(1:1) electrode in H$_2$O and 0.1 M LiClO$_4$.

Figure 55:
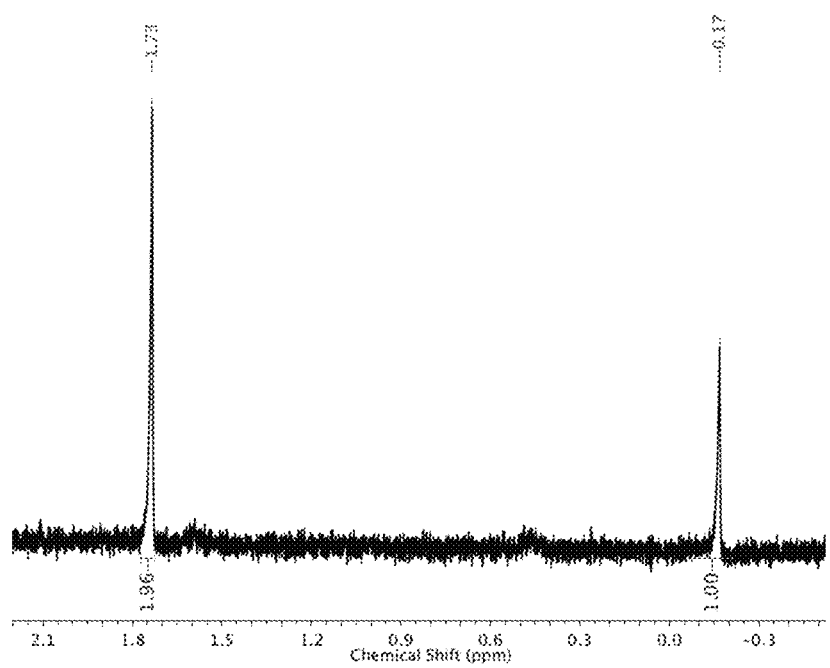

FIG. 55 shows spectra of acetate after adsorption by PVF/CNT(1:1) electrode in H$_2$O and 0.1 M LiClO$_4$.

Figure 56:
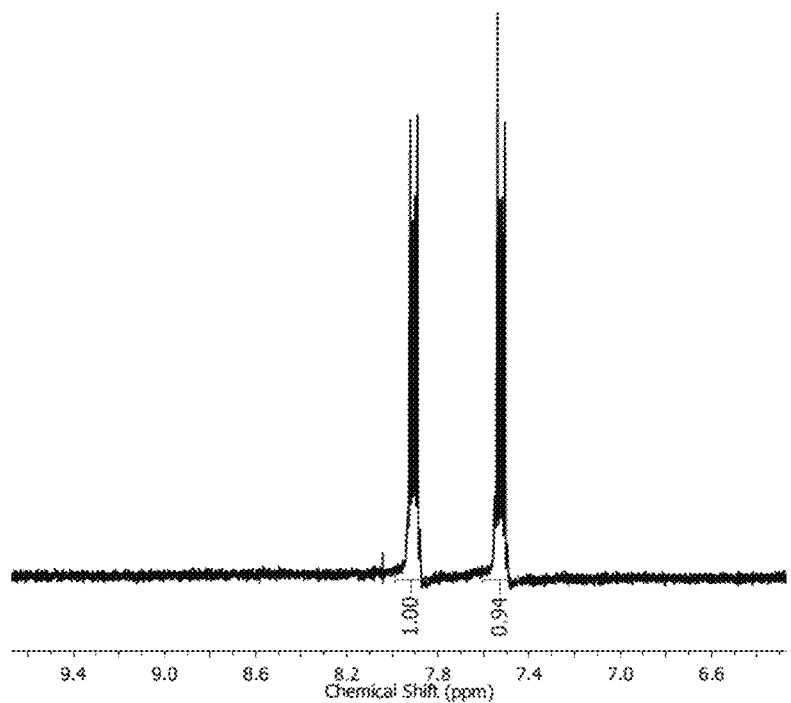

FIG. 56 shows spectra of formate (3.4 mM) after adsorption by PVF/CNT(1:1) PVFx4 at +0.24 V in 95% v MeCN/5% v H$_2$O with 0.1 M TBAPF$_6$. Napthalene is the internal standard.

Figure 57:
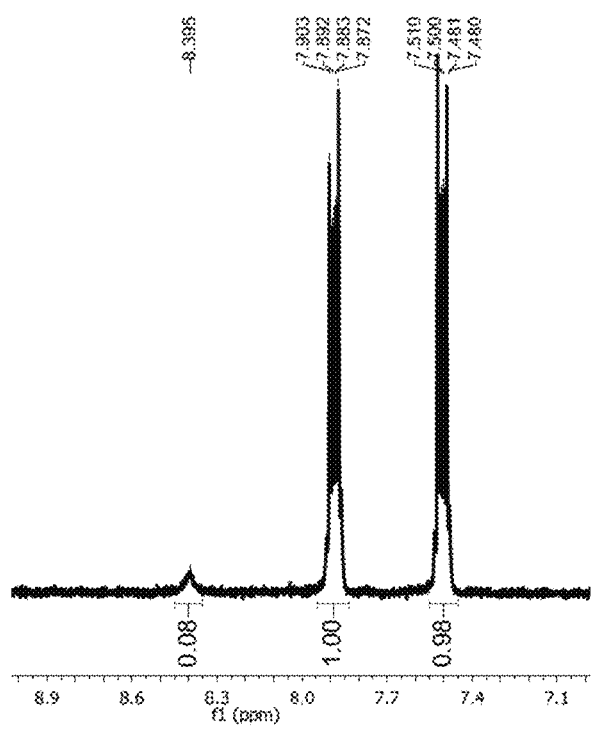

FIG. 57 shows spectra of formate after desorption by PVF/CNT(1:1) PVFx4 in (95% v MeCN/5% v H$_2$O) at −0.1 V applied potential.

Figure 58:
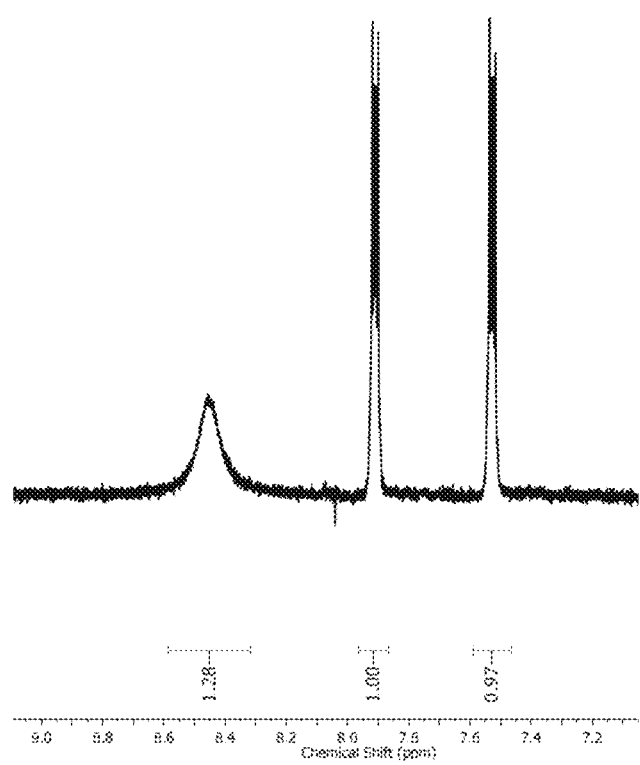

FIG. 58 shows spectra of formate after desorption by PVF/CNT(1:1) PVFx4 in (95% v MeCN/5% v H$_2$O) at −0.4 V applied potential.

Figure 59A:
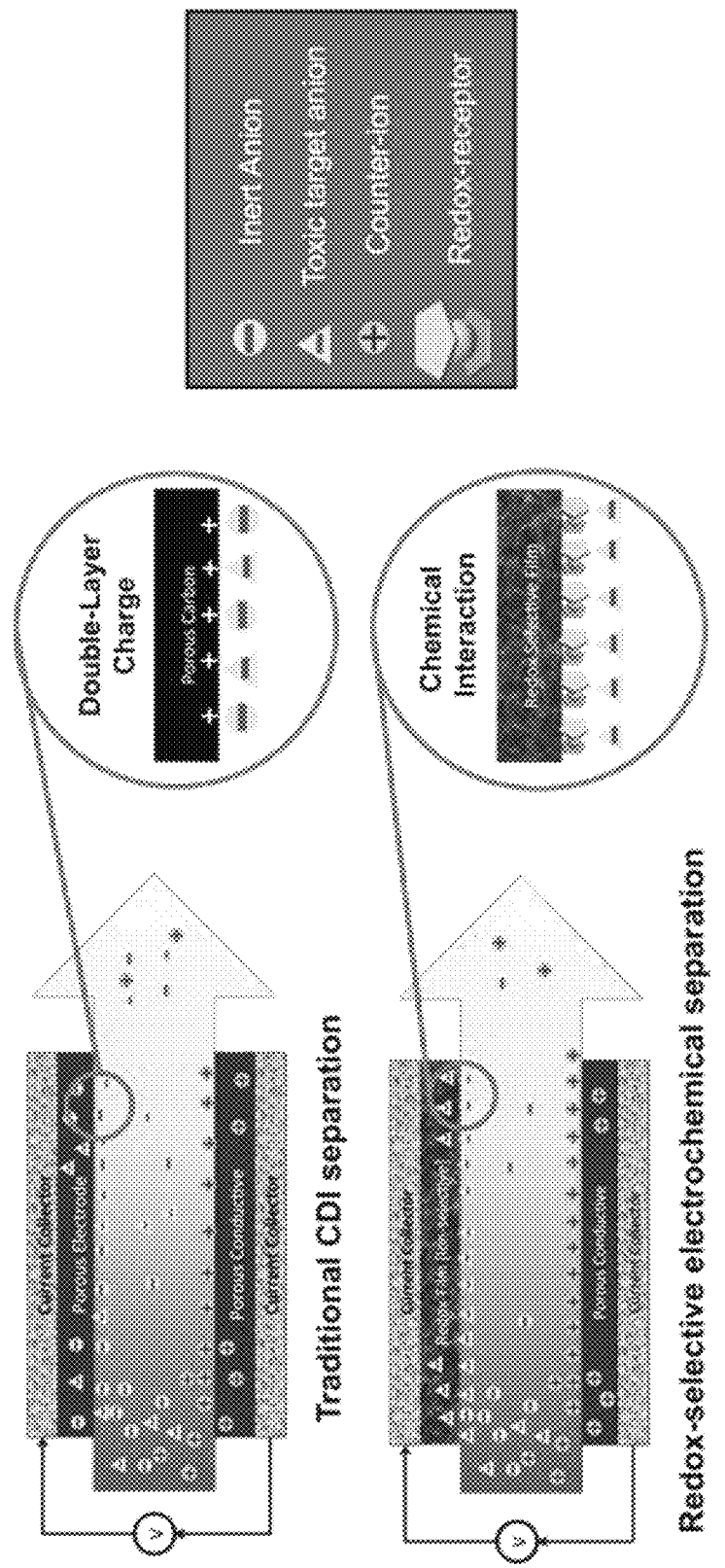
Figure 59B:
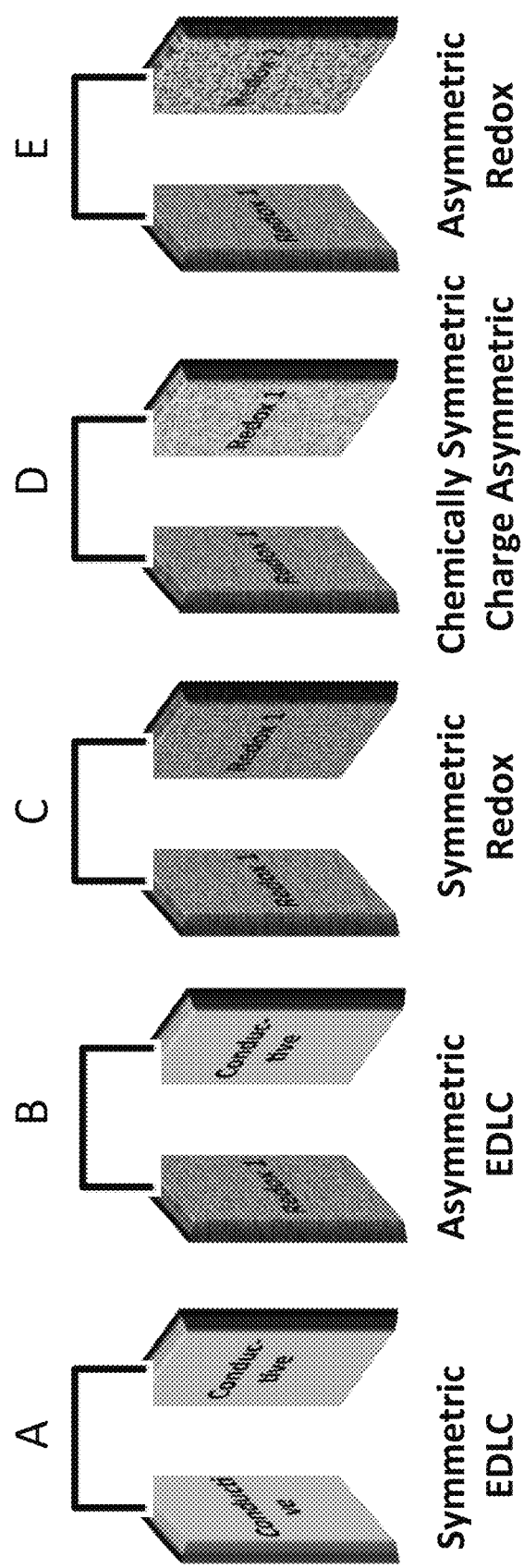

FIGS. 59A-59B show a comparison of EDLC-mediated electrochemical separation and redox-mediated electrochemical separation. FIG. 59A shows that redox-electrodes present high separation factors towards target specific ions, either of high toxicity or high recovery-value. In this case, a metallocenes-type redox-electrode is illustrated for selective anion recovery. FIG. 59B shows redox-electrode configurations. Panel A is a purely double layer system. Panel B has only one electrode redox-functionalized, the counter is only conductive. Panel C denotes a symmetric pseudocapacitive system with both electrodes functionalized with the same redox-species. Panel D shows an asymmetric system in which one of the electrodes is in a different oxidation state, but are they are chemically identical. Panel E presents a fully asymmetric system in which the active centers of both electrodes have different charges and chemical identities.

Figure 60:
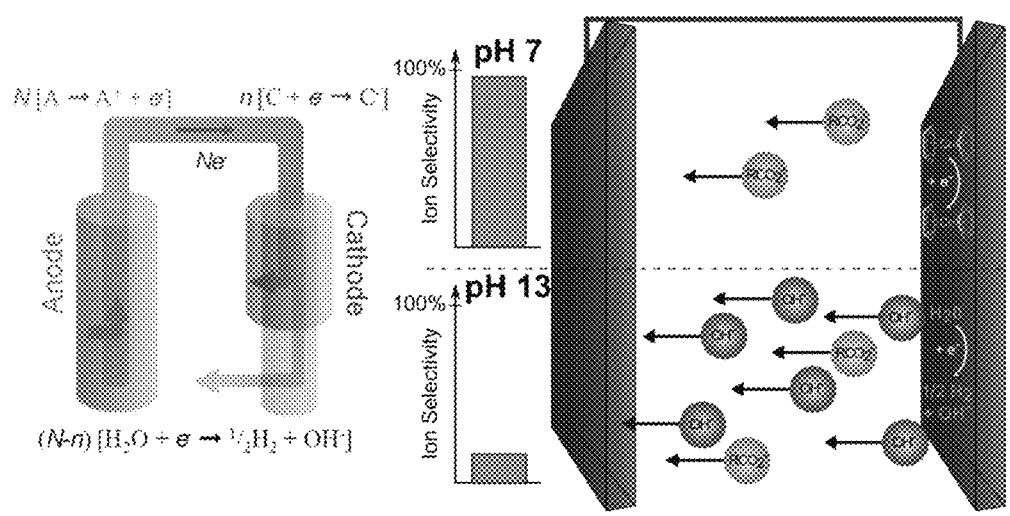

FIG. 60 shows a dual-functionalized asymmetric Faradaic system with redox organometallics for increased electrochemical performance and controlled water chemistry. The anode and cathode are functionalized with redox-species A and C, respectively. Either self-exchange within the cathode material or electron transfer towards the solvent can occur depending on degree of functionalization.

Figures 61A, 61B, 61C, 61D, 61E:
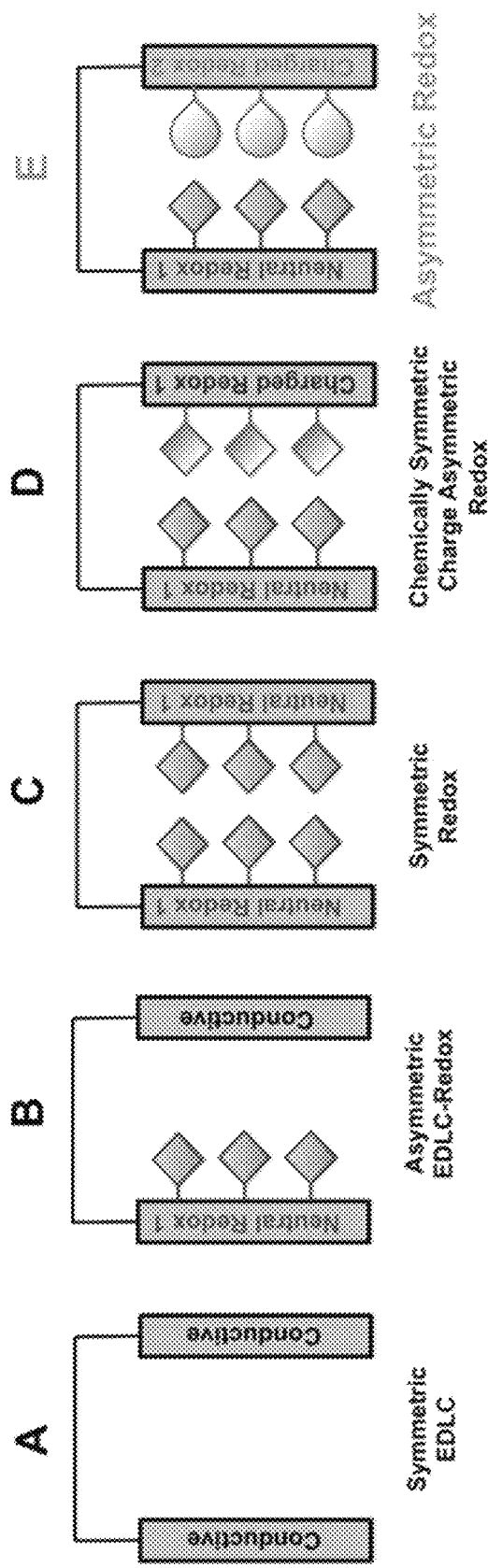

FIGS. 61A-61E show redox-electrode configurations. FIG. 61A is a purely double layer system. FIG. 61B has only one electrode redox-functionalized, the counter being just conductive. FIG. 61C denotes a symmetric pseudocapacitive system with both electrodes functionalized with the same redox-species. FIG. 61D shows an asymmetric system in which one of the electrodes is in a different oxidation state, but are chemically identical. FIG. 61E presents a fully asymmetric system in which the active centers of both electrodes have different charges and chemical identity.

Figure 62A:
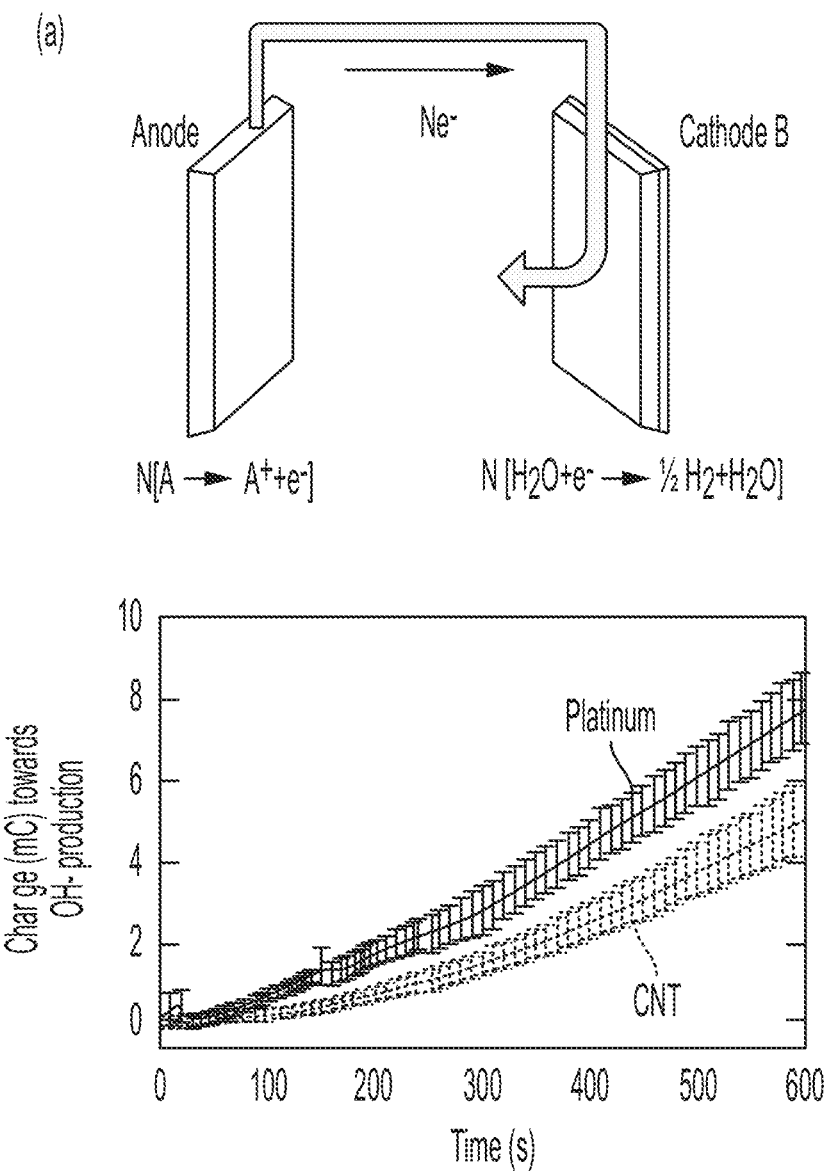
Figure 62B:
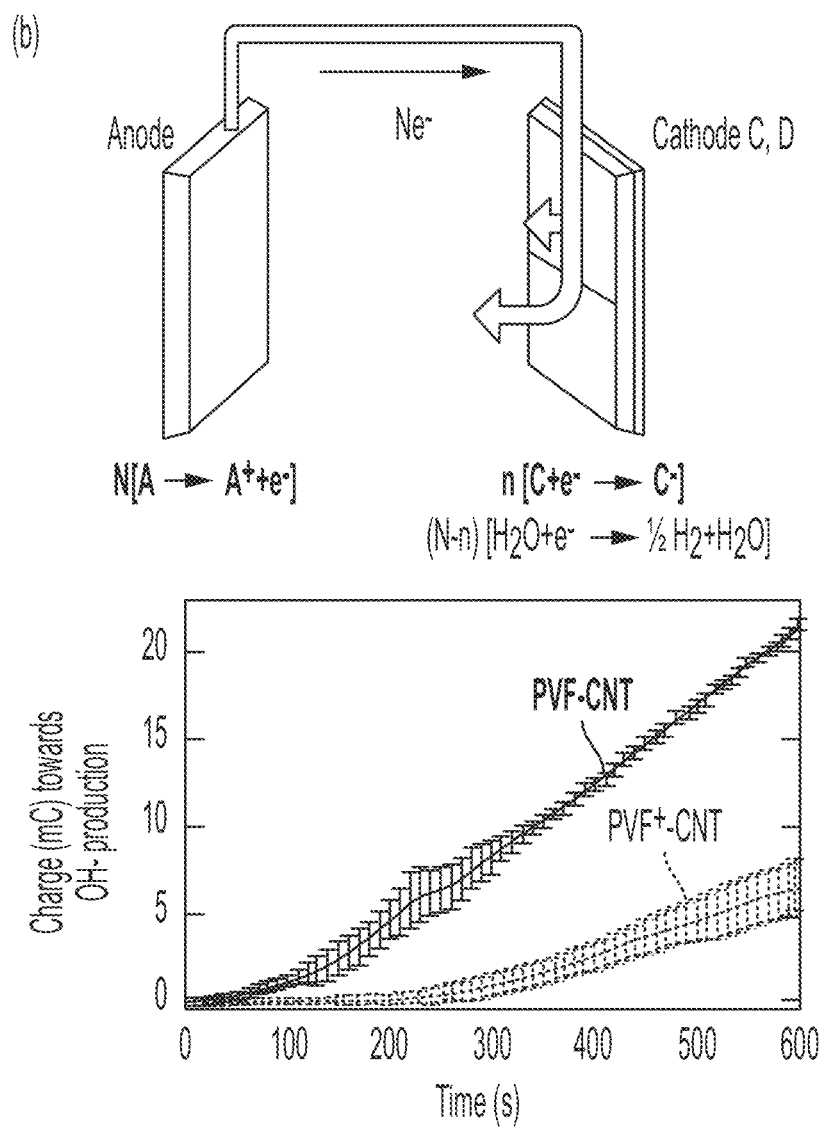

FIGS. 62A-62B show water splitting tracked by hydroxide production with standard cathode materials: platinum and conductive carbon substrate (FIG. 62A). Equivalent of configuration B shown in Scheme 1. FIG. 62B shows hydroxide production with symmetric PVF-CNT//PVF-CNT (configuration C) when compared to charge asymmetric PVF-CNT//PVF+–CNT (configuration D) (FIG. 62B).

Figures 63A, 63B, 63C:
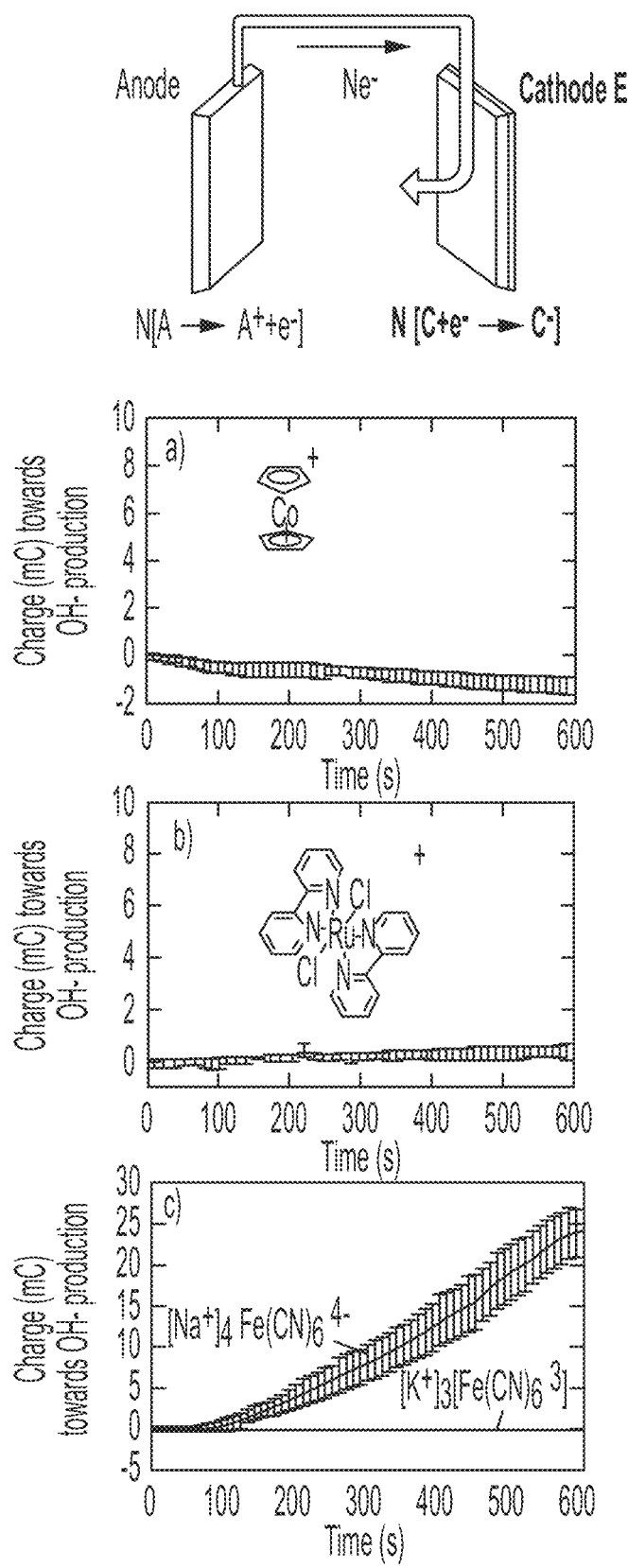

FIGS. 63A-63C show screening of organometallic species on counter-electrodes using PVF-CNT//Rubpy-CNT-cp (FIG. 63A), PVF-CNT//CoCp$_2^+$-CNT-cp (FIG. 63B) and PVF-CNT//Fecy-CNT-cp (FIG. 63C) equivalent of configuration E.

Figures 64A, 64B, 64C, 64D, 64E:
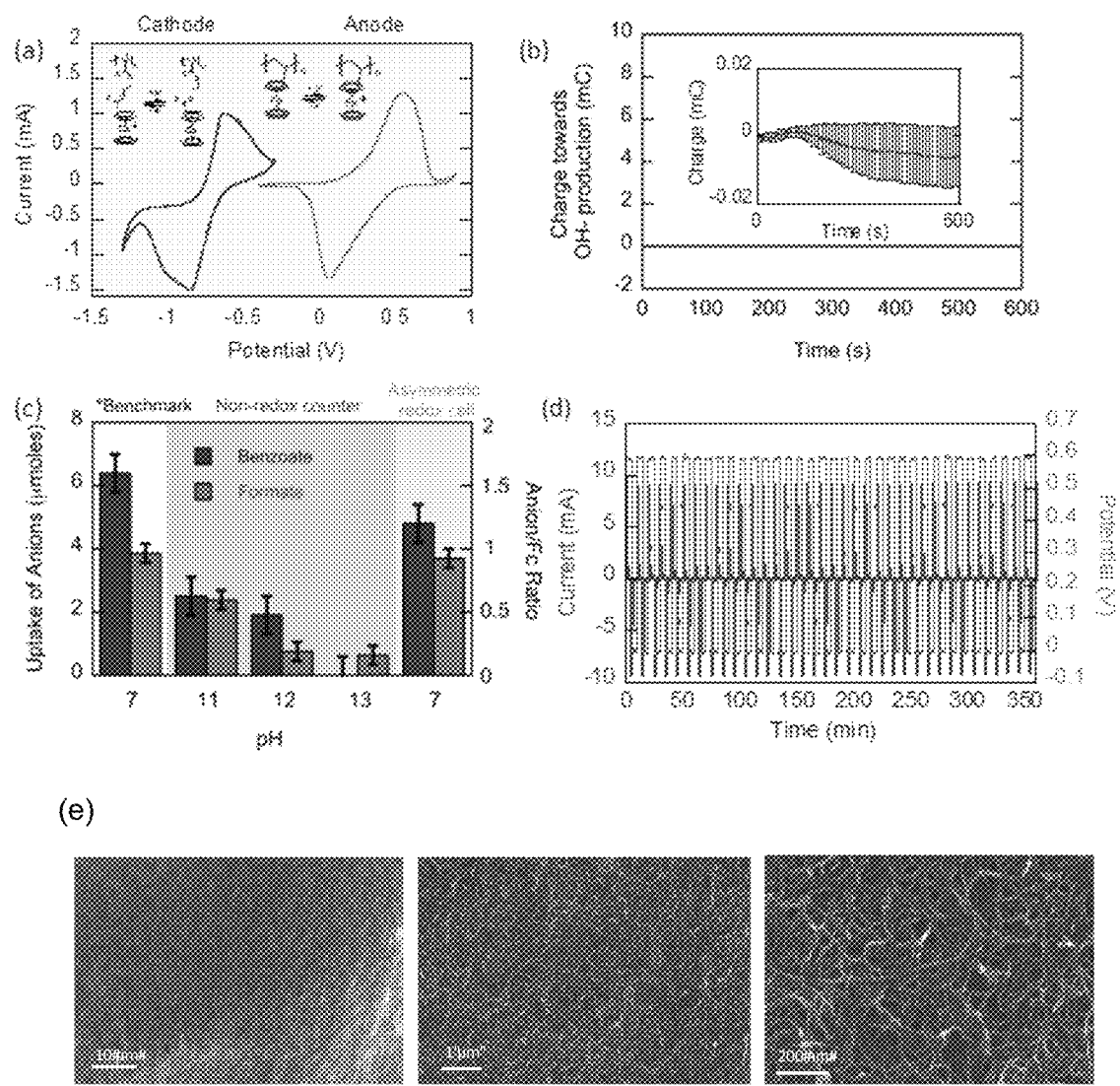

FIGS. 64A-64E. FIG. 64A: as illustrated in configuration E, fully asymmetric pseudocapacitive system with cobaltocenium-based polymer on the cathode (PMAECoCp$_2$-CNT) and PVF/CNT on the anode. FIG. 64B shows OH$^-$ production using the asymmetric PMAECoCp$_2$-CNT//PVF-CNT system in one cycle. FIG. 64C shows the effect of pH on anion-selective separation at the anode, when using a non-redox counter compared to an asymmetric redox cell (3 mM formate and benzoate vs 100 mM LiClO$_4$). Benchmark values compared are one cycle PVF/CNT adsorption of carboxylates previously reported in Su et al. (2016) *Advanced Functional Materials* 26: 3394-3404. FIG. 64D shows multiple cycles of asymmetric redox cell at 100 mM LiClO4 shown up to 30 out of 800 cycles. FIG. 64E shows the surface morphology of PMAECoCp$_2$-CNT electrodes under HR-SEM at various magnifications.

FIGS. 65A-65B. FIG. 65A shows a comparison of ion-selective adsorption of formate in the presence of OH$^-$ (left), when a non-redox cathode is used, and in its absence, with a redox-cathode (right). FIG. 65B shows a comparison of recovery fraction of 300 μM micropollutants using an asymmetric system (PVF-CNT//PMMAECoCp2 counter) vs a symmetric system (PVF-CNT//CNT) and the effect of pH.

Figures 66A, 66B, 66C:
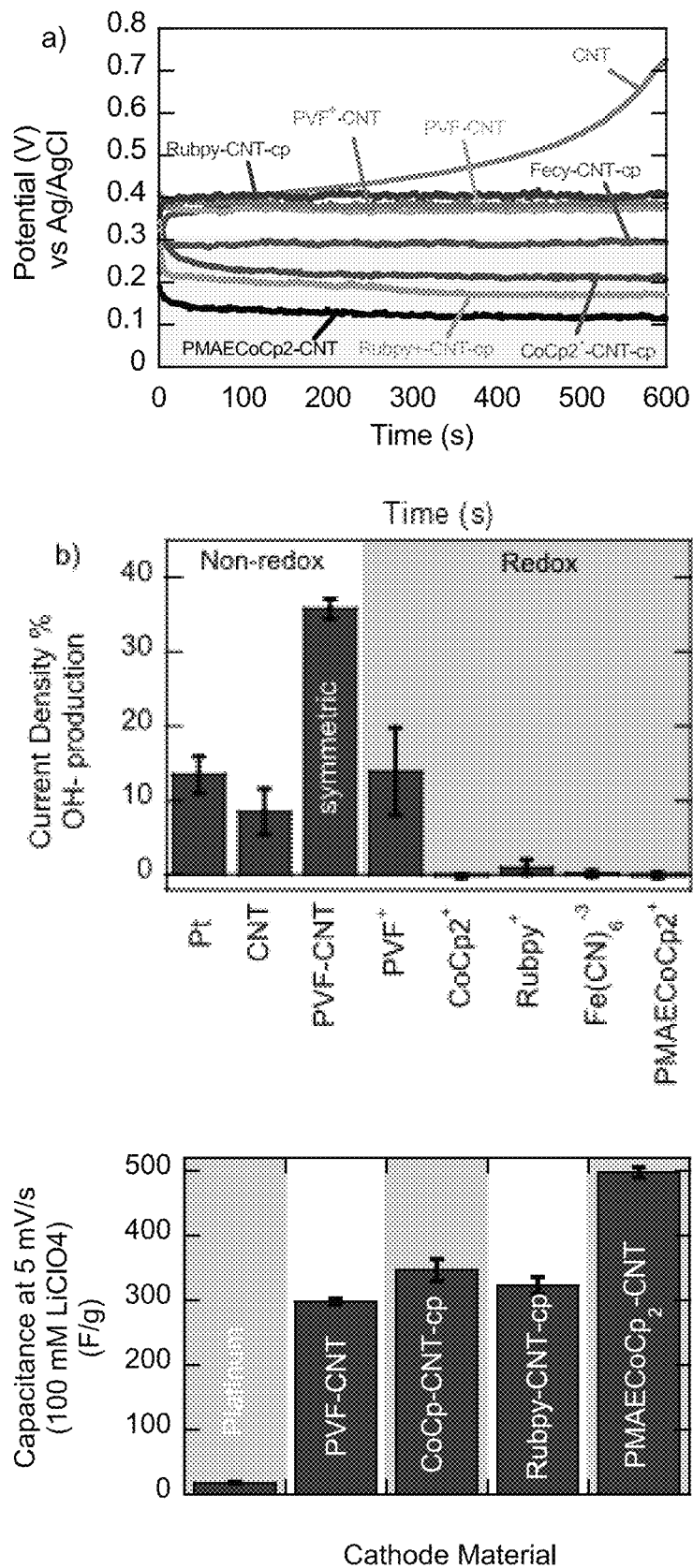

FIGS. 66A-66C. FIG. 66A shows potential applied on anode under chronopotentiometry (100 uA) over 10 minutes for various counter-electrode materials. FIG. 66B shows current efficiency towards water splitting (OH–) production depending on the material for the counter electrode. As seen, there is significant suppression of H$_2$ and OH$^-$ production with a charged, asymmetric cell. FIG. 66C shows specific capacitance from three-electrode CV of PVF-CNT working anode combined with various cathode materials being tested in the current work. The immobilized cobaltocenium-polymer counter (PMAECoCp$_2^+$-CNT) was the counter-electrode screened yielding the highest relative specific capacitance for the system.

Figure 67:
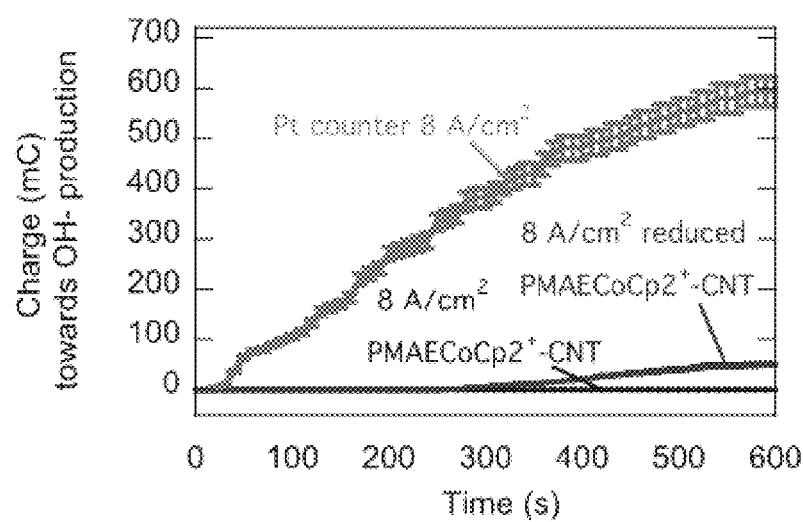

FIG. 67 shows the hydroxide production performance of PMAECoCp$_2$ at high current densities (8.3 A/m$^2$) in both fully oxidized state as well as partially reduced state, and its comparison with the platinum control.

Figure 68A:
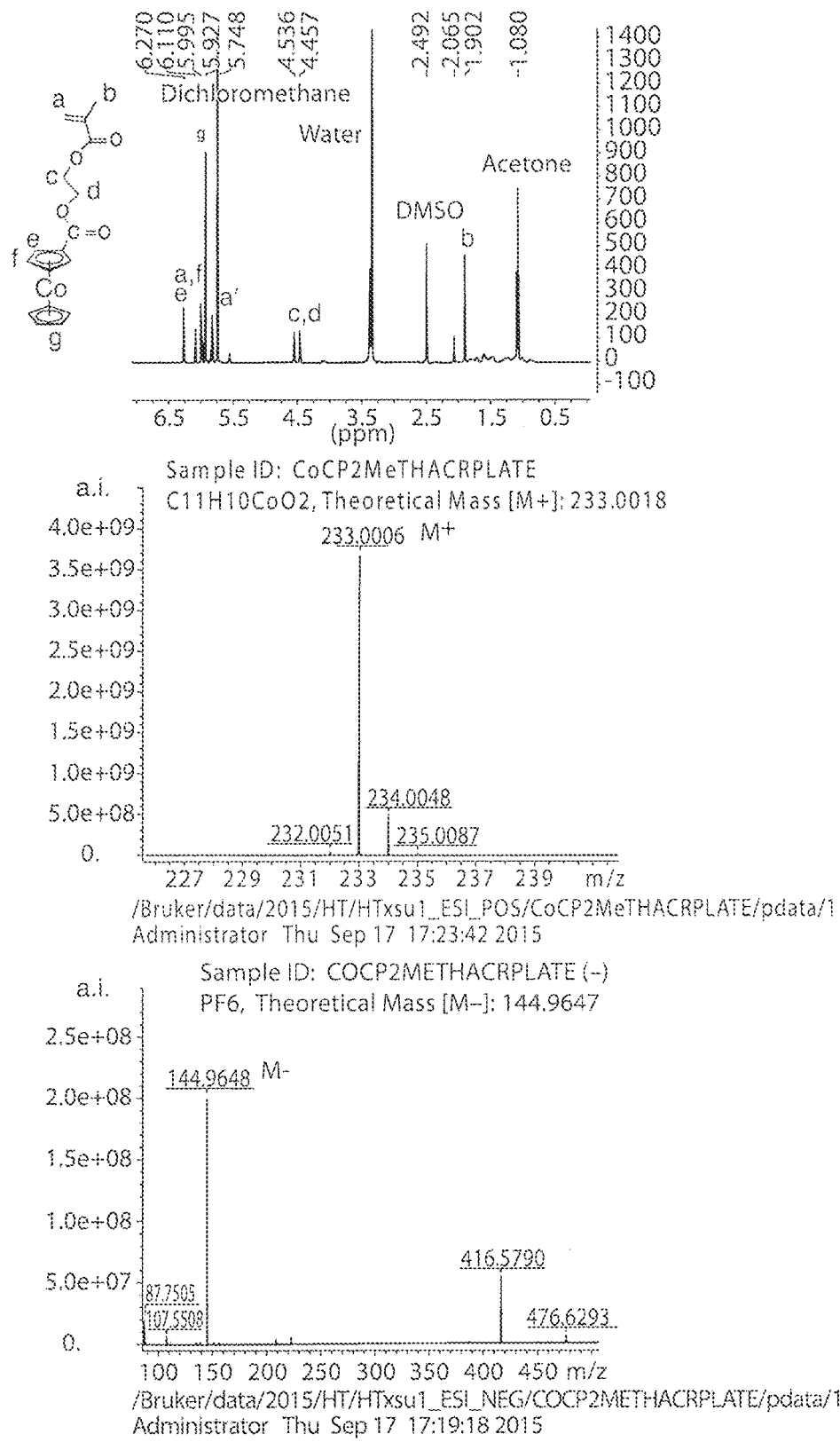
Figure 68B:
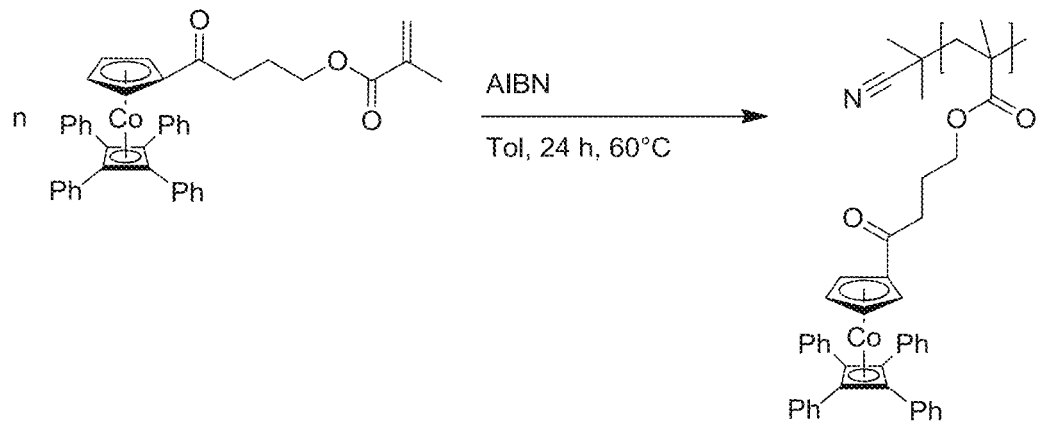

FIGS. 68A-68B. FIG. 68A shows spectra analyses for MAECoPF$_6$. (Top) 1$^H$ NMR (Middle) Cation-mass spectra for cation component of monomer MAECoPF6 (233.0016). (Bottom) Anion-mass spectra showing PF6– (144.698) as the main anion. FIG. 68B shows the free-radical polymerization scheme of CpCoCbMA to result in PcpCoCbMA.

Figure 69:
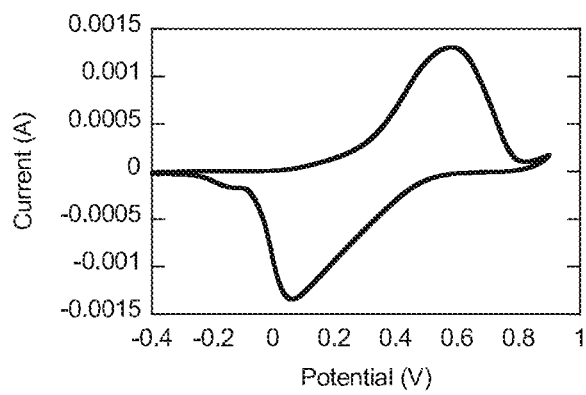

FIG. 69 shows a cyclic voltammogram at 0.1 M LiClO$_4$ on PVF-CNT at 0.005 V/s.

Figure 70:
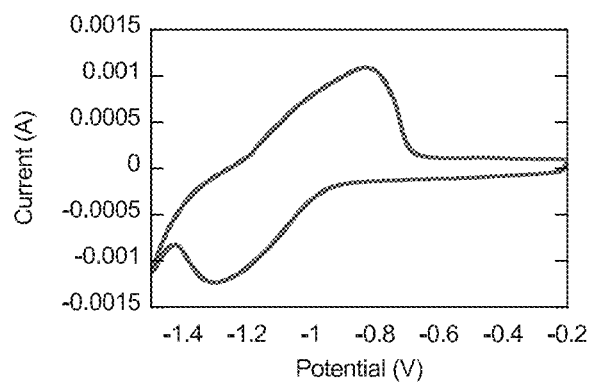

FIG. 70 shows a cyclic voltammogram at 0.1 M LiClO$_4$ on CoCp$_2$-CNT-cp at 0.01 V/s.

Figure 71:
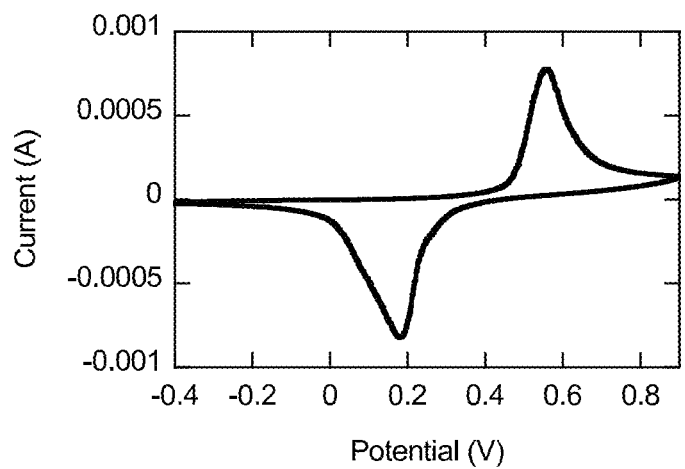

FIG. 71 shows a cyclic voltammogram at 0.1 M LiClO$_4$ on Rubpy-CNT-cp vs Pt at 0.01 V/s.

Figure 72:
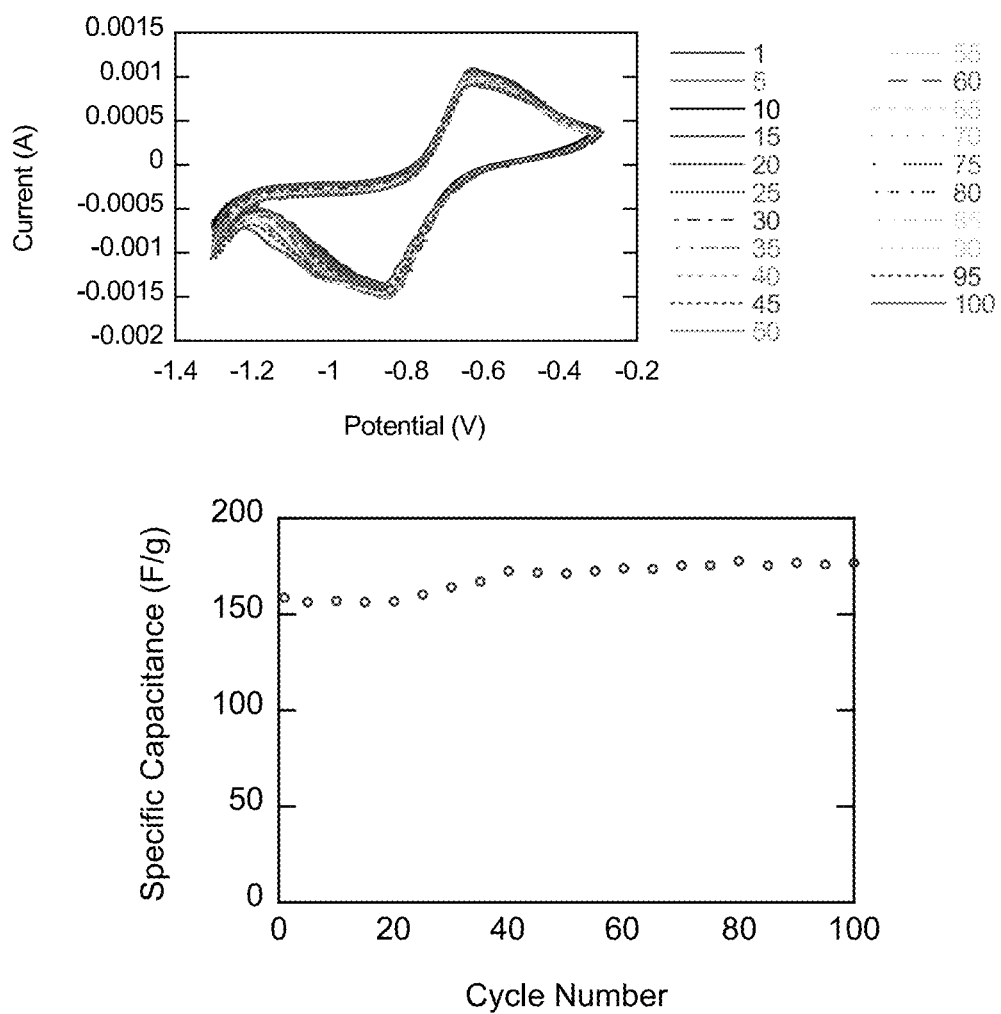

FIG. 72 shows the charge stability of PMAECoCp$_2$-CNT at 0.005 V/s in 0.1 M LiClO$_4$ with Pt as counter, Ag/AgCl reference (top) and the specific capacitance from the area of the CVs (bottom).

Figure 73:
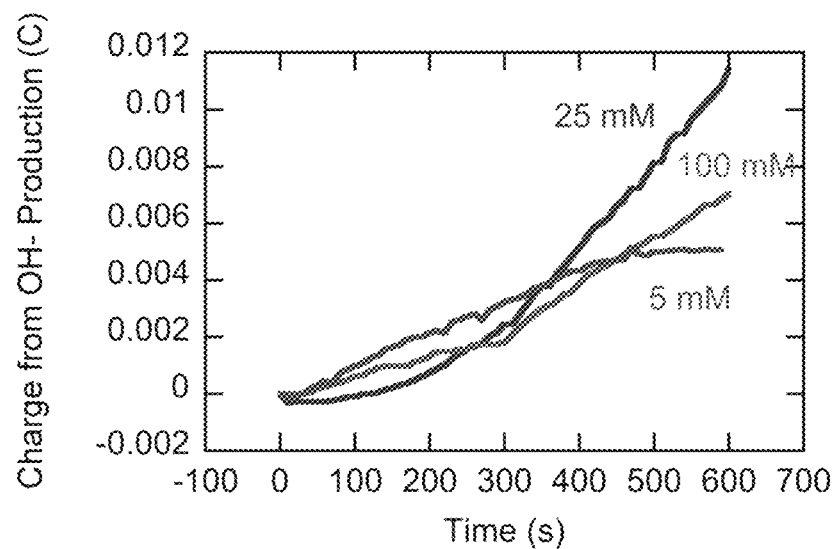

FIG. 73 shows hydroxide production results of PVF-CNT//Pt configuration at varying concentrations of electrolyte using chronopotentiometry (+100 uA on PVF-CNT).

Figure 74:
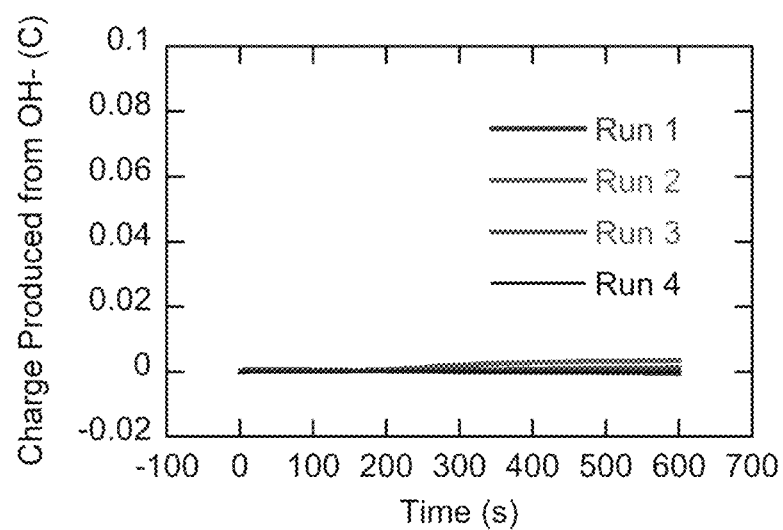

FIG. 74 shows chronoamperometry of PVF-CNT//CoCp$^+$-CNT-cp at 25 mM LiClO$_4$.

Figure 75:
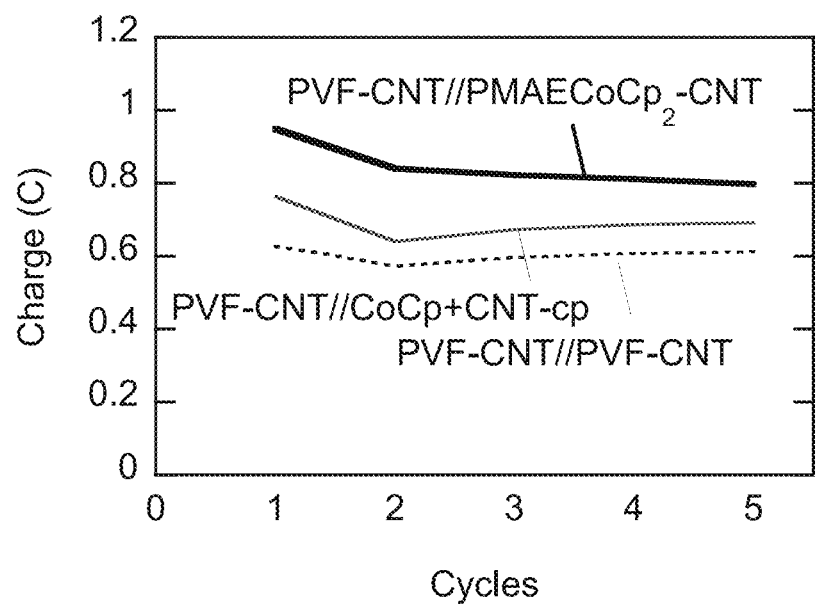

FIG. 75 presents a comparison of electrochemical charge storage of system with PVF//CNT as working electrode in 3-electrode cell configuration, obtained through CV for a 1.2 V range in 0.005 V/s in 100 mM LiClO$_4$.

Figure 76:
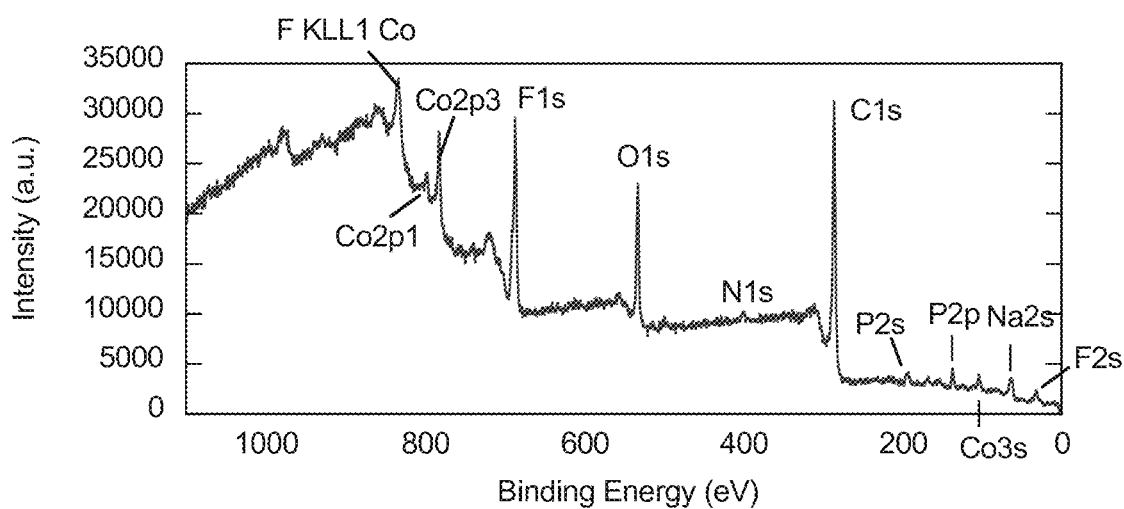

FIG. 76 shows survey XPS spectra of PMAECoCp2-CNT functionalized electrodes with PF$_6^-$ as the counter-ion (in at % C1s 62.5%, F1s 15.5%, O1s 13%, Co2p3 3.3%, P2p 1.3%, N1s 1.2%, Na1s 0.4%, remainder, 2.9%).

Figure 77:
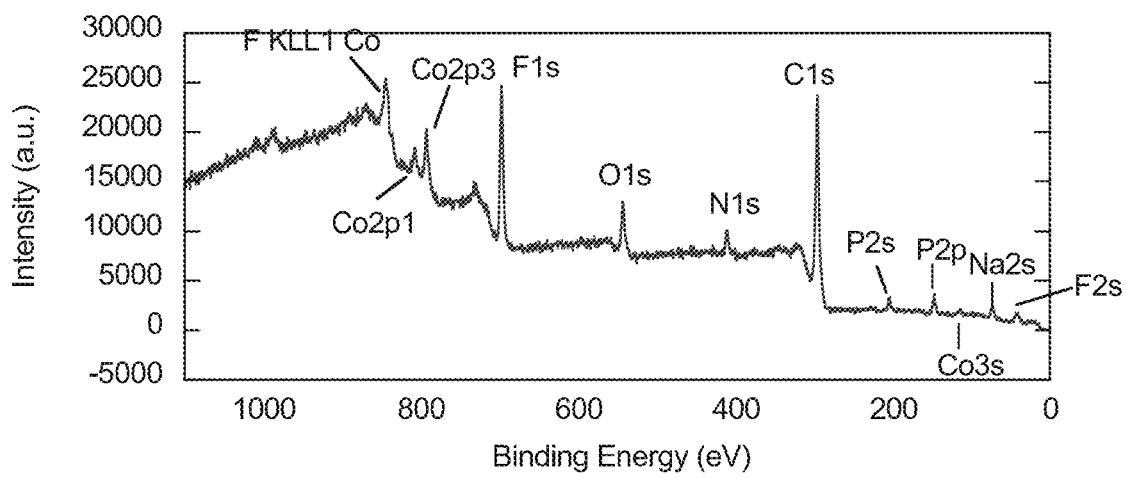

FIG. 77 shows survey XPS spectra of PMAECoCp2-monomer (in at % C1s 66.7%, F1s 16.5%, O1s 7.9%, Co2p3 2.3%, P2p 2.6%, N1s 4%).

Figure 78A:
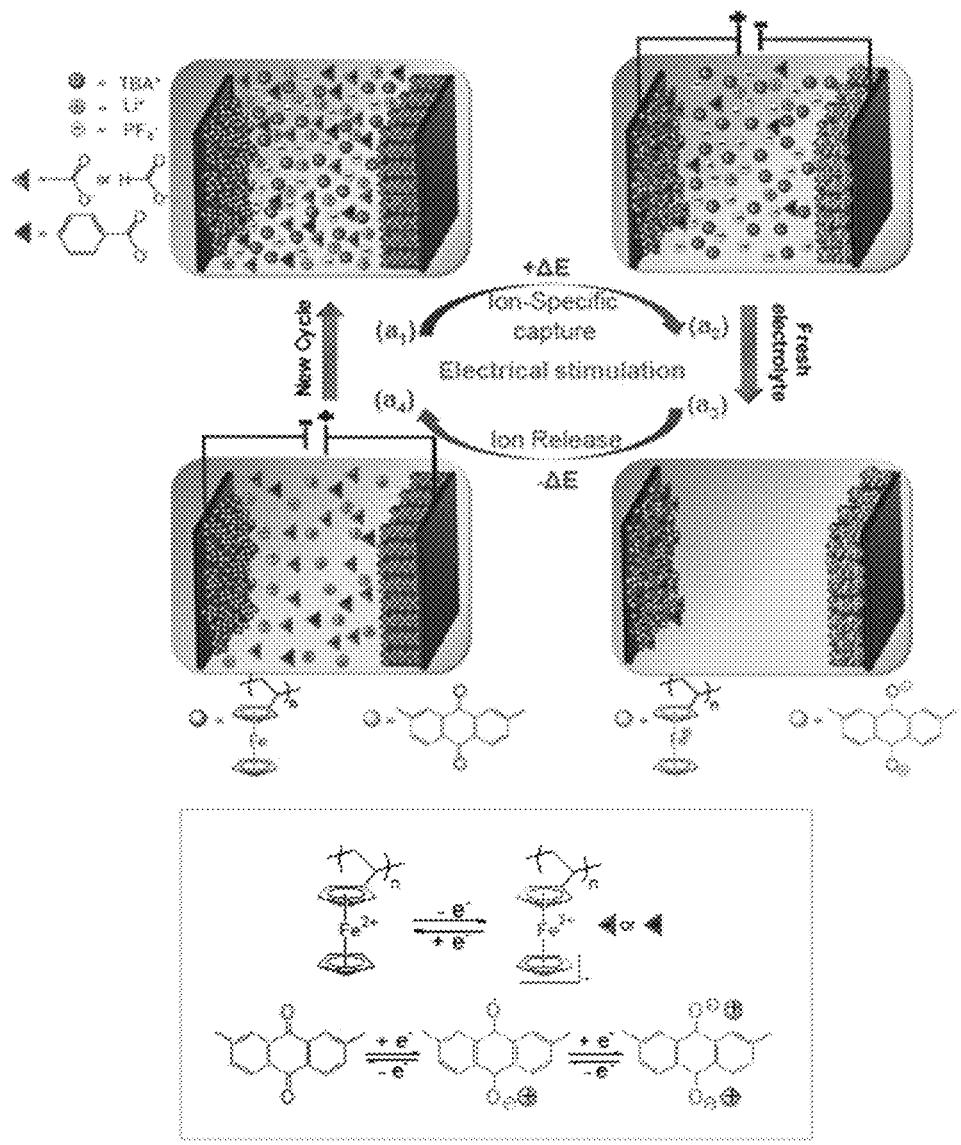
Figure 78B:
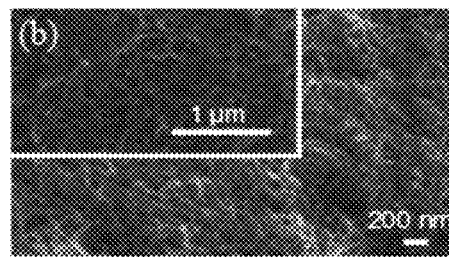
Figure 78C:
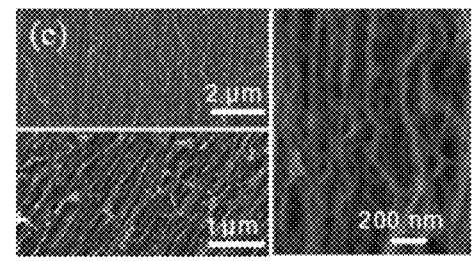

FIGS. 78A-78C present an overview of the two-electrode Pseudocapacitive Separation Technology (PSST). FIG. 78A shows the operational four-step principle of the Molecularly Selective PSST, which facilitates the electro-regulated recovery of lithiated carboxylates; (a1) the pseudocapacitor is placed in an electrolyte solution which contains the ions to be separated, (a2) upon electrical stimulation, the carboxylate anions and the lithium cations are remotely and selectively captured by the electroactive PVF and PAQ moieties of the anode (left) and the cathode (right), respectively, (a3) replacement of the solution with fresh electrolyte, (a4) controlled release of the desired ions in the solution phase upon reversing the potential of the pseudo-capacitive cell. The asymmetric cell is then provided with a fresh solution of the desired ions for a new separation cycle to begin. SEM images of the PVF$_{50}$-MWCNT$_{50}$ anodic (FIG. 78B) and the PAQ-VACNT cathodic (FIG. 78C) electrode at various magnifications.

Figure 79:
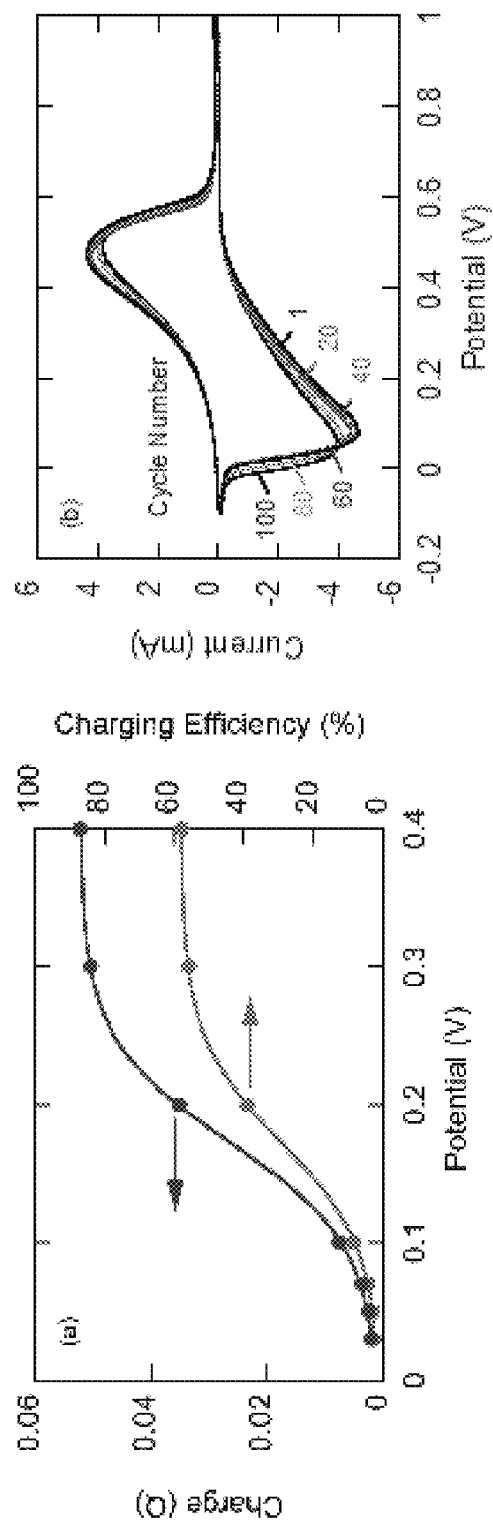

FIG. 79 shows variations of the charge and the charging efficiency ($Q_{eff}$) of the electrode, upon increasing the applied potential from 0.03 to 0.4 V (left) and successive CVs of the $PVF_{50}$-$MWCNT_{50}$ electrode, recorded after 1, 20, 40, 60, 80 and 100 cycles, in 0.1 M $TBAPF_6$ in ACN at a scan rate of 0.05 V/s (right).

Figure 80:
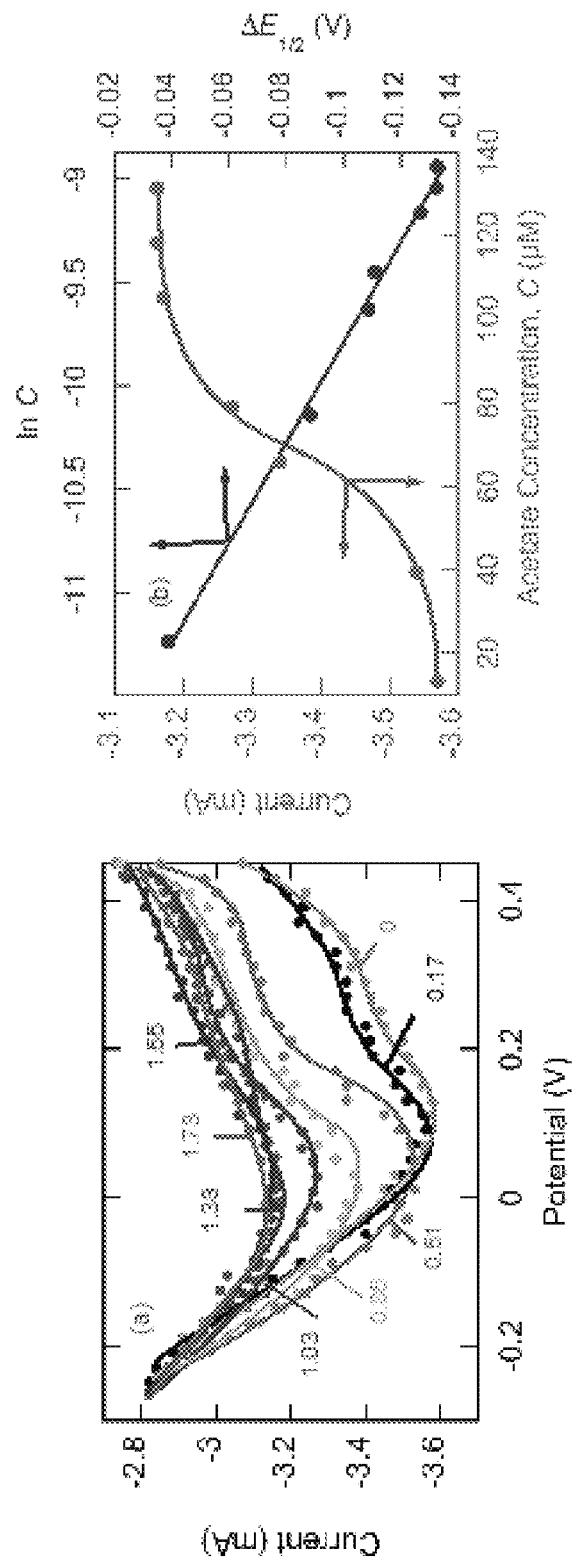

FIG. 80 shows SWVs obtained during the titration of the $PVF_{50}$-$MWCNT_{50}$ electrode with $AcCOO^-$ anions, in the absence and in the presence of 0.17-1.73 equivalents of the anionic species (left) and binding isotherm and variations in the peak current, derived due to changes of the redox properties of the $PVF_{50}$-$MWCNT_{50}$ electrode, in the absence of the anions and upon increasing the $AcCOO^-$ concentration between 0.013 and 0.13 mM (right). The red solid line represents the fit of the experimental data for the calculation of the binding constant.

Figure 81:
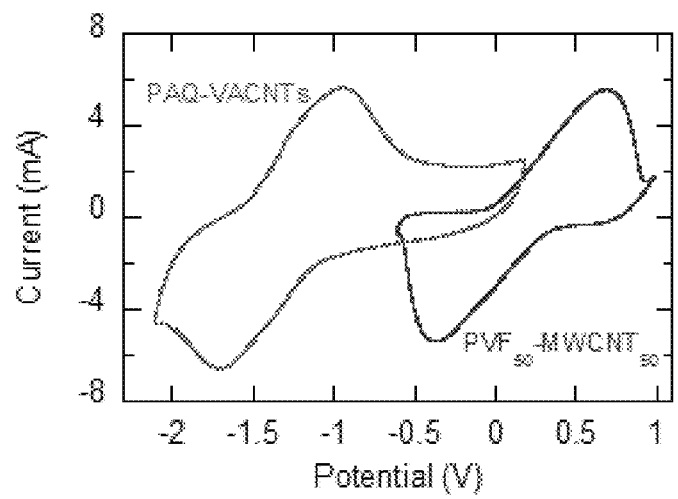

FIG. 81 shows CVs of the anodic $PVF_{50}$-$MWCNT_{50}$ and cathodic PAQ-VACNTs electrodes recorded at a scan rate of 0.03 V/s.

Figure 82:
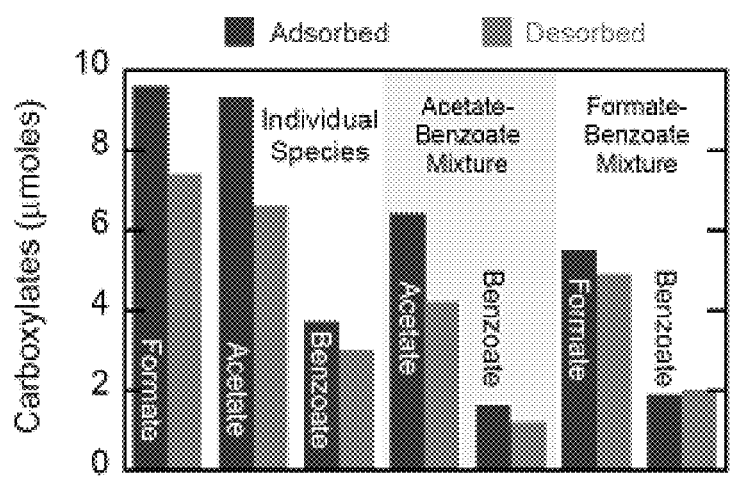

FIG. 82 shows adsorbed/desorbed quantities (in moles) of the carboxylates during the electrochemical testing of the asymmetric supercapacitor.

Figure 83:
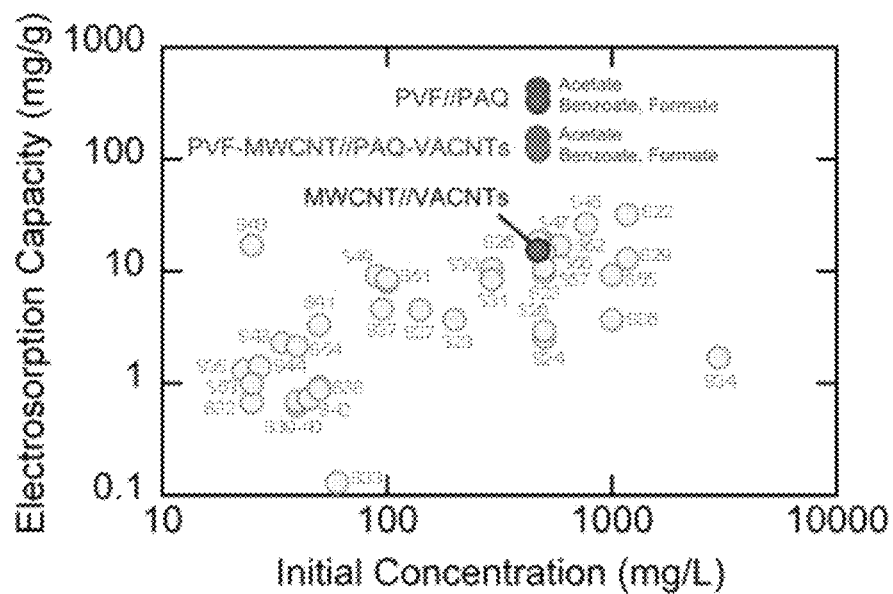

FIG. 83 shows the electrosorption capacity of the current system (in mg/g) compared to other traditional and modern supercapacitors reported in the literature. Red bullets indicate the efficiency of the asymmetric pseudocapacitor to separate the ionic species whereas the blue symbol corresponds to the electrosorption capacity of the carbon-based component of the cell. Green symbols show the electrosorption capacities of the polymeric component of the system after subtracting the contribution of the CNTs from the overall separation efficiency of the cell. The light symbols correspond to the separation efficiencies of other modern and traditional systems and the numbers the references for the systems used for comparison.

Figure 84:
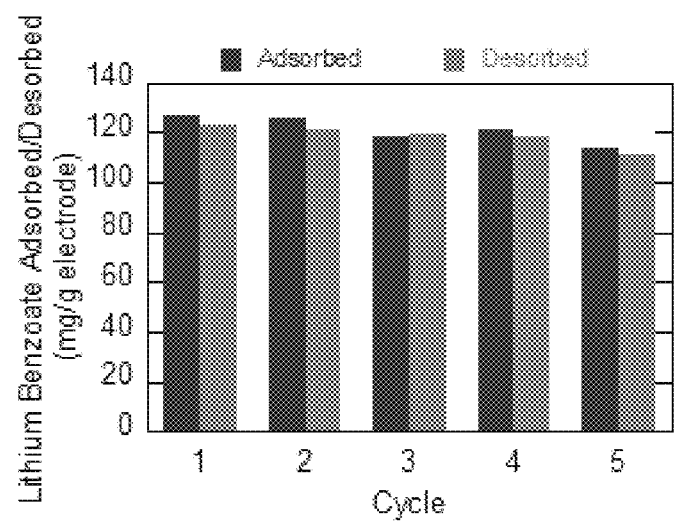

FIG. 84 shows the electrosorption/electrodesorption capacity (in mg/g) of the system towards benzoate, during tests for the stability of the separation process for 5 consecutive adsorption/desorption cycles.

Figure 85:
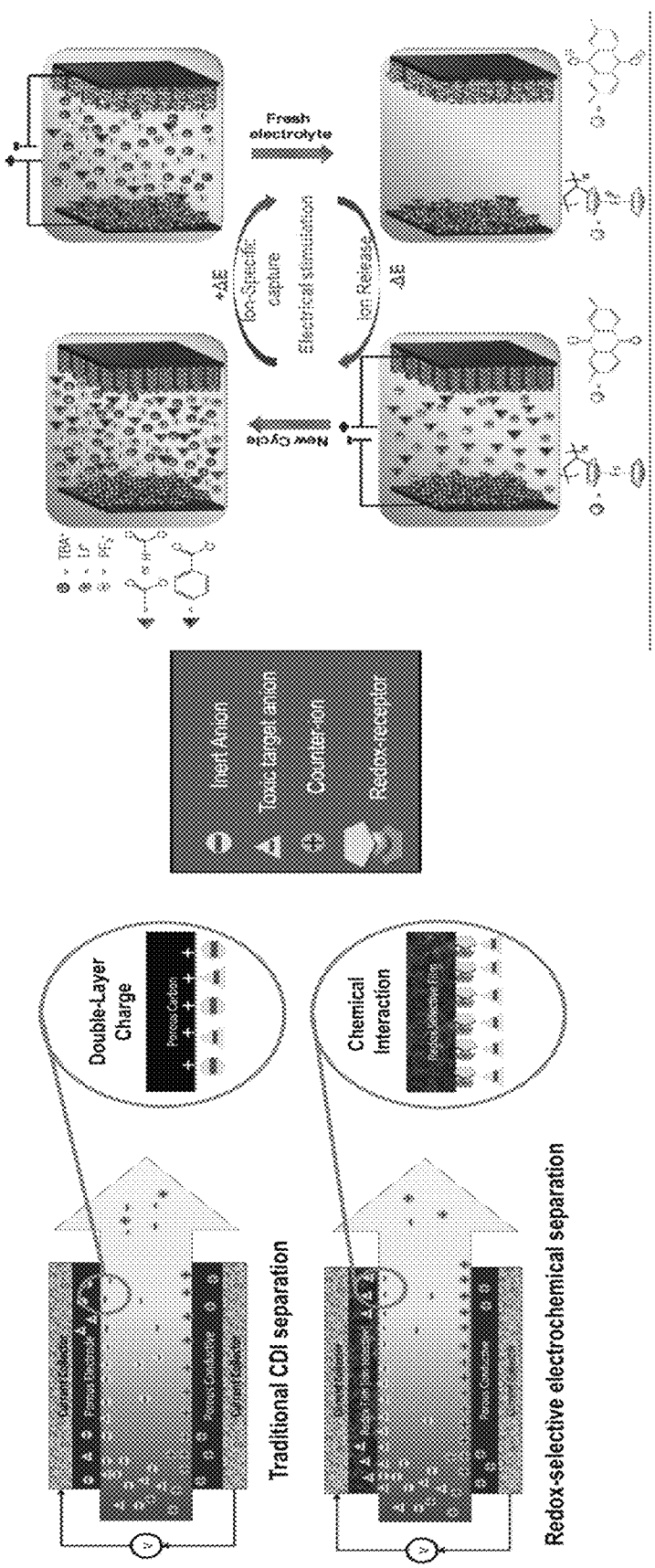

FIG. 85 presents a comparison of traditional electrochemical separation method with capacitive deionization methods. The right schematic shows selective electrochemically-mediated adsorption on anode side by reversible electrochemical swing using metallocenes systems.

Figure 86:
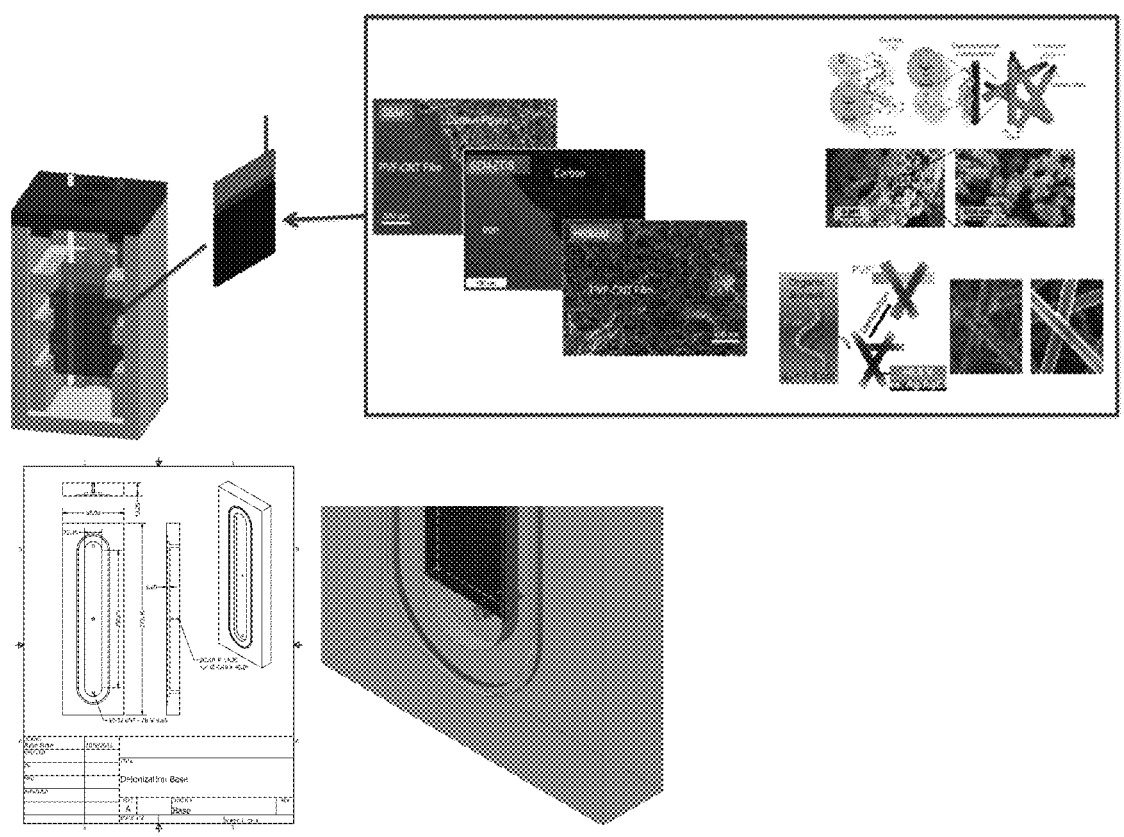

FIG. 86 shows examples of current materials chemistry and batch-scale devices used for multi-stack electrode testing, and design of the flow-electrode system.

Figures 87A, 87B, 87C:
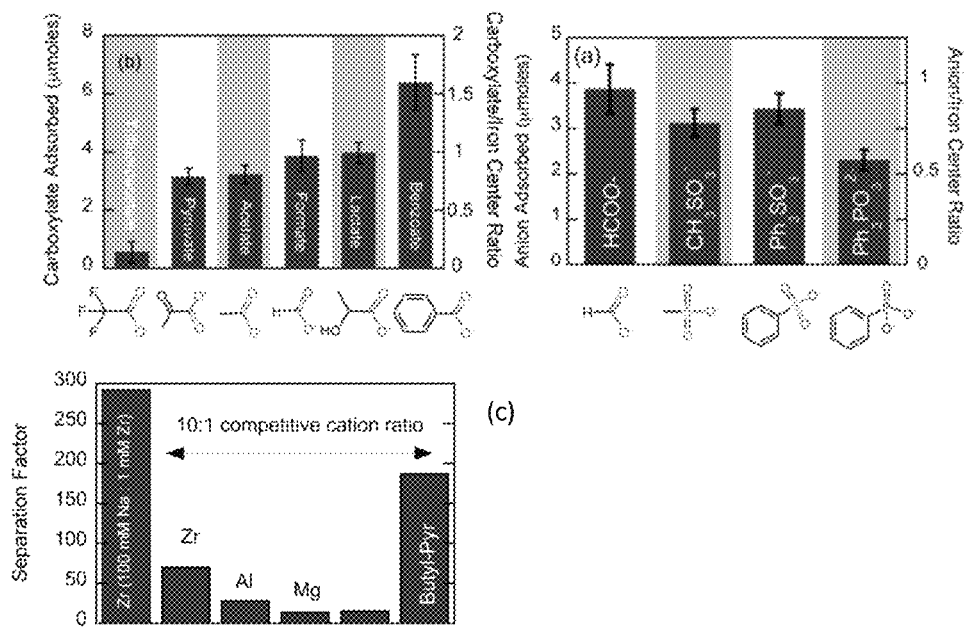

FIGS. 87A-87C show some examples of the range of contaminants targeted during the proof-of-principle stage, including various organic chemical functional groups (FIG. 87A), various molecules within a same chemical group (FIG. 87B) and heavy metal cation pollutants and butyl pyridinium (FIG. 87C).

Figure 88:
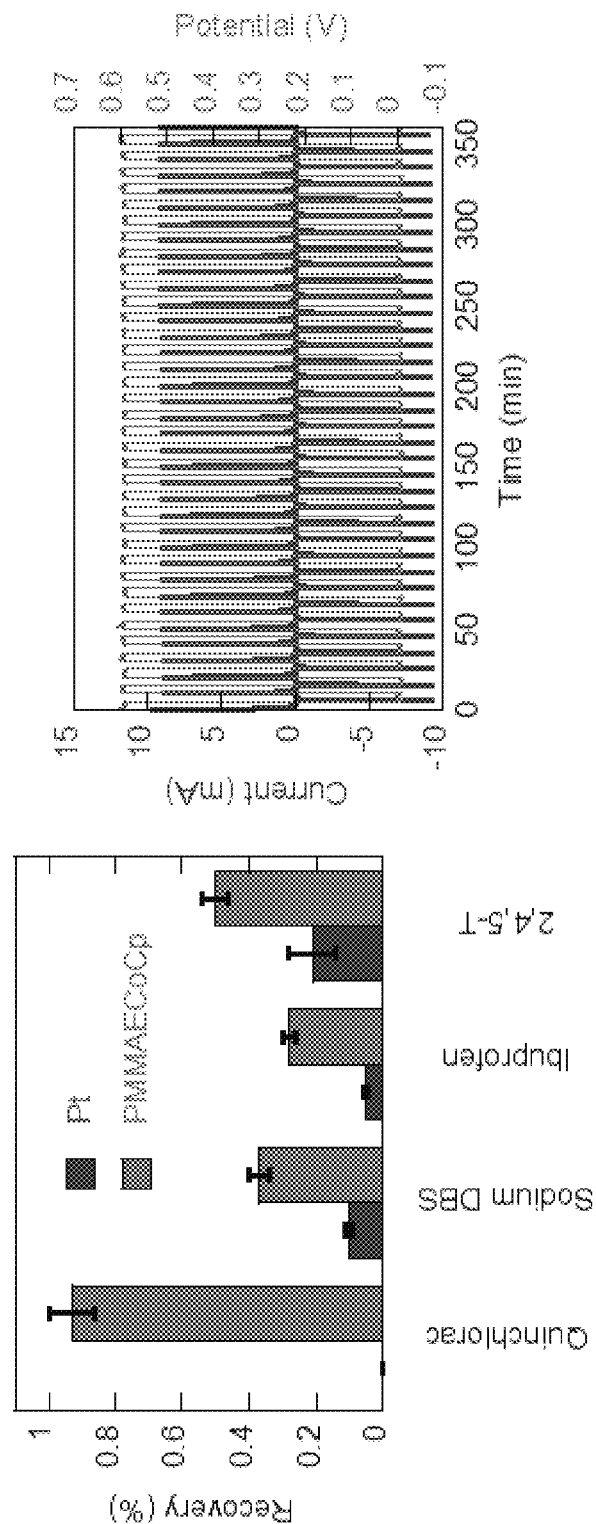

FIG. 88 shows micropollutant removal by asymmetric redox-electrode systems (left). Pt is with a control counter, PMMAECoCp is the asymmetric, dual functionalized redox system. The cycling stability of the purification system for over 800 cycles (30 cycles shown for clarity) is depicted (right).

Figure 89:
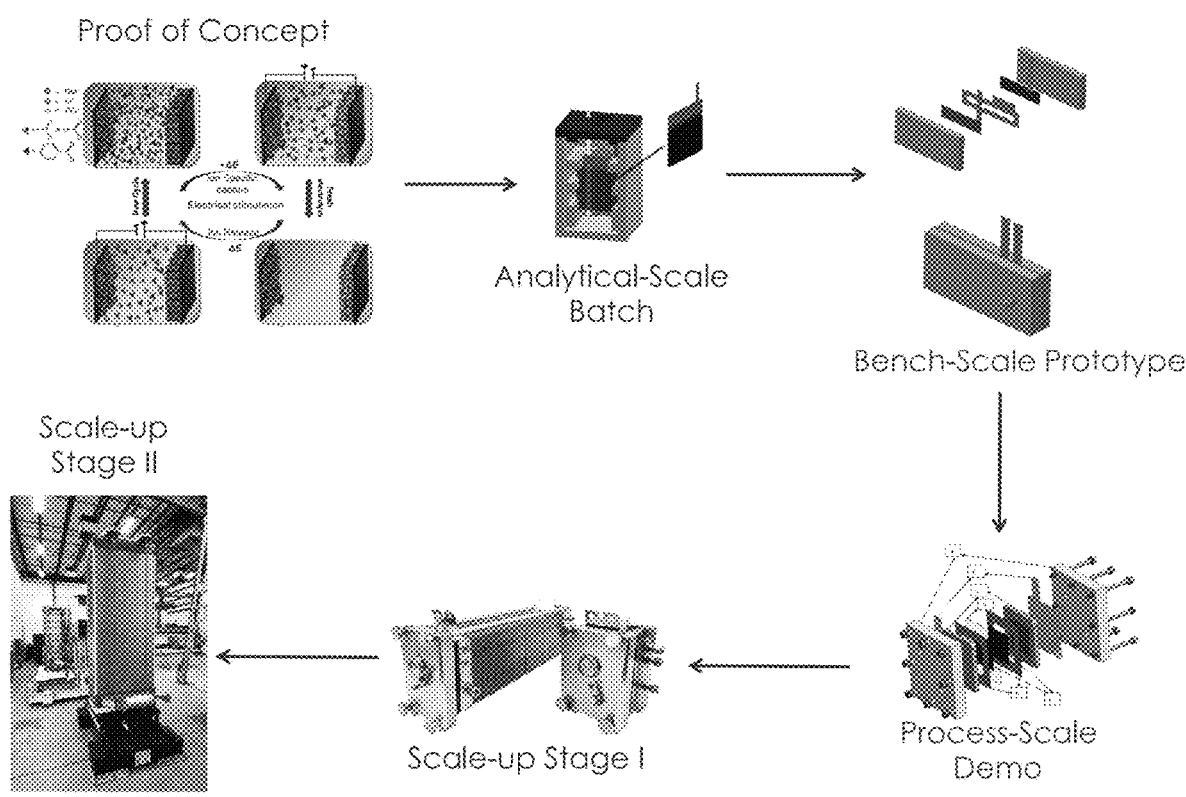

FIG. 89 is a diagram showing stages of scale-up: from proof-of-concept to bench-scale to 100 gallons/day to eventual 10,000 gallons/day large scale chemical process.

Figures 90A, 90B, 90C:
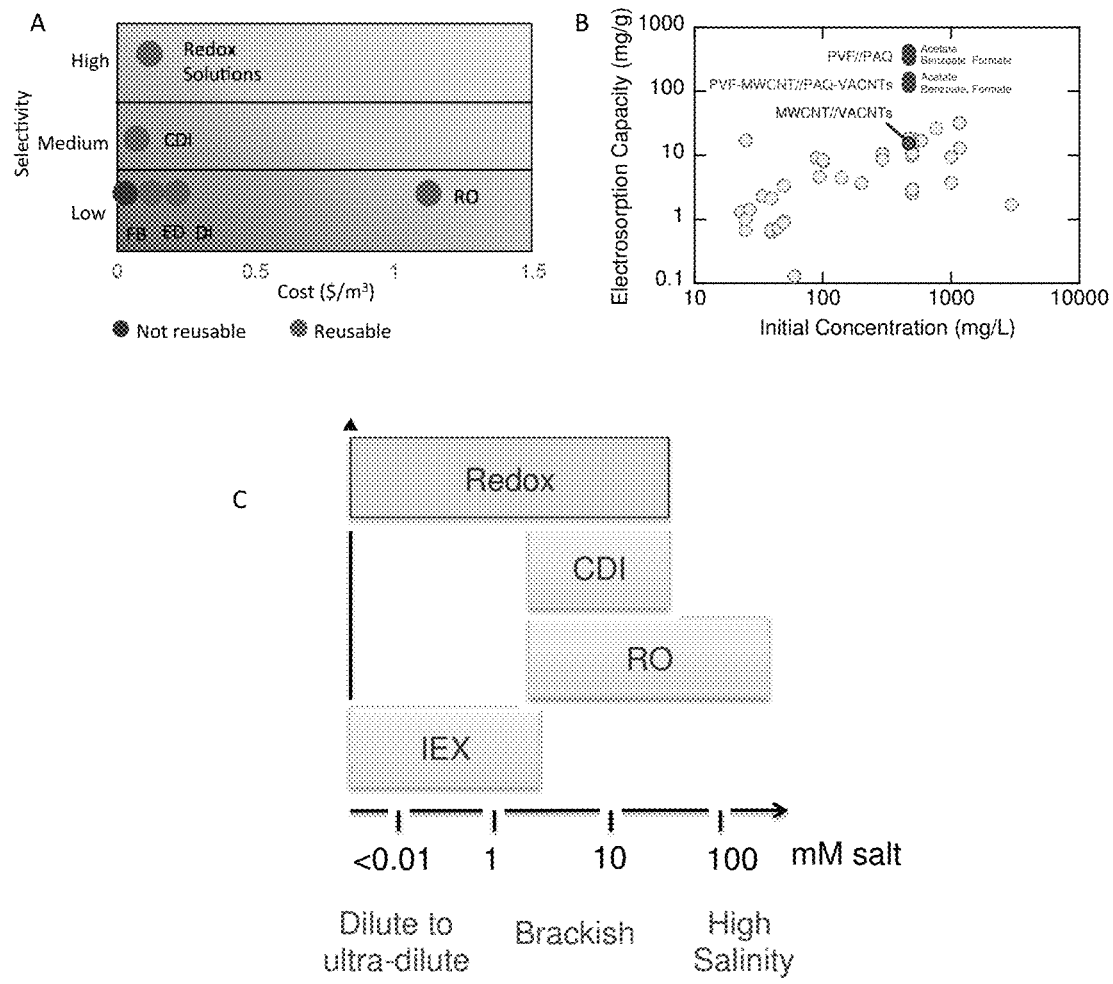

FIG. 90A is a graph showing comparison of costs vs selectivity of a variety of purification methods vs. one or more embodiments of the redox solution systems described herein. CDI=capacitive deionization, FB=fixed bed adsorbent, ED=electrodialysis, DI=distillation, RO=reverse osmosis. FIG. 90B is a graph showing comparison of ion-capacity of one or more embodiments of the redox-systems described herein (green and red) vs. literature values. FIG. 90C is a graph showing ranges of application-superior performance of redox-based technologies from dilute to brackish concentrations.

Figures 91A, 91B, 91C, 91D, 91E:
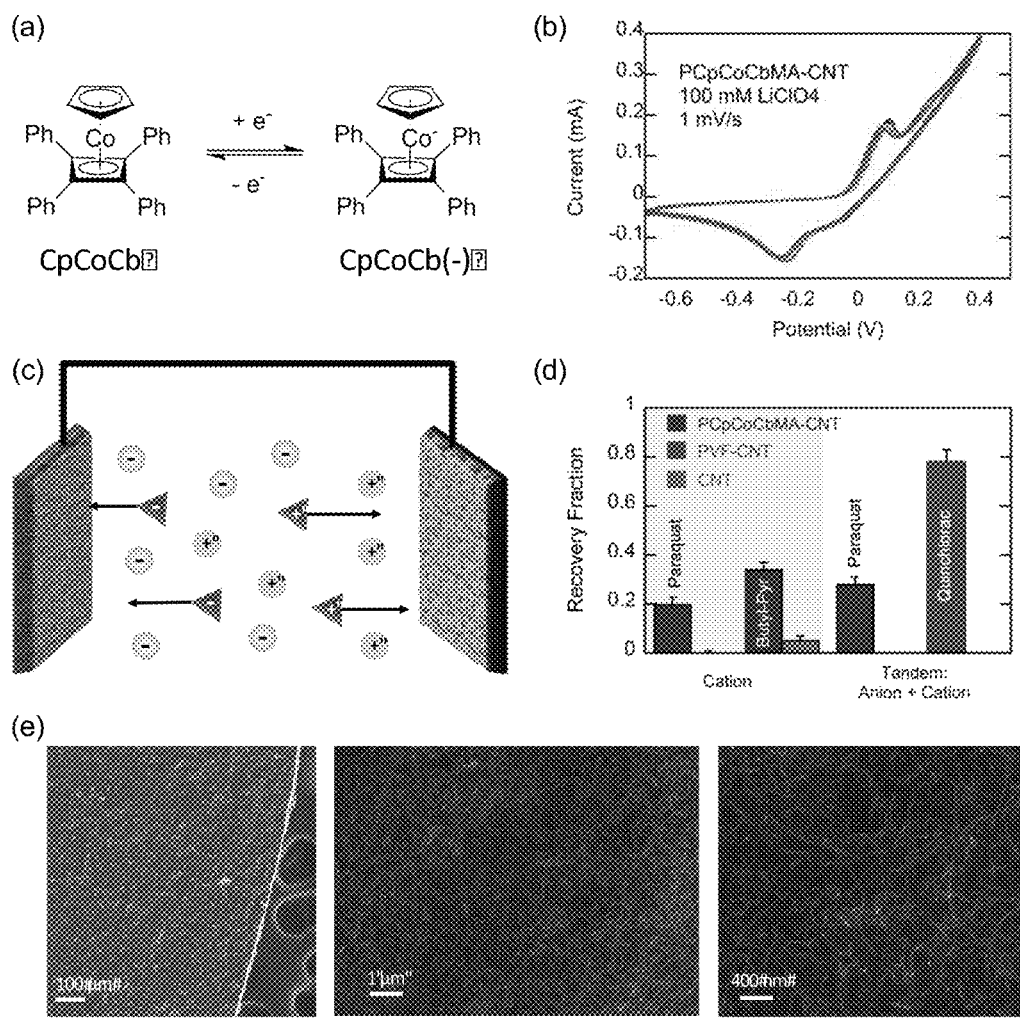

FIGS. 91A-91E. FIG. 91A shows the cation-selective organometallic CpCoCb and its redox process. FIG. 91B shows CV at 10 mV/s for PCpCoCbMA-CNT electrodes. FIG. 91C shows the tandem separation system with a working PVF-CNT anode and a counter PCpCoCbMA-CNT cathode for separation of paraquat (purple cation, left) and quinchlorac (red anion, right). FIG. 91D shows a comparison of PCpCoCbMA-CNT versus CNT cathode separation with solely paraquat and butyl-pyridinium (300 μM and 100 mM $NaClO_4$), and tandem results with PVF-CNT//PCoCp-CoCbMA-CNT when both paraquat and quinchlorac are present. FIG. 91E shows the surface morphology of PCp-CbMA-CNT electrodes under HR-SEM at various magnifications.

Figure 92:
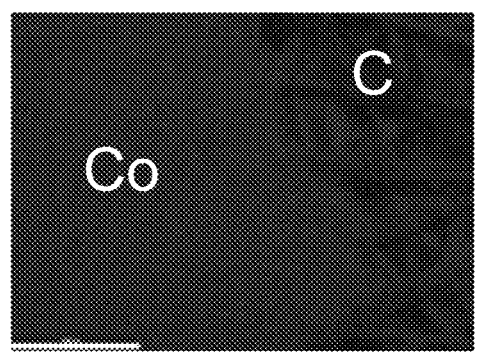

FIG. 92 shows a SEM-EDX of $PMAECoCp_2$-CNT coated on carbon paper fibers.

Figure 93:
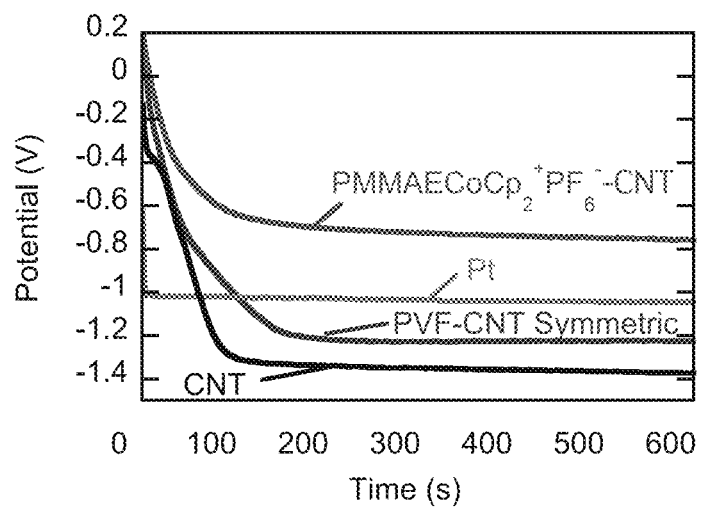

FIG. 93 shows the charging of various working cathodes with PVF-CNT as the anode counter (−100 μA vs Ag/AgCl reference). Tracking the redox potential of the cathode allows us to see that water reduction is suppressed when the asymmetric system is applied.

Figure 94:
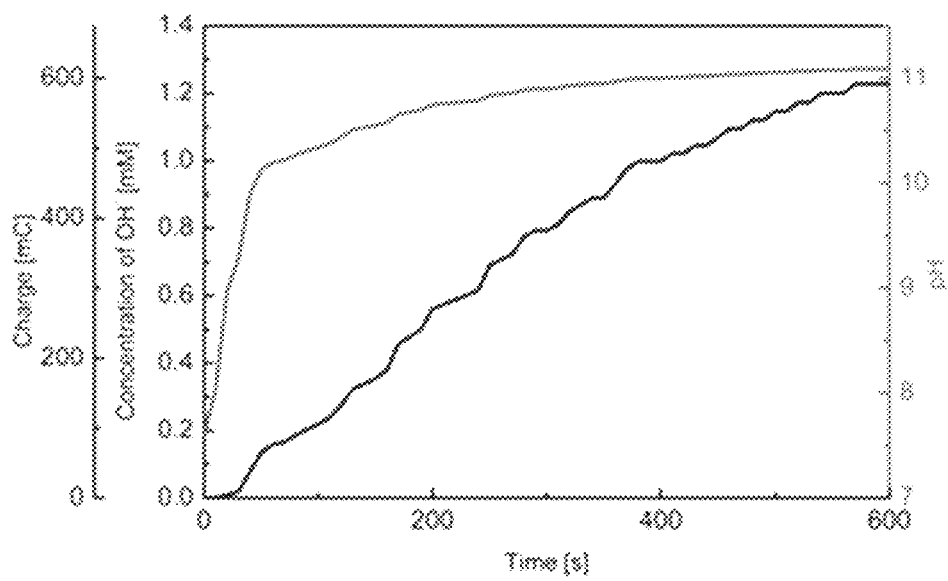

FIG. 94 shows the pH versus charge versus concentration of OH− of the model PVF-CNT electrode with Pt counter over 600 s chronoamperometry (0.83 $mA/cm^2$).

Figures 95A, 95B, 95C, 95D, 95E, 95F:
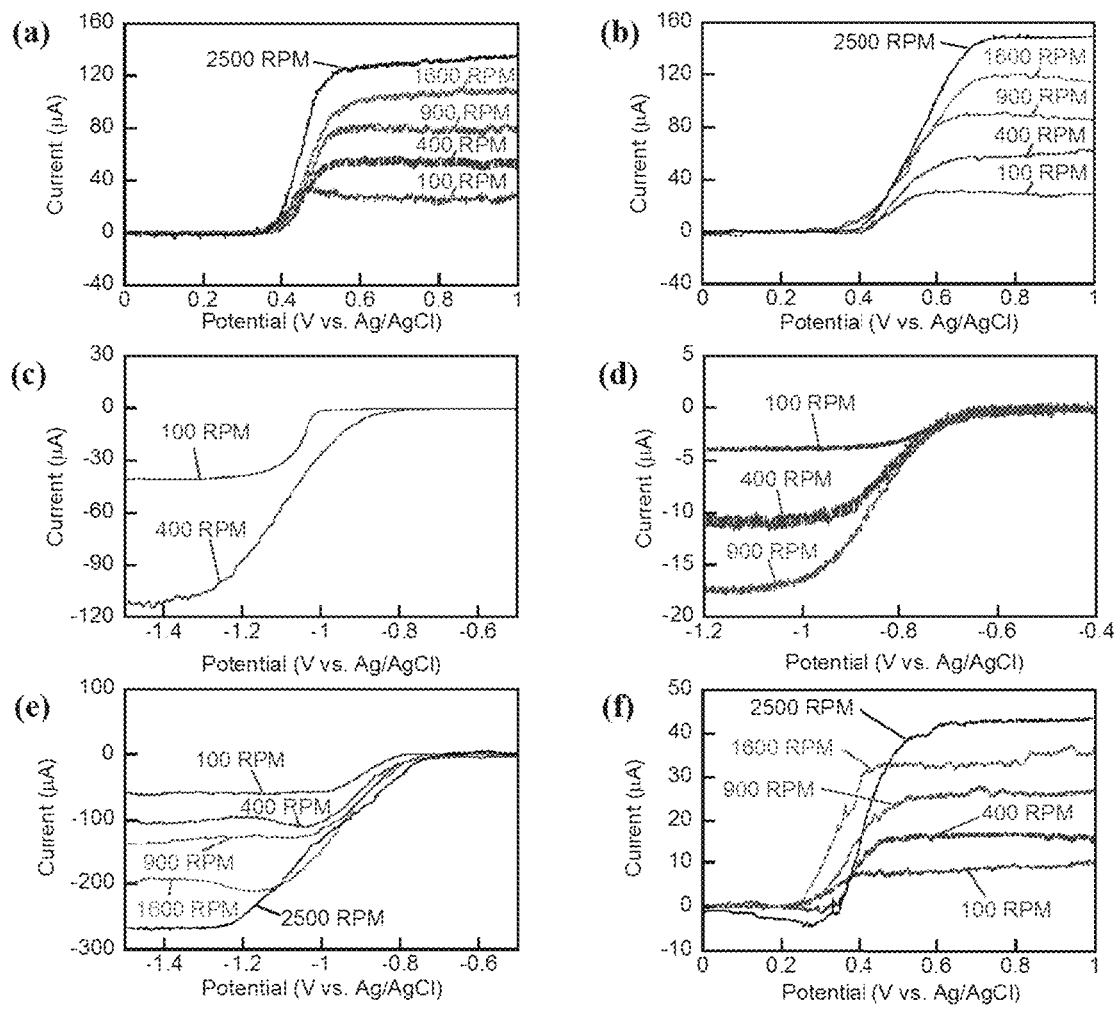

FIGS. 95A-95F show linear sweep voltammograms (LSVs) at a scan rate of 10 mV/s for different working electrode rotation speeds. FIG. 95A at 1 mM Fc, 100 mM $TBaBF_4$ in MeCN. FIG. 95B at 1 mM Fc, 10 mM $TBaBF_4$ in MeCN. FIG. 95C 30 μM CpCoCb, 10 mM $TBaBF_4$ in MeCN. FIG. 95D 25 μM CpCoCb, 10 mM $TBaBF_4$ in DMSO. FIG. 95E at 1 mM $CoCp_2PF_6$, 10 mM $TBaBF_4$ in MeCN. FIG. 95F at 80 μM Rubpy, 10 mM $TBaBF_4$ in MeCN.

Figures 96A, 96B, 96C, 96D, 96E, 96F:
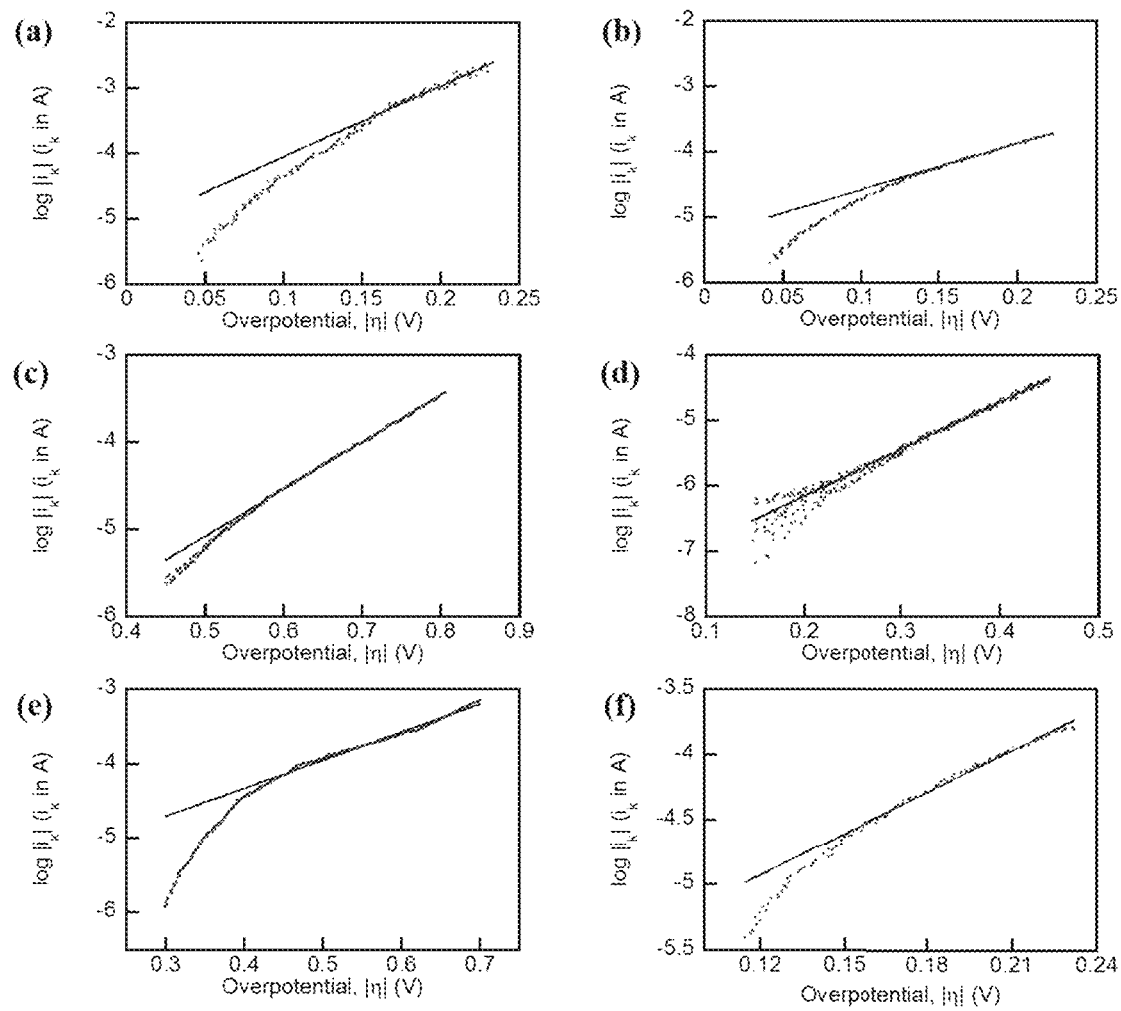

FIGS. 96A-96F show Tafel plots at a scan rate of 10 mV/s for the highest working electrode rotation speed tested. FIG. 96A at 1 mM Fc, 100 mM $TBaBF_4$ in MeCN at 2500 RPM. FIG. 96B at 1 mM Fc, 10 mM $TBaBF_4$ in MeCN at 2500 RPM. FIG. 96C at 30 μM CpCoCb, 10 mM $TBaBF_4$ in MeCN at 400 RPM. FIG. 96D at 25 μM CpCoCb, 10 mM $TBaBF_4$ in DMSO at 900 RPM. FIG. 96E at 1 mM $CoCp_2PF_6$, 10 mM $TBaBF_4$ in MeCN at 2500 RPM. FIG. 96F at 80 μM Rubpy, 10 mM $TBaBF_4$ in MeCN at 2500 RPM.

Figures 97A, 97B, 97C, 97D, 97E, 97F:
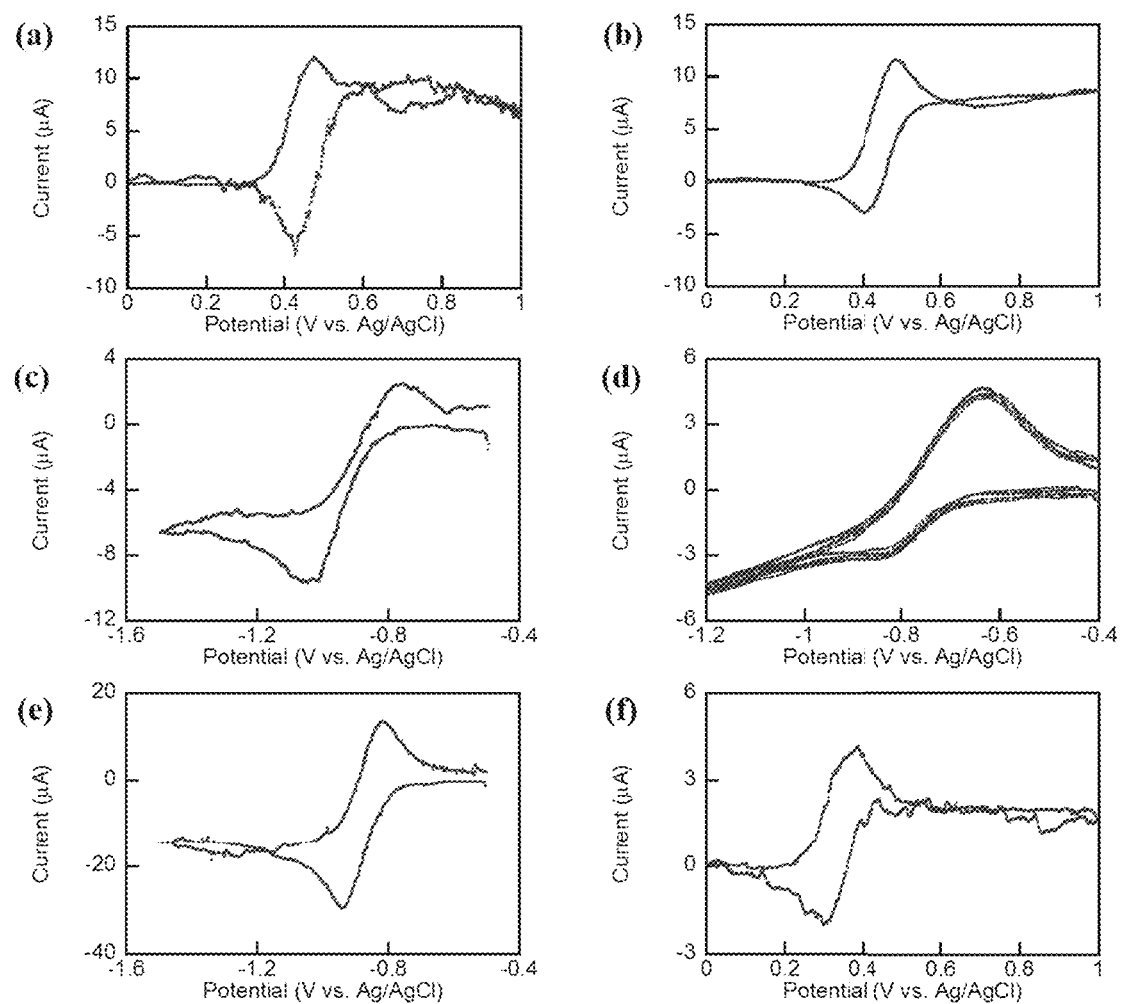

FIGS. 97A-97F show cyclic voltammograms (CVs) at a scan rate of 10 mV/s. FIG. 97A at 1 mM Fc, 100 mM $TBaBF_4$ in MeCN. FIG. 97B at 1 mM Fc, 10 mM $TBaBF_4$ in MeCN. FIG. 97C at M CpCoCb, 10 mM $TBaBF_4$ in MeCN. FIG. 97D at 25 μM CpCoCb, 10 mM $TBaBF_4$ in DMSO. FIG. 97E at 1 mM $CoCp_2PF_6$, 10 mM $TBaBF_4$ in MeCN. FIG. 97F at 80 μM Rubpy, 10 mM $TBaBF_4$ in MeCN.

Figure 98:
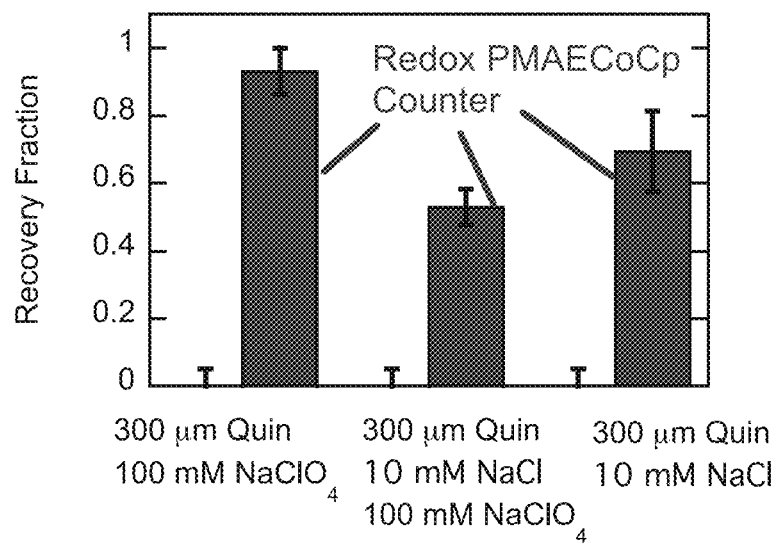

FIG. 98 shows the recovery factor of quinchlorac between redox counter and CNT (non-existent) under various competing electrolyte concentrations.

Figure 99:
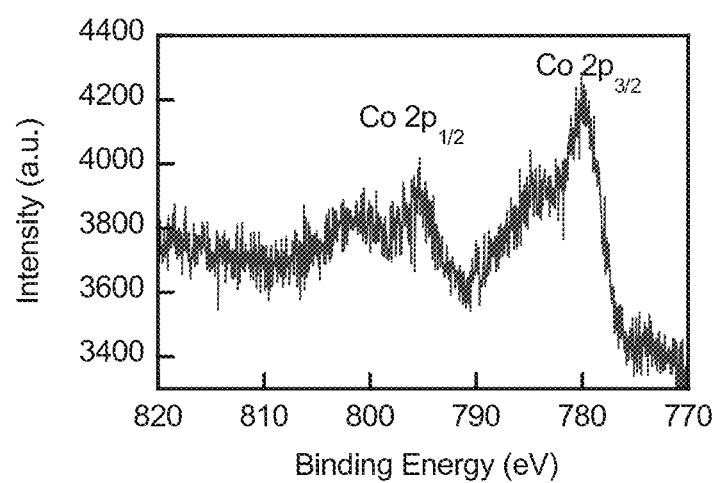

FIG. 99 shows the high-res XPS of cobalt in PCoCp-CbMA.

Figure 100:
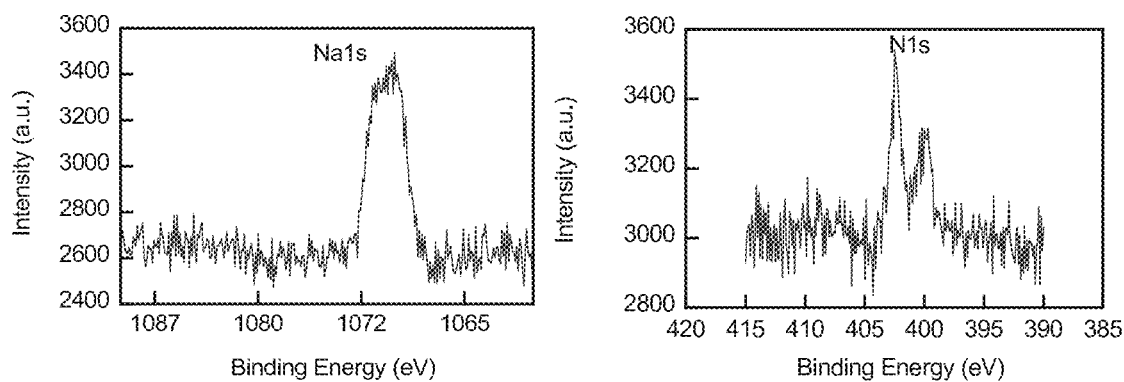

FIG. 100 shows the high-res XPS of Na1s vs N1s of butyl pyridinium adsorbed on a PCoCpCbMA-CNT electrode.

Figure 101:
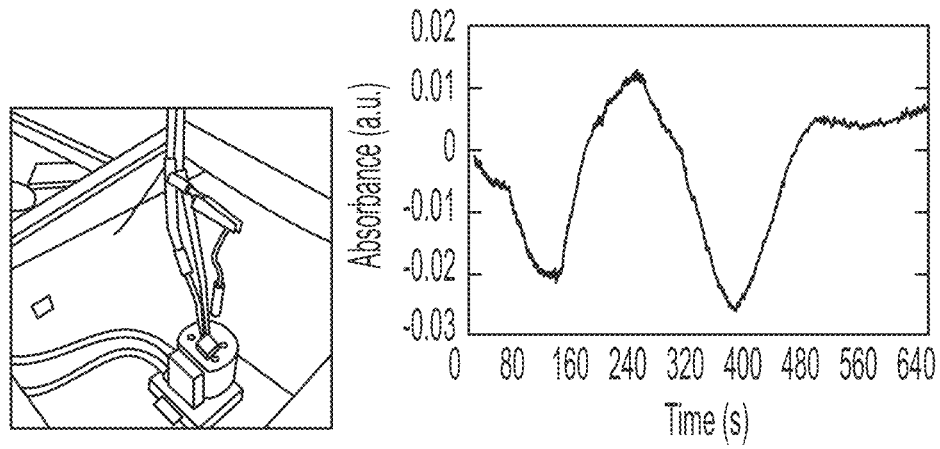

FIG. 101 shows the reversible adsorption of butyl-pyridinium (300 uM But-pyr with 100 mM $NaClO_4$) under potential using PCoCpCbMA-CNT//PVF-CNT. Adsorption under −0.7 V and desorption under 0 V.

Figure 102:
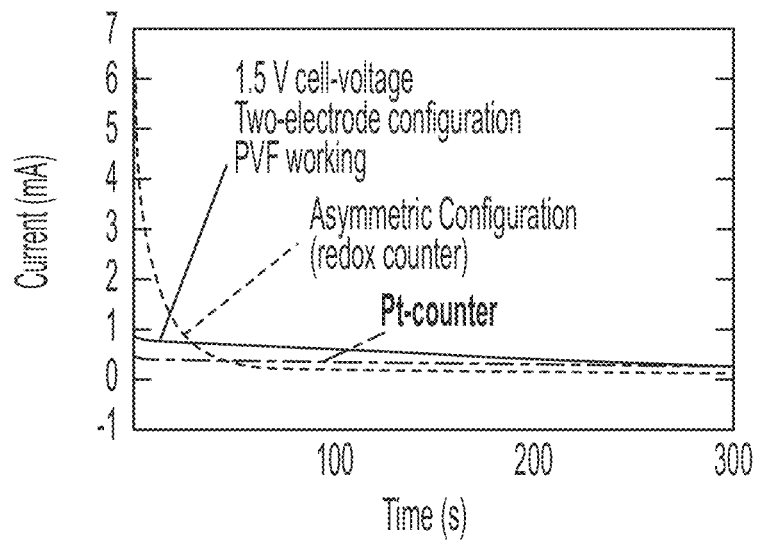

FIG. 102 shows chronoamperometry at 1.5 V of various configurations of PVF-CNT with various counters. Charging is much more significant with the asymmetric electrode counter $PMMAECoCp_2$-CNT.

Figure 103:
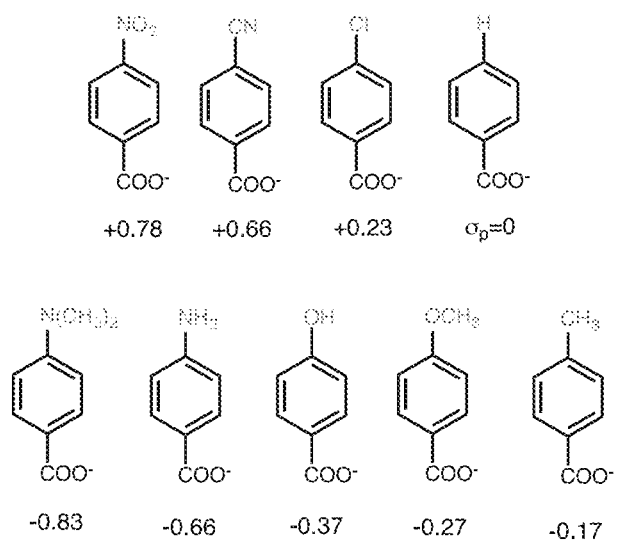

FIG. 103 shows molecules screened for para-substitution in Hammett series of binding with ferrocenium.

Figures 104A, 104B:
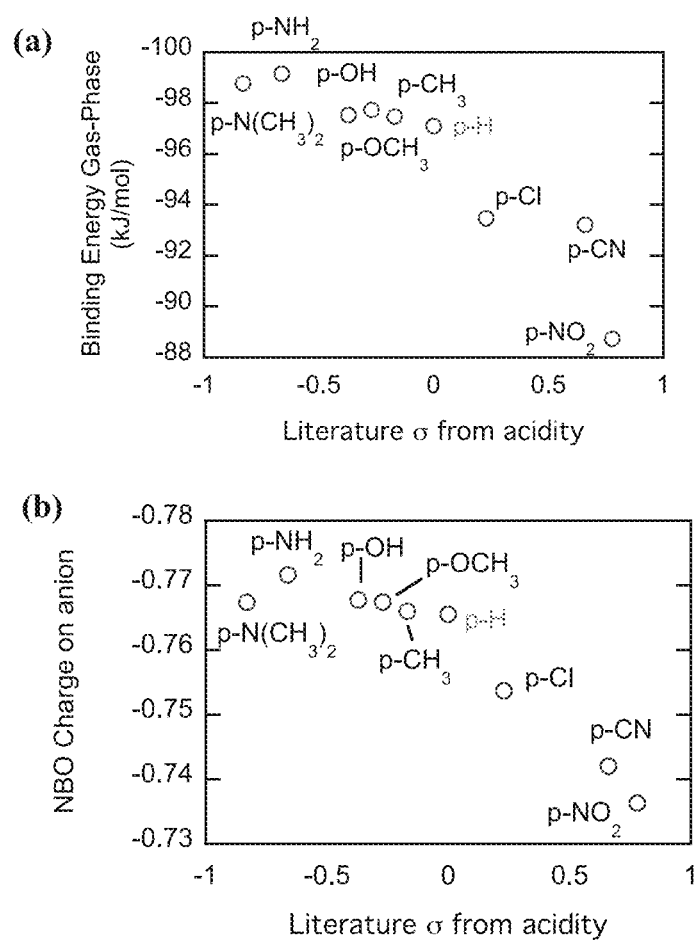

FIGS. 104A-104B shows the results of binding energy of p-substituents carboxylate anions with ferrocenium (FIG. 104A) and NBO charge on COO− group with acidity of molecules (FIG. 104B).

Figure 105:
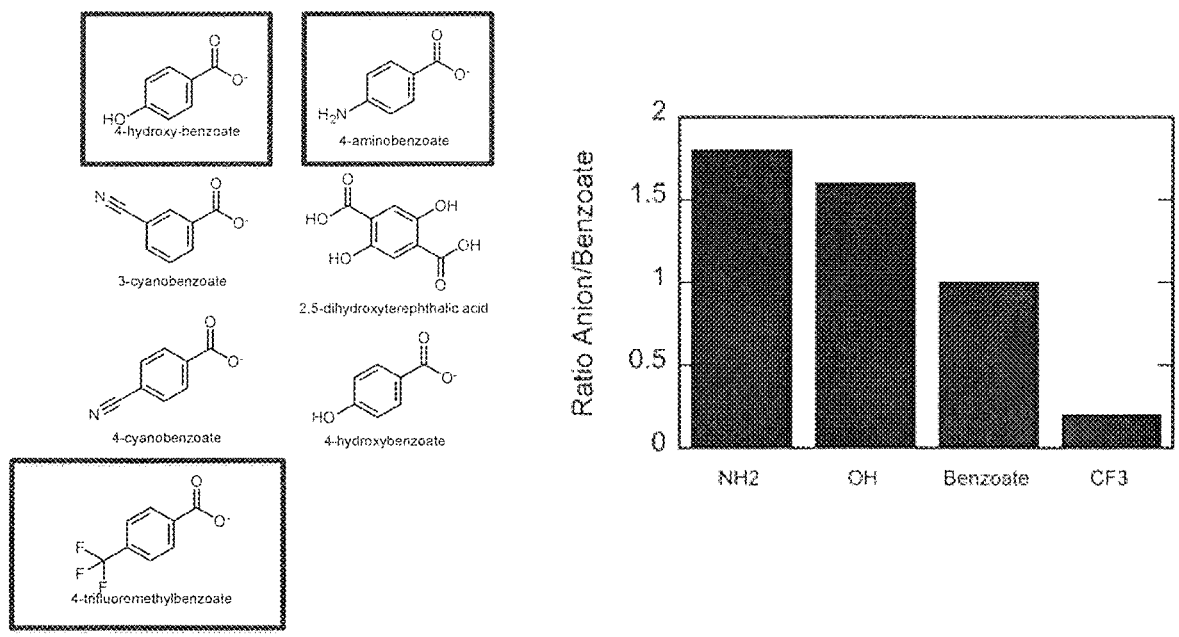

FIG. 105 shows the experimental co-adsorption between $NH_2$/OH/$CF_3$ substituted para-benzoic acids and benzoate.

Figure 106:
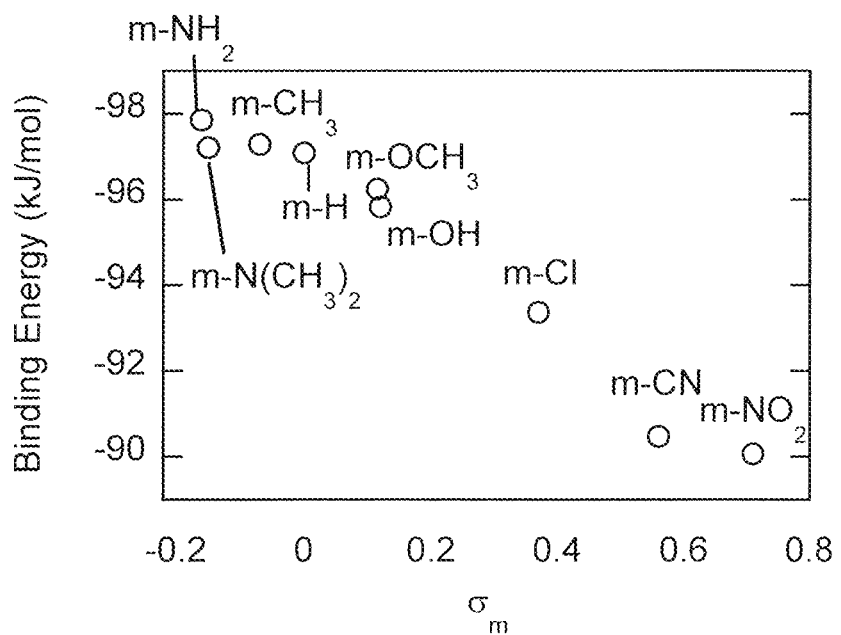

FIG. 106 shows meta-substitution binding energies.

Figure 107:
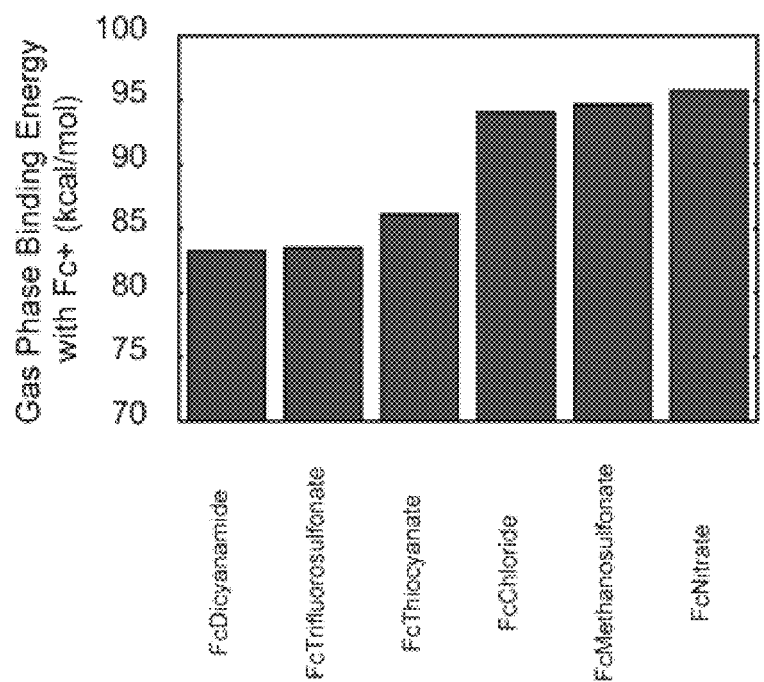

FIG. 107 shows the screening of ferrocenium binding with a variety of competing electrolytes.

Figures 108A, 108B, 108C, 108D, 108E:
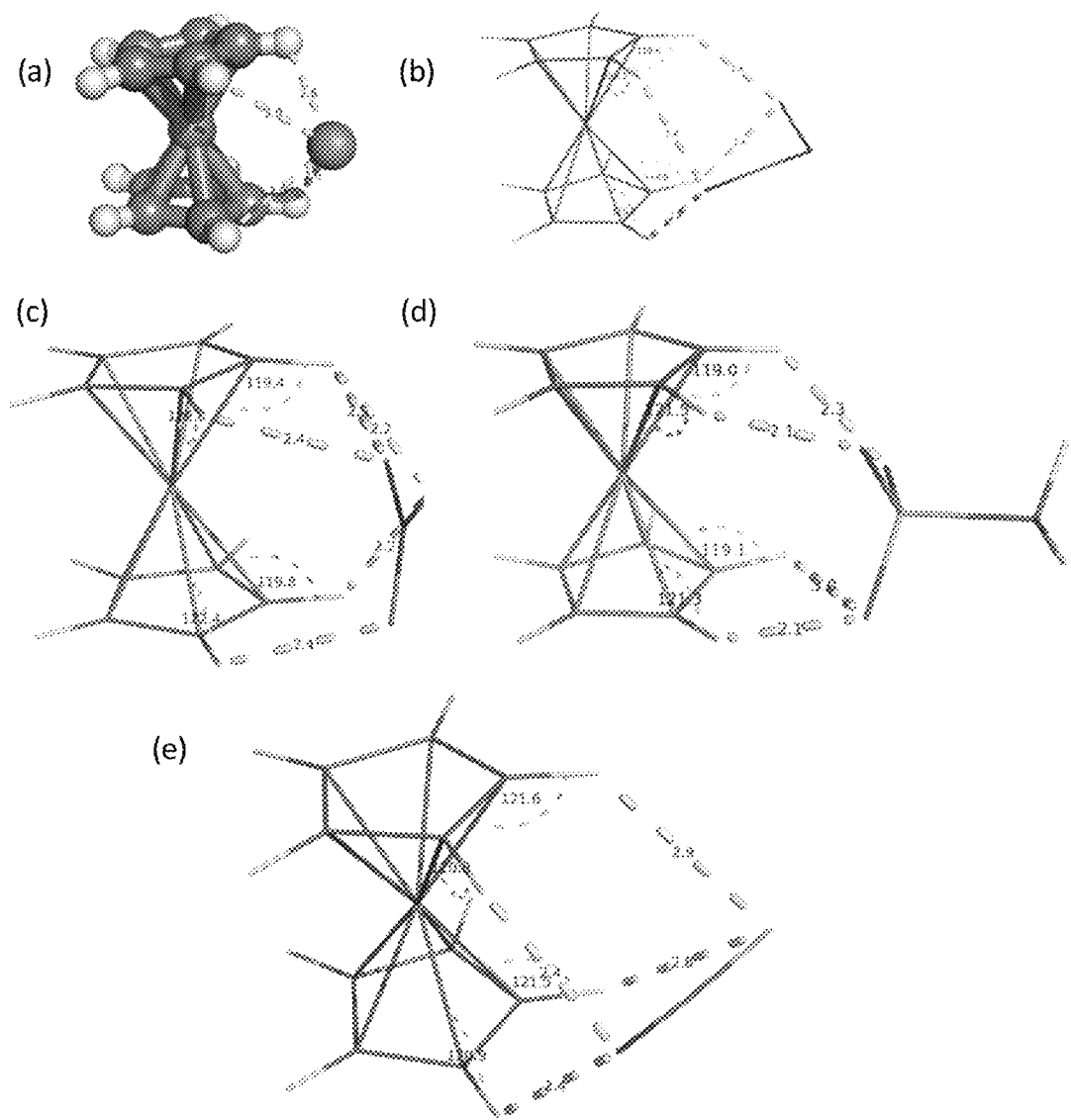

FIGS. 108A-108E show optimized geometries for the binding of ferrocenium with chloride (FIG. 108A), dicyanamide (FIG. 108B), nitrate (FIG. 108C), methanosulfonate (FIG. 108D) and thiocyanate (FIG. 108E).

FIGS. 109A-109D show optimized geometries of ligand functionalized ferrocenes and their binding with the various formates, among others. (FIG. 109A) 1,2-bromosubstitution, (FIG. 109B) amino-substitution, (FIG. 109C) methyl-substitution and (FIG. 109D) alcohol substitution.

FIG. 110 illustrates gas-phase calculations of functionalization of cyclopentadienyl ring and the effect of binding energy.

Figure 111:
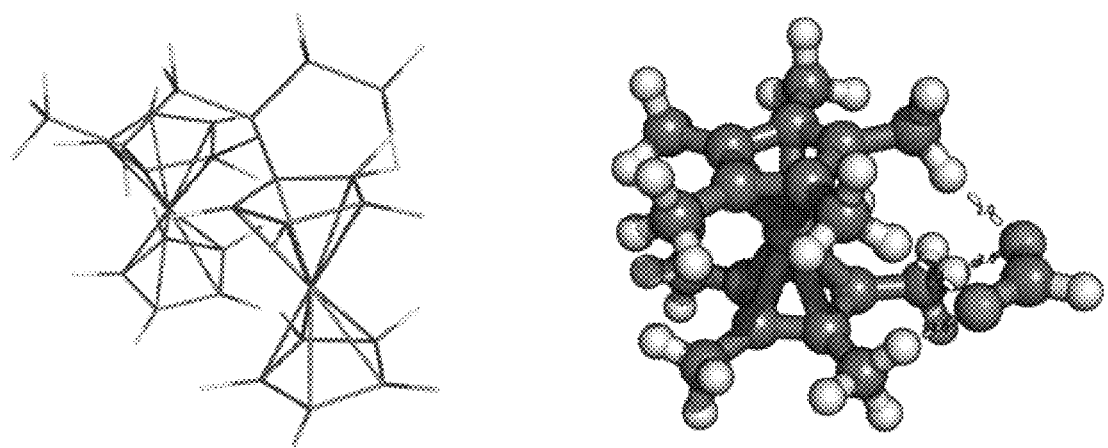

FIG. 111 shows ferrocene dimer and decamethylferrocene.

Figure 112:
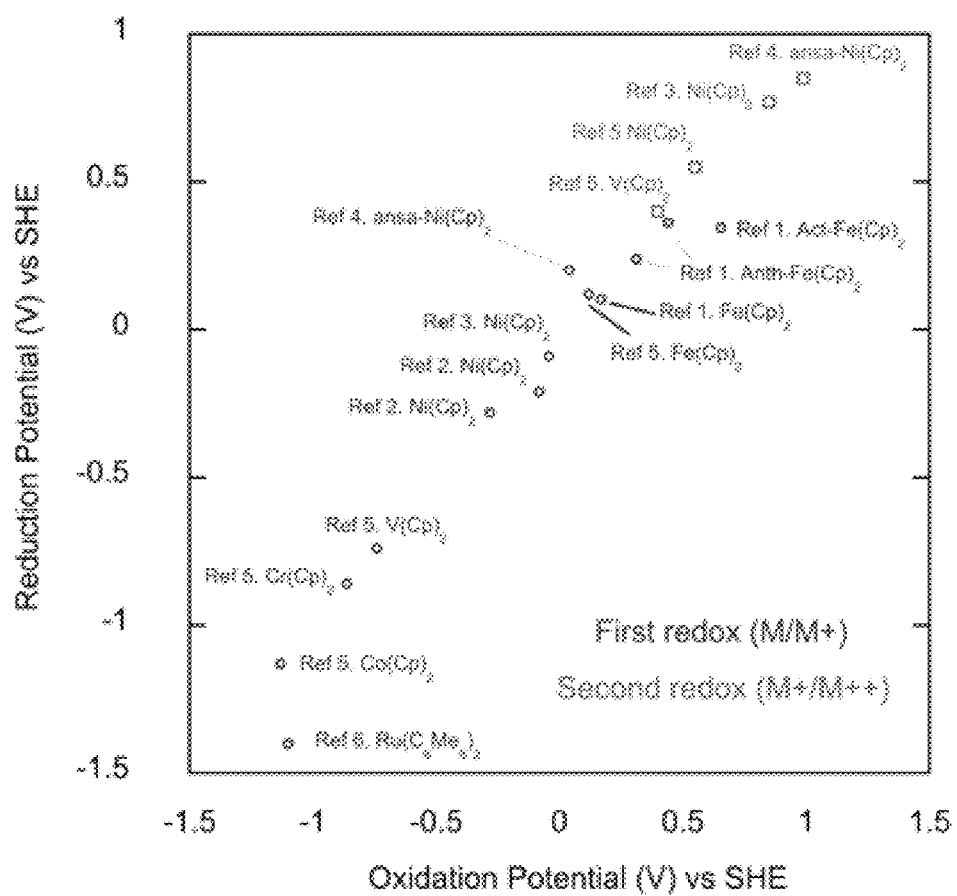

FIG. 112 shows a summary of metal-centers and their various oxidation and reduction potentials.

Figure 113:
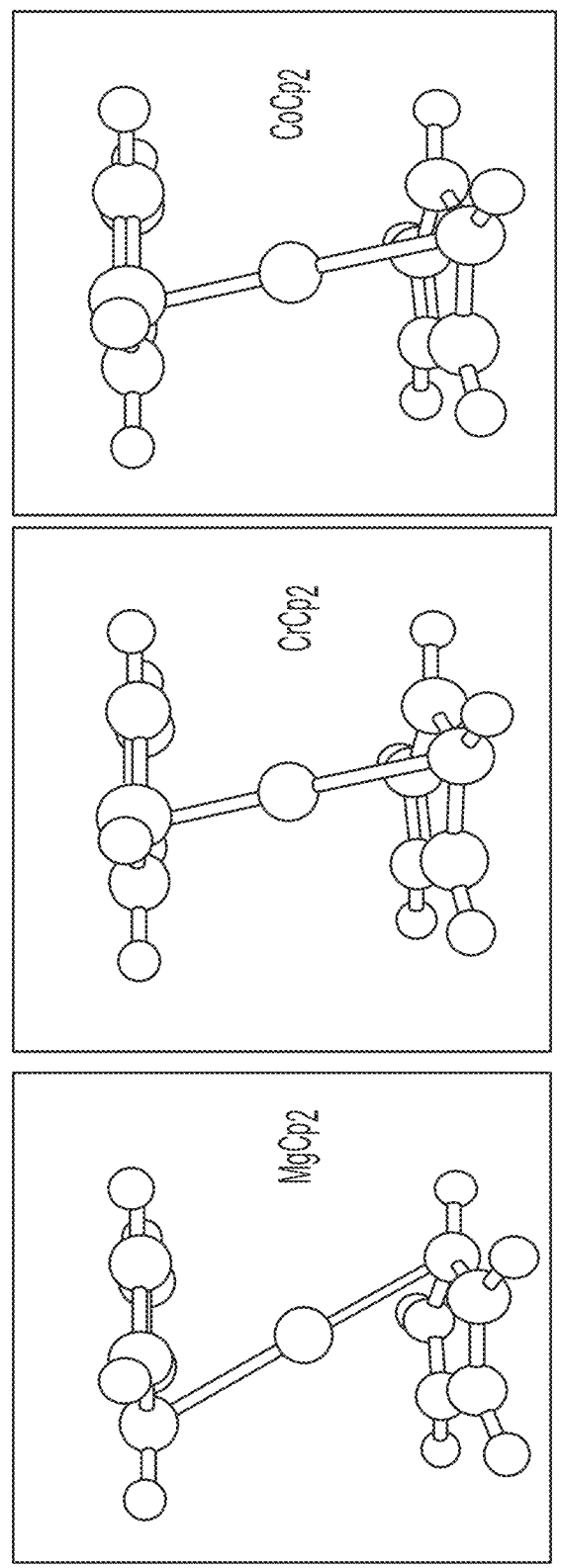

FIG. 113 illustrates a screening of metal center with stable metallocenes considered.

Figure 114:
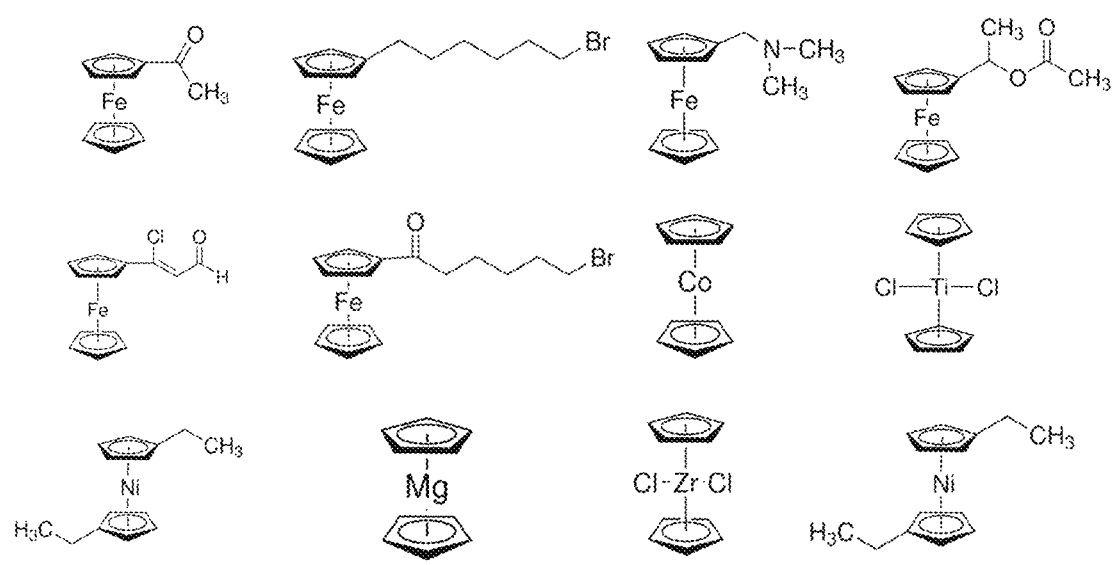

FIG. 114 shows metallocenes purchasable from SIGMA for screening binding energies experimentally.

DETAILED DESCRIPTION OF EXEMPLARY EMBODIMENTS

Selective recovery or separation of organic ions, e.g., organic anions or cations, in dilute concentrations from solution is a crucial challenge in the chemical and pharmaceutical industries, and in environmental remediation efforts such as in large-scale wastewater treatment facilities. Since existing technologies suffer from high energetic penalties and performance limitations when organic ions are present at very low concentrations (nM to μM) with competing species in excess, there is a need to develop efficient, affordable and robust purification technologies for various types of separation, for example point-of-source treatment or remote in-situ purification devices to large-scale wastewater treatment facilities.

The present disclosure is, in part, based on the design and construction of an electrochemical separation device that utilized redox-functionalized electrode(s) to selectively remove one or more target species (e.g., organic or inorganic anions and/or cations) from solution by modulating the electrical potential applied to the device. For example, adsorption or capture of one or more target species to redox-functionalized electrodes depends on the changes in the redox state of the redox species within the electrodes when an electrical potential is applied, while release of the captured species relies on reversal of the applied electrical potential, with minimal or no pH, temperature, or other changes in solution conditions. The electrochemical devices or systems described herein do not rely on intercalated ions between a layered structure of an electrode that reversibly move from the electrode to another.

High selectivity for target species (e.g., organic anions and/or cations) is achieved, at least in part, by functionalizing at least one electrode with a redox species that is tuned to selectively interact with a certain functional group of a target species, wherein the chemical interaction between the redox species and the functional group is activated by a Faradaic/redox reaction. For example, the inventors have discovered a specific type of redox-activated chemical interaction (e.g., a redox-activated directional hydrogen bonding) between the cyclopentadienyls of a metallocene-based system (e.g., ferrocene-based system) and anions (e.g., organic anions) when the metallocene is oxidized. Such specific redox-activated chemical interaction between the first electrode (e.g., anode) and anions allows for remarkable recognition and separation of anions, e.g., organic ions such as carboxylates, sulfonates, and phosphonates, from other competing anions such as other competing organic anions or inorganic anions, in both aqueous and organic phases. Thus, such separation of ions (e.g., organic ions) is not merely based on size or charge of the ions as employed by the conventional separation methods, but rather relies on the specific interaction between the electrode redox species and the target molecules (e.g., organic or inorganic ions or neutral molecules) to be separated. The discovery described herein can be extended to design of other metallocenes and functionalized redox-species using specific chemical interaction for more efficient electrochemical separation.

Accordingly, aspects of the present disclosure feature electrochemical devices or systems each comprising at least one redox-functionalized electrode that is selective toward a target molecule or species, as well as methods of separating at least one target molecule from a fluid source. As used herein, an "electrochemical system" is a system that is configured to provide an electrical potential across electrodes to induce one or more chemical reactions at the electrodes. "Electrochemical reactions" are those reactions within the electrochemical system that, directly or indirectly, produce or consume electrons. Upon application of an electrical potential, The electrons generated by a voltage generator (e.g., can be transferred between an anode and a cathode. Generally, the electrochemical reactions will include at least one oxidation reaction and at least one reduction reaction. In most cases, the oxidation electrochemical reaction generates electrons, and the reduction electrochemical reaction consumes electrons.

Generally, an "electrode" corresponds to a solid material within the electrochemical system at which a reduction or oxidation reaction occur. The anode is the electrode at which oxidation occurs during application of an electrical potential, and the cathode is the electrode at which reduction occurs during application of an electrical potential.

The electrochemical system may also include, according to certain embodiments, other optional components such as, for example, an electrolyte (e.g., a liquid electrolyte which may, for example, facilitate the transport of ions between the electrodes of the electrochemical system during operation), a vessel (e.g., any suitable container), external electrical connections, and the like. Such optional components are described, for example, in more detail below.

Exemplary Electrochemical Systems

One aspect provided herein relates to an electrochemical device or system comprising a redox-functionalized first electrode and a second electrode. The first electrode comprises a first solid substrate and a first redox species immobilized to the first solid substrate, wherein the first redox species is selective toward a target functional group of a target molecule.

A target molecule that is amenable for separation using the electrochemical devices or systems or methods described herein can be a charged molecule (e.g., an ion) or a neutral molecule. In some embodiments, the target molecule is an organic molecule (e.g., charged or neutral). In some embodiments, the target molecule is an inorganic molecule (e.g. charged or neutral). In some embodiments, the target molecule (e.g., organic or inorganic molecule) may be a molecule comprising at least one or more electronegative atom (e.g., oxygen or nitrogen) that promotes one or more hydrogen bridges between a metallocene (e.g., cyclopentadienyl) present in the electrode and the electronegative atom when the metallocene is oxidized.

As used herein, the term "organic molecule" refers to a molecule of any molecular weight comprising at least one or more carbon atoms to which other elemental atoms (e.g., nitrogen, phosphorus, oxygen, sulfur, etc.) are attached. The organic molecule can be a neutral or charged (e.g., positively-charged or negatively-charged) molecule. Examples of an organic molecule include but are not limited to molecular or polyatomic ions (e.g., an ion comprising two or more atoms), atomic ions (e.g., an ion of a single atom), chemical molecules or compounds, and/or biomolecules (e.g., a molecule that can be found in or derived from a biological organism or cell) or fragments thereof.

As used herein, the term "inorganic molecule" refers to a molecule of any molecular weight that is not an organic molecule as defined above. For example, an inorganic molecule is a molecule of any molecular weight comprising no carbon atoms. The inorganic molecule can be a neutral or charged (e.g., positively-charged or negatively-charged) molecule. Examples of an inorganic molecule include but are not limited to molecular or polyatomic ions (e.g., an ion comprising two or more atoms such as nitrates or phosphates), atomic ions (e.g., an ion of a single atom such as fluorides), and/or chemical molecules or compounds.

As used herein, the term "immobilized" refers to a redox species that is coupled, directly or indirectly, to an electrode is not able to move freely from one electrode to another electrode. The term "coupled" as used herein means to chemically associate one entity (for example a moiety) with another. In some embodiments, the coupling is covalent. For example, metallocene is covalently attached to a polymer such as polyvinyl(ferrocene). In non-covalent embodiments, the non-covalent coupling is mediated by non-covalent interactions including but not limited to charge interactions, affinity interactions, metal coordination, physical adsorption, hydrophobic interactions, hydrogen bonding interactions, van der Waals interactions, dipole-dipole interactions, and/or combinations thereof. In some embodiments, the coupling is encapsulation.

Another aspect described herein provides an electrochemical system that utilizes chemical interaction(s) to target a specific species based on redox mediation. The electrochemical system comprises (a) a first electrode comprising a solid substrate comprising a first redox-species, wherein the first redox-species is selective toward a target anion based on a first specific chemical interaction between the first redox species and the target anion, wherein the first specific chemical interaction is activated by a first Faradaic/redox reaction; and (b) a second electrode.

In some embodiments of various first electrodes described herein, the first redox species in an oxidized state selectively binds to an electron-donating functional group of a target molecule molecule (e.g., a neutral or charged organic or inorganic molecule). For example, the first redox species in an oxidized state is selective toward a target functional group (e.g., a target molecular moiety) when it has a higher affinity for the target functional group than for a non-target species, e.g., by at least about 1.1-fold, at least about 1.5-fold, at least about 2-fold, at least about 3-fold, at least about 4-fold, at least about 5-fold, at least about 10-fold, at least about 25-fold, at least about 50-fold, at least about 100-fold, at least about 200-fold, at least about 300-fold, at least about 400-fold, at least about 500-fold, at least about 1000-fold or more. Alternatively, the first redox species in an oxidized state is selective toward a target functional group (e.g., a target molecular moiety) when a separation factor of a target molecule (e.g., a neutral or charged organic or inorganic molecule) comprising the target functional group (relative to a non-target species) is at least 5 or more, including, e.g., at least 10, at least 20, at least 30, at least 40, at least 50, at least 60, at least 70, at least 80, at least 90, at least 100, at least 125, at least 150, at least 175, at least 200, at least 250, at least 300, at least 350, at least 400, at least 450, at least 500, or more.

As used herein, the term "redox species" generally refers to any molecule or compound or a portion thereof (e.g., a molecular or functional moiety of a molecular or compound) that can be oxidized and/or reduced during or upon electrical stimulation (e.g., during or upon application of an electrical potential), or can undergo a Faradaic reaction. For example, a redox species comprises one or more molecular moieties that accept and/or donate one or more electrons depending on its redox state. Thus, the redox species can form part (e.g., a molecular moiety) of a small molecule, a compound, a polymer molecule, or can exist as an individual molecule or compound.

In some embodiments of various first electrodes described herein, the first redox species can be oxidized to comprise an electron-receptor moiety upon application of an electrical potential. Examples of such a first redox species include, but are not limited to organometallic compounds or polymers, an organic species (e.g., polymers), or a crystalline solid. An organometallic compound is generally a compound comprising at least one metal-carbon (M-C) bond where the carbon is part of an organic group. Examples of such organic group include, but are not limited to, alkyl (e.g., methyl), alkylidene (e.g., carbene), alkene (e.g., ethene), allyl (e.g., —$C_3H_5$), alkylidyne (e.g., carbyne), 1,3-butadiene (e.g., $C_4H_6$), cyclobutadiene (e.g., $C_4H_4$), cyclopentadienyl ($C_5H_5$), benzene (e.g., $C_6H_6$), and cyclooctatetraene (e.g., $C_8H_8$). The metal in the metal-carbon (M-C) bond of organometallic compounds include metals (e.g., Li, Mg, and Al), metalloids, and transition metals (e.g., Fe, Co, Cr, and Ni). Organometallic compounds include, among others, metallocenes, polymers and derivatives, metal-bipyiridine systems, ferricyanide type systems, porphyrins, phthalocyanines, and pincer-ligand metal systems. An organometallic polymer is a polymer comprising an organometallic compound, e.g., a polymer comprising metallocene. An exemplary organometallic polymer includes, but is not limited to polyvinyl(ferrocene).

Additional non-limiting examples of the first redox species that can be used in various first electrodes include polymeric redox-systems, e.g., polyaniline-type systems, polypyrrole, polythiophene, and their derivatives; crystalline solids, e.g., redox-active metal-based nanoparticles, redox-active heteropolyacids, redox-active metal-organic frameworks, redox-active crystalline polymer frameworks (e.g., covalent-organic frameworks); cyclodextrin-based systems, metal-polypyridyl systems, metal-dicarbamates, cryptands, redox-active arenes, dendrimers comprising redox-active centers, and redox-active organic macrocycles.

In some embodiments, the first redox species present in the first electrode (e.g., anode) comprises a metallocene. A metallocene is a compound comprising two cyclopentadienyl rings and a metal center coordinated in a sandwich structure, wherein the metal center is oxidized to form a metal ion upon electrical stimulation. Thus, in another aspect, the present disclosure provides an electrochemical device or system comprising a first electrode that comprises a metallocene-comprising solid substrate, wherein the metallocene is selective toward a target functional group of a target inorganic or organic molecule (e.g., a neutral or charged inorganic or organic molecule); and a second electrode (e.g., cathode).

In some embodiments of various first electrodes described herein, the first redox species or metallocene comprises a ferrocene-based redox species. In some embodiments, the cyclopentadienyl ligand or ring of ferrocenium (oxidized state of ferrocene) can form a hydrogen bonding with an anion, e.g., an anion comprising a carboxylate moiety, a sulfonate moiety, or a phosphonate moiety.

In some embodiments involving various first electrodes described herein, the first redox species or metallocene may interact with a moiety of an inorganic ion (e.g., but not limited to nitrates, phosphates, fluorides, among others), or a moiety of a neutral molecule. Accordingly, some embodiments of the electrochemical devices or systems described herein can be used to separate inorganic ions or neutral molecules from other competing species (e.g., dissolved ionic and/or neutral species) in the solution.

In some embodiments, the first electrode contains the first redox species (e.g., as described herein) in an amount of greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In certain embodiments, the first electrode contains the first redox species (e.g., as described herein) in an amount of less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt %. Combinations of the above-referenced ranges are also possible (e.g., greater than or equal to 20 wt % and less than or equal to 100 wt %). Other ranges are also possible.

In one embodiment, the first electrode contains the solid substrate and the first redox species (e.g., described herein) in an amount as described above, wherein the first redox species is dispersed in the solid substrate and is stabilized through non-covalent interactions (e.g., $\pi$-$\pi$ interactions) with the solid substrate.

In various embodiments of the electrochemical devices or systems described herein, the second electrode can be electrically conductive and electrochemically inert (e.g., carbon, and/or platinum); or a conductive electrode functionalized with a redox species. In some embodiments, the redox species in the second electrode can be (i) the same redox species as in the first electrode; (ii) a redox species with identical chemical identity to the redox species of the first electrode, but in a different oxidation state; or (iii) a redox species that has a different charge and chemical identity from that of the redox species of the first electrode.

In electrochemical applications, water electrolysis or solvent electrolysis at the second electrode is a major challenge as it drains current density that could otherwise be applied in a useful process. For example, in aqueous systems, water reduction at the second electrode, with its subsequent OH⁻ generation and $H_2$ evolution, can affect the solution chemistry through increases in pH and impact the stability of the first electrode itself and affect the performance of separation process. The inventors have discovered use of redox-functionalized second electrodes to suppress side reactions and preservation of water chemistry. Accordingly, in some embodiments, using favorable faradaic process on the second electrode, e.g., providing a second electrode that is functionalized with a redox species with favorable reduction process, can be desirable to prevent side reaction such as water electrolysis. By preventing or minimizing water or solvent electrolysis at the second electrode, pH and condition of the liquid phase can be controlled. In these embodiments, the second electrode can comprise a second solid substrate and a second redox species immobilized to the solid second substrate, wherein the second redox species undergoes a self-exchange reaction within the second electrode during operation of the electrochemical system. Such second electrode configuration can be applied to both aqueous and organic solution systems.

In some embodiments, the second redox species can be a molecule, compound, or polymer comprising an electron-acceptor moiety, e.g., with a more favorable reduction process than water or solvent electrolysis (e.g., the redox potential for the second redox species lies above the water-reduction potential). The molecule, compound, or polymer comprising an elector-acceptor moiety can be a charged species or a neutral species. For example, a charged redox species can comprise a charged organometallic compound, which becomes neutrally charged upon reduction. In some embodiments, the charged organometallic compound can be a metallocenium-based species, e.g., but not limited to cobaltocenium-based redox species (e.g., cobaltocenium hexafluorphosphate or cobaltocenium-containing polymer such as poly(2-(methacrylolyoxy)ethyl cobaltocenium)). Other charged organometallic compounds that can be used to functionalize the second electrode include, but are not limited to, ruthenium-based redox species (e.g., cis-dichlorobis(2,2'-bipyridine)ruthenium(II)-based molecules or -containing polymer, or ferrocenium-based redox species. Alternatively, the second redox species can be a neutral molecule, compound, or polymer comprising an electron-acceptor moiety that becomes negatively charged upon reduction. Exemplary neutral redox species includes organic conducting polymers comprising electron-acceptor moieties, e.g., poly(anthraquinone), or ferricyanide-based redox species (e.g., complexes of ferricyanide such as potassium ferricyanide).

In some embodiments, the second redox species can be a charged species of the first redox species described herein, which is reduction favorable. Non-limiting examples of such first species that can be used to form a charged species include quinone containing polymers (e.g., polyanthraquinone), Cobaltocenium containing polymers (e.g., poly(2-(methacrylolyoxy)ethyl cobaltocenium), and polypyrrole, as well as other possible redox-active species including, e.g., cyclodextrin-based systems, metal-polypyrridyl systems, metal-dicarbamates, cryptands, dendrimers comprising redox-active centers, and redox-active organic macrocycles.

In some embodiments, it is desirable to have the second redox species of the second electrode chemically different from the first redox species of the first electrode to form an asymmetric redox-based electrochemical device or system. Asymmetric redox-based electrochemical devices or systems enable efficient separation of a diluted target species from a complex background (e.g., the presence of competing ions at a concentration that is at least 100-fold higher than that of the target species) with substantially constant pH over a wide range of current densities at a high current efficiency. In some embodiments, the current densities can range from about 0.5 A/cm$^2$ to about 10 A/cm$^2$, or about 0.8 A/cm$^2$ to about 8 A/cm$^2$. In some embodiments, the current efficiency can be at least about 90% or higher, including, e.g., at least about 95%, at least about 96%, at least about 97%, at least about 98%, or higher.

In some embodiments, the second electrode contains the second redox species (e.g., as described herein) in an amount of greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In certain embodiments, the second electrode contains the second redox species (e.g., as described herein) in an amount of less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt %. Combinations of the above-referenced ranges are also possible (e.g., greater than or equal to 20 wt % and less than or equal to 100 wt %). Other ranges are also possible.

In some embodiments involving the electrochemical devices or systems described herein, the solid substrate forming the electrodes can be porous, e.g., the solid substrate comprising pores. As used herein, a "pore" generally refers to a conduit, void, or passageway, at least a portion of which is surrounded by a medium in which the pore is formed such that a continuous loop may be drawn around the pore while remaining within the medium. "Externally-accessible pores" are pores within the porous medium that are not completely surrounded by the solid material from which the porous medium is made, and thus, are accessible from outside the solid material from which the porous medium is made by a fluid (e.g., a liquid, gas, and/or supercritical fluid). The externally-accessible pores may be, according to certain embodiments, accessible by an electrolyte of the electrochemical system. Voids within a material that are completely surrounded by the solid material from which the porous medium is formed (and thus, not accessible from outside the porous medium, e.g. closed cells) are not externally-accessible pores. Pores may comprise any suitable cross-sectional shape such as, for example, circular, elliptical, polygonal (e.g., rectangular, triangular, etc.), irregular, and the like. The porous structure provides facile ion diffusion and high externally-accessible surface area of the pores that can be contacted by an external fluid (e.g., the electrolyte during operation of the electrochemical system).

Any art-recognized electrode material can be used in the solid substrate to form the anodic and/or second electrodes described herein. In general, the solid substrate can comprise one or more electrical conducting materials, e.g., but not limited to copper, carbon nanotubes, carbon paste, graphite, graphene, titanium, brass, silver, platinum, gold, ceramic material, and combinations thereof. The solid substrate can be in the form of a layer, a mesh, a film, or a plate. In one embodiment, the solid substrate for use in the electrodes of the electrochemical devices or systems described herein comprise a network of carbon nanotubes.

In some embodiments, the first and/or second electrodes may be in contact with a fluid electrolyte (e.g., a liquid and/or supercritical fluid electrolyte). In some embodiments, the first and/or second electrodes are in contact with a liquid electrolyte. Generally, the electrolyte is capable of conducting ions but is not capable of conducting a sufficient amount of electricity to result in a short circuit of the electrochemical system. The pH of the electrolyte can be neutral, acidic, or basic. In some embodiments, the pH of the electrolyte can range from pH 1 to about pH 14. In some embodiments, the electrolyte has a pH that is above the isoelectric point of the target molecule (e.g., organic or inorganic molecules) for anion-selective separation. In some embodiments, the electrolyte has a pH that is below the isoelectric point of a cation species (e.g., organic or inorganic species) to be separated for cation-selective separation.

In some embodiments, the pH of the electrolyte can vary during the operation of the electrochemical systems described herein. In some embodiments, the pH of the electrolyte is substantially the same (e.g., within 10%, within 5%, or less) during the operation of the electrochemical systems described herein.

The electrolyte might not always be present in the electrochemical system. For example, in some cases, the electrochemical system may not include some components of an electrolyte until the electrochemical system is in use. This may be the case, for example, when it is desired to transport the electrochemical systems in a dry state and/or when the components of the electrolyte material are readily available at the point of use (e.g., in the case where a water-based electrolyte is used and water is readily available at the point of use). In some embodiments, the electrochemical system includes the electrolyte salt (e.g., sodium chloride, sodium phosphate, or another suitable salt), but does not include water. In some such embodiments, water may be added to the electrochemical system at the point of use. Thus, the presence of the electrolyte within the electrochemical system is optional.

Generally, as noted above, the electrolyte serves as a medium for the transport of ions between the anode and the cathode. According to certain embodiments, the electrolyte may comprise one or more dissolved species or target molecules (e.g., inorganic or organic molecules) to be separated. In some embodiments, the electrolyte may comprise one or more dissolved salts. The salt may, according to certain embodiments, act as a pH buffer in the electrochemical system. The electrolyte may also contain, according to certain embodiments, one or more byproducts of the electrochemical reaction(s) employed by the electrochemical system.

In some embodiments, the electrolyte is an aqueous electrolyte. In some such embodiments, the electrolyte contains water in an amount of at least 50 wt %, at least 75 wt %, at least 90 wt %, or more.

In some embodiments, the electrolyte is an organic solvent electrolyte. In some such embodiments, the electrolyte contains organic solvent in an amount of at least 50 wt %, at least 75 wt %, at least 90 wt %, or more.

In certain embodiments, the electrochemical system may comprise additional components. For example, the electrochemical system may further comprise, according to certain embodiments, electrical contact pads and/or electrical leads (which can be connected to, for example, an external electrical potential generator, e.g., a voltage generator).

Other non-limiting examples of additional components include pumps, valves, storage tanks, flow meters, and mixers. In some embodiments, the electrochemical system may comprise a pump which is fluidically connected to the electrolyte. In certain embodiments, the electrochemical system may comprise a valve which is capable of allowing any gases or supercritical fluids generated during electrochemical system operation (e.g., hydrogen) to escape. In some embodiments, the electrochemical system may comprise a valve which is capable of allowing water and/or seawater into the chamber, in which the electrodes are placed. Additionally, in some embodiments, additional components such as structures, supports, and non-conductive separators may be present.

The electrochemical devices or systems described herein can be designed to introduce asymmetric Faradaic processes on both first and second electrodes to provide ionic selectivity as well as high adsorption capacity and charge storage (e.g., higher energy and power densities), as compared to purely conductive double-layer electrodes. Thus, the electrochemical devices or systems described herein can be used for various applications, e.g., electrochemical separation, ion-selective capacitive or pseudocapacitive deionization, Faradaic-based devices for energy storage, redox-based sensing, electrocatalysis, and wastewater treatment.

For example, in some embodiments, the asymmetric electrochemical device or system described herein comprises (i) a first electrode comprising a first solid substrate (e.g., a dispersion of carbon nanotubes) and a metallocene (e.g., ferrocene) or a metallocene-comprising polymer (e.g., ferrocene-comprising polymer such as polyvinyl(ferrocene) dispersed in the first solid substrate; and (ii) a second electrode comprising a second solid substrate (e.g., a dispersion of carbon nanotubes) and a redox species dispersed therein, wherein the redox species is chemically different from the metallocene or metallocene-comprising polymer used in the first electrode. By way of example only, when the metallocene or metallocene-comprising polymer used in first electrode is based on ferrocene, the second redox species used in the second electrode can be any metallocene or metallocene-comprising polymer that is not based on ferrocene. For example, the second redox species used in the second electrode may comprise a cobaltocenium-containing polymer such as poly(2-(methacrylolyoxy)ethyl cobaltocenium) or PMAECoCp2.

In some embodiments, the electrochemical system described herein can comprise more than one set (e.g., 2 sets or more, 3 sets or more, 4 sets or more, 5 sets or more, 10 sets or more, or 20 sets or more) of the first and second electrodes arranged in series or in parallel. In some embodiments where the first and second electrodes are asymmetric (e.g., when the first and second electrodes have chemically different redox species), the electrodes can be arranged in series.

Tuning Selectivity of the Metallocene-Based Electrodes

In some embodiments involving the systems described herein, the selectivity of the metallocene-based electrodes for a target molecule (e.g., an organic or inorganic molecule) can be enhanced through tuning of a target molecule (e.g., an organic or inorganic molecule) to be separated, composition of an electrolyte, and/or modification of the metallocene rings. For example, as further described in detail below, the chromatographic resolution between different target molecules (e.g., one or more functional groups of the target molecules) may be achieved by performing experimental and/or computational studies as illustrated with carboxylates (an example model of a target organic molecule) following the Hammett series. Additionally or alternatively, the binding energies of the metallocenes to various target molecules (e.g., organic or inorganic ions or molecules) can be tuned by functionalization of the target molecules. In some instances, modification of the metallocene rings, e.g., by adding electron withdrawing and/or electron donating functional groups can modulate the strength of the cyclopentadienyl hydrogen bonding.

Chemical Affinity by Screening Substituents: Hammett Series

The selective binding affinity of the redox species in the electrodes for a target moiety or substituent can be screened, for example, based on the Hammett Series. The Hammett equation has been used as a quantitative measure of the electronic effect that substituents can have on equilibrium constants of p and m-substituted benzoic acids. See, e.g., C. D. Johnson, The Hammett Equation, Cambridge University Press, London, U K, 1973. A parameter σ is referred to as the substituent constant and can analytically be defined as: $\sigma = \log K - \log K_o$ in which K is the equilibrium constant (for acid dissociation) for the substituted benzoic acid, for example, and $K_o$ is the equilibrium for benzoic acid itself, for example. A list of Hammett series coefficients can be found in literature for diverse substituents, ranging from extremely electron-donating to the highly electron withdrawing. See, e.g., C. Hansch, A. Leo and R. W. Taft, Chemical Reviews, 1991, 91, 165-195. The Hammett equation, due to its robust quantitative measure, has been applied to explain a wide range of biochemical, pharmacological and organic processes—and being able to derive various structure-activity relationships, and has been an essential tool for organic and physical organic chemists.

As discussed in Example 1, hydrogen-bonding directing is related to the electronic structure of target molecules (e.g., organic or inorganic molecules) to be separated, as strongly electron-withdrawing groups such as trifluoroacetate did not adsorb onto the ferrocene. This electronic effect originating from charge transfer between the adsorbing anion and the organometallic redox-center can be computationally probed by the Hammett series. Density functional theory calculations is carried out with the B3LYP exchange correlation functional and LACVP* mixed basis set using the Q-Chem electronic structure code. See, e.g., Shao et al., Phys. Chem. Chem. Phys. 2006, 8, 3172. This mixed basis set corresponds to a 6-31G* basis set on all atoms but Fe, which is instead described by an LANL2DZ effective core potential (1s2s2p6 configuration is modeled by the effective potential). The calculations are performed with unrestricted wave functions.

Para-Substitutions

By way of example only, carboxylates were selected for calculation of the $\sigma_p$ values for the para-substituted carboxylates, which are shown in FIG. 103, ranging from the significantly electron withdrawing nitro-groups to electron donating substituents such as amino and hydroxyl. As an example, the binding energies of all these molecules were performed with ferrocenium and are shown in FIGS. 104A-104B. As a confirmation, the natural bonding order charge was calculated for the carboxylate group of each of the binding analytes, and there is a direct correlation between the electron-donating tendency with the localized negative charge.

From the binding energy differences, it can be seen that in the gas-phase, differences of over 12 kcal/mol can be seen between the most electron withdrawing and electron donating carboxylates. As described herein, dramatic separation factors were observed between fluoro-substituents and other functional groups (e.g. trifluoroacetate and formate) in both water and organic solvent. Therefore, this significant difference in binding energies points favorably towards achieving chromatographic resolution between various target molecules, e.g., organic or inorganic molecules. Experiments may be performed to validate the binding affinity between metallocenes (e.g., ferrocenium) and para-substituted anions. In some embodiments, the selectivity factors can be achieved by functionalizing the metallocenes ligand. The strength of the binding is dictated solely by the functional group, with weak dependence on the substituent group in terms of size.

Experimentally, the ability of the first electrodes (e.g., anion-selective, polyvinylferrocene-coated redox-electrodes) to achieve differential selectivity can be tested by performing the co-adsorption of mixtures of two different substituted benzoic acids (1.5 mM each, in competition with benzoate itself), in the presence of 100 mM supporting electrolyte. Separation factors of around 1.7 and 1.6 can be seen observed the electron donating groups ($NH_2$ and OH) and separation factors of greater than 10 can be observed for the electron-withdrawing groups.

Meta-Substitutions

The meta-substitutions show a similar trend. For both types of substitution, the binding energies follow the Hammett series closely again, indicating that charge transfer is an important component beyond electrostatics and a parameter that can be tuned through chemical modifications to achieve higher selectivity.

Screening Other Electrolytes

There have been a variety of inorganic electrolytes that can be found in nature and can be either desirable targets for extraction, or can be strong fouling agents. The recovery of various inorganic electrolytes such as nitrates or phosphates can be crucial for agrochemical industry, either in the process synthesis step or from water remediation. Other monoatomic salts such as chlorides and fluorides are fouling agents to the competing redox sites. A series of these electrolytes were screened for their binding energies in the gas phase against metallocene (e.g., ferrocene) and are shown in FIG. 107. A variety of electrolytes were screened computationally, and it is observed that chlorides compete quite strongly due to their localized charge, as well nitrates. Accordingly, in some embodiments, the electrolyte used in any aspects of the systems described herein does not have chloride.

Without wishing to be bound by theory, the strong binding energies for sulfonate and nitrate can be due to the presence of three oxygens that promote hydrogen bridges between the cyclopentadienyl and the ions. Chloride is strongly binding due to its localized electrostatic charge on a small atomic radius, thus indicating that experimentally, under high concentrations of chloride there may be slower ion-exchange for some of the ions (e.g., organic or inorganic ions) due to thermodynamic equilibrium, and thus co-adsorption can happen if chloride, for example is added to an electrolyte, in which, e.g., sulfonate or carboxylate, is also present in the electrolyte.

Molecular Design of Metallocenes

Controlling the nature of the binding of target molecules towards an active site is at heart of catalysis, molecular recognition and selective electrochemical separations. In supra-molecular chemistry, specific interactions such as hydrogen bonding, host-inclusion or direct coordination are employed by a wide variety of synthetic receptors to sense and recognize molecules. For example, ferrocene is a unique organometallic combining with particular importance as a precursor for the field of modern organometallic chemistry itself. The applications of ferrocene and its derivatives have been extended to homogeneous chemical catalysis, electrocatalysis, electrochemical sensing and even as redox agents for morphological control, anticancer agent or biological anchors. The redox process for ferrocene plays an important role in sensing as many receptor systems use a ferrocene core as a controller for the selective binding of anions for voltammetric studies, such as one case where ferrocene units were attached to organic functionalities with N—H bonding character for urea detection. See, e.g., S. R. Collinson, T. Gelbrich, M. B. Hursthouse, and J. H. R. Tucker, Chemical Communications, (6):555-556, 2001. Ferrocene has gone beyond molecular design to supramolecular constructions such as polymers and large receptor groups, to being supported on heterogeneous electrodes by either polymerization or non-covalent functionalization on nanotubes.

Metallocene Functionalization

In some embodiments, ligand functionalization of the metallocene ring can be performed to control the binding energies with target molecules (e.g., organic or inorganic molecules) in solution. The electronic density of the metallocene ring (e.g., cyclopentadienyl ring) can be modulated through placing electron withdrawing and electron donating groups, to either strengthen or weaken the interactions of the hydrogens with the target ions. The placement of pendant groups to tune the strength of ions binding has been used for sensors as diverse as calixerenes to metallocenes.[116] Appended groups ranging from amino-groups to aldehydes promote stronger hydrogen bonding and coordination with various metal cations and anions.[54,94] The strategy for the molecular design of metallocenes to improve the binding strength in both polar and apolar solvents for any embodiment of the systems described herein starts with the functionalization by a series of functional groups with varying degrees of electronic donation, as well as potential H-bonding interactions.

As shown in FIGS. 109A-109D and FIG. 110, the general effect of substituting hydrogens by the various functional groups (R) serves to strengthen the hydrogen-bonding interactions when the group is electron donating (~8 kcal/mol to 10 kcal/mol in the gas phase between, e.g., bromo-substituted and ferrocene), and to weaken when the group is electron donating (e.g., $CH_3$). However, depending on the conformation of the formate interaction, there can be hydrogen-bonding interactions being mediated through the additional functional group, which is the case with, e.g., $CH_2OH$ or $NH_3$ when the formate is placed group to the pendant chemical group. Both $NH_2$ and OH are stronger acceptors of hydrogen bonding than just the CH on the metallocene, thus they increase the binding energy significantly (~20 kcal/mol, or in the solution phase, ~4 to 5 kcal/mol). Amino and alcohol functionalities in fact are the archetypical H-bonding groups in both redox-sensing and protein/substrate interactions, and are widely studied in supramolecular chemistry. Thus, a design library to mix and match electrode chemistries can be created to target any given mixture of chemicals for a chemical process. From computational perspective, multiple functional groups can enhance the selectivity even further, especially for bidentate of tridentate polarizable organic ions such as phosphonates and sulfonates. Binding energies can also be determined experimentally through both electrochemical, spectroscopic and/or calorimetric means.

Studies with Dimers and Decamethylferrocene

An interesting aspect is to investigate a dimer of polyvinylferrocene itself, which is different from an isolated molecule of the organometallic due to the fact that there is a methyl connection between the two cyclopentadienyls. Preliminary calculations were performed on the dimer, to check the distribution of electronic density and charge between the adjacent ligands and the metal-centers and it was found that the Natural Bonding Order (NBO) positive charge was more localized on the metal centers due to the methyl bridge, and thus decreases slightly the electron withdrawing effect of the ring (+0.6 in the dimer as opposed to +0.5 in the original ferrocene). Thus, functional groups other than methyl may serve as better polymerization linkers to tune the selectivity of binding, again, drawing from the trends explored above. Full-substitution of all hydrogens by methyl groups (decamethylferrocene) surprisingly increases the binding strength of formate (~−110 kcal/mol vs −103 kcal/mol). Without wishing to be bound by theory, the lack of a direct $sp^2$ hydrogen bonding can be compensated by the enhancement of electrostatics through the change in quadrupole on the ferrocene through total substitution of the hydrogens.

Metallocenes: Tuning the Metal-Center

In some embodiments, the metal-center can be tuned to improve the electrochemical performance and selectivity of the redox-centers of the electrodes described herein. As shown in FIG. 112, by switching the metal-center there is a wealth of reduction and oxidation potentials that can be pursued. A series of these metallocenes were screened computationally for (1) stability and (2) formate binding. FIG. 112, by way of example only, can be used in the development and screening of functionalized metallocenes as well as different metal-centers, and shows the degree of tuning of the chemistry of these systems. For example, for target anions to be separated using electrochemical systems described herein, which can be easily degraded above a certain oxidation potential of ferrocene-based material, another metallocene with a lower oxidation potential could be used. For example, nickel or cobalt could be used instead of iron as the metal-center of the metallocene.

Similarly, if a certain potential desired in asymmetric configuration for either energy storage or water chemistry applications, there is a wide variety of alternative metal centers which can be selected for the counter-electrodes, e.g., as described in Examples 2-3, in which appropriate redox potentials can be matched to provide maximum electrochemical performance.

Exemplary Applications of the Electrochemical Systems Described Herein

In some aspects, methods of separating at least one target organic or inorganic molecule (e.g., a charged or neutral molecule) from a fluid source are provided herein. The methods can be applied to any fluid source, e.g., an aqueous fluid (e.g., a liquid comprising water in an amount of at least 50 wt %, at least 75 wt %, at least 90 wt %, or more), or an organic fluid (e.g., a liquid comprising organic solvent in an amount of at least 50 wt %, at least 75 wt %, at least 90 wt %, or more). Any embodiment of the electrochemical devices or systems described herein can be used in the methods described herein.

In one aspect, the method comprises (a) placing in a fluid source (i) a first electrode comprising a first solid substrate and a first redox species immobilized to the first solid substrate; and (ii) a second electrode; and (b) applying an electrical potential across the first electrode and the second electrode such that the first redox species transforms to an oxidized state and selectively binds to a target electron-donating functional group of a target molecule (e.g., organic or inorganic molecule) present in the fluid source. Thus, the target molecule (e.g., organic or inorganic molecule) comprising the target electron-donating function group is separated from other competing non-target species, e.g., inorganic ions and/or organic ions, in the fluid source. In some embodiments, the separation factor of the target molecule (e.g., organic or inorganic molecule) over the other competing non-target species is at least 10 or higher, including, e.g., at least 25, at least 50, at least 100, at least 200, at least 300, or higher.

In some embodiments of the methods described herein, the second electrode can comprise a second solid substrate and a second redox species immobilized to the second solid substrate, wherein the second redox species is chemically different from the first redox species.

In some embodiments, the second electrode can be tuned to selectively capture a target cationic species present in the fluid source, in the presence of competing alkali or alkaline earth metal cations (e.g., sodium and magnesium). For example, the second electrode can comprise a second redox species that is selective toward a target cation based on a specific chemical interaction between the second redox species and the target cation, wherein the specific chemical interaction between the second redox species and the target cation is activated by a Faradaic/redox reaction. Examples of such target cationic species include, but are not limited to transition metals and heavy metals such as chromium, lead, copper, zirconium, mercury, cadmium, zinc, nickel, aluminum, and tin; lanthanides, organic cations such as pyrridinium, and compounds with charged amino-groups. Metal-organic cations such as methylmercury and other organic mercury conjugates can also be separated using the electrochemical devices or systems and/or methods described herein. Selectivity has also been seen towards main-group cations (Group 1 and 2) such as lithium, sodium, potassium, among others. Rare-earth metals, e.g., scandium, yttrium, lanthanum, cerium, gandolinium, erbium, holmium, samarium, europium, terbium, dysprosium, thulium, and lutetium, tantalum and hafnium, can also be extracted using the electrochemical devices or systems and/or methods described herein. Valuable metals such as gold, silver, copper, ruthenium, iridium in charged forms can also be recovered using the electrochemical devices or systems and/or methods described herein.

In some embodiments, the first electrode can be tuned to selectively capture target anionic species, e.g., organic or inorganic anionic species. Examples of such target anionic species include, but are not limited to pharmaceutical compounds, personal healthcare products, pesticides and herbicides such as halo-carboxylates, various sulfonate, and phosphonate organic compounds (e.g., paraquat and quinclorac), detergents or surfactants, endocrine-disrupting compounds such as quinclorac, sodium dodecyl benzoate, ibuprofen, and 2,4,5-trichlorophenoxyacetic acid, and common industrial wastewater contaminants. In some embodiments, the first electrode can be tuned to selectively separate a variety of other anions including, e.g., carbonates, carbamates, phosphorus, phosphates, arsenic, sulfates, and a variety of anionic oxygen containing complexes such as chromate, $VO_4^{-3}$, $SO_4^{-2}$, $MnO_4^{-2}$, $SeO_4^{-2}$, $PO_4^{-3}$ among others. Differential selectivity can also be achieved, e.g., for anions including chloride, bromide, iodide, among others.

In some embodiments, the target cationic species and/or anionic species is present in the fluid source in a micromolar range or in a nanomolar range. In some embodiments, the target cationic species and/or anionic species can be a micropollutant or a nanopollutant. A micropollutant is a target species to be separated from a fluid source present at a micromolar concentration (e.g., about 0.1 micromolar to 100 micromolar, about 0.5 micromolar to about 50 micromolar, about 0.5 micromolar to about 25 micromolar). A nanopollutant is a target species to be separated from a fluid source present at a nanomolar concentration (e.g., about 0.01 nM to about 1000 nM, or about 0.1 nM to about 500 nM, or about 1 nM to about 500 nM).

In some embodiments, the fluid source can comprise other competing non-target cations or anions present at a concentration that is significantly higher (e.g., at least 5-fold or higher, including, e.g., at least 10-fold, at least 25-fold, at least 50-fold, at least 100-fold, at least 200-fold, at least 300-fold, at least 400-fold, at least 500-fold) than that of the target cationic species or target anionic species.

The electrochemical systems described herein may be operated at a variety of suitable temperatures. According to certain embodiments, the electrochemical system is operated at a temperature such that the electrolyte remains in liquid and/or supercritical fluid form. In certain embodiments, the electrochemical system is operated at a temperature such that the electrolyte remains in liquid form. For example, according to certain embodiments, the electrochemical system may be operated at any temperature between 0° C. and 100° C. when under atmospheric pressure (i.e., 1 atm) or greater (e.g., at the increased pressure imposed by hydrostatic pressure underwater). The electrochemical systems described herein may be operated at a variety of suitable pressures. According to certain embodiments, the electrochemical system is operated at a pressure such that the electrolyte remains in liquid and/or supercritical fluid form. In certain embodiments, the electrochemical system is operated at a pressure such that the electrolyte remains in liquid form.

The electrochemical systems described herein may be operated with an electrolyte at a variety of suitable ionic strength ranging from 0 mM (e.g., water-based or organic solvent-based electrolyte) to up to 10 M (e.g., a salt-based electrolyte).

The electrochemical systems described herein may be operated at a variety of suitable pHs. According to certain embodiments, the electrochemical system is operated with a neutral electrolyte (e.g., at pH 7). In some embodiments, the electrochemical system is operated with an acidic electrolyte (e.g., below pH 7, e.g., pH 6, pH 5, pH 4, or lower). In some embodiments, the electrochemical system is operated with a basic electrolyte (e.g., above pH 7, e.g., pH 8, pH 9, pH 10, pH 11, pH 12, or higher). In some embodiments of anion-selective separation, the electrochemical system is operated with an electrolyte that has a pH above the isoelectric point of a target molecule (e.g., an organic or inorganic molecule) to be separated. In some embodiments of cation-selective separation, the electrochemical system is operated with an electrolyte that has a pH below that of the isoelectric point of a cation species to be separated.

In some embodiments, the electrical potential applied to the electrodes (e.g., the first electrode) can be equal to or less than 2 V or lower, e.g., equal to or less than 1.5 V, equal to or less than 1.0V, equal to or less than 0.8 V, equal to or less than 0.6 V, equal to or less than 0.4 V or lower. In some embodiments, the electrical potential applied to the electrodes (e.g., the first electrode) can be at least 0.1 V, at least 0.2 V, at least 0.3 V, at least 0.4 V, at least 0.5 V, at least 0.6 V, at least 0.7 V, at least 0.8 V, at least 0.9 V, or at least 1.0 V. Combinations of the above-referenced ranges are also possible. For example, in some embodiments, the electrical potential applied to the electrodes (e.g., the first electrode) ranges from 0.1 V to 0.8 V. Other combinations are also possible.

Various embodiments of the methods described herein can further comprise reversing the applied electrical potential (e.g., partially or completely reversal including when the applied electrical potential is off, i.e., V=0) to release the bound target molecule and/or captured cationic species from the electrodes.

The electrode systems described herein can be cycled for at least 200 cycles or more with a minimal loss (e.g., less than 10% loss, or less than 5% loss) in electrochemical charge. In some embodiments, the electrode systems can be cycled for at least 300 cycles, at least 400 cycles, at least 500 cycles, at least 600 cycles, at least 700 cycles, at least 800 cycles, at least 900 cycles, at least 1000 cycles, or more, with a minimal loss (e.g., less than 10% loss, or less than 5% loss) in electrochemical charge.

In some embodiments where the cathodic and first electrodes are asymmetric redox-activated (e.g., cathodic and first electrodes have redox species of different charges and chemical identity), the electrochemical devices or systems have the capability of suppressing parasitic reactions that would be otherwise present in electrochemical systems without asymmetric redox-activated electrodes, thus increasing separation as well as energy storage performance. This is applicable for both organic solvent phase-based and water phase-based application (e.g. suppression of electrolyte destruction, prevention of water reduction or water oxidation). Accordingly, in another aspect, a method of increasing separation efficiency of a target molecule (e.g., an organic or inorganic molecule) from a fluid source or increasing energy storage performance of an electrochemical device or system is described herein. Such a method comprises: (a) placing in a fluid source (i) a first electrode comprising a first solid substrate and a first redox species immobilized to the first solid substrate; and (ii) a second electrode comprising a second solid substrate and a second redox species immobilized to the solid second substrate, wherein the second redox species is chemically different from the first redox species and the first and second redox species have different charges; and (b) applying an electrical potential across the first electrode and the second electrode such that the first redox species transforms to an oxidized state and selectively binds to a target electron-donating functional group of a target molecule (e.g., an organic or inorganic molecule) present in the fluid source and the second redox species undergoes a self-exchange reaction within the second electrode. Thus, the separation efficiency or energy storage performance of the electrochemical device or system is increased by diverting at least a portion of electron transfer toward the self-exchange reaction of the second redox species and suppressing or reducing electron transfer toward the fluid source. In some embodiments, the fluid source can be an aqueous fluid (e.g., a liquid comprising water in an amount of at least 50 wt %, at least 75 wt %, at least 90 wt %, or more). In alternative embodiments, the fluid source can an organic fluid (e.g., a liquid comprising organic solvent in an amount of at least 50 wt %, at least 75 wt %, at least 90 wt %, or more).

In some embodiments, reactive electrochemical separation, in which process intensification can be achieved by combining the reaction step with the product recovery.

In some embodiments, the ion-separation capabilities described herein can be used in tandem with electrocatalysis, to implement an integrated reaction-separation system. By way of example only, electrocatalysts for $CO_2$ transformation to formate, both homogeneous and supported, may be constructed for ruthenium bipyridine as well as a pincer-catalyst. While not necessary, in some embodiments, the ligand may be modified through organic reactions to create a handle which can then heterogeneously be immobilized onto electrode surfaces. By combining this catalytic cathode,

EXAMPLES

Example 1: Anion-Selective Redox-Electrodes: Electrochemically-Mediated Separation with Heterogeneous Organometallic Interfaces Redox-species may be used for catalysis, energy storage and molecular recognition. This Example shows that nanostructured pseudocapacitive electrodes functionalized with ferrocene-based redox polymers are an attractive platform for the selective sorptive separation of dilute organic anions from strong aqueous and organic electrolyte solutions, and subsequent release of the sorbed ions to a stripping phase through electrochemical control of the specific binding processes. A remarkable degree of selectivity was shown for carboxylates (—COO—), sulfonates (—$SO_3^+$) and phosphonates (—$PO_3^{-2}$) over inorganic anions such as $PF_6^-$ and $ClO_4^-$ (separation factor >140 in aqueous and >3000 in organic systems), and between carboxylates with various substituents, based on differences in electronic structure and density of the adsorbates, beyond size and charge. Organometallic redox-electrodes described herein are a promising platform for targeting aqueous and organic systems requiring high separation factors and fast throughput, such as in the recovery of value-added products from organic synthesis and isolation of dilute yet highly toxic organic contaminants. The combination of spectroscopic experiments and quantum chemistry shed light on a selective binding mechanism based on redox-enhanced hydrogen bonding between the cyclopentadienyl ligand and the carboxylate functional group, with broader implications for molecular design, supramolecular recognition and metallocene catalysis.

Selective recovery of organic anions from solution is a crucial challenge in the chemical and pharmaceutical industries, and in environmental remediation efforts. Major catalytic processes involve the use of metal catalysts or inorganic salts to produce a range of charged organic fragments, all of which can make the separation of the desired compound the most costly aspect of its production.[1] In the pharmaceutical industry, multi-step organic synthesis increases the production costs of the compound immensely due to limiting yields of sequential reactions, and thus small improvements in recovery can translate into tremendous economic benefits.[2] Similarly, many renewable energy pathways involve the reduction of stable molecules to form charged anions in the presence of homogeneous catalysts as in, for instance, $CO_2$ hydrogenation.[3] In all of these scenarios, the desired organic product is often in a charged-state in very dilute amounts (millimolar range) and must be separated from competing ions that are electrolytes, buffers, side-products, catalysts or co-reagents that are often present in significant excess.

From an environmental perspective, organic ions are contaminants of emerging concern to researchers and to the EPA,[4, 5] and present a worldwide problem for both human health and the aquatic ecosystem in first-world and developing countries alike.[6] A majority of these toxic compounds are anionically charged endocrine-disrupting compounds (EDCs), as well as pharmaceutical and personal care products (PPCPs),[5] with dangerous concentration levels detected close to agricultural streams and urban drinking water sources.[7] These compounds include highly toxic pesticides and herbicides[4, 5] such as halocarboxylates and various sulfonate and phosphonate organic compounds, which in the aqueous phase are highly soluble, polar and charged.[8,9] Sulfonate groups in particular feature in numerous highly toxic agricultural pesticides, and in environmentally stable surfactant contaminants which accumulate in the ecosystem.[9] These organic pollutants range from the few millimolar down to nanomolar range in natural aqueous environments, and in the presence of natural hardness and other ions, are extremely challenging to separate selectively by traditional adsorption or fixed-bed ion-exchange methods.[4, 5]

Carboxylic acids, in addition to being components of a majority of PCCP and EDC compounds, are integral participants in homogeneous catalysis, both as valuable substrates[10] and expensive products.[11] Of particular importance is formate (HCOO–), the smallest carboxylate and a model representative of this class of compounds. As formate is a key product in the $CO_2$ utilization pathway, its separation from homogeneous reaction mixtures containing metal-catalysts and salts is of crucial importance.[12] Beyond formate there is a multitude of naturally occurring and synthetic carboxylates of scientific and practical importance. Biologically active carboxylates include well-known drug molecules[13] with applications ranging from cholesterol reduction to control of arterial hypertension.

For all these compounds, a general ion-selective recovery platform with high throughput and separation factors is desired, and electrochemical separation offers an attractive solution, with advantages including fast kinetics, control by electrical potential, modularity and reuse.[14-16] Electrochemical separations require no need for additional chemicals during the regeneration step, and for organic-phase separations, it requires no additional solvent for extraction and is thus extremely advantageous in terms of water economy and downstream waste sustainability. In the field of electrochemical separations, capacitive deionization (CDI) is a promising technology for salt-removal,[17] in which ions are extracted by concentrating them at the interfaces of porous electrodes within the electrical double layers (EDL) that form there. However, though efficient for bulk deionization, CDI is not sufficiently ion-selective for targeting dilute analytes. Recently there has been intense interest in the development of advanced redox-based electrodes for deionization,[18] most notably crystalline-battery materials.[19] These electrodes bridge the gap between electrochemical energy materials with high-performance environmental separation by increasing ion-capacity and providing selectivity.[16] Some of these battery materials have been used successfully for selective recovery based on charge and size-selective intercalation of monoatomic, inorganic cations.[14, 19]

Organic anion recognition and selectivity presents a significantly harder challenge due to similarities in size, charge and electrostatic properties of the solutes to be separated.[20] Traditional anion-doping of conducting polymers alone is often insufficient to enable acceptable binding selectivity;[21] on the other hand, supramolecular anion recognition through specific chemical interactions is able to discriminate between target molecules very effectively.[20, 22] A variety of metallic and non-metallic redox systems have been exploited for this purpose, based on host-guest inclusion,[23] direct metal coordination[24], and charge-transfer.[25] However, strong host-guest interactions often lead to irreversible binding, whereas weaker, neutral interactions lack in selectivity. Thus, it is highly desirable to develop an anion-selective electrode combining good electrochemical performance, molecular specificity towards select functional groups and, most importantly, reversibility.

Heterogeneous redox organometallics have received much attention due to their ability to facilitate electron transfer reactions and increase pseudo-capacitive charge.[26] Ferrocene is the archetypical electrochemically responsive coordination complex, with a Fe(II) center sandwiched between two cyclopentadienyl rings. It has been used as a component in dye-sensitized solar cells,[27] as an oxidative agent,[28] and for morphological control of surfaces and films through electrochemical stimulation.[29] In heterogeneous form, ferrocene-metallopolymers have been principal components of redox-responsive systems[30] including hybrid electrochemical storage devices.[31] When oxidized, the ferrocenium cation-center can behave as a mild electrophilic center with promising potential as a robust chemical platform for reversible sorption processes of anions. As such, in contrast to capacitive systems in which the main ion separation principle is accumulation of electrical double layer charge (EDLC),[32] it is discovered that metallocene-based pseudocapacitors can adsorb organic anions selectively in the presence of excess electrolytes, and that this sorption and subsequent release of the targeted compounds can be controlled electrochemically through the surface redox processes.

In this Example, the use of polyvinyl(ferrocene) functionalized electrodes for the heterogeneous capture and release of organic anions in the presence of competing excess anions is presented and the mechanism of ferrocenium-anion interactions through experimental and theoretical methods (FIG. 1) was investigated. It is presented herein that ferrocene-functionalized electrodes are remarkably selective towards nucleophilic organic functional groups such as carboxylates, sulfonates and phosphonates (with separation factors >140 against common electrolytes such as $ClO_4^-$ and $PF_6^-$) and that the sorption is fully reversible. In the case of carboxylates, there is strong evidence that the underlying mechanism is based on a remarkable redox-enhanced hydrogen bonding of the cyclopentadienyl ring to the carboxylate functional group, and such mechanism may be applied to electro-catalysis and to the molecular design of electro-chemically-controlled recognition and sorption systems.

Results and Discussion
Anion-Selective Electrosorption and Release
Electrode Design.

A facile self-assembly approach was pursued in which a dispersion of carbon nanotubes (CNTs) and PVF in a volatile organic solvent was drop-cast onto a conductive carbon-based paper. CNTs and PVF form stable dispersions in chloroform with high processability and, once deposited, produce uniform films.[31] The resulting composite, which is stabilized through non-covalent π-π interactions of the cyclopentadienyl groups with the aromatic carbon structures, possesses high electrical conductivity and pseudocapacitance. The carbon nanotubes, in addition to accelerating electron transfer from the substrate to the redox center, also serve as a non-covalent support for the poly(vinyl)ferrocene polymer, an immobilization method that has recently been exploited for organometallic catalysts.[33]

Figure 2:
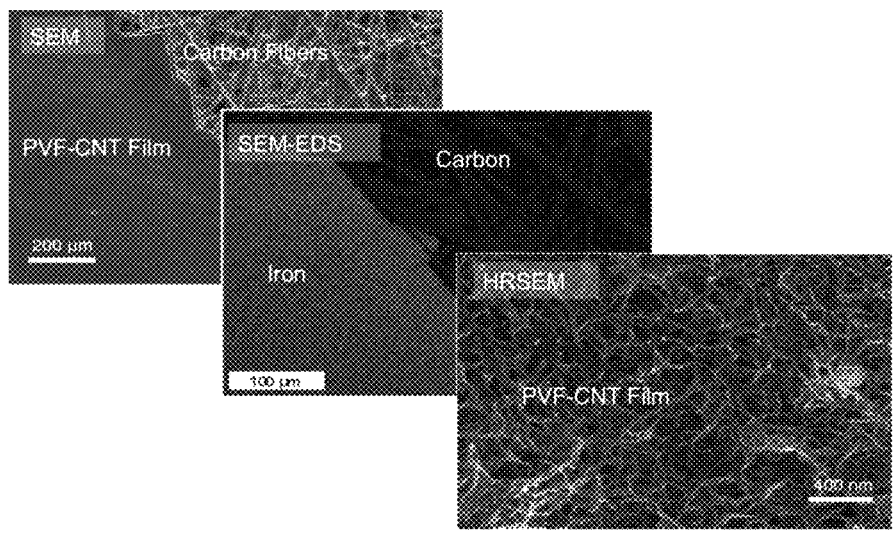
FIG. 2 is a scanning electron micrograph (SEM) of the surface of an electrode showing a PVF/CNT(1:1) uniform film coated on top of conductive carbon fibers, with EDS showing carbon fiber in blue and iron in green.

A PVF/CNT (1:1 ratio; $8\times10^{-4}$ g each of CNT and PVF) electrode with 4 μmoles of attached ferrocene units was utilized in the sorption and spectroscopy studies. The SEM image in FIG. 2 indicates that the composites formed uniform films on the conductive carbon fibers, while a uniform incorporation of PVF within the film was demonstrated by energy dispersive X-ray spectroscopy. High-resolution SEM indicated that the conductive CNT matrix at the nanoscale was highly porous, a desirable attribute for facile ion diffusion, and consistent with the high surface area of the composite (100 $m^2$/g Langmuir by BET $N_2$ sorption). X-ray photoelectron spectroscopy (XPS) indicated an atomic iron loading of 6-9% against carbon on the surface, which agrees well with the elemental analysis from energy dispersive X-ray (EDX) analysis of 5.81% Fe vs C, thus suggesting a uniform functionalization with PVF across the bulk of the CNT film. The electrode was stable electrochemically over 10 hours of voltammetric cycling in water.

Aqueous System.

Figures 3A, 3B, 3C, 3D:
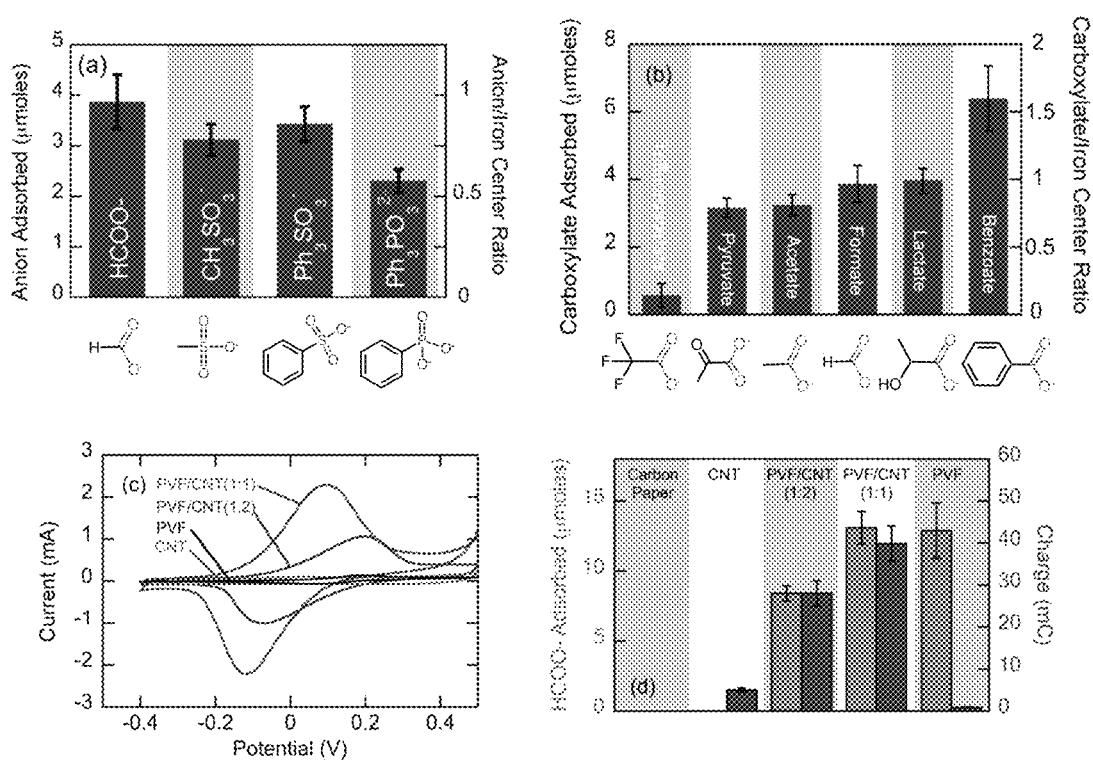
FIGS. 3A-3D show adsorptions by PVF/CNT.

Cyclic voltammetry with automatic IR compensation at a scan rate of 0.005 V/s indicated that formate induces a slight −50 mV shift in peak potential relative to that for pure perchlorate (FIGS. 18-27), an indication of the more favorable interaction of formate with the heterogeneous PVF electrode. In acetonitrile, the negative shift was much more pronounced at almost −150 mV (FIGS. 18-27). The relatively broader voltammogram peaks relative to those for molecular ferrocene are due to the heterogeneous nature of the system, which offers an additional resistance due to electron transfer across the PVF/CNT film. To explore these electrodes for selective adsorption, 3.4 mM formate was adsorbed from water at a controlled potential of +0.6 V on the working PVF/CNT electrode for 10 min, in the presence of thirty-fold excess of $LiClO_4$ as the competing supporting electrolyte (100 mM). The amount of solute adsorbed onto the electrode was calculated from the differences between the concentrations in the initial stock solution and in the supernatant after adsorption; specifically, the moles adsorbed are given by $(c_{initial}-c_{final})V$, where V is the solution volume. The concentrations were determined from the integrated areas of the peaks observed for the solute in the solutions in NMR measurements with an external reference as the standard; the reference was naphthalene in the organic solvent, and 3-(trimethylsilyl)-1-propanesulfonic acid in the aqueous solutions. The PVF/CNT functionalized electrode was able to adsorb formate selectively in almost 1:1 stoichiometry (FIG. 3a). HPLC measurements of the concentrations in the feed and supernatant solutions indicated a formate capacity of 0.9 HCOO− molecules per ferrocenium, in close agreement with the 1:1 stoichiometry inferred from NMR (FIGS. 47-58). The number of iron centers was set a priori during the film deposition method. A small degree of competitive binding from perchlorate (~⅕ of the formate adsorbed) was evident through XPS of the electrode surface after sorption, equivalent to a separation factor of carboxylates of ~142. Methanesulfonate and benzenesulfonate were also adsorbed by the PVF/CNT in 1:1 stoichiometries, indicating remarkable selectivity for sulfonate groups. Benzenephosphonate adsorption (FIG. 3a) on the other hand indicated that adsorption was 1:2 with respect to the ferrocene centers, which could be due to the charge of −2 on the phosphonate group, which requires two proximal ferrocene units to stabilize one anion.

The specificity of the redox-species towards a distinct functional group in aqueous solutions was probed with a number of carboxylates with different substituents, with close to a 1:1 stoichiometry for most of the carboxylates (FIG. 3b), indicating a strong specific interaction of the ferrocenium with the carboxylate functional group. An exception was the negligible adsorption of trifluoroacetate, attributed to its strong-electron withdrawing substituent which affects the electronic density distribution over the carboxyl group and thus the binding strength. In this latter case, perchlorate was the major component adsorbed. Benzoate presented a higher stoichiometry (1.5:1) which may be attributed either to a higher electronic affinity due to its stronger electron-donating moiety, or to energetically favorable π-π stacking interactions of the benzoic rings with the carbon nanotubes,[34] or both.

Organic System.

Sorption was also carried out in an organic medium (95% MeCN/5% $H_2O$ by volume) with 3.4 mM HCOO− and 100 mM tetrabutylammonium hexafluorophosphate ($TBAPF_6$). The medium composition reflects a number of existing conditions for electrosynthesis[4] with water added to improve the solubility of the formate. The formal potential shift in the CV after addition of the carboxylate was much more pronounced at almost −100 mV (FIGS. 18-27), indicating stronger interaction between the carboxylate and the ferrocenium groups in organic than in aqueous media. The effect of electrode composition on the adsorption of the formate was evaluated with electrodes prepared with varying amounts of PVF for the same mass of CNT (FIG. 3c). At +0.24 V, all the formate present initially in solution was taken up by the electrode, with a higher than 1:1 stoichiometry (FIG. 3d) probably due to solvation and hydrophobicity effects in the mixed solvent. The calculated charge from the CVs was proportional to the amount of PVF deposited—from 26 mC in PVF/CNT(1:2), when the PVF mass was halved, to almost 37 mC in the standard PVF/CNT(1:1), which is characteristic of pseudo-capacitor systems (FIGS. 3(c) and 3(d)). FIG. 3d shows that adsorption in organic was strictly dependent on the redox species present, irrespective of electrochemical charge on the electrode. CNTs by themselves do not adsorb formate as the electrical double layers are agnostic towards the specific ions, and depend primarily on the charge on the adsorbed species; because the electrolyte ions are in significant excess, their adsorption is favored simply by mass action penomena. PVF, on the other hand, adsorbed formate quite strongly even without CNT. By fluorine analysis on XPS, the bound $PF_6^-$-to-iron ratio of less than 4% after sorption indicated that carboxylates were the selectively adsorbed species, with an estimated separation factor over the competing anion of more than 3000. In organic media, the electrodes were found to be stable to repeated adsorption/desorption cycles for at least an hour, as indicated by cyclic voltammetry (~1-2% loss in charge). For extensive applications in organic solvent, covalent grafting of the ferrocene units is expected to provide higher stability and re-use capability.

Desorption and Release.

The recovery of the adsorbed anions was achieved by applying a more negative potential to the working electrode in order to reduce the ferrocenium and thus release the bound anions. In water, the desorption was achieved at +0.2 V, with over 97% of the adsorbed formate successfully released, indicating that a feasible separation process can be performed with a moderate voltage swing of at most +0.4 V in aqueous media. In the acetonitrile-water system, with a potential of −0.1 V applied after complete adsorption of the formate, only 7.3% of the adsorbed formate was recovered. Full desorption was achieved only by applying the more negative potential of −0.4 V, at which a strong negative current was sustained to reduce all ferrocenium centers. The requirement for a significantly more negative potential of −0.4 V in organic media as opposed to +0.2 V in water for desorption, indicates a stronger stabilization of the oxidized ferrocenium by the bound anion in the organic system, and also that additional energy is needed to expel the ingressed water and salts.

Heterogeneous Electrode Characterization

Figures 4A, 4B, 4C, 4D, 4E, 4F:
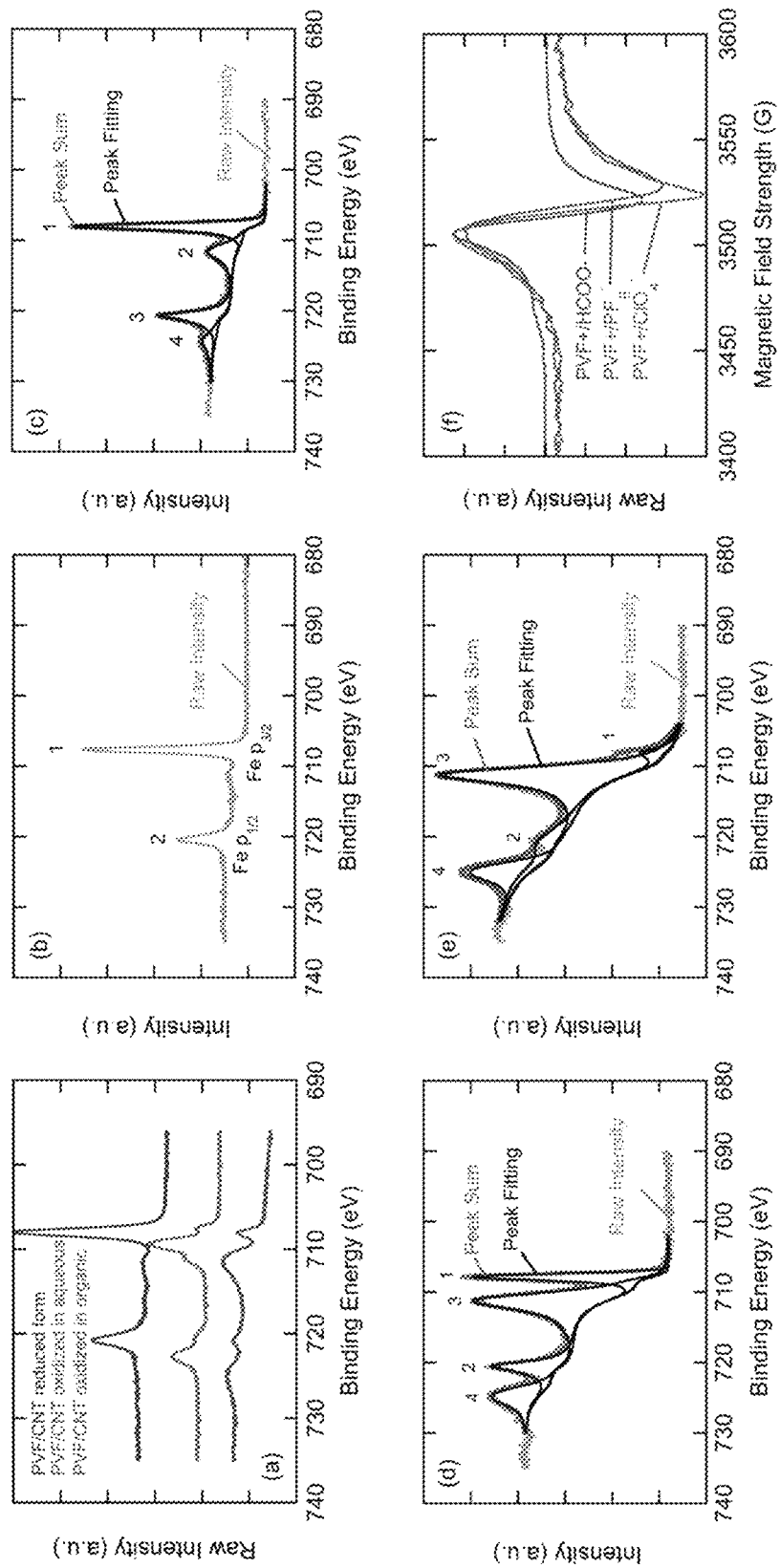
FIGS. 4A-4F depict surface chemistry characterizations.

For understanding the heterogeneous adsorption mechanism, and the molecular interactions with the redox-species, carboxylates were used as the model organic anions due to their strong binding. The chemical properties of the functionalized electrode after sorption of formate were investigated by X-ray photoelectron spectroscopy (XPS) and electron paramagnetic resonance (EPR) measurements. With XPS, the top 1-2 nm of the electrode surface was probed to investigate the elemental composition and the oxidation state of ferrocene. FIG. 4(a) shows the iron chemistry after formate sorption experiments in both water and organic solvent. Ferrocenium was stabilized strongly by formate as evidenced by the appearance of a pair of oxidized iron peaks with shifts of ~1.5 eV in water and ~3.5 eV in the organic solvent, indicating a stronger intermolecular interaction within the carboxylate-ferrocenium complex in the organic than in the aqueous phase (FIG. 4(a)), an effect which is in agreement with CV observations.

It was found that ferrocenium-formate complexes produced a much higher total number of oxidized centers than were observed with only inorganic anions in solution. In organic media, 78% of the iron centers remained oxidized after formate complexation, whereas just 29% remained oxidized with only $PF_6^-$ in solution (FIG. 4(b)-(e)). In literature reports, 34-40% of sites are said to be oxidized in PVF films with perchlorate[35] in both water and acetonitrile (using 0.01 V/s CVs), in agreement with the observations described herein. In aqueous systems, the sorption of formate resulted in 82% of the iron centers being oxidized; the oxidation behavior of PVF was thus found to be similar in both solvent environments during adsorption of formate. When −50% of the ferrocenium sites were coordinated with formate in organic media, 62% of the iron centers remained oxidized (FIG. 4(d)), indicating a proportionality in adsorption capacity with number of oxidized iron centers. Low oxidation degrees from cyclic voltammetry have been attributed to self-exchange reactions and conduction along a polymer chain being slower than the voltammetric timescale, or to microscale defects.[36] However, we tested formate sorption to PVF during cycling at +0.005 V/s, and over 80% of the ferrocene sites were oxidized (FIGS. 28-35) after 3 cycles, confirming a high degree of electronic and diffusional accessibility. In sum, XPS highlights the more favorable sorption of carboxylates through both binding energy shifts and a higher number of stabilized ferrocenium cations.

Electron paramagnetic resonance (EPR) spectroscopy was also used to probe the Fe(III) center under complexation as shown in FIG. 4(f). Reduced PVF did not produce any significant EPR signal, whereas ferrocenium hexafluorophosphate in salt-form showed strong broadening, probably due to spin-spin coupling from neighboring metal centers[37] (FIGS. 28-35). The PVF samples were oxidized in water with formate, perchlorate and hexafluorophosphate individually, and showed sharp EPR signals, attributed to the more well-isolated nature of the spins in PVF. However, detailed analysis of low-spin metallocenes, including iron-based compounds, has been noted to be challenging due to the dynamics of spin relaxation.[38] The nature and character of Fe(III) seems to be fairly similar for all the complexes, indicating either a subtle or no direct interaction of the anion with the metal center. The slight broadening from PVF+/$ClO_4^-$ and PVF+/$PF_6^-$ relative to the formate complex could be a superposition of the spins with uncoupled Fe(II) centers (in agreement with XPS observations that the Fe(II)/Fe(III) ratio is greater than in the former case). Similar behavior has been observed for other metal systems such as Mn(II)/Mn (III).[39]

Investigation of Molecular Interactions

DFT Calculations.

Figures 5A, 5B, 5C, 5D:
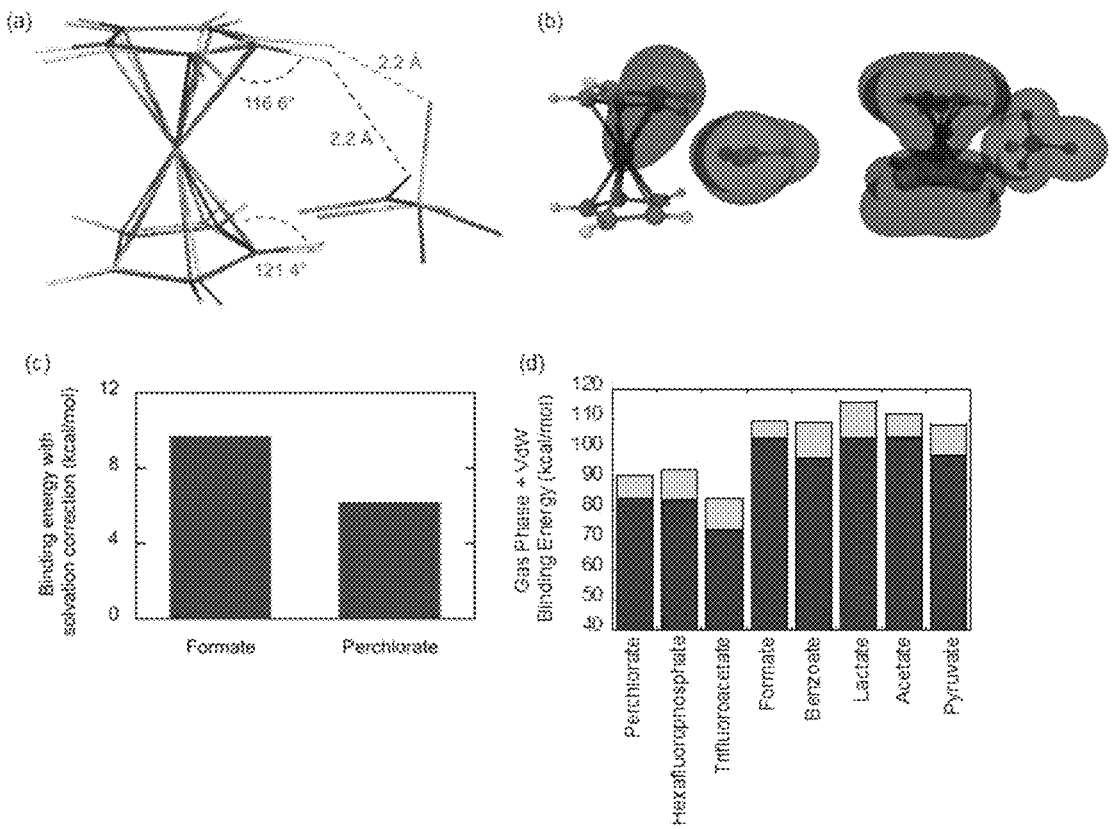
FIGS. 5A-5D show different models of ferrocenium-percholate and ferrocenium formate and related data.

Heterogeneous characterization of the electrode surface suggested that the selective interaction could be ligand-mediated rather than directly with the metal-center. Density functional theory (DFT) was used to explore the interaction of the ferrocenium active center with the anions in more detail, through calculations of complex binding energies, optimized geometries, and electronic structures (FIG. 5a). Using a solvation model based on an implicit water description, the final binding energy for the ferrocenium-formate complex was 9.7 kcal/mol for ferrocenium-formate as opposed to 6.8 kcal/mol for ferrocenium-perchlorate (FIG. 5c). For qualitative comparison of the interaction energies for different solutes, gas-phase results were used to allow ease of comparison and more robust geometry optimizations (due to the higher computational requirements for pcm convergence), since it is noted that the trend in binding energies is preserved when solvation correction is used. Gas-phase binding energies for carboxylates were on average −100 kcal/mol, which is 20 kcal/mol greater than those for perchlorate and hexafluorophosphate (FIG. 5d).

The distance from the carboxylate oxygen to the cyclopentadienyl hydrogen was found to be 2.2 Å, with a change of over 7° in the H—C—Fe angle due to hydrogen deflection on the Cp-ring; this deflection was calculated to be only ~2° for $ClO_4^-$ and $PF_6^-$ (FIG. 5a). This difference in the H—C—Fe angle relative to that for weakly coordinating anions was observed for all carboxylates bound to ferrocenium. The bond distance between iron and the formate carbon was found to be 4 Å after optimization, which was large enough to indicate that the anion did not interact directly with the metal center. Intuitively, the Cp-rings may hinder sterically access of the anion to the iron center; chemically, the frontier orbitals of ferrocenium are derived primarily from the Cp-ligand rather than the iron center as indicated by analysis of the molecular orbitals (MOs), thus making the rings the more probable electron acceptors.

These observations provide insight into a potential hydrogen-bonding interaction between the Cp-ring of the oxidized complex and the carboxylates. A density difference mapping shown in FIG. 5(b) between the optimized complexes and the isolated ions frozen at the complex geometry indicated a directional gain of electron density on the Cp-ring, especially along the hydrogens proximal to formate. In the case of the perchlorate, the electron density gain on the ferrocenium cation was delocalized, further supporting the concept of a specific chemical interaction for formate and a general electrostatic interaction for perchlorate. In fact, the gas-phase binding energies of 75-85 kcal/mol for these inorganic anions were consistent with calculations for ferrocenium-$BF_4^-$,[40] but more importantly, they were in agreement with values estimated from the Coulombic attraction of point-charges at the corresponding separation distances from their centers of mass in the optimized structure, thus reinforcing their purely electrostatic character. Finally, the comparable bond-distances of ~2.2 Å between the Cp-ligand and all anions precluded the notion that there may be any major size-selection effects (FIG. 36B). Trifluoroacetate stood apart from the other carboxylates, behaving more as a weakly-coordinating anion. Its predicted binding energy was lower even than that of perchlorate, which is consistent with the experimental sorption results in which perchlorate sorption was favored over that of the trifluoroacetate (FIG. 5(d)).

H-Bonding Description Using ALMO and NBO.

Hydrogen bonding is known to be a powerful determinant in supramolecular anion recognition, particularly in organic media[41] and in selective anion encapsulation through crystallization.[42] However, this interaction has been exploited mostly with neutral receptor systems without reversibility or electrochemical control, and, in many cases,[20, 22] lacking in binding strength for protic-media applications owing to competition with water and other polar compounds for the hydrogen bonds. As shown herein, oxidation by electrochemical potential enhances the acceptor character of the Cp-ring, and the resulting specific binding from hydrogen-bonding augments the electrostatic interaction to enable remarkable selectivity of carboxylates over weakly-coordinating anions, yet remain within an energetic threshold that allows for reversible release. This interplay between electrostatics and chemical interaction is crucial in maintaining the balance between selectivity and reversibility of an electrochemically-controlled sorption system.

Figure 6A:
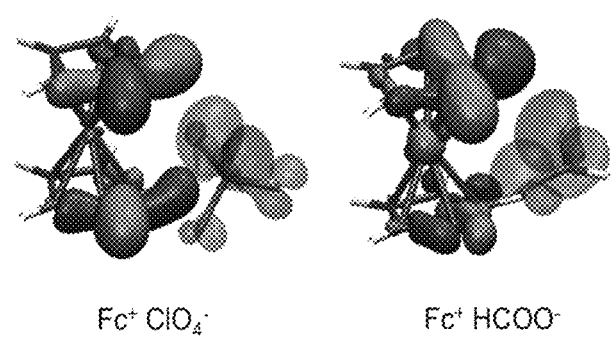
FIG. 6A shows complementary virtual orbital pair representing ferrocenium-anion interaction and charge acceptance across the C—H bond. The transparent orbitals are donating and the solid orbitals are the corresponding accepting COVPs.

Hydrogen-bonding is defined by IUPAC as an X—H—Y interaction in which X is a more electronegative element than H and there is sufficient evidence to support a bond formation between H and Y.[43] In particular, the IUPAC document specifies a set of criteria for determining the probability of such an interaction which includes an increase in linearity of the bond, a degree of charge transfer from Y to X, an increase in the polarization of the X—H bond, and experimental evidence such as downfield NMR shift and lengthening of the X—H bond due to weakening of the covalent interaction. Two electronic structure methods are used to further study the bond: Natural Bonding Order (NBO)[44] and Absolutely Localized Molecular Orbital (ALMO) analysis.[45] ALMO. The analysis by absolutely localized molecular orbital analysis (ALMO) enabled an energy decomposition analysis (EDA) for the cation-anion complex, by deconvoluting the contributions of the relevant components of the intermolecular interaction,[45, 46] and at the same time, generating chemically significant complementary virtual orbital pairs (COVPs). COVPs are a powerful tool for investigating intermolecular H-bonding as they allow a comprehensive visualization of the significant charge-transfer orbitals.[47] First, the energy decomposition analysis (EDA) indicated that the major component of the binding energy with ferrocenium originated from electrostatics, as expected (see SI Section D), being 77 kcal/mol for formate and 67 kcal/mol for perchlorate. The charge-transfer contribution to the binding energy estimated for formate (17.4 kcal/mol) was, however, almost double that obtained for perchlorate (9.8 kcal/mol). Thus the differential contribution in binding energies towards selectivity for carboxylates over non-coordinating anions was mainly due to the increase in charge transfer through specific H-bond interactions. From the complementary virtual pair analysis, COVP-3, in particular, indicated a complete in-phase donation and acceptance of a π-character hydrogen bonding between the orbitals of the two carboxylate oxygens and both rings of ferrocenium (FIG. 6(a)).

NBO.

Figure 6B:
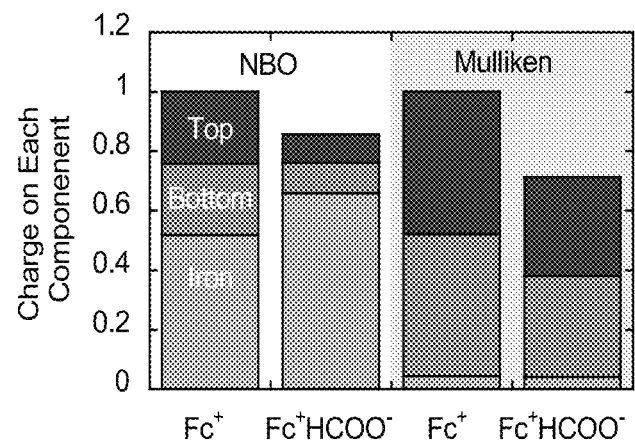
FIG. 6B shows a natural bonding (NBO) charge population comparison between ferrocenium before and after binding.
Figure 7A:
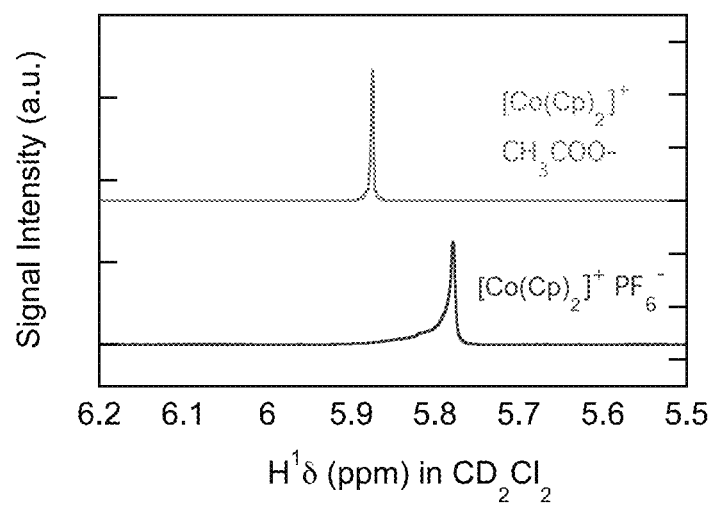
FIGS. 7A-7B show the NMR $H^1$ shift of hydrogen on cyclopentadienyl in 0.01 M $Co(Cp)_2^+$ $PF_6^-$ relative to $Co(Cp)_2^+$ $CH_3COO-$ with 0.1 M tetrabutyl-ammonium acetate introduced in dicholoromethane-d (FIG. 7A) dimethyl sulfoxide-d (FIG. 7B)
Figure 7B:
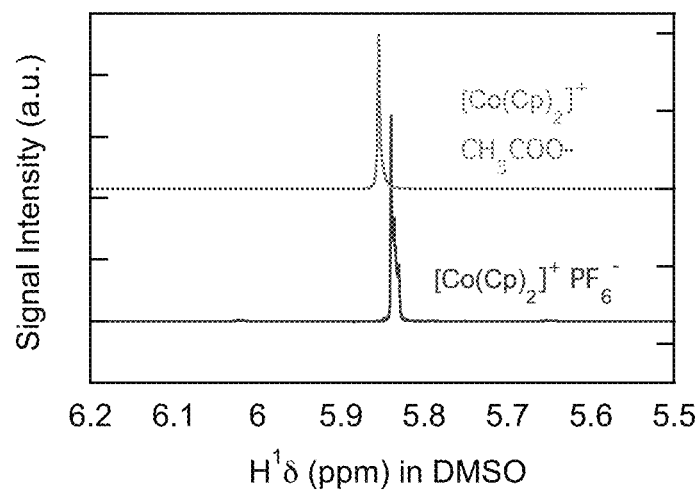
Figure 7C:
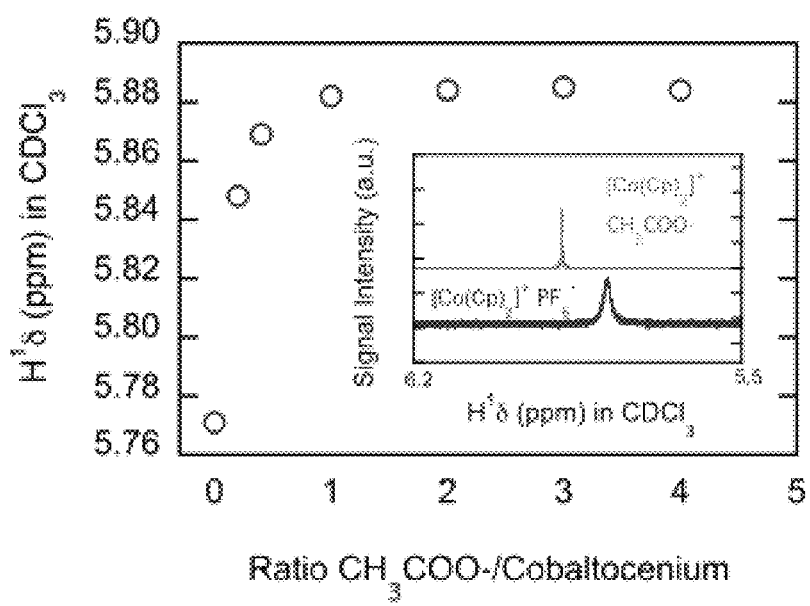
FIG. 7C shows the NMR $H^1$ shift of cyclopentadienyl hydrogen with different ratios of carboxylate vs cobaltocenium, when 0.005 M $Co(Cp)_2^+$ $PF_6^-$ is titrated with 0.02 M of tetrabutyl-ammonium acetate at different volumes in chloroform.

The natural bonding order (NBO) method was developed to describe orbitals in terms of maximum electron occupancy, allowing for chemical interpretation of the results through more intuitive orbitals and bonds. For the ferrocenium cation in isolation, a natural population charge analysis (which is more accurate than determination of Mulliken charges) indicated that +0.25 charge was located in each of the Cp-rings and +0.5 was located initially on the iron (FIG. 6(b)). Upon oxidation and binding with carboxylates, the partial charge lost by the iron was redistributed over the ring and increased the acidity of the cyclopentadienyl C—H, which then accepted charge from a donor to strongly repolarize the C—H bond to make the bond-contributing hydrogens more positive (increase in 10% of charge) and the ring itself more negative (SI Section D). Finally, a perturbation analysis in the NBO confirmed the donation of the lone pairs $n_B$ of the carboxylate oxygens to the σ* C—H antibond of the cyclopentadienyls; this gave an average bond energy of ~1.4 kcal/mol for the formate with four hydrogen bonding contributors (2 oxygen lone pairs to 4 hydrogens), yielding a total H-bonding energy of 6 kcal/mol, which is in the characteristic range for moderate H-bonding.[44] Furthermore, this donation to the antibond weakened and lengthened the C—H bond slightly for the most donating C—H—O pair (~0.008 Å).

NMR Spectroscopy.

Figure 8:
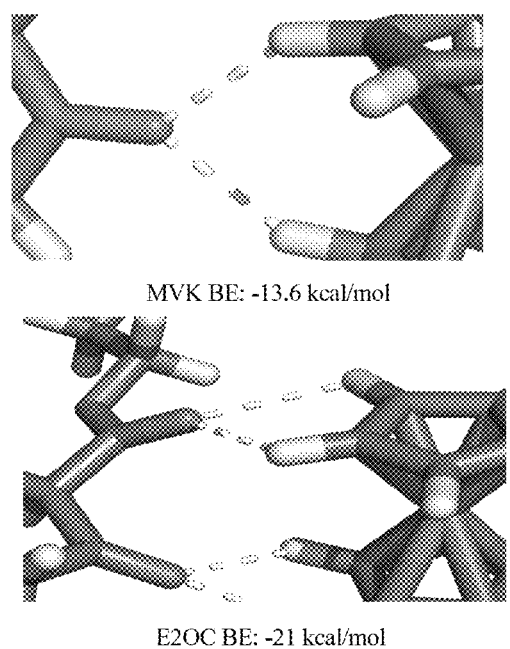
FIG. 8 shows the gas-phase optimized geometries and energies of ferrocenium with MVK and E2OC showing neutral aldehyde-groups interaction with ferrocenium.
Figure 10C:
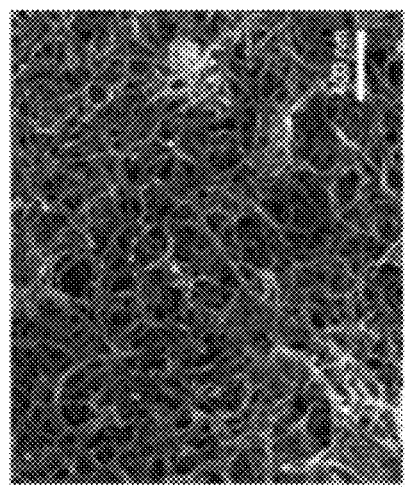
FIG. 10C is a SEM of the surface of the PVF/CNT(1:1) film at high resolution showing the nanotube matrix.
Figure 10B:
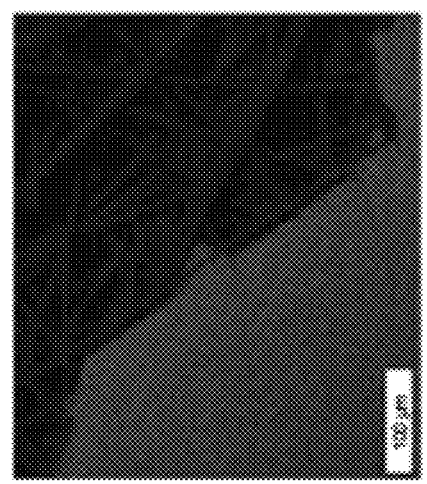
FIG. 10B is a SEM-EDS showing the carbon from the conductive fibers in blue and the iron from the PVF in green.
Figure 10A:
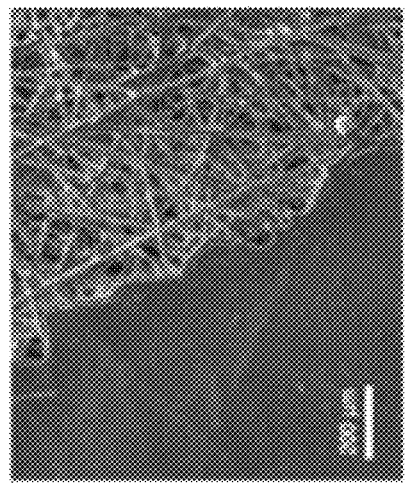
FIG. 10A is a scanning electron micrograph (SEM) of the surface of an electrode showing a PVF/CNT(1:1) uniform film coated on top of conductive carbon fibers.
Figure 11:
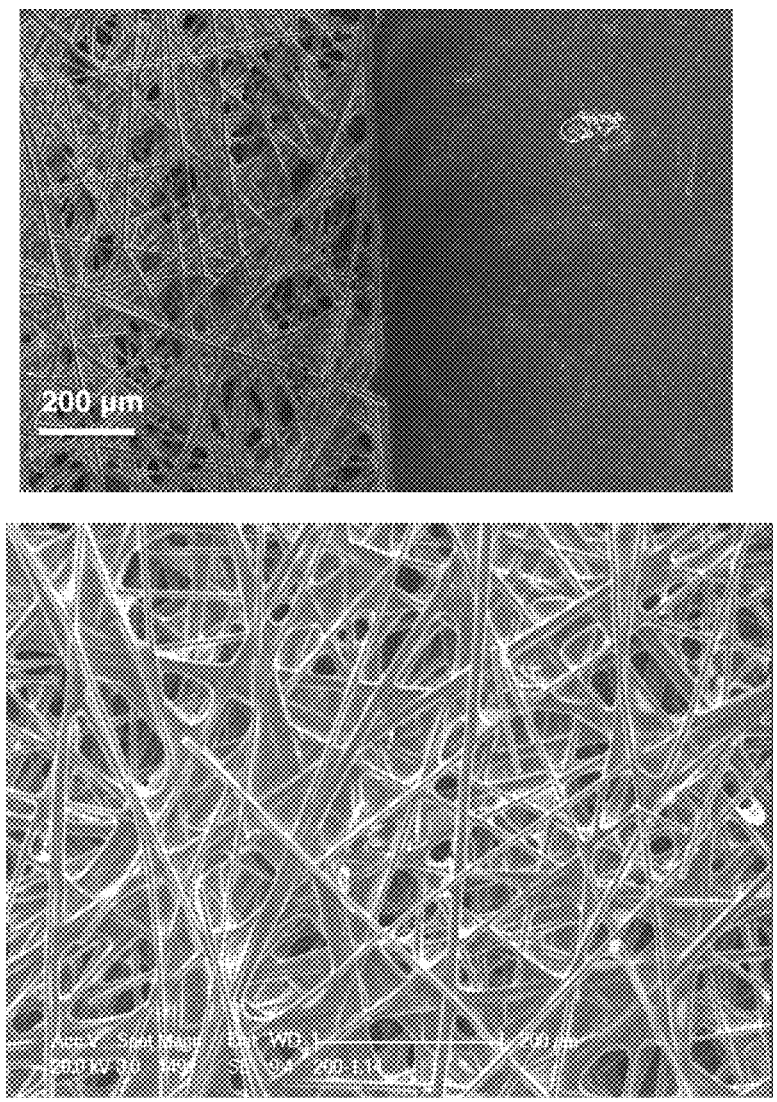
FIG. 11 shows a ZEISS Merlin high-resolution image of PVF/CNT(1:1) (top) and a Field Emission SEM image of Toray carbon paper composed of conductive fibers (bottom).
Figure 13:
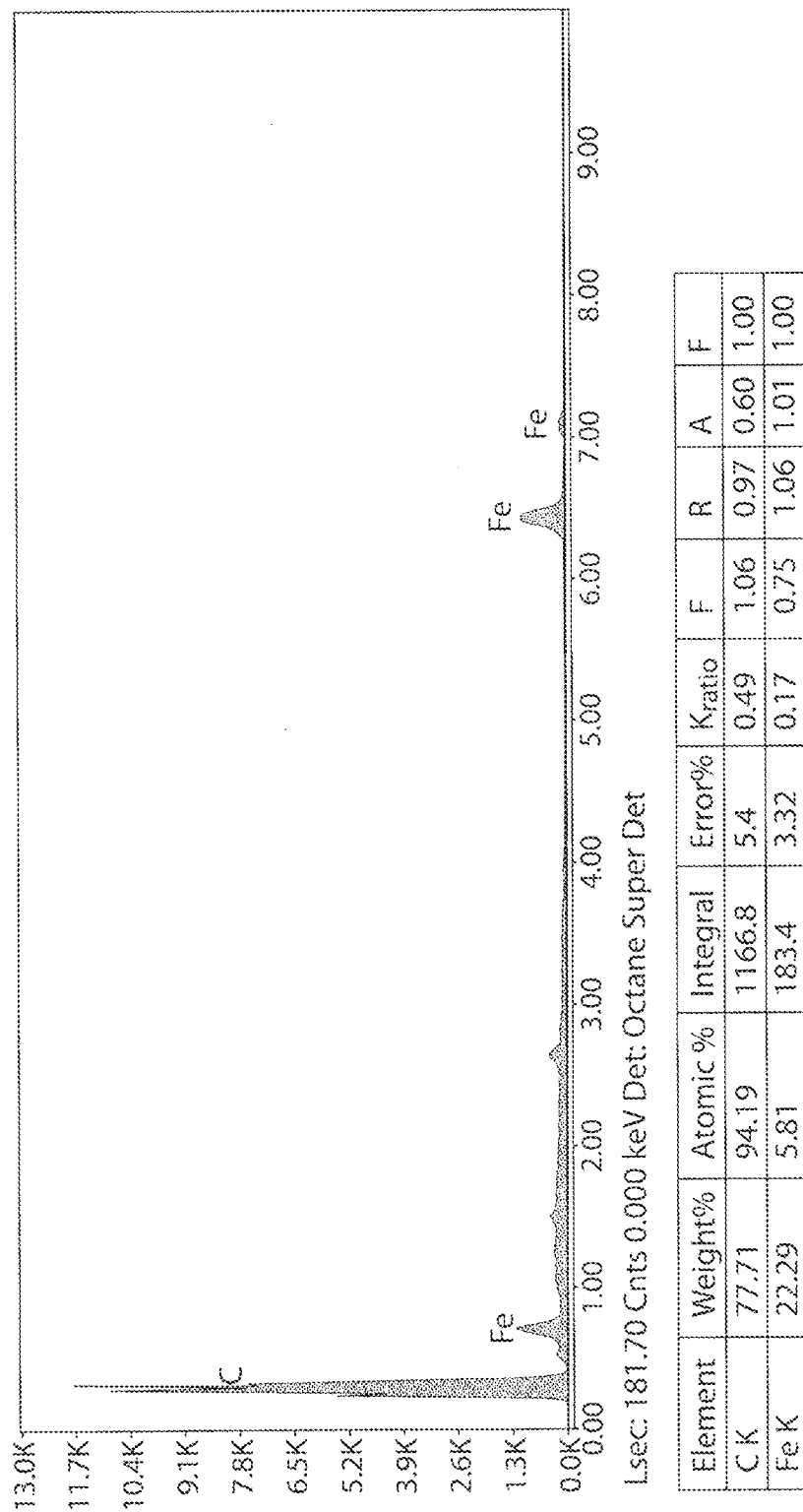
FIG. 13 shows EDX spectra of PVF/CNT (1:1) film of the imaged area represented in FIG. 2 or FIG. 10B at 100 k magnification. The table below shows EDX elemental analysis of PVF/CNT (1:1) film at 100 k magnification.
Figure 14:
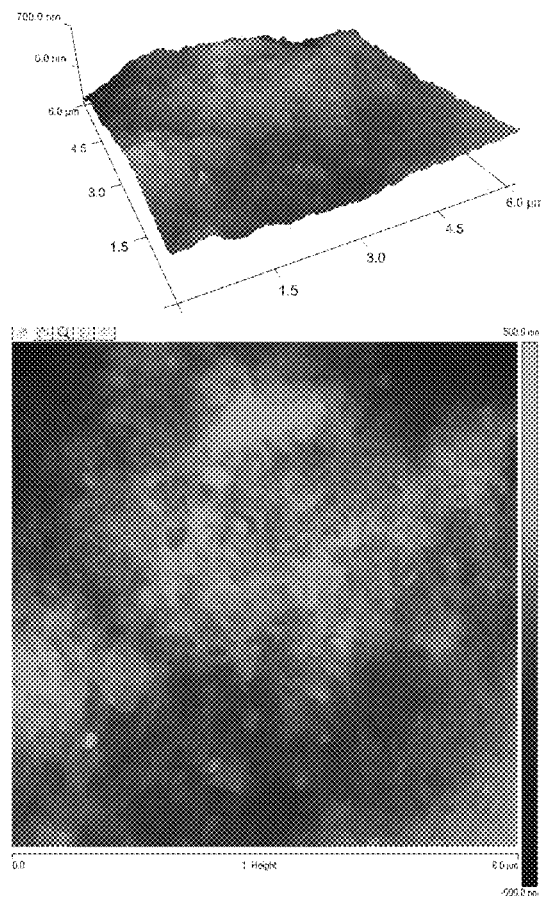
FIG. 14 shows AFM height mapping of PVF/CNT(1:1) film, both 3-D depiction (top) and 2-D color mapping (bottom).
Figure 15:
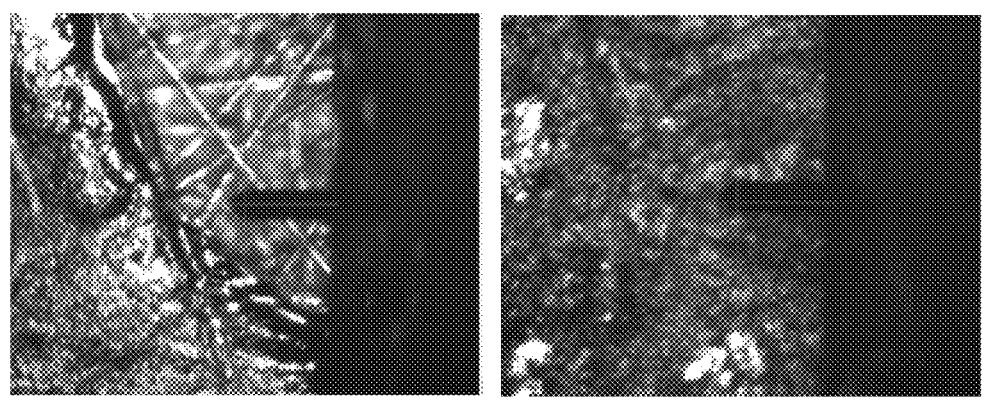
FIG. 15 shows the AFM tapping tip approaching the edge of the PVF/CNT film with the fibers (top) and the area imaged by the tapping tip on the film (bottom).
Figure 16:
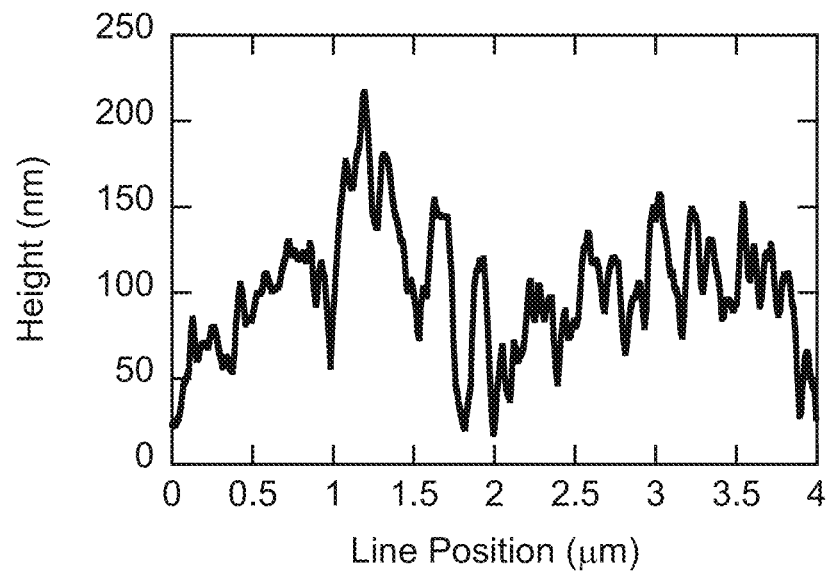
FIG. 16 shows an AFM height plotted versus the line scan.
Figure 17:
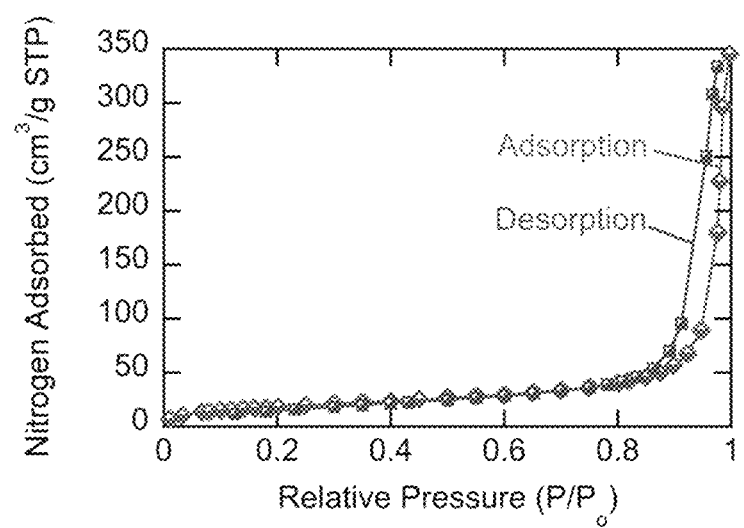
FIG. 17 shows a Nitrogen Adsorption Isotherm. The BET surface area was found to be 69.9 $m^2/g$, the Langmuir surface area to be 100.5 $m^2/g$ and the t-external surface area to be 79.4 $m^2/g$. The BET average pore width was estimated to be 15.91 nm and the BJH average pore width to be 33 nm.
Figure 18:
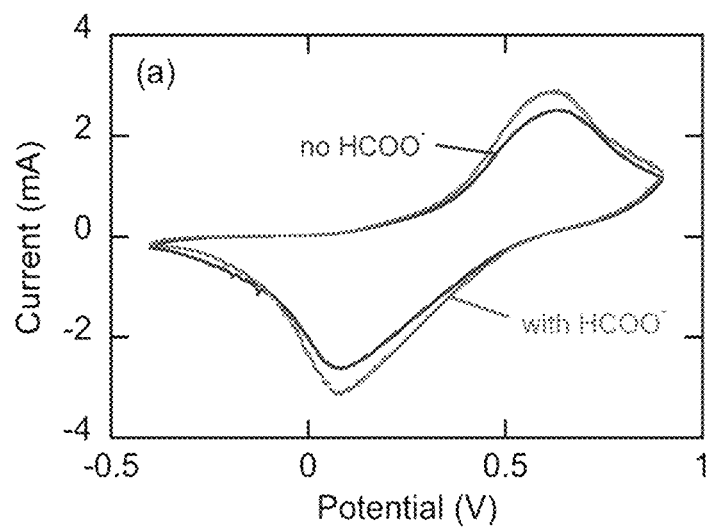
FIG. 18 shows cyclic voltammetry (CV) at 0.005 V/s in 100 mM $LiClO_4$ in aqueous solvent with 3.4 mM formate and without formate with PVF/CNT.
Figure 19:
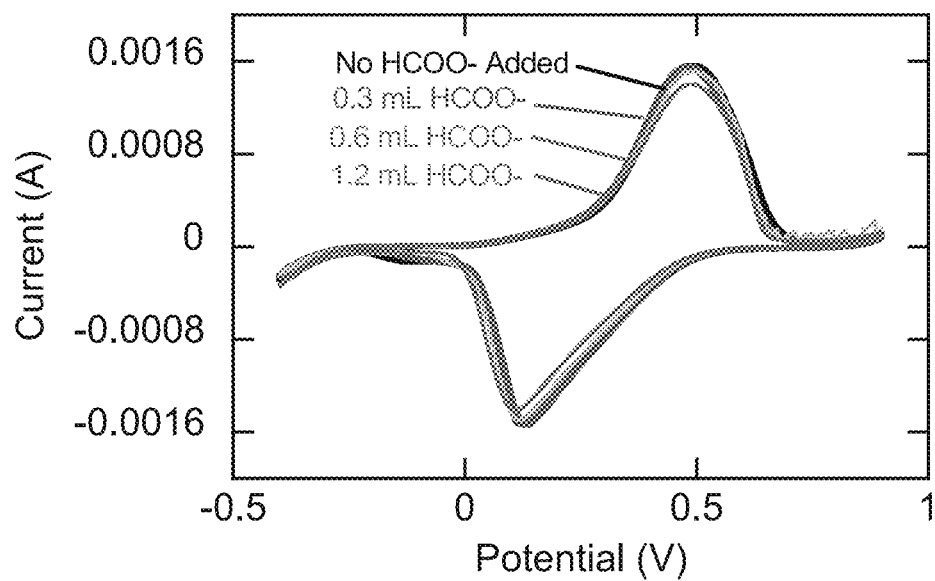
FIG. 19 shows the dependence of electrochemical behavior on the concentration of the lithium formate added for PVF/CNT. CV is performed at 0.005 V/s with 0.1 M $LiClO_4$.

The downfield shift of the $H^1$ signal due to deshielding of the interacting proton is primary supporting evidence of a H-bonding mechanism.[43, 44] The direct experimental investigation of the hydrogen of ferrocenium through $H^1$ NMR is challenging due to the paramagnetic nature of the iron center,[48] with peaks that are very broad and downfield shifted (>30 ppm). Cobaltocenium, on the other hand, is an ideal candidate as an analogue probe due to its high stability in the oxidized state (18e−, isoelectronic to ferrocene) and diamagnetic nature; it has been used successfully as an alternative to ferrocenium for interaction studies.[49] Its $H^1$ NMR shift in $CDCl_3$ lies at 5.77-5.78 ppm as a singlet due to the rapid equilibration of the 10 hydrogens on the ring in the solvent environment (cobaltocenium hexafluorophosphate $CoCp_2^+PF_6^-$). With the addition of tetrabutylammonium acetate, the $H^1$ shifts to 5.88 ppm, an entire 0.1 ppm, which is a significant indication of moderate intermolecular bonding in the anion interaction between cobaltocenium and acetate [$CoCp_2^+HCOO-$] (FIG. 8). The shift appears as a coalesced peak due to the rapid exchange between the hydrogens, but the interaction is specific, as a 1:1 stoichiometry is indicated by titration experiments (FIG. 8(c)), consistent with the results from heterogeneous adsorption of formate on ferrocenium surfaces.

A similar downfield shift can be seen in dichloromethane, which has a similar dielectric constant and hydrogen-bonding screening effect as chloroform (FIG. 8(a)). In a more polar medium, such as DMSO, this effect is smaller yet still consistently noticeable (FIG. 8(b)). This decrease in the effect on the chemical shift is further evidence of the H-bonding nature of the interaction, which correlates with the stronger binding and higher separation factors seen in the organic than in the aqueous systems. The downfield shift of the $H^1$ NMR signals of the cyclopentadienyl are consistent with the de-shielding of the interacting hydrogens with the anions, which provides strong experimental support for a hydrogen-bonding mechanism.[43, 50] In an apolar solvent, the interaction causes a larger downfield-shift of the proton due to stronger binding between the anion and the Cp-ring, resulting in a more evident repolarization of the bond. The singlet nature of the signal is due to the fast rotation time of the organometallic, which smears out any distinction between the hydrogens. From a structural and electronic perspective, the binding of cobaltocenium is very similar to that of ferrocenium, with a gas-phase binding energy of −101 kcal/mol and two strong hydrogen interactions which bring the C—H—$O^-$ distance to 1.9 Å (SI Section D). The cobaltocenium-hexafluorophosphate complex has a binding energy of −82 kcal/mol, which is consistent with the higher selectivity observed for acetate and thus agrees with the favorable anion-exchange experiment from NMR in which acetate preferentially binds with cobaltocenium over hexafluorophosphate.

Implications in Neutral-System Bonding and Metallocene-Catalysis

Neutral Systems.

In addition to the interactions in the charged systems considered above, the interaction of neutral compounds with ferrocenium could also be strongly guided by hydrogen bonding interactions from the Cp-ring, such as ferrocenium mediated catalysis of reactions with organic molecules containing aldehyde groups. Ferrocene and other derivatives have been used as redox-switchable acidic catalysts for various organic transformations, as mild Lewis acids, as part of stereochemical reactions, and as Bronsted or Lewis base catalysts[51] for reactions as diverse as Diels-Alder and enolate cyclization.[52] Ferrocene-based organometallic polymers have been shown to be highly active towards the Michael addition reaction,[53] especially the addition of ethyl-2-oxycylopentane carboxylate (E2OC) to methyl vinyl ketone (MVK), with reversible binding of the E2OC. Hydrogen bonding plays an important role in increasing the binding affinity of E2OC due to the extra three centered bond with the ketone group, thus directing the activated structure of the intermediate for the catalyzed reaction (FIG. 8). ALMO and NBO analysis of the orbitals and charges strongly support this view with the main COVP orbitals being charge donation towards the hydrogens. The stronger binding of E2OC is consistent with MVK being the first order reaction product due to the much stronger interaction with the E2OC molecule. Further studies are underway to explore the effect of the H-bonding interaction on other catalytic systems.

Conclusion

It is presented herein that a redox-electrode functionalized with organometallic polymers can serve as an advanced high-performance platform for selective recognition and separation of organic anions present in strong electrolyte solutions. Molecular selectivity is driven by a structure-specific chemical interaction superimposed on the inherent electrostatic attraction of these anions for the redox-functionalized materials that provides high separation factors for organic anions over supporting electrolyte species in both aqueous and organic phases. This performance is particularly remarkable in aqueous phase systems as the polarity of the solvent provides a challenging medium for chemical discrimination, especially in light of the similarity in size and charge between the organic and inorganic anions. Our ferrocene-based system allows for stoichiometric binding of carboxylates, sulfonates and phosphonates with respect to the organometallic unit. The process is fully reversible in both aqueous and organic media, with complete recovery possible with moderate potential swings of ~0.4 V in aqueous systems. Experiments and theoretical calculations were in remarkable agreement with the binding energy predictions from DFT calculations fully corroborating the experimental sorption results.

The redox-mediated process presented in the current work shares the advantages of conventional electrochemical separation systems: the absence of large pressure driving forces required for membrane processes, fast sorption kinetics, the avoidance of chemicals for the release of the sorbed ions and regeneration of the separation media, and the potential offset of electrical costs through charge storage. In one example, the approach, in essence, moves beyond capacitive processes by electrochemically activating chemical interactions between the heterogeneous redox-species and specific functional groups that allow for targeted removal at low anion concentrations and against excess competing species. We have thus shown that organometallic pseudocapacitive systems can be used to tune molecular selectivity by redox-control, opening the way to a range of possibilities in functional materials and molecular design, in which redox-electrodes can now be used not only to detect or sense species, but also to capture organic anions and release them selectively by electrochemical control. The molecular interactions unraveled in the current work have implications not only in anion recognition but also electrocatalysis by heterogeneous organometallic species.

This study indicates that the molecular selectivity is due to specific hydrogen bonding interactions between the organic anions and the cyclopentadienyl rings on the ferrocenium moiety. There are few known cases of weak hydrogen bonding by C—H groups, with chloroform, terminal alkynes and halogenated C-containing compounds among them.[54] One case that is said to be C—H hydrogen bonding, that of an imidazolium based ionic liquid (IL) with halides, in which the carbon is on an aromatic ring and has $sp^2$ character,[55] is generally accompanied by hydrogen abstraction to stabilize a free carbene and allowing $CO_2$ to bind to the IL; this is not, however, a sustainable intermolecular interaction due to the lability of the hydrogen. In the case of ferrocenium, a distributed partial charge allows for an increase in bond acidity to such an extent as to accept charge but not abstract the proton when in the presence of carboxylates. Furthermore, both the resonance within the cyclopentadienyl rings and the charge on the system are expected to contribute to the delocalization of electronic charge to foster intermolecular interactions.[57] Unlike imidazolium or other purely organic carbocations, the organometallic redox-species undergoes a process in which oxidation of the metal-center is coupled with changes in electronic density on the ligand, thus allowing for tuning of the intermolecular interaction through a controllable redox process. A similar mechanism is contemplated for other nucleophilic organic functional groups, including sulfonates.

REFERENCES

[1] C. Grondal, M. Jeanty, D. Enders, Nature Chemistry 2010, 2, 167; L. F. Tietze, U. Beifuss, Angew. Chem.-Int. Edit. Engl. 1993, 32, 131.
[2] L. F. Tietze, A. Modi, Medicinal Research Reviews 2000, 20, 304.
[3] E. E. Benson, C. P. Kubiak, A. J. Sathrum, J. M. Smieja, Chemical Society Reviews 2009, 38, 89; J. F. Hull, Y. Himeda, W. H. Wang, B. Hashiguchi, R. Periana, D. J. Szalda, J. T. Muckerman, E. Fujita, Nat Chem 2012, 4, 383.
[4] D. Minakata, W. Song, J. Crittenden, Environmental Science & Technology 2011, 45, 6057.
[5] P. Westerhoff, Y. Yoon, S. Snyder, E. Wert, Environmental Science & Technology 2005, 39, 6649.
[6] S. A. Snyder, M. J. Benotti, Water Science and Technology 2010, 61, 145.
[7] M. Grassi, L. Rizzo, A. Farina, Environmental Science and Pollution Research 2013, 20, 3616.
[8] M. S. Rodriguez-Cruz, M. J. Sanchez-Martin, M. Sanchez-Camazano, Chemosphere 2005, 61, 56.
[9] J. Margot, L. Rossi, D. A. Barry, C. Holliger, Wiley Interdisciplinary Reviews-Water 2015, 2, 457.
[10] L. J. Goossen, N. Rodriguez, K. Goossen, Angewandte Chemie-International Edition 2008, 47, 3100.
[11] Y. Liu, J. Cornella, R. Martin, J. Am. Chem. Soc. 2014, 136, 11212.
[12] S. Wesselbaum, U. Hintermair, W. Leitner, Angewandte Chemie-International Edition 2012, 51, 8585; Z. F. Zhang, E. Xie, W. J. Li, S. Q. Hu, J. L. Song, T. Jiang, B. X. Han, Angewandte Chemie-International Edition 2008, 47, 1127.
[13] H. Maag, *Prodrugs of Carboxylic Acids*, Springer, New York 2007.
[14] R. Y. Wang, B. Shyam, K. H. Stone, J. N. Weker, M. Pasta, H. W. Lee, M. F. Toney, Y. Cui, Advanced Energy Materials 2015, 5.
[15] A. Dash, R. Chakravarty, Industrial & Engineering Chemistry Research 2014, 53, 3766.
[16] M. E. Suss, S. Porada, X. Sun, P. M. Biesheuvel, J. Yoon, V. Presser, Energy & Environmental Science 2015.
[17] S. Porada, R. Zhao, A. van der Wal, V. Presser, P. M. Biesheuvel, Progress in Materials Science 2013, 58, 1388.
[18] W. Chen, X. H. Xia, Advanced Functional Materials 2007, 17, 2943.
[19] M. Pasta, C. D. Wessells, Y. Cui, F. La Mantia, Nano Letters 2012, 12, 839.
[20] P. D. Beer, P. A. Gale, Angewandte Chemie-International Edition 2001, 40, 486.
[21] P. R. Teasdale, G. G. Wallace, Analyst 1993, 118, 329; H. Ge, G. G. Wallace, Reactive Polymers 1992, 18, 133.
[22] N. H. Evans, P. D. Beer, Angewandte Chemie 2014, 53, 11716.
[23] A. R. Bernardo, J. F. Stoddart, A. E. Kaifer, Journal of the American Chemical Society 1992, 114, 10624; A. Trabolsi, N. Khashab, A. C. Fahrenbach, D. C. Friedman, M. T. Colvin, K. K. Coti, D. Benitez, E. Tkatchouk, J. C. Olsen, M. E. Belowich, R. Carmielli, H. A. Khatib, W. A. Goddard, 3rd, M. R. Wasielewski, J. F. Stoddart, Nat Chem 2010, 2, 42.
[24] H. Yang, C. K. McLaughlin, F. A. Aldaye, G. D. Hamblin, A. Z. Rys, I. Rouiller, H. F. Sleiman, Nat Chem 2009, 1, 390.
[25] O. Reynes, C. Bucher, J. C. Moutet, G. Royal, E. Saint-Aman, Chem Commun (Camb) 2004, 428; S. Cosnier, C. Innocent, J. C. Moutet, F. Tennah, J. Electroanal. Chem. 1994, 375, 233.
[26] P. Simon, Y. Gogotsi, Nature Materials 2008, 7, 845; J. T. Mefford, W. G. Hardin, S. Dai, K. P. Johnston, K. J. Stevenson, Nature Materials 2014, 13, 726.
[27] T. Daeneke, T. H. Kwon, A. B. Holmes, N. W. Duffy, U. Bach, L. Spiccia, Nature chemistry 2011, 3, 211.
[28] B. W. Carlson, L. L. Miller, J. Am. Chem. Soc. 1983, 105, 7453.
[29] Y. Ma, W. F. Dong, M. A. Hempenius, H. Mohwald, G. J. Vancso, Nat Mater 2006, 5, 724; M. Nakahata, Y. Takashima, H. Yamaguchi, A. Harada, Nature Communications 2011, 2.
[30] G. R. Whittell, I. Manners, Advanced Materials 2007, 19, 3439.
[31] X. W. Mao, F. Simeon, D. S. Achilleos, G. C. Rutledge, T. A. Hatton, Journal of Materials Chemistry A 2013, 1, 13120.
[32] A. S. Arico, P. Bruce, B. Scrosati, J. M. Tarascon, W. Van Schalkwijk, Nature Materials 2005, 4, 366.
[33] P. Kang, S. Zhang, T. J. Meyer, M. Brookhart, Angewandte Chemie-International Edition 2014, 53, 8709.
[34] F. Tournus, S. Latil, M. I. Heggie, J. C. Charlier, Physical Review B 2005, 72; J. J. Zhao, J. P. Lu, J. Han, C. K. Yang, Applied Physics Letters 2003, 82, 3746.

[35] W. H. Smyrl, M. Lien, *Applications of Electroactive Polymers*, Chapman & Hall, Suffolk, Great Britain 1993.
[36] P. Denisevich, K. W. Willman, R. W. Murray, J. Am. Chem. Soc. 1981, 103, 4727.
[37] F. E. Mabbs, Chemical Society Reviews 1993, 22, 313.
[38] P. H. Rieger, Coordination Chemistry Reviews 1994, 135, 203; J. H. Ammeter, Journal of Magnetic Resonance 1978, 30, 299.
[39] G. Berggren, A. Thapper, P. Huang, P. Kurz, L. Eriksson, S. Styring, M. F. Anderlund, Dalton Transactions 2009, 10044.
[40] Y. Yang, L. Yu, Physical chemistry chemical physics: PCCP 2013, 15, 2669.
[41] T. R. Kelly, M. H. Kim, J. Am. Chem. Soc. 1994, 116, 7072.
[42] R. Custelcean, A. Bock, B. A. Moyer, J. Am. Chem. Soc. 2010, 132, 7177.
[43] E. Arunan, G. R. Desiraju, R. A. Klein, J. Sadlej, S. Scheiner, I. Alkorta, D. C. Clary, R. H. Crabtree, J. J. Dannenberg, P. Hobza, H. G. Kjaergaard, A. C. Legon, B. Mennucci, D. J. Nesbitt, Pure and Applied Chemistry 2011, 83, 1619; E. Arunan, G. R. Desiraju, R. A. Klein, J. Sadlej, S. Scheiner, I. Alkorta, D. C. Clary, R. H. Crabtree, J. J. Dannenberg, P. Hobza, H. G. Kjaergaard, A. C. Legon, B. Mennucci, D. J. Nesbitt, Pure and Applied Chemistry 2011, 83, 1637.
[44] F. Weinhold, C. Landis, *Valency and Bonding*, Cambridge University Press, Cambridge, UK 2005.
[45] R. Z. Khaliullin, A. T. Bell, M. Head-Gordon, Journal of Chemical Physics 2008, 128.
[46] R. Z. Khaliullin, E. A. Cobar, R. C. Lochan, A. T. Bell, M. Head-Gordon, Journal of Physical Chemistry A 2007, 111, 8753.
[47] E. Ramos-Cordoba, D. S. Lambrecht, M. Head-Gordon, Faraday Discussions 2011, 150, 345.
[48] J. Blumel, N. Hebendanz, P. Hudeczek, F. H. Kohler, W. Strauss, J. Am. Chem. Soc. 1992, 114, 4223.
[49] I. E. Philip, A. E. Kaifer, J. Am. Chem. Soc. 2002, 124, 12678.
[50] V. Bertolasi, P. Gilli, V. Ferretti, G. Gilli, J. Am. Chem. Soc. 1991, 113, 4917; I. McEwen, P. Ahlberg, J. Am. Chem. Soc. 1992, 114, 10869.
[51] R. Peters, D. F. Fischer, S. Jautze, in *Iron Catalysis: Fundamentals and Applications*, Vol. 33 (Ed: B. Plietker), 2011, 139.
[52] U. Jahn, P. Hartmann, Chemical Communications 1998, 209.
[53] D. A. Durkee, H. B. Eitouni, E. D. Gomez, M. W. Ellsworth, A. T. Bell, N. P. Balsara, Advanced Materials 2005, 17, 2003; X. Mao, W. Tian, J. Wu, G. C. Rutledge, T. A. Hatton, Journal of the American Chemical Society 2015, 137, 1348.
[54] M. B. Smith, J. March, *March's Advanced Organic Chemistry: Reactions, Mechanisms, and Structure*, Wiley-Interscience, Hoboken, N.J., U.S 2007; M. J. Calhorda, Chemical Communications 2000, 801.
[55] A. a. K. Abdul-Sada, S. Al-Juaid, A. M. Greenway, P. B. Hitchcock, M. J. Howells, K. R. Seddon, T. Welton, Structural Chemistry 1990, 1, 391; K. Dong, S. Zhang, D. Wang, X. Yao, Journal of Physical Chemistry A 2006, 110, 9775; J. D. Holbrey, W. M. Reichert, I. Tkatchenko, E. Bouajila, O. Walter, I. Tommasi, R. D. Rogers, Chemical Communications 2003, 28.
[56] S. Stevanovic, A. Podgorsek, A. A. Padua, M. F. Costa Gomes, The journal of physical chemistry. B 2012, 116, 14416; G. Gurau, H. Rodriguez, S. P. Kelley, P. Janiczek, R. S. Kalb, R. D. Rogers, Angewandte Chemie 2011, 50, 12024; M. Besnard, M. I. Cabaco, F. V. Chavez, N. Pinaud, P. J. Sebastiao, J. A. Coutinho, Y. Danten, Chem Commun (Camb) 2012, 48, 1245.
[57] P. Gilli, V. Bertolasi, V. Ferretti, G. Gilli, J. Am. Chem. Soc. 2000, 122, 10405.

Experimental and Computational Methods

Electrode Preparation.

All reagents were purchased from Sigma Aldrich and PolySciences without further purification. The base electrodes were prepared by cutting 2 cm by 1 cm swatches of Toray carbon paper obtained from Electrochem Inc, then soldered with copper tape and wire. The PVF/CNT electrodes were prepared by drop casting. A stock solution A of 80 mg poly(vinyl)ferrocene (PVF) (Polysciences, Inc) and 40 mg multiwalled-CNT (MWCNT, Sigma) was dissolved in 10 mL anhydrous chloroform. A stock solution B of 40 mg of CNT in 10 mL chloroform was also prepared. The two stock solutions were sonicated for 2 hours in icy water to optimize dispersion level. The PVF/CNT(1:1) ratio was prepared by mixing stocks A and B in a 1:1 ratio: 1 mL of A was mixed with 1 mL of B and sonicated for another 3 hours in an ice-bath, before drop-casting 50 μL, equivalent to a 1 drop PVF/CNT(1:1) and left to dry at 25° C. For sorption experiments, a 1:1 mass ratio of PVF to CNT was used with 4 drops (80 mg PVF+80 mg CNT, resulting in 4 μmoles of ferrocene units). PVF/CNT(1:2) was prepared by combining different amounts of the two stock solutions.

Electrochemical Separation.

The adsorption tests were performed in 10 mL BASi MCA cells in the three-electrode configuration. A platinum wire was used as the auxiliary electrode, and references electrodes of a platinum wire in $Ag/Ag^+$ were used. Aqueous Phase. For aqueous phase sorption, 0.3 mL of a 77 mM LiCOOH solution were added to 6 mL of deuterated water (22 μmoles and 3.4 mM concentration HCOO−), and exposed to 4 μmoles of ferrocene units ($8 \times 10^{-4}$ g CNT and $8 \times 10^{-4}$ g of PVF). The three-electrode configuration was then sealed with para-film and purged with argon for 10 min, and a slow stream of argon was bubbled through to maintain oxygen free conditions. The quantity of solute adsorbed onto the electrode was determined by NMR measurements on aliquots of the initial stock solution and the supernatant after adsorption. The amount adsorbed onto the electrode is calculated based on the difference between the integrated areas of the peaks of the compounds, $(c_{initial}-c_{final}) \times volume$, with respect to an external reference as the standard (naphthalene in organic solvent, 3-(trimethylsilyl)-1-propanesulfonic acid in aqueous). All electrochemical studies were performed on a VersaSTAT 4 potentiostat (Princeton Applied Research) with automatic IR compensation between 50 MΩ and 5Ω. Aqueous phase studies were complemented by high performance liquid chromatography (HPLC), performed using a BioRad HPLC Organic Acid Analysis Column (Aminex HPX-87H ion exclusion column) at 50° C. and isocratic runs with 14 mM sulfuric acid. Organic Phase. Reference electrodes for acetonitrile were prepared by preparing 0.01 M $AgNO_3$ and 0.1 M tetrabutylammounium hexafluorophosphate ($TBaPF_6$) sealed in a glass tube with a vycor frit (BASi). A solution of 6 mL acetonitrile and 0.3 mL water was prepared with 0.1 μM $TBaPF_6$, and the formate concentration varied in the water phase depending on the experiment. The samples were tested using cyclic voltammetry at 0.02 V/s before for 5-10 cycles to confirm stability and oxidation peaks. The adsorption was performed under argon by controlled potential at +0.24 V.

Spectroscopic Procedures. NMR.

The $^1$H NMR were performed on a Varian 500 MHz with naphthalene used as an internal standard in d-acetonitrile and 3-(trimethylsilyl)-1-propanesulfonic acid as the internal standard in $D_2O$. EPR. The electron paramagnetic resonance spectroscopy was performed in the Department of Chemistry Instrumentation Facility (DCIF) at MIT, on a Bruker EMX spectrometer with an ER 4199 HS cavity and a Gunn diode with X-band 8-10 GHz radiation. For the formate to PVF binding, PVF/CNT (1:1) electrodes were oxidized for 5 minutes in a 0.077 M LiCOOH in water solution. The same procedure were performed with $LiClO_4$ and $LiPF_6$ instead of LiCOOH as comparison. The electrodes were removed under applied potential and the surface polymer scrapped off into a 100 mm length and 0.04 mm OD Wilmad Quartz EPR tube. Ferrocenium hexafluorophosphate (Sigma-Aldrich) was used as a comparison. Cobaltocenium hexafluorophosphate (purchased from STREM Chemicals Inc) was titrated with tetrabutylammonium acetate under different concentrations. XPS. The Physical Electronics Versaproble II X-ray Photoelectron spectrometer was used for the analysis of the surface of the electrodes. The analysis was performed at ultra-high vacuum (1e-08 bar) with an argon-gun neutralizer. Details on EPR and XPS instruments parameter and data analysis can be found herein.

Computational Methods.

Density functional theory calculations were carried out with the B3LYP exchange correlation functional and LACVP* mixed basis set using the Q-Chem electronic structure code.[1] This mixed basis set corresponds to a 6-31G* basis set on all atoms but Fe, which is instead described by an LANL2DZ effective core potential (1s2s2p6 configuration is modeled by the effective potential). The calculations were performed with unrestricted wave functions. Geometry optimizations were carried out in the gas phase, although select calculations (ferrocenium perchlorate and ferrocenium formate) were also performed with an added Polarizable Continuum Model (PCM) on the final gas-phase optimized geometry. Specifically, the conductor-like solvation model (COSMO) was used to account for the dielectric properties of water ($\varepsilon$=78.39) implicitly. For PCM, van der Waals radii from Bondi's table were utilized,[2] with an iron radius assigned to be 2 Å. The B3LYP functional was augmented with dispersion correction (Grimme's DFT-D3)[3] and corrected for basis set superposition error with the counterpoise method for all geometry optimizations. The starting structure of ferrocene was obtained from neutron-diffraction obtained crystal structure with $D_{5h}$ eclipsed symmetry.[4] Ferrocenium was set with spin multiplicity 2 (17 e$^-$ complex) in the charged state, with a formal charge of +1, and cobaltocenium as having spin multiplicity 1 (18 e$^-$ complex) with charge +1. Anions were simulated with spin multiplicity 1 and total charge −1. NBO. Natural bond order (NBO) analysis was carried out in Gaussian 09, Revision C.01, performed at the Institute of Chemistry of Clermont-Ferrand, Blaise Pascal University, France, and in QChem 4.0. NBO is a well-used method for localizing electronic density onto a Lewis structure, with second-order perturbation analysis allowing for the investigation of intermolecular bonds. NBO, whose theoretical analysis and algorithm implementation are well documented, searches for the highest-occupancy (near-pair) eigenorbitals.[5] ALMO. Absolutely localized molecular orbital (ALMO) analysis was carried out in Q-Chem 4.0, including the energy decomposition analysis (EDA) and the assignment of complementary occupied-virtual pairs (COVP), with the mathematical development and interesting applications presented in detail by Khaliullin et al.[6] Instead of using conventional delocalized molecular orbitals (MOs), ALMO expands the atomic orbitals (AOs) of a given molecule, thus excluding charge transfer and allowing for energy decomposition analysis (EDA). From ALMO-EDA, we are able to decompose the binding interaction into three principal components: the "frozen density" (FRZ) corresponding to pure electrostatic interactions, the "polarization" (POL) intra-molecular orbital relaxation, and charge-transfer energy (CT) resulting from inter-fragment orbital relaxation. Along with the energy decomposition, the ALMO method allows for the construction of pairs of molecular orbitals that describe the charge transfer between molecular fragments exactly, named complementary occupied-virtual pairs (COVPs). COVPs are ranked by degree of charge transfer between the fragments, with the highest being denoted as COVP-1, the next as COVP-2, and so on. In most intermolecular interactions, only a few representative COVPs are required to account for the majority of the charge transfer.

Scanning Electron Microscopy (SEM) and Atomic Force Microscopy (AFM).

The surface morphology of the electrodes were characterized by a FEG-XL-30 field-emission SEM at 20 kV using a beam size of 3 and high vacuum conditions, and a ZEISS Merlin High-Resolution SEM at kV-20 kV. Energy dispersive X-ray spectroscopy (EDX) was performed using the TEAM software to map the elements at 50 is dwell time, 512×400 resolution and 15 kV. In green is the iron and in blue is the carbon. AFM measurements were carried out with a Veeco Nanoscope V with Dimension 3100 scanner in tapping mode, with 512×512 resolution and 1100 eV amplitude.

Surface Area Analysis.

The surface area of the electroactive polymer was measured through nitrogen sorption on a Micromeritics ASAP 2020. The PVF/CNT precursor solution was deposited in large amounts on a substrate, scratched off once dried and 60 mg were collected off for BET analysis. The sample was degassed to 10 µmHg and heated to 200° C. for 300 minutes before running the nitrogen adsorption.

Details on XPS Analysis.

The survey scans were performed with 10 cycles from 1400 eV to 50 eV at 200 kV with a pass energy of 80 eV and a step size of 0.5 eV. The high resolution scans for were performed with 100 kV, a pass energy of 11 eV, 0.05 eV resolution with 30 cycles for iron and 8 cycles for the remaining elements. The scans were exported using CASA XPS commercial software (MIT license) and peal fitting was performed using XPS Peak Fit free-ware. For Fe 2p analysis, the background were fitted from 702 eV to 732 eV using a Shirley background with 7 end-points averaged. The two Fe $P_{3/2}$ at 708 and 711 eV were fitted using a Lorentzian-Gaussian fit with 0.2 and 60 asymmetry factors, and using the p-type orbital constraint. The two $p_{1/2}$ peaks were set as constraints using a split energy Δ=13.66 eV (XPS handbook). The goodness of fit was checked by the chi-squared and seeing of the FWHM of peaks 1 and 2, 3 and 4 were similar. Peaks 1 and 2 are the Fe $p_{3/2}$ and Fe $p_{1/2}$ of the neutral species, and 3 and 4 the corresponding peaks for the oxidized species. The % oxidized iron can be calculated from the peak areas.

$$\% \text{ Oxidized Iron} = \frac{(\text{Area } 1 + \text{Area } 2)}{(\text{Area } 1 + \text{Area } 2 + \text{Area } 3 + \text{Area } 4)}$$

Details on EPR Parameters.

The measurements were performed with Center Field 3500.00 G, sweep width 2000.00 G and 1024 points resolution, at a microwave frequency of 9.868 GHz and power 0.202 mW. The receiver gain was set to 2e+04 with Mod. Frequency 100.00 kHz and Mod. Amplitude 5.00 G.

REFERENCES (1) Shao, Y.; Molnar, L. F.; Jung, Y.; Kussmann, J.; Ochsenfeld, C.; Brown, S. T.; Gilbert, A. T. B.; Slipchenko, L. V.; Levchenko, S. V.; O'Neill, D. P.; DiStasio, R. A.; Lochan, R. C.; Wang, T.; Beran, G. J. O.; Besley, N. A.; Herbert, J. M.; Lin, C. Y.; Van Voorhis, T.; Chien, S. H.; Sodt, A.; Steele, R. P.; Rassolov, V. A.; Maslen, P. E.; Korambath, P. P.; Adamson, R. D.; Austin, B.; Baker, J.; Byrd, E. F. C.; Dachsel, H.; Doerksen, R. J.; Dreuw, A.; Dunietz, B. D.; Dutoi, A. D.; Furlani, T. R.; Gwaltney, S. R.; Heyden, A.; Hirata, S.; Hsu, C. P.; Kedziora, G.; Khaliulin, R. Z.; Klunzinger, P.; Lee, A. M.; Lee, M. S.; Liang, W.; Lotan, I.; Nair, N.; Peters, B.; Proynov, E. I.; Pieniazek, P. A.; Rhee, Y. M.; Ritchie, J.; Rosta, E.; Sherrill, C. D.; Simmonett, A. C.; Subotnik, J. E.; Woodcock, H. L.; Zhang, W.; Bell, A. T.; Chakraborty, A. K.; Chipman, D. M.; Keil, F. J.; Warshel, A.; Hehre, W. J.; Schaefer, H. F.; Kong, J.; Krylov, A. I.; Gill, P. M. W.; Head-Gordon, M. *Phys. Chem. Chem. Phys.* 2006, 8, 3172.

(2) Bondi, A. *J. Phys. Chem.* 1964, 68, 441.s (3) Grimme, S.; Antony, J.; Ehrlich, S.; Krieg, H. *J. Chem. Phys.* 2010, 132, 154104.

(4) Takusagawa, F.; Koetzle, T. F. *Acta Crystallogr. B* 1979, 35, 1074.

(5) F. Weinhold, C. Landis, *Valency and Bonding*, Cambridge University Press, Cambridge, UK, 2005.

(6) R. Z. Khaliullin, A. T. Bell, M. Head-Gordon, *J. Chem. Phys.* 2008, 128; bR. Z. Khaliullin, E. A. Cobar, R. C. Lochan, A. T. Bell, M. Head-Gordon, *J. Phys. Chem. A* 2007, 111, 8753-8765.

TABLE 1

Final xyz coordinates from optimized gas-phase DFT geometries:

Ferrocenium-formate

| | | | |
|---|---|---|---|
| Fe | −0.0244037309 | −0.0338411534 | 0.0125962337 |
| C | −0.4844068454 | 1.1170909894 | 1.7168813362 |
| C | 0.8895112022 | 0.7489217986 | 1.8104927803 |
| C | 0.9711626566 | −0.6702647052 | 1.8214556685 |
| C | −0.3547920323 | −1.1958754199 | 1.7437420599 |
| C | −1.2578400053 | −0.0862421054 | 1.6878455553 |
| H | −0.8259027619 | 2.1329581372 | 1.5400607058 |
| H | 1.7044311278 | 1.4557104085 | 1.7176768886 |
| H | 1.8830028264 | −1.2537973065 | 1.8374169016 |
| H | −0.6251485353 | −2.2438431529 | 1.7224076185 |
| H | −2.3355775526 | −0.1492052041 | 1.6119952707 |
| C | 0.9701017638 | −0.6254529192 | −1.8153659601 |
| C | −0.3793984445 | −1.0907905866 | −1.7829043417 |
| C | −1.2314917136 | 0.0555499101 | −1.6786494366 |
| C | −0.4036672254 | 1.2216838513 | −1.6287132611 |
| C | 0.9536588313 | 0.7926622530 | −1.7245612325 |
| H | 1.8535069168 | −1.2506690644 | −1.8480717076 |
| H | −0.6983619960 | −2.1247006374 | −1.8166386483 |
| H | −2.3121515026 | 0.0382900668 | −1.6201554703 |
| H | −0.6938741281 | 2.2408976435 | −1.3780156707 |
| H | 1.7970786132 | 1.4566520703 | −1.5849446289 |
| H | 1.2531149808 | 4.9463696443 | 0.2770838015 |
| C | 0.8951726935 | 3.8915168909 | 0.1473758117 |
| O | 1.8030433106 | 3.0146711492 | 0.0874904535 |
| O | −0.3531184493 | 3.7370874418 | 0.0836393619 |

TABLE 1-continued

Final xyz coordinates from optimized gas-phase DFT geometries:

Ferrocenium-Perchlorate

| | | | |
|---|---|---|---|
| Fe | −0.1197604915 | −0.0856694312 | −0.0001595614 |
| C | −0.6641425658 | 1.0172448968 | 1.7719090390 |
| C | 0.7424078108 | 0.8146190623 | 1.7903130377 |
| C | 0.9913791918 | −0.5861374383 | 1.7485581950 |
| C | −0.2690190481 | −1.2626933818 | 1.7134074173 |
| C | −1.2953529423 | −0.2627544001 | 1.7252526815 |
| H | −1.1208704518 | 1.9982604411 | 1.7073662823 |
| H | 1.4706958921 | 1.6130122390 | 1.7200395153 |
| H | 1.9660185375 | −1.0562661508 | 1.7207266495 |
| H | −0.4185347192 | −2.3341932563 | 1.6844538981 |
| H | −2.3615941444 | −0.4459127439 | 1.6935377914 |
| C | 0.9517485567 | −0.5853908866 | −1.7720391442 |
| C | −0.3113326475 | −1.2555583790 | −1.7138280783 |
| C | −1.3320533273 | −0.2498951306 | −1.7007161854 |
| C | −0.6950739991 | 1.0270478387 | −1.7564250501 |
| C | 0.7096235521 | 0.8169852570 | −1.8038549921 |
| H | 1.9241675768 | −1.0608766313 | −1.7664881919 |
| H | −0.4659339312 | −2.3263409120 | −1.6854927648 |
| H | −2.3984575419 | −0.4270669844 | −1.6476153267 |
| H | −1.1458478914 | 2.0102426583 | −1.6791844272 |
| H | 1.4435334046 | 1.6110077851 | −1.7443335112 |
| O | −0.3481701482 | 4.0034627036 | 1.2332323685 |
| O | 1.5920277297 | 3.1970380530 | −0.0198099912 |
| O | 1.0523763778 | 5.5895504488 | −0.0016764143 |
| Cl | 0.4800286571 | 4.2264300515 | −0.0013129809 |
| O | −0.3783634373 | 4.0156542911 | −1.2167602560 |

Ferrocenium-hexafluorophosphate

| | | | |
|---|---|---|---|
| Fe | −0.0001508602 | 0.0249652017 | −0.0187687081 |
| C | −0.6402668360 | 1.1280737761 | 1.7447729507 |
| C | 0.7703438822 | 0.9252633329 | 1.7426093318 |
| C | 1.0163312933 | −0.4827675599 | 1.7395063981 |
| C | −0.2490442039 | −1.1480480278 | 1.7175526506 |
| C | −1.2669242368 | −0.1461326850 | 1.7192913451 |
| H | −1.1166640540 | 2.0935469784 | 1.6501175110 |
| H | 1.4973494048 | 1.7227038134 | 1.6872070374 |
| H | 1.9874179358 | −0.9605983643 | 1.7337278165 |
| H | −0.4065786910 | −2.2182875870 | 1.6828482746 |
| H | −2.3325835280 | −0.3280438035 | 1.6592674767 |
| C | 0.7726151026 | −1.0004143169 | −1.7008875190 |
| C | −0.6560700165 | −0.9744280469 | −1.7309029571 |
| C | −1.0610752171 | 0.3967098935 | −1.8042044244 |
| C | 0.1105785792 | 1.2072370008 | −1.8478345523 |
| C | 1.2364318944 | 0.3479786952 | −1.7710671780 |
| H | 1.3920934854 | −1.8833198862 | −1.6110320236 |
| H | −1.3127726859 | −1.8334560332 | −1.6847850904 |
| H | −2.0767159375 | 0.7689145471 | −1.8098829049 |
| H | 0.1340830745 | 2.2873942376 | −1.8312083800 |
| H | 2.2671476858 | 0.6734270521 | −1.7137661138 |
| F | 0.1619832053 | 4.5752521359 | −1.5642389479 |
| F | 1.1695368988 | 5.5623400930 | 0.2933086574 |
| F | −1.1452450184 | 5.5802793934 | 0.0854701306 |
| P | 0.0153750722 | 4.4606076886 | 0.0612072938 |
| F | 1.1748747428 | 3.2619092307 | 0.0306333357 |
| F | −1.1426927513 | 3.2789873490 | −0.1772997013 |
| F | −0.1337782203 | 4.2090058911 | 1.6749582908 |

Ferrocenium-benzoate

| | | | |
|---|---|---|---|
| Fe | 0.0882718390 | −0.0922485410 | −0.0024179961 |
| C | −0.6262337919 | 0.9617152798 | 1.7431553193 |
| C | 0.7962254127 | 0.9862418762 | 1.6866667918 |
| C | 1.2623356292 | −0.3652261458 | 1.7017454537 |
| C | 0.1194260544 | −1.2279971708 | 1.7592071442 |
| C | −1.0453261048 | −0.3983499096 | 1.7833908478 |
| H | −1.2390988359 | 1.8423498212 | 1.5793101685 |
| H | 1.3650563968 | 1.8888021875 | 1.4817557678 |
| H | 2.2961548396 | −0.6830916316 | 1.6563509472 |
| H | 0.1335145404 | −2.3100302927 | 1.7761083258 |
| H | −2.0702239855 | −0.7472032444 | 1.7881164298 |
| C | 0.1097441436 | −1.2284588945 | −1.7650101654 |
| C | −1.0577325034 | −0.4026354535 | −1.7806085850 |
| C | −0.6426542254 | 0.9587237862 | −1.7420422352 |
| C | 0.7801450641 | 0.9880376411 | −1.6965271422 |
| C | 1.2502170144 | −0.3620397876 | −1.7154679492 |
| H | 0.1271059456 | −2.3104226398 | −1.7832165883 |
| H | −2.0815811817 | −0.7547640414 | −1.7784584100 |

TABLE 1-continued

Final xyz coordinates from optimized gas-phase DFT geometries:

| | | | |
|---|---|---|---|
| H | −1.2568177048 | 1.8376408854 | −1.5743457940 |
| H | 1.3482481867 | 1.8918682588 | −1.4944653179 |
| H | 2.2852319576 | −0.6768803390 | −1.6768926556 |
| C | 1.0466725775 | 7.6863921233 | −0.0181232583 |
| C | −0.1971480150 | 8.3235547233 | −0.0113731965 |
| C | 1.1177444134 | 6.2933886415 | −0.0153067690 |
| C | −1.3675427500 | 7.5599426693 | −0.0019663813 |
| C | −0.0500912389 | 5.5211502632 | −0.0060204810 |
| C | −1.2924945568 | 6.1669829914 | 0.0005587058 |
| C | 0.0329553148 | 3.9994092372 | −0.0031027780 |
| H | 1.9596584573 | 8.2778041908 | −0.0256177082 |
| O | 1.1917352421 | 3.4884414560 | −0.0059650525 |
| H | −0.2541102524 | 9.4097326850 | −0.0134386020 |
| O | −1.0676551130 | 3.3684699966 | 0.0017445541 |
| H | 2.0714974965 | 5.7756919154 | −0.0202670467 |
| H | −2.3375382236 | 8.0523573559 | 0.0034077507 |
| H | −2.1875520427 | 5.5531001068 | 0.0077859038 |
| Ferrocenium-Pyruvate | | | |
| Fe | −0.1091791439 | 0.0117724020 | −0.0352107144 |
| C | −0.8452250947 | 1.2959324349 | 1.5401947290 |
| C | 0.5719429389 | 1.3897523866 | 1.5177001888 |
| C | 1.1047061277 | 0.0817746343 | 1.7066535202 |
| C | 0.0117848722 | −0.8287847232 | 1.8662778052 |
| C | −1.1985226000 | −0.0706707797 | 1.7549787631 |
| H | −1.5128094940 | 2.1153185068 | 1.3043176338 |
| H | 1.1122329470 | 2.3055131994 | 1.3094889197 |
| H | 2.1548930815 | −0.1797258134 | 1.7137565852 |
| H | 0.0859355263 | −1.8942751186 | 2.0412127245 |
| H | −2.2040559060 | −0.4670671730 | 1.8092767686 |
| C | 0.9613123294 | −0.6605164631 | −1.7559885529 |
| C | −0.2082935366 | −1.4517097986 | −1.5198509522 |
| C | −1.3443651126 | −0.5809135816 | −1.6123538756 |
| C | −0.8691965365 | 0.7360139876 | −1.9007117400 |
| C | 0.5487218078 | 0.6800229896 | −1.9962461150 |
| H | 1.9830188942 | −1.0178857106 | −1.7251668525 |
| H | −0.2290071108 | −2.5134530513 | −1.3093194904 |
| H | −2.3758607750 | −0.8685392799 | −1.4640200877 |
| H | −1.4188126686 | 1.6775611840 | −1.8713973463 |
| H | 1.1557601749 | 1.5750479071 | −2.0809243178 |
| O | 0.3235115652 | 4.5577050894 | 1.6207717723 |
| H | −0.6045679114 | 6.8909058150 | 1.1656738311 |
| H | −1.7373218048 | 6.1930961523 | −0.0459145702 |
| C | −0.6914833458 | 6.2676582601 | 0.2716219567 |
| C | −0.1518582655 | 4.8782411909 | 0.5365800483 |
| C | −0.2745857820 | 3.8445788095 | −0.5961154059 |
| H | −0.1361331080 | 6.7266741376 | −0.5567008837 |
| O | −1.4594105422 | 3.4501538253 | −0.7908259947 |
| O | 0.7978866734 | 3.4742985806 | −1.1283383474 |
| Ferrocenium-Acetate | | | |
| Fe | −0.1564748048 | −0.0567777302 | 0.0096086144 |
| C | −0.8343022130 | 0.9896323435 | 1.7323651103 |
| C | 0.5839972883 | 0.8862606282 | 1.8063065785 |
| C | 0.9289540703 | −0.4949753483 | 1.7937829830 |
| C | −0.2779236172 | −1.2588150350 | 1.7213914422 |
| C | −1.3717387296 | −0.3345093029 | 1.6855385287 |
| H | −1.3572002495 | 1.9257226329 | 1.5655282780 |
| H | 1.2513578005 | 1.7337350167 | 1.6901891674 |
| H | 1.9338835563 | −0.8976646803 | 1.7981832507 |
| H | −0.3497948928 | −2.3383994692 | 1.6941665172 |
| H | −2.4200601640 | −0.5938775211 | 1.6126441640 |
| C | 1.0004332326 | −0.3636358809 | −1.7549245501 |
| C | −0.1993741128 | −1.1424507813 | −1.7800751555 |
| C | −1.3050686928 | −0.2329197934 | −1.7258623205 |
| C | −0.7820875452 | 1.0959965577 | −1.6635190789 |
| C | 0.6391161455 | 1.0119774485 | −1.6893436280 |
| H | 2.0095095719 | −0.7558245057 | −1.7483702313 |
| H | −0.2598456186 | −2.2221230495 | −1.8253966180 |
| H | −2.3519358855 | −0.5079913495 | −1.7090832828 |
| H | −1.3131913016 | 2.0183832520 | −1.4494894149 |
| H | 1.2839820109 | 1.8602214441 | −1.4801024945 |
| H | −0.1950307894 | 5.8213449237 | 1.2841672963 |
| C | 0.3913533088 | 5.4977509836 | 0.4163035581 |
| H | −0.0001216264 | 6.0425091100 | −0.4513866091 |
| H | 1.4425256189 | 5.7599607760 | 0.5629574560 |
| C | 0.2094404463 | 3.9856786824 | 0.1976688322 |
| O | 1.2630752043 | 3.2789820921 | 0.1437383597 |
| O | −0.9787280114 | 3.5692285558 | 0.0864433047 |
| Ferrocenium-Trifluoroacetate | | | |
| Fe | 0.1681025848 | −0.1635461269 | −0.0040006723 |
| C | −0.5977821507 | 0.8744075249 | 1.6195754056 |
| C | 0.8338573240 | 0.8938905606 | 1.6546006706 |
| C | 1.2932898154 | −0.4590993092 | 1.7371546096 |
| C | 0.1498099122 | −1.3185250328 | 1.7507134181 |
| C | −1.0172976288 | −0.4929813368 | 1.6824841397 |
| H | −1.2026571063 | 1.7564365411 | 1.4127842458 |
| H | 1.4163305320 | 1.7954712559 | 1.5020079214 |
| H | 2.3259784470 | −0.7835714984 | 1.7341540580 |
| H | 0.1663381206 | −2.4005935021 | 1.7637309221 |
| H | −2.0389283691 | −0.8471098223 | 1.6303033110 |
| C | 0.1990835937 | −1.1645541613 | −1.8493326134 |
| C | −0.9793700701 | −0.3597370891 | −1.7375011473 |
| C | −0.5771532338 | 1.0009563633 | −1.5490846061 |
| C | 0.8542248918 | 1.0380478177 | −1.5514031998 |
| C | 1.3320887809 | −0.2977043836 | −1.7390705630 |
| H | 0.2290914378 | −2.2413012220 | −1.9547371087 |
| H | −1.9974353669 | −0.7270248933 | −1.7373946035 |
| H | −1.1950927838 | 1.8573286976 | −1.2832532966 |
| H | 1.4192922488 | 1.9317040172 | −1.3106567713 |
| H | 2.3684139525 | −0.6100720165 | −1.7390842451 |
| F | −1.4435609888 | 6.0434082303 | 0.8079328273 |
| O | −1.3542986435 | 3.4465556440 | 0.1433904542 |
| C | −0.3291470126 | 5.5912900348 | 0.1961242377 |
| F | −0.3483776364 | 6.0695775561 | −1.0749758488 |
| C | −0.2431594169 | 4.0334700948 | 0.1760001185 |
| F | 0.7250817330 | 6.1591915877 | 0.8179625407 |
| O | 0.9198370333 | 3.5681844684 | 0.1502257851 |
| Ferrocenium-Lactate | | | |
| Fe | −0.0229024238 | 0.1672310617 | −0.0793484098 |
| C | −0.4856358312 | 1.5864244836 | 1.5104500339 |
| C | 0.9026656304 | 1.6370417297 | 1.2131337088 |
| C | 1.4460893345 | 0.3310751846 | 1.4109292691 |
| C | 0.3860757318 | −0.5325468861 | 1.8388874258 |
| C | −0.8112895290 | 0.2507866399 | 1.8854819972 |
| H | −1.1695788310 | 2.4084783905 | 1.3409658759 |
| H | 1.3972430479 | 2.5025388596 | 0.7908689392 |
| H | 2.4766225875 | 0.0398843950 | 1.2539023198 |
| H | 0.4731877194 | −1.5834790033 | 2.0823642772 |
| H | −1.7971912232 | −0.1109904960 | 2.1481295875 |
| C | 0.8320234821 | −0.5547613571 | −1.8597195818 |
| C | −0.2567104647 | −1.3881863246 | −1.4419247980 |
| C | −1.4417480212 | −0.5831018962 | −1.4510381129 |
| C | −1.0849592484 | 0.7301262190 | −1.8763643104 |
| C | 0.3150578667 | 0.7486456435 | −2.1259051938 |
| H | 1.8687816441 | −0.8580195667 | −1.9310698380 |
| H | −0.1942585907 | −2.4339015494 | −1.1687746961 |
| H | −2.4309621168 | −0.9084851318 | −1.1547974293 |
| H | −1.6749298761 | 1.6442847302 | −1.8236456952 |
| H | 0.8568728897 | 1.6743889387 | −2.3001106810 |
| H | 1.7198176601 | 5.7659234947 | −0.5187261228 |
| O | 0.6912351118 | 3.5830014189 | −1.3200779935 |
| C | 0.7536351781 | 6.2613028852 | −0.3946783542 |
| O | 0.1042479946 | 4.7556336232 | 1.4170388733 |
| C | −0.3771234167 | 3.9800189285 | −0.7813446395 |
| H | 0.1797601536 | 5.5254321626 | 2.0027578277 |
| H | 0.8592058406 | 7.1046022387 | 0.3035141242 |
| C | −0.2695186457 | 5.2535919445 | 0.1097024201 |
| O | −1.5153125456 | 3.4326733837 | −0.8100525918 |
| H | 0.4503912418 | 6.6684258657 | −1.3664258485 |
| H | −1.2684323508 | 5.7076799894 | 0.1715276169 |
| Cobaltocenium-formate | | | |
| Co | −0.0005362420 | 0.2223489575 | 0.0065971205 |
| C | −0.6639491151 | 1.3406750640 | 1.6096131794 |
| C | 0.7642180523 | 1.2933489669 | 1.6152882772 |
| C | 1.1456220658 | −0.0815698717 | 1.7033887832 |
| C | −0.0392597458 | −0.8819773142 | 1.7564305465 |
| C | −1.1621541930 | 0.0030350953 | 1.7021507661 |
| H | −1.2130014731 | 2.2564867242 | 1.4276566312 |
| H | 1.3856783420 | 2.1802129699 | 1.3958506764 |
| H | 2.1602485194 | −0.4587145833 | 1.6824483569 |
| H | −0.0800282536 | −1.9633370198 | 1.7841439616 |

TABLE 1-continued

Final xyz coordinates from optimized gas-phase DFT geometries:

| | | | |
|---|---|---|---|
| H | −2.2013886295 | −0.2992481126 | 1.6806807240 |
| C | 0.7886387266 | −0.6889743210 | −1.6814797121 |
| C | −0.6355255605 | −0.7946625427 | −1.6916831328 |
| C | −1.1702112640 | 0.5320290441 | −1.6752597970 |
| C | −0.0845110131 | 1.4607880960 | −1.6612039431 |
| C | 1.1252875679 | 0.7020971376 | −1.6595530058 |
| H | 1.4858388016 | −1.5158995382 | −1.6499340891 |
| H | −1.2072511708 | −1.7132641435 | −1.6705427835 |
| H | −2.2193724469 | 0.7936017981 | −1.6330368712 |
| H | −0.1621040669 | 2.5324679663 | −1.4669801174 |
| H | 2.1203454816 | 1.1199246657 | −1.5822253960 |
| C | 0.8651886229 | 4.3807113240 | 0.1548798464 |
| O | −0.2973890788 | 3.9150977247 | −0.0257693217 |
| O | 1.8737858251 | 3.8118244589 | 0.6445550490 |
| H | 1.0200302482 | 5.4426974536 | −0.1704157488 |
| Cobaltocenium-hexafluorophosphate | | | |
| Co | 0.0353789973 | 0.3595042125 | −0.0194174550 |
| C | −0.5178430255 | 1.5192729220 | 1.6391045826 |
| C | 0.8713681679 | 1.2042049674 | 1.6968796569 |
| C | 1.0091248987 | −0.2173306084 | 1.7190506288 |
| C | −0.3012977437 | −0.7869972032 | 1.6635182438 |
| C | −1.2414934153 | 0.2900211412 | 1.6134684394 |
| H | −0.9207557411 | 2.5160618074 | 1.5239222660 |
| H | 1.6619579991 | 1.9393727740 | 1.6572822764 |
| H | 1.9405350888 | −0.7685458891 | 1.7346270719 |
| H | −0.5350937067 | −1.8429851786 | 1.6320771543 |
| H | −2.3152084641 | 0.1899658590 | 1.5238984733 |
| C | 0.7870370488 | −0.6498450358 | −1.6592858879 |
| C | −0.6406336722 | −0.6133498571 | −1.7138066522 |
| C | −1.0401952772 | 0.7595996034 | −1.7539014406 |
| C | 0.1314392543 | 1.5709742856 | −1.7394464965 |
| C | 1.2585953798 | 0.7009563775 | −1.6682480712 |
| H | 1.3986406189 | −1.5393428881 | −1.5841170126 |
| H | −1.3018010682 | −1.4697229514 | −1.6870001234 |
| H | −2.0556312105 | 1.1325197936 | −1.7502221922 |
| H | 0.1542241350 | 2.6506151513 | −1.6914100402 |
| H | 2.2900952265 | 1.0185925049 | −1.5928114712 |
| F | 0.2103345034 | 4.9216467845 | −1.5515789566 |
| F | 1.1001200688 | 5.9872835984 | 0.3198105197 |
| F | −1.1901732845 | 6.0622867790 | −0.0754589471 |
| P | −0.0715969762 | 4.9087916752 | 0.0619755681 |
| F | 1.0461822626 | 3.6773722789 | 0.1954399275 |
| F | −1.2404695036 | 3.7464362082 | −0.2046568020 |
| F | −0.3572405614 | 4.7617408877 | 1.666906740 |

Example 2: Molecular Tuning of Redox-Organometallic Electrodes: Asymmetric Faradaic Systems for Electrochemically-Mediated Separations Water scarcity worldwide, due to geographical shortage or anthropogenic pollution, has made desalination and aqueous-phase pollutant remediation a major engineering challenge for the 21$^{st}$ century.[1,2] One of the primary areas of focus for current separation technologies is the treatment of contaminants of emerging concern, especially complex organic ions that are highly toxic and present in the micromolar range, including pesticides, chemical waste-products and pharmaceuticals.[3,4] These dilute organic micropollutants are a particular challenge for conventional separation techniques, which can be limited in separations capacity, kinetics and regenerability. Electrochemical separation processes have been gaining increased attention as a platform for addressing these and other water purification and wastewater treatment needs[5-7] due to their combination of high throughput, no need for chemical regenerants and re-usability. Indeed, electrochemical platforms present a more sustainable alternative to pressure-based membrane technologies, thermally-based adsorption processes, and pH swing ion-exchange methods, due to potentially lower energetic costs, integration with renewable sources and absence of the need for chemical regenerants.[8-10] Capacitive-type methods for water purification exhibit good performance for bulk desalination operations,[6] but are still limited by the loss of current efficiency towards side-reactions and, for selective separations, the lack of ion-specificity.

Water splitting is a major side reaction that limits the effectiveness of capacitive deionization processes.[5,8] In the presence or absence of oxygen reduction, it is a ubiquitous process that can be catalysed at the surface of most conductive materials once its reduction potential at −0.83 V versus the standard hydrogen electrode (SHE) is reached, with its accompanying hydroxide formation and $H_2$ evolution ($H_2O+e^-\rightarrow OH^-+\frac{1}{2}H_2$ at moderate to high pH; $H^++e^-\rightarrow\frac{1}{2}H_2$ at low pH).[11] Due to the high voltage windows required for these electrochemical separations, water splitting has been a major challenge for cathode design, with a significant fraction of the current being diverted towards this side-reaction and altering the pH of the system,[8,9] and has been highlighted as a major source of performance loss in capacitive deionization.[5,8] More generally, for any analytical sensing, the change in the aqueous phase conditions can be detrimental to the accuracy of the measurement, as most redox-receptors operate within a narrow pH range.[12] The production or consumption of hydroxides and protons negatively affects sensing,[13,14] lowers ion-adsorption and charge storage capacity,[5,8] fouls redox-selective electrodes, and, in the case of electrocatalysis, adversely influences pH-sensitive reaction rates and substrate selectivity.[15]

From the selectivity perspective, increasing interest is being given to Faradaic-based systems for water decontamination and electrochemical separation[16] due to their high energy densities and selective ion intercalation properties.[17-19] Redox-electrodes used in batteries and pseudocapacitors have been touted for their energy storage capabilities, promoted by a reversible surface reaction.[20,21] In contrast to capacitive systems, electrosorption and deionization based on these Faradaic materials can be designed at a molecular scale to remove target contaminants selectively by tuning the Faradaic binding process at the interface (see comparison in FIG. 59A).[22] With their fast kinetics and high ion-adsorption capacity at low-voltage windows, these redox-materials may be used for the bridging of environmental remediation solutions and advanced energy materials.[16,22,23] However, the use of these systems for micropollutant separation, and for the targeting of specific ions, remains a formidable task due to side-reactions which decrease ion selectivity by producing competing ions that foul the redox-electrodes.

The judicious choice of the electrochemical configuration and materials design represents the first step in overcoming these performance limitations. There are various configurations in which an electrochemical cell can be deployed. In FIG. 59B, configuration panel A is a purely double layer system; panel B has only one redox-functionalized electrode, the counter being just a conductive electrode; panel C denotes a symmetric pseudocapacitive system with both electrodes functionalized with the same redox-species; panel D shows an asymmetric system in which the two chemically-identical electrodes are in different oxidation states; and panel E presents a fully asymmetric system in which the active centers of the two electrodes have different charges and chemical identities. In this Example, it is presented that properly designed asymmetric redox-electrodes (configuration E) can be used for increasing the performance of electrochemical separations, showing that water reduction can be suppressed and the ion-selectivity of each electrode can be preserved even for very low contaminant concentrations. For example, ferrocene-based anodes (PVF-CNT) have high selectivity towards anionic organic contaminants.[16,24] For the cathode, a number of reduction-favorable organometallics were screened and cobaltocenium was identified as a suitable redox-active group; a cobaltocenium containing polymer (poly(2-(methacrylolyoxy)ethyl cobaltocenium) (PMAECoCp$_2$)) was synthesized and used as an efficient counter electrode material for suppressing water splitting. Additionally, a specifically designed cobalt-based polymer ([η5-(1-carboxy-propylmethacrylate)-cyclopentadienyl]cobalt(η4-tetraphenylcyclobutadiene) (PCp-CoCbMA)) was shown to be able to selectively capture cations in the asymmetric system while preserving the selectivity of the PVF-CNT anode for targeted anion recovery.

Results

Electrochemical Design.

The materials approach is based on electroactive organometallics species to take advantage of their flexible chemical design, tunability and robust electron-transfer processes. Metallocene polymers are generally of interest due to their excellent combination of redox, mechanical, semi-conductive, photo-physical and optoelectronic properties.[25,26] Recent advances in the surface immobilization of these polymers[27] have led to applications ranging from charge-storage,[28] controlled release,[29] and catalysis[30-32] to selective anion recognition and electrosorption.[16] Examples 1 and 3 show that poly(vinyl)ferrocene-carbon nanotube electrodes (denoted as PVF-CNT) were found to be extremely efficient (separation factors over competing ions greater than 180 in water) for targeting specific organic functional groups such as carboxylates, sulfonates, and phosphonates, all of which are major classes of organic pollutants.[16] Further, lithium carboxylates can be recovered selectively from polar organic solutions with PVF-CNT as the anode, and a polyanthraquinone (PAQ)-functionalized cathode.[24] All the electrochemical tests performed in this Example used PVF-CNT as the redox-functionalized anode.

Common counter or auxiliary electrodes for lab-scale electrochemical testing are composed of noble metal surfaces such as platinum or gold, and for standard capacitive deionization systems, conductive carbon materials (Configuration B). All such conductive electrodes invariably suffer from losses in current efficiency during operation through side-reactions. At neutral to high pH, while the anode is functionalized with a redox-species capable of anion binding without water interference (in the case of ferrocene units Fc, Fc+A$^-$→Fc$^+$A$^-$+e$^-$), parasitic reactions at the cathode generate hydroxides, namely $H_2O+e^-\rightarrow OH^-+$ ½H$_2$ as shown in FIG. 62A (SHE E$^0$=−0.83 V and −1.1 V vs Ag/AgCl). Hydroxide production was shown to be significant, with current losses towards this secondary reaction of up to 15% at 0.83 A/m$^2$ and 30-40% at 8.3 A/m$^2$ for both platinum and carbon nanotubes, even at low operating potentials during chrono-potentiometry (+0.4 V of working electrode vs Ag/AgCl, +100 µA, equivalent to a current density of ~0.83 A/m$^2$) (FIG. 62A), sufficient to basicify the solution to pH=11.2 starting from pH=7.2. A symmetric arrangement of PVF-CNT (Configuration C; neutral PVF-CNT on both electrodes) was shown to result in a much higher degree of water reduction than when platinum or carbon was used as the counter electrode (FIG. 62B), with over 30% of the current density spent in the generation of hydroxide.

The extent of water splitting was lowered compared to the Pt or CNT control, however, when the PVF-CNT cathode was pre-oxidized (Configuration D), as a certain number of charged organometallic units could now be used as electron sinks (FIG. 62B). To pre-oxidize the PVF-CNT electrode, 100 µA current (0.83 A/m$^2$) was applied for 180 seconds, thus creating the charged form of the electrode, PVF$^+$-CNT. A fraction of this pre-oxidized PVF reduced back naturally to the neutral PVF under no applied potential, limiting thermodynamically the number of oxidized units attainable. As depicted in FIG. 62B, this corresponds to a counter-electrode that is part redox, part conductive. Previous measurements of the charging of PVF/CNT electrodes by XPS indicated that with perchlorate as the counter-ion, only ~40% of the units held the oxidized charge,[16] which may indicated why the hydroxide concentration increases after a certain total charge has been transferred. Regardless, under pre-oxidation for 180 s, the OH$^-$ formation can be eliminated for a comparable length of time during which current has been directed towards the self-exchange reduction of ferrocenium, after which current is diverted to water reduction.

Redox-Organometallic Counter Electrodes.

To assess whether organometallic systems (Configuration E) could be favourably reduced as ideal counter electrodes for controlling parasitic water reactions, different organometallic materials were evaluated; (1) cis-dichlorobis(2,2'-bipyridine)ruthenium (II) (Rubpy), a low spin 18 e$^-$ complex analogous to ferrocene, (2) the naturally oxidized cobaltocenium hexafluorophosphate (CoCp2$^+$), and complexes of (3) ferricyanide [K$^+$]$_3$[Fe(CN)$_6^{3-}$] and ferrocyanide [Na$^+$]$_4$ [Fe(CN)$_6^{4-}$]. The redox potentials for all these organometallics lie above the water-reduction potential, and thus they offer a favourable Faradaic process at the surface (Table 2). Chemically analogous to ferrocene, cobaltocenium is stable with an 18e$^-$ configuration as Co(III) (whereas ferrocene is an 18e$^-$-complex in its neutral form Fe(II)), and has a reduction peak around −0.9 V vs Ag/AgCl.[33] In its oxidized state, cobaltocenium has a counter-ion which can be appropriately ion-exchanged with an anion of choice depending on the application. Ferricyanide on the other hand, is an ionic complex that, in the Fe(II) state, has a favourable reduction towards Fe(III) to raise its overall negative charge by −1. Rotating disk-electrode (RDE) with the various organometallics show that their reduction potentials in the homogeneous form lie above the water reduction potential (see FIGS. 95A-95F). Quantification of the electrochemical parameters (charge transfer coefficients and redox rate constants) suggests that electron transfer behaviour, in solution, for all the tested metal-complexes lie within the same order of magnitude.

For screening, the homogeneous species were immobilized by doping the CNT/organometallic solution with conductive hydrophobic carbon paste (BASI, Inc.) to serve as a binder (Rubpy-CNT-cp, CoCp$_2^+$-CNT-cp and Fe(CN)$_6$-CNT-cp). The hydrophobic paste prevented solubilization of the charged organometallics and enhanced attachment onto Teflon-coated carbon fiber electrodes (see electrode preparation below). Equivalent mass loadings (40 mg active material/10 mL solvent) of the cathode organometallics were used to provide performance comparable to that of the anode. The CoCp$_2^+$-CNT-cp electrode showed the remarkable property of fully suppressing hydroxide production, with no noticeable increase in pH despite sustained application of an oxidative current (chronopotentiometry at +100 µA or 0.83 A/cm$^2$) on the PVF-CNT anode for 10 minutes (FIGS. 63A-63B).

In its charged form, Rubpy$^+$-CNT-cp also fully suppressed hydroxide production. Similarly, sodium ferrocyanide $[Na^+]_4[Fe(CN)_6^{4-}]$, with its Fe(II) center, was not able to suppress side-reactions, whereas its Fe(III) analogue $[K^+]_3[Fe(CN)_6^{3-}]$ was able to accept electrons readily and provide pseudocapacitive current with no increase in pH. This serves to show that other ligand-metal systems beyond metallocenes can be used in redox-electrodes to suppress side-reactions (FIG. 66B) in which the current efficiencies towards the water reduction reaction can be brought to almost zero for such asymmetric systems. For screening purposes, the paste electrodes were stable with limited leaching within a dozen cycles; however, for long-term stability and multiple cycling, a polymeric dual-functionalized system was investigated with cobaltocenium as the major redox component, both because the earth-abundant metal center is stable in its oxidized form, and because its asymmetric electron-transfer behavior is close to that of ferrocene.

Asymmetric PVF-CNT/PMAECoCp$_2$-CNT System.

A cobaltocenium-containing polymer, poly(2-(methacrylolyoxy)ethyl cobaltocenium) (PMAECoCp$_2$)[34,35] was synthesized by free-radical polymerization (see Cobaltocenium Polymer Synthesis below). On conjugating these polymers with nanotubes in a procedure similar to that used for the PVF-CNT systems, we prepared PMAECoCp$_2$-CNT redox-electrodes by the drop-casting of a mixture of polymer and CNT to form homogeneous films. Electrochemical characterization with PMAECoCp$_2$-CNT as the working electrode (and Pt as counter) through voltammetry at 5 mV/s indicated an almost eightfold higher single-electrode specific capacitance than that of the paste electrodes (176 F/g vs 28 F/g in 0.1 M LiClO$_4$), with a preservation of 100% activity after 12 hours of cycling in a 1 V potential window (see Electrochemical Characterization and Parameters). The PMAECoCp$_2$-CNT electrode capacitance (176 F/g) is roughly half that of PVF/CNT (298 F/g), since the cobaltocenium monomer has roughly 2.3 times higher molecular weight than ferrocene; the mass of the polymer on the cathode must, therefore, be adjusted accordingly to ensure equality of the respective charge capacities on the two electrodes for an asymmetric dual-functionalized system. The cyclic voltammogram (CV) of a balanced dual-functionalized, fully heterogeneous asymmetric system is illustrated in FIG. 64A. The individual CVs for each of the electrodes indicate that their Faradaic processes are in appropriate potential ranges for them to be suitable counters for each other, with proper equivalent charges based on the areas of the CVs.

Chronopotentiometry tests for these systems showed complete suppression of the production of OH$^-$ (FIG. 64B), indicating a coulombic efficiency of 100% when all current is diverted towards the desired Faradaic process, as well as cycling stability for over 500 cycles (FIG. 64D). This reinforces the concept that overall current efficiency of asymmetric cells, when compared in terms of counter-electrode material (FIG. 66B), can be superior for electrochemistry applications in aqueous systems, with complete suppression of any side-reaction through the diversion of oxidative current solely towards the self-exchange reaction. The asymmetric pseudocapacity of PVF/PMAECoCp$_2$ was also studied under various electrolyte concentrations (100 mM, 50 mM and 25 mM), with varying deionization conditions (see FIG. 73). The production of hydroxides with Pt as a counter was found to increase by around 30% in 25 mM LiClO$_4$, at 0.83 A/cm$^2$. Cobaltocenium was still able to suppress the hydroxide production under these conditions, with little to no H$_2$ or OH-production (see FIG. 74).

Further, the asymmetric PVF-CNT//PMAECoCp$_2$-CNT system was challenged by applying a tenfold higher current density (8.3 A/m$^2$), with remarkably no hydroxide production even under such conditions (see FIG. 67). When the counter-electrode was fully reduced and then pre-oxidized for 5 minutes, the hydroxide production was suppressed until the electrode was fully charged, after which the onset of water reduction occurred, at 5 minutes. Even at these high current efficiencies, at which Pt produces large amounts of hydroxide (changing the pH from 7 to 13), the PMAECoCp$_2$-CNT counter ensured that the pH remained unchanged. The results in FIG. 67 point to an important feature of these asymmetrically-balanced electrode systems in that they can be operated until the redox groups on the anode are fully oxidized, and all charge is transferred efficiently to the redox-cathode'self-exchange and ion-binding process. During this period, the water splitting process is inhibited, but once the electrochemical cell has been utilized to its full extent, further application of current would be pointless, and the cell would need to be discharged and regenerated. Finally, similar to PVF-CNT electrodes, the PMAECoCp$_2$-based electrodes form nanoporous architectures allowing for easy ion accessibility (FIG. 64E).

The effect of water splitting and hydroxide production was investigated directly for carboxylate separations (FIG. 65A). PVF-CNT has been shown in Examples 1 and 3 to be effective in removing organic ions, especially carboxylates, by reversible, specific chemical interactions, with a reported 1:1 stoichiometry relative to the functional group under 3.4 mM carboxylate and 100 mM LiClO$_4$ (benchmark value shown in FIG. 64C). When the adsorption was carried out under higher pH conditions with benzoate and formate as model aromatic and aliphatic ions, (under similar salt conditions), the produced hydroxides were shown to compete with the organic anion and lower the separation efficiency. Hydroxides are known to be the most nucleophilic H-bonding anions and thus can act as strong fouling species for anion-selective receptors such as ferrocene. After 20 cycles of chronopotentiometry, the pH of a non-redox counter system increased from 7 to 11.5, thus resulting in a loss of efficiency of almost 60%. After 100 cycles, the pH increased to 12 and was sufficiently high to result in over 80% loss in adsorption efficiency for formate (FIG. 64C). This loss may be a result of the pH effect and not cycling as the test was performed both with carboxylates in the original cycling solution as well as a fresh electrode adsorbing the carboxylates under higher pH. The pH reaches a plateau between 12 and 13 even after multiple charge discharge cycles probably due to the equilibrium of water oxidation on Pt during the PVF-CNT discharge. Finally, the asymmetric cell was found to be able to very efficiently adsorb complex micropollutants in the 100-200 μM range, including Ibuprofen (an endocrine disruptor), 2,4,5-trichlorophenoxyacetic acid (2,4,5-T) and quinchlorac, both herbicides, as well as sodium dodecyl sulphate, an environmentally persistent detergent (FIG. 65).

In contrast, with the PVF-CNT//PMAECoCp$_2$-CNT system, after 600 seconds (FIG. 64C) the pH of the asymmetric faradaic cell remained at 7, and the anode ion-selectivity towards formate was preserved at about 96% of the initial benchmark value. Furthermore, for one-pass adsorption tests at 10 minutes charging, with model carboxylate micropollutants (300 μM concentrations in the presence of 100 mM LiClO$_4$ supporting electrolyte), the adsorption efficiency of the asymmetric cell was found to be significantly greater than that obtained with a CNT or Pt counter (FIG. 65B). The anionic contaminants tested include herbicides such as quinchlorac and 2,4,5-trichlorophenoxyacetic acid (2,4,5-

T), ibuprofen, which is an endocrine disruptor, and a model detergent molecule (sodium dodecyl benzenesulfonate, or DBS). With CNT as a non-redox counter, the production of hydroxides was so fast that little to no micropollutant could be adsorbed, whereas with the PMAECoCp$_2$-CNT counter electrode, the redox-selectivity was enhanced almost twenty-fold. Since chloride salts are a more common competing electrolyte in deionization, the adsorption capacity was also tested in a mixed salt solution (90 mM NaClO$_4$, 10 mM NaCl), and solely in the presence of 10 mM NaCl, with most of the adsorption capacity still preserved (see FIG. 98). Thus, to successfully implement ion-selectivity for practical problems in environmental remediation and wastewater treatment, the effective design of Faradaic asymmetric system can be a crucial strategy for achieving high-performance separations at low contaminant concentrations.

Asymmetric PVF-CNT//PCpCoCbMA-CNT system.

In some embodiments, the redox-species at the cathode was initially in a charged state (+1) and was reduced to a 0-state. This was satisfactory for the applications in which anion separation at the anode was the main focus. However, in some embodiments, a system may be based on a redox-species that is reduced from the neutral (0) to the −1 state, and simultaneously exhibit binding affinity towards harmful cations. To this end, reversible selective cation binding capability of (η5-cyclopentadienyl)-cobalt(η4-tetraphenyl-cyclobutadiene)(CpCoCb)[36] was evaluated. When compared to cobaltocenium, which is positively charged in its Co(I) state, the substituted bottom ligand η4-tetraphenyl-cyclobutadiene maintains CpCoCb in the 0-neutral state. Upon reduction to Co(0), this active center becomes negatively charged and has the potential to adsorb cations selectively (FIG. 91A). Stable electrodes of the polymeric form, poly[η5-(1-oxo-4-methacryloyloxy-butyl)-cyclopentadienyl]cobalt(η4-tetraphenylcyclobutadiene) (PCpCoCbMA)[37] were developed. As indicated in FIG. 91B, PCp-CoCbMA-CNT electrodes show high stability under cycling at 10 mV/s and, similar to the PMAECOCp$_2$-CNT and PVF-CNT electrodes, exist as stable, nanoporous films (FIG. 91E).

When used as the working cathode, PCpCoCbMA-CNT was shown to be able to capture aromatic cations such as butyl-pyridinium and paraquat (otherwise known as methyl viologen) successfully in the presence of competing electrolyte (FIG. 91D, 300 µM of each in the presence of 100 mM NaClO$_4$), as determined by both NMR studies and in-situ UV-vis. Upon sequential reduction (−0.7 V) and oxidation (0 V) of the redox-electrode, the cation contaminant can be extracted and then expelled (FIG. 101). This high selectivity was evident in the recovery of paraquat from solution (with lower stoichiometry than quinchlorac, a monovalent anion, due to its +2 charge), thus indicating that CpCoCb systems have strong chemical interaction with these aromatic cations regardless of size and charge, with a possible driver being the large hydrophobic ligands having π-π and charge-induced dispersion interactions with the organic cations. An electroswing asymmetric cell with PCp-CoCbMA-CNT as the cathode and PVF-CNT as the anode was applied to an equimolar solution of 300 µM quinchlorac and 300 µM methyl viologen in the presence of 100 mM NaClO$_4$ (FIGS. 91C and 91D). It was observed that each electrode preserved its uptake capacity without interference from side-reactions, and that the pH remained unchanged during the sorption process. Assays of the liquid phase indicated that no organometallic leached from the heterogeneous asymmetric polymeric electrodes (PMAECoCp$_2$-CNT and PCpCoCbMA).

Discussion

When redox-cathodes were used, the electrochemical performance of asymmetric cells was improved significantly. During chronopotentiometry (+0.83 A/m$^2$), to sustain the same current density, higher voltages in the range of 0.35 V to 0.4 V (vs Ag/AgCl) were required for the operation of the PVF/CNT anode when solely conductive, non-redox counters were used (see FIG. 66A), with the PVF-CNT// CNT configuration requiring an anode potential of as high as +0.7 V. On the other hand, for the asymmetric system in which redox-organometallic complexes were used in the counter, lower overpotentials were required; in particular, the anode electrochemical potential for PVF-CNT// PMAECoCp$_2$-CNT was only ~0.15 V. In order to understand the voltage behaviour of the cell, the electrochemical potential of the cathode was tracked under equivalent chronopotentiometry conditions (see FIG. 93) and it was find that non-redox counters (e.g. Pt and CNT) reached much more negative overpotentials (−1 V to −1.4 V), thus promoting water reduction, whereas the redox-counter PMMAECoCp$_2$-CNT, on the other hand was maintained at the reduction redox-potential of the electroactive polymer (−0.79 V), where no water splitting occurs.

The specific capacitances for the combined asymmetric systems with the PVF-CNT as the anode and the various materials as the cathode were estimated based on CVs at 0.005 V/s in 100 mM LiClO$_4$ and a window of −0.2 V to 0.9 V (1.1 V range)[38] for the PVF-CNT working anode. The mass values used in the calculation accounted for the CNTs, organometallics and any binder that may be present. The asymmetric system with the cobaltocenium polymer (PMAECoCp2-CNT) as the counter had the highest specific capacitance, 498 F/g, which was almost a 70% increase over that of the symmetric system tested (FIG. 66C). The electrochemical charge was almost unchanged after cycles, with the polymerized-cobaltocenium counter providing comparable or higher charge than the symmetric PVF-CNT//PVF-CNT or the paste-electrode systems during all cycles.

Conclusions

Presented herein are dual-redox asymmetric Faradaic systems that can suppress hydrogen evolution and pH excursions during electrochemical processing operations, and pointed to their potential utility as more efficient counter-electrodes than solely EDLC materials for ion-selective electrochemical separations. These systems have been shown to be particularly effective at micropollutant organic contaminant removal, showing a combination of ion selectivity, high ion and reversibility. If a cation-selective redox-electrode is utilized, organic cations can be separated in tandem with organic anions, all the while preserving constant pH. In particular, from a molecular design perspective, redox-organometallics offer a facile route to tune operating windows through control of ligand and metal structure and the resulting redox-potential.[25,39] Although it may be desirable in many electrochemical capacitive applications to work with as wide an operating potential window as possible, this is not the case for other chemical processing applications such as separations or electrocatalysis in which the goal is to minimize the energy expenditure and perform the electrochemical task with minimal overpotentials. Faradaic materials, unlike capacitive ones, have a high charge and specific capacitance focused in a narrow window due to redox-mediated ion-binding. The asymmetric Faradaic systems may be used for a broad range of applications, such as for ion-selective capacitive or pseudocapacitive deionization, electrocatalysis, redox-based sensing and devices for energy storage, where organometallic interfaces may be a prime materials platform to achieve these goals. In particular, the electrochemical cells described in this Example and herein can have an immediate impact on water purification and micropollutant remediation as next-generation, fast-throughput separation devices.

Exemplary Methods and Methods

Electrode Preparation.

All asymmetric polymer electrodes were prepared through non-covalent functionalization. PVF-CNT: A poly (vinyl)ferrocene-carbon nanotube composite (PVF-CNT) was chosen as the working anode, and prepared through a reported non-covalent functionalization method.[40] For each electrode, 200 µL solution of a mixture of 40 mg PVF and 40 mg CNT in 10 mL chloroform was drop-cast and assembled as a homogeneous film onto conductive, Teflon-coated carbon fibers. These non-covalently functionalized PVF-CNT electrodes provide high-surface area systems for pseudocapacitive charge storage devices[36] as well as for high-surface area anion recognition and selective redox-mediated separation systems.[16] Both the PMAECoCp$_2$-CNT and the PCpCoCb-CNT cathodes were prepared by similar methods, but with different loadings of polymer to match the charge as described in the main text. PMAECoCp$_2$-CNT: A cobaltocenium-containing polymer, poly(2-(methacryloloxy)ethyl cobaltocenium) (PMAECoCp$_2$)[34, 35] was synthesized by free-radical polymerization. Instead of synthesizing the polymer through the acyl-chloride route, the methacrylate was coupled directly to mono-substituted cobaltocenium using DCC chemistry. The resulting polymer was then dispersed with CNTs in 10 mL DMSO (80 mg polymer+40 mg CNT) and drop-cast as a uniform film on Teflon-coated carbon fibers. Details of the synthesis can be found in the SI. XPS analysis shows that the major counter-ion for both the monomer and the resulting PMAE film was hexafluorophosphate (PF$_6^-$) (Co:P:F ratio in monomer 1:1.13:7.17 and 1:0.33:4.6 in polymer), with limited ion-exchange occurring during the polymerization step, and a final loading of 6.3% relative to carbon in the film, with the balance being oxygen from the methacrylate. PCpCoCbMA-CNT: Poly[η5-(1-oxo-4-methacryloyloxy-butyl)-cyclopentadienyl]cobalt(η4-tetraphenylcyclobutadiene) was synthesized based on a recently published procedure,[37] and electrodes were prepared by dropcasting from chloroform.

Electrochemical Testing.

The majority of the electrochemical tests were performed using a three-electrode system in 100 mM LiClO$_4$, with Ag/AgCl as the reference electrode, under N$_2$ purge to eliminate O$_2$ interference in the reduction process. For some of the competing electrolyte tests, 10 mM NaCl was also used to measure the effect of chloride fouling. Water electrolysis at the counter was studied by chrono-potentiometry at +100 µA for 600 s (0.83 A/m$^2$). The extent of H$_2$ evolution and OH$^-$ production was tracked through changes in solution pH, and subsequently converted to electrochemical charge. Cation-selective separation tests were performed in 100 mM NaClO$_4$ and 300 µM organic ion contaminant. In-situ UV-vis tests were performed in a custom made three-electrode cell with PCpCoCb-CNT as the working cathode, and PVF-CNT as the counter, with Ag/AgCl reference electrode. Asymmetric tests were operated in both three-electrode (with PVF-CNT as working) and two-electrode systems with similar results, with either PMAECoCp$_2$-CNT or PCpCoCbMA as the cathode and PVF-CNT as the anode. In a two-electrode system, a potential was applied of +1.5 V between PVF-CNT and the counter electrode.

Reagents and Methods.

All reagents were purchased from Sigma Aldrich and PolySciences without further purification unless otherwise noted. CpCoCb was synthesized according to literature.[1] All $^1$H NMR was performed on a Varian 500 MHz, and the Physical Electronics Versaproble II X-ray Photoelectron spectrometer was used for the analysis of the surface of the electrodes. The analysis was performed at ultra-high vacuum (10$^{-8}$ bar) with an argon-gun neutralizer. All electrochemical studies were performed on a VersaSTAT 4 potentiostat (Princeton Applied Research) with automatic IR compensation between 50 MΩ and 5Ω. The surface morphology of the electrodes were characterized by a FEG-XL-30 field-emission SEM at 20 kV using a beam size of 3 and high vacuum conditions for EDX, and a ZEISS Merlin High-Resolution SEM at 5 kV-20 kV for the high resolution images in the main text.

1. Electrode Preparation

PVF-CNT (Polyvinylferrocene-Functionalized Electrode):

The detailed preparation methods for the PVF-CNT electrodes are discussed in previous publications[2, 3] and also in Example 1. The base electrodes were prepared by cutting 2 cm by 1 cm swatches of Teflon-treated Toray carbon paper obtained from Electrochem Inc., then soldering them with copper tape and wire. The PVF/CNT electrodes were prepared by drop casting. A stock solution A of 80 mg poly (vinyl)ferrocene (PVF) (Polysciences, Inc) and 40 mg multiwalled-CNT (MWCNT, Sigma) was dissolved in 10 mL anhydrous chloroform. A stock solution B of 40 mg of CNT in 10 mL chloroform was also prepared. The two stock solutions were sonicated for 2 hours in icy water to optimize dispersion level. The PVF/CNT(1:1) ratio was prepared by mixing stocks A and B in a 1:1 ratio: 1 mL of A was mixed with 1 mL of B and sonicated for another 3 hours in an ice-bath, before drop-casting 50 µL, equivalent to a 1 drop PVF/CNT(1:1) and left to dry at 25° C. For sorption experiments, a 1:1 mass ratio of PVF to CNT was used with 4 drops (resulting in 4 µmoles of ferrocene units). PVF/CNT (1:2) was prepared by combining different amounts of the two stock solutions. For all the systems, the immersed electrochemical area is equivalent to 1.2 cm$^2$ (1 cm by 1.2 cm).

CoCp$_2$-CNT-Cp (Cobaltocenium-Paste Electrode):

20 mg of cobaltocenium hexaflourophosphate (Strem Chemicals, 98%), 20 mg of carbon paste (BASI Carbon Paste, Oil Base), and 10 mg of carbon nanotubes (Sigma-Aldrich, Multi-Walled, >95%) were added to 5 mL of chloroform (Sigma-Aldrich, 99.9%). The solution was sonicated in an ice bath for a minimum of 45 minutes, and then drop cast onto 1 cm×2 cm strips of Teflon-treated carbon conductive paper (ElectroChem Incorporated, EC-TP1-060T), which had been brushed lightly 5-10 times on each side with a razorblade. A total of four 50 µL drops were drop cast onto each strip, with two drops on each side. The second drop on each side was drop cast only after the first drop had dried. Once the last of the drops finished drying, each strip was attached to a copper wire using conductive copper tape.

Rubpy-CNT-Cp (Ruthenium-Paste Electrode):

40 mg of cis-Dichlorobis(2,2'-bipyridine)ruthenium(II) (Sigma-Aldrich, 97%) and 40 mg of carbon paste (BASI Carbon Paste, Oil Base) were added to 5 mL of N,N-Dimethylformamide (DMF) (Sigma-Aldrich, 99.9%) to form one solution, and 20 mg of carbon nanotubes (Sigma-Aldrich, Multi-Walled, >95%) was added to 5 mL of DMF to form a second solution. Both solutions were sonicated separately in a water bath at room temperature for a minimum of 45 minutes, before being combined and sonicated again in a water bath at room temperature for a minimum of 45 minutes. The solution was then drop cast onto 1 cm×2 cm strips of Teflon-treated carbon conductive paper (Electro- Chem Incorporated, EC-TP1-060T). A total of four 50 μL drops were drop cast at the same time onto one side of each strip. The strips were dried in a vacuum oven at 80° C. and −30 mmHg for 3-4 minutes (until dry). Each strip was attached to a copper wire using conductive copper tape.
Potassium-Ferricyanide (Potassium Ferricyanide-Paste Electrode):

40 mg of potassium ferricyanide, 40 mg of carbon paste (BASI Carbon Paste, Oil Base) and 20 mg of CNT were mixed in a mortar and pestle, and 3 mg was pasted onto the surface onto a 1 cm×2 cm strips of Teflon-treated carbon conductive paper (ElectroChem Incorporated, EC-TP1-060T). Two drops of chloroform were applied on top of the surface to smooth the surface. Each strip was attached to a copper wire using conductive copper tape. For the sodium ferrocyanide system, 80 mg of sodium ferrocyanide, 20 mg CNT, and 20 mg carbon paste were mixed in 20 mL DMF, sonicated for a minimum of 45 minutes and similar to the previous organometallics, drop-cast onto carbon fiber electrodes and dried in vacuum for 3-4 minutes.
PMAECoCp$_2$-CNT (Cobaltocenium-Polymer Functionalized Electrode):

Poly(2-(methacrylolyoxy)ethyl cobaltocenium) (PMAECoCp$_2$) was synthesized according to the procedures outlined below. 20 mg of PMAECpCp$_2$ and 10 mg of CNT were dispersed in 5 mL of DMSO by sonication for 45 minutes at room temperature. A total of 200 uL of solution was drop-cast onto 1 cm×2 cm strips of Teflon coated-carbon paper for a 4-drop electrode. The strips were dried in a vacuum oven at 80° C. and −30 mmHg for 3-4 minutes (until dry). Each strip was attached to a copper wire using conductive copper tape. Depending on the amount of PVF/CNT on the working electrode, the amount of PMAECoCp$_2$-CNT can be varied to match the charges on the electrodes. The PMAECoCp$_2$ electrodes were characterized accordingly by XPS and SEM.
PCpCoCbMA-CNT ((Cyclopentadienyl)Cobalt(Tetraphenyl-Cyclobutadiene)-Polymer Functionalized Electrode):

16 mg of CNT were dispersed in 4 mL of chloroform by sonication for 45 minutes at 0° C. Then 16 mg poly[η$^5$-(1-oxo-4-methacryloyloxy-butyl)-cyclopentadienyl]cobalt(η$^4$-tetraphenylcyclobutadiene) (PCpCoCbMA) are added and the dispersion is sonicated for another 45 min. A total of 200 μL of solution was drop-cast onto 1 cm×2 cm strips of Teflon coated-carbon paper for a 4-drop electrode. The strips were dried at room temperature. Each strip was attached to a copper wire using conductive copper tape.

2. Cobaltocenium Polymer Synthesis

The synthesis procedure for Poly(2-(methacrylolyoxy) ethyl cobaltocenium) (PMAECoCp$_2$) with a hexafluorophosphate counter-ion was adapted from literature.[4-6]

2.1. 2-(Methacrylolyoxy)Ethyl Cobaltocenium Hexafluorophosphate (MAECoPF$_6$).

As opposed to following the acyl-chloride route previously reported,[5] mono-carboxylcobaltocenium was directly coupled with (hydroxyethyl)methacrylate (HEMA) using Steglich esterification. Mono-substituted carboxylcobaltocenium (1.2 g, 3.17 mmol) was dissolved with HEMA (0.62 g, 4.76 mmol) and N,N-dimethylamino pyridine (DMAP, 0.74 g, 6.02 mmol) in 30 ml anhydrous acetonitrile, A solution of N,N'-dicyclohexylcarbodiimide (DCC, 0.73 g, 3.52 mmol) in 10 ml acetonitrile was added slowly at 0° C. The mixture was then stirred at room temperature for 16 hours. The reaction mixture was filtered to remove N,N'-dicyclohexylurea. The solution was diluted with Dichloromethan and subsequently washed with 1 μM HCl, 1 μM NaOH and water. The organic phase was dried with MgSO$_4$, filtered and concentrated under reduced pressure. MAECoPF$_6$ was precipitated by adding diethylether. The yellow product was filtered, washed with diethylether and dried under vacuum. Yield: 600 mg $^1$H NMR (D$_6$-DMSO, δ, ppm): 6.27 (t, 2H, Cp), 6.22 (m, 1H, CH$_2$=C), 6.11 (t, 2H, Cp), 5.99 (s, 5H, Cp), 5.93 (m, 1H, CH$_2$=C), 4.54 (m, 2H, OCH$_2$CH$_2$O), 4.46 (m, 2H, OCH$_2$CH$_2$O), 1.90 (m, 3H, CH$_3$).

2.2. Free-Radical Polymerization of MAECoPF$_6$

The monomer MAECoPF$_6$ (300 mg, 0.61 mmol) and AIBN (1.97 mg, 0.012 mmol) were dissolved in 3 mL THF in a Schlenktube. The vessel was flushed with nitrogen, and the mixture was heated to 70° C. for 20 hours. The product was precipitated in 40 mL dichloromethane, and by centrifugation. The final average molecular weight was found to be 184200 g/mol using gel permeation chromatography (GPC) by comparing to PMMA standards.

2.3. Synthesis of PCpCoCbMA

PCpCoCbMA was synthesized according to previously published literature procedures.[7] The free radical polymerization of [∂2$^5$-(1-carboxy-propylmethacrylate)-cyclopentadienyl]cobalt(η$^4$-tetraphenylcyclobutadiene) is described below.

The cobalt-containing methacrylate CpCoCbMA (500 mg, 0.8 mmol, 1 equiv.) was dissolved in a solution of AIBN (13.15 mg, 0.08 mmol) in toluene (3.25 mL) and stirred for 24 hours at 60° C. The polymer was precipitated in 50 mL methanol, collected by centrifugation, dissolved in DCM and precipitated in methanol again. The obtained polymer was dried in vacuum yielding a yellow solid (60 mg, 12%).

$M_n$: 8900 g mol$^{-1}$, $M_w$: 18600 g mol$^{-1}$, PDI: 2.09 (SEC vs. PS standards)

$M_w$: 56000 g mol$^{-1}$ g mol$^{-1}$ (SEC-MALLS)

$^1$H NMR (300.0 MHz, CDCl$_3$): δ 7.40 (b, 8H; Ph); 7.12 (b, 12H; Ph); 5.11 (b, 2H; Cp); 4.61 (b, 2H; Cp); 3.60 (b, 2H; CH$_2$); 1.88 (b, 2H; CH$_2$); 1.42 (b, 2H; CH$_2$); 0.78 ppm (b, 3H; α-CH$_3$)

3. Electrochemical Characterization and Parameters

TABLE 2

Table of reduction potentials for the heterogeneous-redox functionalized electrodes) in 100 mM LiClO$_4$.

| Redox organometallic | $E_{red,\ 1/2}$ vs Ag/AgCl in 100 mM LiClO$_4$ (25° C.) |
|---|---|
| PVF$^+$-CNT | +0.12 V |
| Rubpy$^+$-CNT-cp | +0.18 V |
| Fecy$^+$-CNT-cp | +0.15 V |
| PMMAECoCp$_2$$^+$-CNT | −0.8 V |
| PCoCpCbMA-CNT | −0.45 V |
| Water reduction | −1.1 V |

4. pH Tests and Capacitance Calculations

The pH tests were conducted with an in-situ pH probe (Thermo Scientific Orion pH Probe) placed in the solution through a modified 4 entrance cell top. All pH tests, unless otherwise stated, were carried out using 0.1 M LiClO$_4$ in 6 mL deionized water (MiliQ). Moderate constant stirring of the solution was effected throughout each test with the placement of a small stir bar in the center of the cell. The electrodes and pH probe were positioned at a constant submerged depth and in a manner to avoid physical interference from the stir bar. Nitrogen purge was maintained during the entire hydroxide formation test. Prior to starting each test, nitrogen was bubbled through the solution until pH equilibrium was reached, after which the nitrogen purge tip was lifted to maintain the purge above the solution. After the equilibrium pH readings with purge tip inside and above the solution were taken, the test was started and the pH reading was measured every 10 seconds thereafter.

The obtained pH readings were then converted to yield the amount of charge used to produce hydroxide ions through water splitting, as follows:
Converting pH to Moles:

$$n_{OH^-produced}(t) = V_{solution}((10^{-(14-pH(t))}) - (10^{-(14-pH(t=0))}))$$

Converting Moles to Charge Through Faraday's Laws of Electrolysis:

$$Q_{OH^-produced}(t) = n_{OH^-produced}(t) * F * Z_{OH^-}$$

The electrochemical capacitances for the single electrodes (PMMAECoCp$_2$ and PVF-CNT) were performed by integrating CVs areas and a scan-rate at 5 mV/s in 100 mM LiClO$_4$ with Pt as the counter, and using the mass of the active organometallics+CNT as the specific value $$C = \frac{\int i(E)dE}{v(E_2 - E_1)} \cdot \frac{1}{m_{electrode}} \cdot E_2 - E_1$$

is the potential window, with v being the scan-rate. For the combined asymmetric systems, PVF-CNT was maintained as the working anode, and the various electrodes with varying redox-organometallics were used as the counter-cathodes $$C = \frac{\int i(E)dE}{v(E_2 - E_1)} \cdot \frac{2}{(m_{PVF-CNT} + m_{counter})},$$

with again the masses including both PVF, CNT and any binder.

5. Hydroxide Production Results of PVF-CNT//Pt Configuration at Varying Concentrations of Electrolyte.

The results of the PVF-CNT//Pt hydroxide production at varying concentration of electroyltes are shown in FIG. 73. The chronoamperometry of PVF-CNT//CoCp$^+$-CNT-cp at 25 mM LiClO$_4$ is shown in FIG. 74. A comparison of electrochemical charge storage of system with PVF//CNT as working electrode in 3-electrode cell configuration, obtained through CV for a 1.2 V range in 0.005 V/s in 100 mM LiClO$_4$. Is shown in FIG. 75. The survey XPS spectra of PMAECoCp2-CNT functionalized electrodes with PF6$^-$ as the counter-ion (in at % C1s 62.5%, F1s 15.5%, O1s 13%, Co2p3 3.3%, P2p 1.3%, N1s 1.2%, Na1s 0.4%, remainder, 2.9%) is shown in FIG. 76. The survey XPS spectra of PMAECoCp2-monomer (in at % C1s 66.7%, F1s 16.5%, O1s 7.9%, Co2p3 2.3%, P2p 2.6%, N1s 4%) is shown in FIG. 77.

6. Rotating Disk Electrode

Rotating Disk Electrode.

Linear sweep voltammetry experiments were performed using a BASi RDE-2 rotating disk electrode system connected to a VersaSTAT 4 potentiostat (Princeton Applied Research). The tests were conducted using 20 mL of solution in a BASi water-jacketed glass cell with a 3 mm diameter glassy carbon working electrode, a coiled platinum wire auxiliary electrode, and a silver/silver chloride reference electrode. For each run, the potential was swept from the initial potential to the final potential, and then in the reverse direction in order to revert the analyte to its original redox state. The open-circuit potentials were also obtained separately. The concentrations of Rubpy and CpCoCb utilized were equivalent to their solubility limits in the solvents used, and were determined through nuclear magnetic resonance (NMR) spectroscopy of their saturated solutions.

Tafel Plots.

The charge-transfer coefficients, α, and the standard rate constants, k$^0$, for each redox couple system were estimated using Tafel plots. Tafel behavior is observed in the limit of large overpotentials, and can be derived readily from the Butler-Volmer equation in the charge-transfer controlled regime[8]:

$$i_k = i_0 \left( e^{\left(\frac{-\alpha nF}{RT}\eta\right)} - e^{\left(\frac{(1-\alpha)nF}{RT}\eta\right)} \right)$$

Where $i_k$ is the current in the absence of mass-transfer limitations, $i_0$ is the exchange current, η is the overpotential (defined as E−E$_{eq}$), E is the applied potential, E$_{eq}$ is the equilibrium potential (equal to the open-circuit potential at thermodynamic equilibrium), n is the number of electrons transferred, F is Faraday's constant, R is the gas constant, and T is the temperature.

For high overpotentials $$\left(|\eta| \gg \frac{RT}{nF}\right),$$

the response reduces to:

$$\log|i_k| = \log i_0 + \frac{\alpha nF}{RT}|\eta|$$

for the cathodic branch $$\log|i_k| = \log i_0 + \frac{(1-\alpha)nF}{RT}|\eta|$$

for the anodic branch

The slope and y-intercept of a plot of log |$i_k$| against |η| reveal α and k$^0$, respectively. Since the Tafel relationship applies for unidirectional and totally irreversible faradaic processes, good Tafel responses are best observed when electrode kinetics are sluggish and significantly high overpotentials are applied. For the systems tested in this study, the Tafel slopes were analyzed starting at an overpotential of at least 0.12 V, which arises from the assumption that the contribution from the backward reaction must be less than 1% of the forward reaction. For a quasi-reversible system, the proper selection of scan rate can also allow for the observation of irreversible behavior. A quasi-reversible system follows the relation suggested by Matsuda and Ayabe (1955)[9]:

$$|E_p - E_{p/2}| = \Delta(\Lambda, \alpha)\left(\frac{RT}{F}\right), \Lambda = \frac{k^0}{\left(\frac{DF}{RT}v\right)^{\frac{1}{2}}}$$

Where E$_p$ is the peak potential, E$_{p/2}$ is the potential where the current is equal to half of the current at the peak potential, $k^0$ is the standard rate constant, D is the diffusivity of the redox couple species (assumed to be the same for both the oxidized and reduced species), and v is the scan rate.

For a totally irreversible system, $$\Delta(\Lambda, \alpha) = \frac{1.857}{\alpha},$$

and is reached for a suggested zone boundary of $\Lambda \leq 10^{-2(1+\alpha)}$. Based on order of magnitude estimates, a scan rate of 10 mV/s for the LSV tests was selected to try and meet this criterion. For each redox couple system, a Tafel plot was constructed for the LSV attained under the highest rotation speed tested. The Koutecky-Levich equation was used to correct the measured current responses from the LSVs for mass-transfer limitations:

$$i_k = \frac{i * i_l}{i_l - i}$$

Where i is the current response, and $i_l$ is the limiting current under mass-transfer control (determined from the constant current response of the plateau portion in the LSVs at high overpotentials).

At thermodynamic equilibrium, the oxidation/reduction rate constant reduces to the standard rate constant, and the current in the absence of mass-transfer limitations reduces to the exchange current. Thus, the exchange current can be described with the following relation to yield the standard rate constant:

$$i_0 = nFAk^0C^*$$

Where A is the area of the electrode, and $C^*$ is the bulk concentration of the analyte in solution.

TABLE 3

Charge-transfer coefficients ($\alpha$) and standard rate constants ($k^0$) for the investigated redox couple systems at the highest working electrode rotation speed tested

| Redox couple system | Open circuit potential (V vs. Ag/AgCl) | $\alpha$ | $k^0$ (m/s) |
|---|---|---|---|
| 1 mM Fc, 100 mM TBaBF$_3$ in MeCN | 0.32 | .72 | 1.11 * 10$^{-5}$ |
| 1 mM Fc, 10 mM TBaBF$_3$ in MeCN | 0.35 | .82 | 7.71 * 10$^{-6}$ |
| 30 µM CpCoCb, 10 mM TBaBF$_3$ in MeCN | −0.39 | .14 | 8.17 * 10$^{-7}$ |
| 25 µM CpCoCb, 10 mM TBaBF$_3$ in DMSO | −0.45 | .18 | 1.55 * 10$^{-6}$ |
| 1 mM CoCp$_2$PF$_6$, 10 mM TBaBF$_3$ in MeCN | −0.40 | .10 | 2.19 * 10$^{-6}$ |
| 80 µM Rubpy, 10 mM TBaBF$_3$ in MeCN | 0.25 | .73 | 1.16 * 10$^{-5}$ |

7. Additional Separation Data

The recovery factor of quinchlorac between redox counter and CNT (non-existent) under various competing electrolyte concentration is shown in FIG. 98. The high-resolution XPS of cobalt in PCoCpCbMA is shown in FIG. 99. The high-res XPS of Na1s vs N1s of butyl pyridinium adsorbed on a PCoCpCbMA-CNT electrode is shown in FIG. 100. The reversible adsorption of butyl-pyridinium (300 uM But-pyr with 100 mM NaClO$_4$) under potential using PCoCpCbMA-CNT//PVF-CNT. Adsorption under −0.7 V and desorption under 0 V is shown in FIG. 101. FIG. 102 shows chronoamperometry at 1.5 V of various configurations of PVF-CNT with various counters. Charging is much more significant with the asymmetric electrode counter PMMAECoCp$_2$-CNT.

REFERENCES

1. Elimelech, M. & Phillip, W. A. The Future of Seawater Desalination: Energy, Technology, and the Environment. *Science* 333, 712-717 (2011).
2. Shannon, M. A. et al. Science and technology for water purification in the coming decades. *Nature* 452, 301-310 (2008).
3. Alsbaiee, A. et al. Rapid removal of organic micropollutants from water by a porous beta-cyclodextrin polymer. *Nature* 529, 190-U146 (2016).
4. Khin, M. M., Nair, A. S., Babu, V. J., Murugan, R. & Ramakrishna, S. A review on nanomaterials for environmental remediation. *Energy & Environmental Science* 5, 8075-8109 (2012).
5. Suss, M. E. et al. Water desalination via capacitive deionization: what is it and what can we expect from it? *Energy & Environmental Science* 8, 2296-2319 (2015).
6. Porada, S. et al. Direct prediction of the desalination performance of porous carbon electrodes for capacitive deionization. *Energy & Environmental Science* 6, 3700-3712 (2013).
7. Grimm, J., Bessarabov, D. & Sanderson, R. Review of electro-assisted methods for water purification. *Desalination* 115, 285-294 (1998).
8. Porada, S., Zhao, R., van der Wal, A., Presser, V. & Biesheuvel, P. M. Review on the science and technology of water desalination by capacitive deionization. *Progress in Materials Science* 58, 1388-1442 (2013).
9. Zhao, R., Satpradit, O., Rijnaarts, H. H., Biesheuvel, P. M. & van der Wal, A. Optimization of salt adsorption rate in membrane capacitive deionization. *Water Res* 47, 1941-1952 (2013).
10. Anderson, M. A., Cudero, A. L. & Palma, J. Capacitive deionization as an electrochemical means of saving energy and delivering clean water. Comparison to present desalination practices: Will it compete? *Electrochim Acta* 55, 3845-3856 (2010).
11. Walter, M. G. et al. Solar Water Splitting Cells. *Chemical Reviews* 110, 6446-6473 (2010).
12. Stibor, I. & Ansyln, E. Anion Sensing Vol. 255. (Springer-Verlag, Berling; 2005).
13. Beer, P. D. & Bayly, S. R. in Anion Sensing, Vol. 255. (ed. I. Stibor) 125-162 (2005).
14. Beer, P. D. & Hayes, E. J. Transition metal and organometallic anion complexation agents. *Coordination Chemistry Reviews* 240, 167-189 (2003).
15. Lee, J.-H., Bae, W.-S. & Choi, J.-H. Electrode reactions and adsorption/desorption performance related to the applied potential in a capacitive deionization process. *Desalination* 258, 159-163 (2010).
16. Su, X., Kulik, H. J., Jamison, T. F. & Hatton, T. A. Anion-Selective Redox Electrodes: Electrochemically Mediated Separation with Heterogeneous Organometallic Interfaces. *Advanced Functional Materials* 26, 3394-3404 (2016).
17. Pasta, M., Wessells, C. D., Cui, Y. & La Mantia, F. A Desalination Battery. *Nano Letters* 12, 839-843 (2012).
18. La Mantia, F., Pasta, M., Deshazer, H. D., Logan, B. E. & Cui, Y. Batteries for Efficient Energy Extraction from a Water Salinity Difference. *Nano Letters* 11, 1810-1813 (2011).

19. Wang, R. Y. et al. Reversible Multivalent (Monovalent, Divalent, Trivalent) Ion Insertion in Open Framework Materials. *Advanced Energy Materials* 5 (2015).
20. Augustyn, V., Simon, P. & Dunn, B. Pseudocapacitive oxide materials for high-rate electrochemical energy storage. *Energy & Environmental Science* 7, 1597-1614 (2014).
21. Burkhardt, S. E. et al. Tailored redox functionality of small organics for pseudocapacitive electrodes. *Energy & Environmental Science* 5, 7176-7187 (2012).
22. Su, X. & Hatton, T. A. Redox-electrodes for selective electrochemical separations. *Advances in Colloid and Interface Science* In Press (2016).
23. Chen, W. & Xia, X. H. Highly stable nickel hexacyanoferrate nanotubes for electrically switched ion exchange. *Advanced Functional Materials* 17, 2943-2948 (2007).
24. Achilleos, D. S. & Hatton, T. A. Selective Molecularly-Mediated Pseudocapacitive Separation of Ionic Species in Solution. *ACS Applied Materials & Interfaces* Accepted (2016).
25. Whittell, G. R. & Manners, I. Metallopolymers: New multifunctional materials. *Advanced Materials* 19, 3439-3468 (2007).
26. Bellas, V. & Rehahn, M. Polyferrocenylsilane-based polymer systems. *Angewandte Chemie-International Edition* 46, 5082-5104 (2007).
27. Gallei, M. & Elbert, J. in Functional Metallosupramolecular Materials. (eds. J. G. Hardy & F. H. Schacher) 120-148 (Royal Society of Chemistry, Cambridge; 2015).
28. Mao, X., Simeon, F., Achilleos, D. S., Rutledge, G. C. & Hatton, T. A. Metallocene/carbon hybrids prepared by a solution process for supercapacitor applications. *Journal of Materials Chemistry A* 1, 13120-13127 (2013).
29. Song, J. et al. Redox-controlled release of molecular payloads from multilayered organometallic polyelectrolyte films. *Journal of Materials Chemistry B* 1, 828-834 (2013).
30. Durkee, D. A. et al. Catalysts from self-assembled organometallic block copolymers. *Advanced Materials* 17, 2003-+(2005).
31. Elbert, J. et al. Reversible Activity Modulation of Surface-Attached Grubbs Second Generation Type Catalysts Using Redox-Responsive Polymers. *Macromolecules* 46, 4255-4267 (2013).
32. Mao, X. W., Tian, W., Rutledge, G. C. & Hatton, T. A. Electrochemically Responsive Heterogeneous Catalysis for Controlling Reaction Kinetics. *J Am Chem Soc* (2015).
33. Stojanovic, R. S. & Bond, A. M. Examination of conditions under which the reduction of the cobaltocenium cation can be used as a standard voltammetric reference process in organic and aqueous solvents. *Analytical Chemistry* 65, 56-64 (1993).
34. Ren, L. X., Hardy, C. G. & Tang, C. B. Synthesis and Solution Self-Assembly of Side-Chain Cobaltocenium-Containing Block Copolymers. *J Am Chem Soc* 132, 8874-+(2010).
35. Ren, L. X. et al. Preparation of Side-Chain 18-e Cobaltocenium-Containing Acrylate Monomers and Polymers. *Macromolecules* 43, 9304-9310 (2010).
36. MacFarland, D. K. & Gorodetzer, R. Rotor-shaped cyclopentadienyltetraphenylcyclobutadienecobalt—An advanced inorganic experiment. *Journal of Chemical Education* 82, 109-110 (2005).
37. Ruttiger, C. et al. One for all: cobalt-containing polymethacrylates for magnetic ceramics, block copolymerization, unexpected electrochemistry, and stimuli-responsiveness. *Polymer Chemistry* 7, 1129-1137 (2016).
38. Stoller, M. D. & Ruoff, R. S. Best practice methods for determining an electrode material's performance for ultracapacitors. *Energy & Environmental Science* 3, 1294-1301 (2010).
39. Vorotyntsev, M. A. & Vasilyeva, S. V. Metallocene-containing conjugated polymers. *Advances in Colloid and Interface Science* 139, 97-149 (2008).
40. Mao, X., Rutledge, G. C. & Hatton, T. A. Polyvinylferrocene for Noncovalent Dispersion and Redox-Controlled Precipitation of Carbon Nanotubes in Nonaqueous Media. *Langmuir* 29, 9626-9634 (2013).

Example 3: Selective Molecularly-Mediated Pseudocapacitive Separation of Ionic Species in Solution Presented herein is the development of a dual-electrode Pseudocapacitive Separation Technology (PSST) to capture quantitatively, remotely, and in a reversible manner, value-added carboxylate salts of environmental and industrial significance. The nanostructured pseudocapacitive cell exhibits elegant molecular selectivity towards ionic species: upon electrochemical oxidation, a poly(vinyl ferrocene) (PVF)-based anodic electrode shows high selectivity towards carboxylates based on their basicity and hydrophobicity. Simultaneously, on the other side of the electrochemical cell, a poly(anthraquinone) (PAQ)-based cathodic electrode undergoes electrochemical reduction and captures the counterions of these carboxylates. The separation and regeneration capability of the electrochemical cell was evaluated through the concentration variations of the carboxylates in polar organic solvents often used in electrocatalytic processes upon electrochemical charging and neutralization of the polymeric cargo of the electrodes, respectively. The strong separation efficiency of the system was indicated by its ability to capture an individual carboxylate (acetate, formate or benzoate) selectively over other competing ions present in solution in significant excess, with an electrosorption capacity in the range of 122 to 157 mg/g. The ion sorption capacity of the cell was high even after 5 adsorption/desorption cycles (18,000s of continuous operation). In addition, the cell exhibited molecular selectivity even between two carboxylates (e.g., between benzoate and acetate or formate) which differ only in terms of basicity and hydrophobicity. This strategy may be employed as a versatile platform for selective ion separations. In particular, the functionalization of electrochemical cells with the proper polymers would enable the remote and economically viable electro-mediated separation of the desired ionic species in a quantitative and reversible manner.

Carboxylates are of high environmental, biological and industrial significance as they are employed in fuels, pharmaceuticals, and as chemical feedstocks for the synthesis of useful organic substances.[1] The environmental significance of these species is becoming more evident as formates, acetates and oxalates are value-added products of the catalytic/electrocatalytic fixation of carbon dioxide ($CO_2$).[2] Formates, which can be formed by the catalytically-controlled reaction of $H_2$ and $CO_2$, are also promising liquid hydrogen-storage media.[3] Acetates are the main products of the catalytic conversion of methane, the main component of natural gas, in the presence[4] or absence of $CO_2$[5] or upon the addition of carbon monoxide (CO).[6] Many pharmaceuticals are also carboxylates, some of which have recently been synthesized in organic media via an alternative to the classical synthetic approaches; the carboxylation[7] or electrocarboxylation[8-9] of benzyl halides with $CO_2$ as the C1 source.[10] In addition, various aliphatic and aromatic carboxylates of industrial significance are derived during the catalytic carboxylation of numerous substances[11-13] with $CO_2$ as the carboxylative agent.

To achieve the quantitative production of the carboxylates from these processes, the separation techniques to be employed for their isolation from the reaction media should be as efficient as their synthetic approaches. This is crucial when the industrial and environmental importance of these species as viable energy sources, starting materials for various organic reactions, and compounds of great interest in the pharmaceutical industry, is recognized.[2,10,14-15] The development of a versatile separation technology for these carboxylates requires consideration of the diverse experimental protocols that govern their synthetic routes. These reactions often take place in pure aqueous[3] or organic phases,[2,16] aqueous/organic binary mixtures[17] or acidic media[5] utilizing metals,[18] transition-metal complexes[2-3,16] or conducting polymers[19] as the catalytically active species. The carboxylate that is produced, formate, acetate or oxalate, depends crucially on the reaction medium.[2-3,5,7,11-12,16-17,20] The use of organic solvents over aqueous media is highly preferred during these reactions, since they facilitate high Faradaic efficiencies and improved reaction yields. This is due to the higher solubility of $CO_2$ in these solvents than in aqueous media.[21]

Although significant efforts have been devoted to the enhancement of the turnover number of the catalytic processes discussed above, efficient separation processes for the isolation of the products without imposing decreased reaction yields or byproduct formation have received far less attention. The separation of carboxylates often relies on their precipitation out of the solution phase; a background electrolyte is employed with suitable cations which, upon ion-pairing with the carboxylates, results in insoluble complexes.[2,16] Some fraction of these crystalline compounds can cover the electrode surface, hamper the electron transfer, and thus decrease the yield of the electrocatalytic process.[2] They also impose diffusional limitations during the migration of the catalytically active species, which often exist in solution, to the working electrode with a resulting decrease in the overall reaction rate. These precipitates are, for instance, considered to be responsible for the formation of dimeric byproducts and a decreased reaction yield during the electrocarboxylation of α-methylbenzyl halides to form the non-steroidal anti-inflammatory (NSAID) drugs.[22] An alternative separation approach for carboxylates involves first the acidification of the crude reaction mixture, followed by extraction with an organic solvent,[23] often with inadequate or only partial isolation of the product. Thus, there is a great demand for the development of a simple and straightforward separation process that would enable stable reaction rates, inhibit the formation of side-products and provide fast, quantitative and selective isolation of the desired product. Such a technology would also facilitate higher turnover numbers and more cost-efficient utilization of catalysts.

The development of a robust separation technology that would facilitate the isolation of carboxylates, based not solely on their charge but also on their molecular attributes such as basicity and hydrophobicity, requires a high level of design. Differences in the charge-to-radius ratio, hydrophobicities and basicities of the ions to be separated compared with those of others coexisting in solution should be exploited in the development of new separation technologies.[24] Given that many synthetic approaches for carboxylates are electrochemically driven, as discussed above, an electro-regulated separation technology would seem to be ideal for the in-situ separation of these carboxylates upon formation. Capacitive Deionization (CDI), an electro-mediated deionization technology that has been applied for many years[25-28] for water desalination, relies on the sequestration of ions in the electric double layers established on electrode surfaces upon application of a potential across the cell. In the early stages of development, CDI showed limited desalination capacity, especially at high ion concentrations, and little discrimination between ions in solution. Significant efforts over the past decade have been made to overcome these problems, however, resulting in the development of advanced membrane-based,[29] flow-through,[30] wire-based,[31] microbial[32] and hybrid deionization technologies,[33] and in battery systems[34] of higher deionization capacity. Modern electrodes based on graphene,[35] vertically aligned CNTs,[36] metal oxides such as $TiO_2$,[37] and $ZnO_2$,[38] graphene/metal oxide hybrids[39] and graphene-polypyrrole-Mn composites[40] have been prepared for this purpose. In some of these systems, the cell electrodes showed detectable affinity towards specific ions in solution. More specifically, $Na^+$ ions have been captured efficiently by an electrochemical cell upon reaction with the $Na_4Mn_4O_{18}$ electrode[33] whereas the $Li^+$ ion has been separated by insertion in $LiFePO_4$[41] or λ-$MnO_2$-based electrodes.[42] Porous carbon electrodes have exhibited time-dependent selectivity towards $Ca^{2+}$,[43] which could also be removed selectively from solution upon adjustment of the pore-size of carbon molecular sieves by chemical vapor deposition (CVD).[44] $NO^{3-}$ ions were also adsorbed selectively by carbon electrodes coated with an ion-exchange resin[45] and by a membrane-based CDI system.[46]

Despite the recent advances in the field of CDI, however, the existing electrochemical cells lack molecular selectivity for organic ions such as carboxylates, particularly when they are in solution with a vast excess of competing electrolyte ions. Such a selective separation mechanism could be established upon functionalization of the electrodes with electroactive species which exhibit two redox states. Upon proper electrical stimulation, the redox species show either high or no affinity towards the carboxylates, depending on redox state, and thus can capture and release them, respectively, in a controlled and remote manner. It is important that the electroactive species of the electrodes have selectivity between carboxylates, since very often a carboxylated product and catalyst coexist.[47]

Electroactive molecules that have shown affinity for carboxylates include quinones fused with chromophores,[48] ruthenium-, rhenium- or osmium-based complexes,[49-50] and ferrocene-based molecular entities.[51-52] Of these, the archetypal ferrocene/ferrocenium single-electron redox couple is an ideal candidate for the elegant and molecularly-driven capture of carboxylates from solution, as shown in Example 1.[53] In general, electrocatalytic processes are carried out in the presence of excess electrolyte which results in the formation of the respective carboxylate salts. In particular, lithium carboxylates are formed during the electrocatalytic conversion of $CO_2$,[2,16-17] and potassium carboxylates are the products of the electrocatalytic $CO_2$ conversion,[54] carboxylation of terminal alkynes,[12] or $CO_2$ hydrogenation.[55] As such, a second electrode is required which, upon electrical stimulation, possesses negative charge and captures selectively the cationic counterparts of the carboxylate anions to ensure electroneutrality in the solution phase. Quinones are example electroactive molecules with selectivity towards $Li^+$ and $K^+$ cations.[56]

Herein, the development of a two-electrode Pseudocapacitive Separation Technology (PSST) for the electrochemically-controlled recovery of value-added carboxylates from process streams (FIG. 78A) was reported. PSST establishes a distinctive separation principle from CDI, despite the fact that it shares similar features with this technology. In particular, the focus is not on the deionization of a feed stream but on the targeted removal of dilute organic anions and their counterions from a concentrated electrolyte solution. To achieve this goal, (i) the synergistic contribution from electrostatic interactions between the target ions and the oppositely charged electrodes, and (ii) the selective molecularly-driven interactions between the carboxylate salts and the well-designed macromolecules adhering to the electrodes were exploited. More specifically, the anodic electrode (FIG. 78A,$a_1$, left electrode) is redox-responsive due to its functionalization with poly(vinyl ferrocene) (PVF, blue species in FIG. 78A,$a_1$). Upon electrical stimulation, it is bestowed with an excess of positively charged species (green moieties in FIG. 78A,$a_2$) which capture the ionized carboxylates (purple and brown triangular species in FIG. 78A,$a_2$) and separate them from the aprotic organic phase. At the same time, the cathodic electrode of the electrochemical cell (FIG. 78A,$a_1$, right electrode), which is functionalized with the conducting polymer poly(anthraquinone) (PAQ) (red species in FIG. 78A,$a_1$), upon electrical stimulation carries a substantial number of negatively-charged moieties (light-green in FIG. 78A,$a_2$). These species show selectivity towards the counterions of the carboxylates (pink spheres in FIG. 78A,$a_2$) present in numerous catalytic processes of environmental and industrial significance.

The active surfaces of the PVF- and PAQ-based electrodes are regenerated and the desired ionic species are released, when the electrochemical cell is provided with fresh electrolyte (FIG. 78A,$a_3$) and the potential is reversed (FIG. 78A,$a_4$). A new separation cycle starts following removal of the collected solutes, and upon charging the pseudocapacitive cell in the presence of a fresh solution from which the desired ions are to be separated. Some aspects described herein, at least in part, stem from the novel design and development of a pseudocapacitive cell which shows molecular selectivity towards certain ionic species, based on their geometrical and chemical characteristics. Such an electro-mediated process may open new routes for the establishment of a versatile and economically viable separation approach for carboxylates and/or other ionic species, based upon rational design of the constituent electrodes of the cell.

Results and Discussion

The need for effective means for the separation of value-added ionic carboxylates from organic media is addressed here via the establishment of a versatile electro-mediated separation technology with a high degree of selectivity towards these species. An exemplary approach is based on the integration of anodic and cathodic electrodes functionalized with appropriate redox-responsive and conducting polymers, which show molecular affinity towards certain anionic and cationic species, respectively, in a single system.

Anodic Electrode and its Selectivity Towards Anions

The anodic electrode (FIG. 78A,$a_1$, left electrode) is a bicomponent nanocomposite prepared via a solution process; PVF was assembled onto the surfaces of multi-walled carbon nanotubes (MWCNTs) via π-π interactions between the cyclopentadienyl (Cp) rings of PVF and the $sp^2$-conjugated sidewalls of the MWCNTs.[57] This solution was drop-cast onto a carbon paper electrode, to provide a hybrid with sponge-like nanoarchitecture characterized by interconnected nanochannels, as observed by Scanning Electron Microscopy (SEM) (FIG. 78B). Such a morphology allows for the easy diffusion of the electrolyte within the active material and promotes the efficient charge/discharge of the anode. The charging efficiency of the system ($Q_{eff}$) was determined to be 58%, at oxidation potentials between 0.03 and 0.4 V (FIG. 79A). Such charging capacity was reported previously for ferrocene-based polymer films and is attributed to the fact that the oxidation occurs initially at nonadjacent ferrocene sites, which makes the subsequent removal of electrons from the remaining ferrocenyl centers adjacent to those already oxidized more difficult.[58]

Ferrocene species are ideal for the current system since they exhibit a fast oxidation/reduction response and are electrochemically stable. This is reflected in the only slight decrease of the charge (area under the CV curve) of the $PVF_{50}$-$MWCNT_{50}$ anodic electrode, after 100 successive oxidation/reduction cycles (FIG. 79B). These results also suggest the good adhesive properties between the electroactive $PVF_{50}$-$MWCNT_{50}$ material and the carbon paper, which serves as a current collector. The presence of the polymer on the surface provides an abundance of positively charged units upon oxidation for the capture of the carboxylates, and thus a substantial anion removal capacity.

The MWCNT component of the anode exhibits desirable electronic and mechanical properties, such as good electrical conductivity (5000 S/cm) and mechanical strength, high accessible surface area (>430 $m^2/g$), and high chemical stability. In addition, due to their 1D structure, they show a high rate of charge mobility in the longitudinal direction.

Selective Mechanism of the Anode Towards Carboxylates

Upon electrical stimulation, the PVF units of the anode undergo one-electron oxidation to form the ferrocenium cations (FIG. 78A). Those species interact electrostatically with carboxylates (0.013-0.13 mM) such as acetates (AcCOO$^-$) and benzoates (BzCOO$^-$) and withdraw them from the solution phase (FIG. 78A), even in the presence of an 8000-fold excess of the $PF_6^-$ anions (0.1 M TBAPF$_6$, FIG. 78A). The interactions that govern the separation of the carboxylates induce a gradual 133 mV cathodic shift of the single reduction wave of the $[Fe^{3+}(Cp)_2]^+$ species (FIG. 80A) upon the addition of 1.55 equivalents of AcCOO$^-$ ($C_{AcCOO-}$=11.9×10$^5$ mole/L, FIG. 80B). Such a potential shift suggests an increased electron density within the metallocene upon coordination with the AcCOO$^-$ (FIG. 78A),[59] in accordance with the literature for other anionic species.[51,59] Based on the partial charges of the atoms of $[Fe^{3+}(Cp)_2]^+$ [60], the negatively charged AcCOO$^-$ anions likely interact with the Cp rings of the metallocene, which exhibit a significant positive partial charge of +0.1165 on the H atoms vs +0.002 determined for the $Fe^{3+}$ iron center and −0.0167 for the carbon atoms of the ring.

These interactions induce charge transfer[61] to the $Fe^{3+}$ center of $[Fe^{3+}(Cp)_2]^+$, as suggested by the cathodic shift in the reduction potential of the metallocene in the presence of AcCOO$^-$. These perturbations in the electron density within $[Fe^{3+}(Cp)_2]^+$ upon interaction with AcCOO$^-$, were also reflected spectroscopically as shifts in the d-d and ligand-to-metal electron transitions (LMCT, $e_{1u}$ π Cp orbitals→$e_{2g}$ level of $Fe^{3+}$ center[62]) of $[Fe^{3+}(Cp)_2]^+$, from 380 and 617 nm to 414 and 351 nm, respectively. Apart from potential variations, these interactions also induced an 11% attenuation of the current intensity of the electrode (FIG. 80B), as a result of ion-trapping[59] and screening effects, which resulted in collapsed PVF-MWCNT nanostructures and hindered electrolyte diffusion.

The strength of the $[Fe^{3+}(Cp)_2]^+$-AcCOO$^-$ interactions (log $K_a$=8.7, Table 4), was determined, upon fitting the data of the binding isotherm (FIG. 80B), and the stoichiometry of complexation was between 1.4 and 1.55 (FIG. 80B and Table 4).

Upon titration of the PVF$_{50}$-MWCNT$_{50}$ electrode with BzCOO$^-$, the potential shifted by only −54 mV and the current intensity was attenuated by 17.6%, after the addition of 1.38 equivalents of the anions. This potential shift, is due to the less prominent variations in the electron density of $[Fe^{3+}(Cp)_2]^+$ upon interaction with BzCOO$^-$, originated presumably by the less basic character of BzCOO$^-$ compared to AcCOO$^-$, which leads to weaker interactions (log $K_a$=4.8, Table 4) and less significant charge transfer to the metallocene.

TABLE 4

Stoichiometry of complexation, half-wave potential ($\Delta E_{1/2}$), current variations ($\Delta I$), affinity constants (log $K_a$) and free energy changes ($\Delta G$) that govern the interactions between the ferrocenium cations and the anionic AcCOO− and BzCOO− species on PVF$_{50}$-MWCNT$_{50}$

| Anion (X) | Stoichiometry PVF$^+_a$:X$_b^1$ | $\Delta E_{1/2}$ (mV)$^2$ | $\Delta I^3$ (%) | log $K_a^4$ | $\Delta G$ (kJ mol$^{-1}$)$^5$ |
|---|---|---|---|---|---|
| AcCOO$^-$ | 1:1.4-1.55 | −133 | 11.1 | 8.7 | −49.5 |
| BzCOO$^-$ | 1:1.38 | −54 | 17.6 | 4.8 | −27.4 |

$^1$a and b are the moles of the cation and the anion, respectively, which participate in the complex (PVF$^+_a$:X$_b$) formation;
$^2$Cathodic potential shifts recorded in the presence of the anions;
$^3$Current variations (%) in the presence of the anionic species;
$^4$log $K_a$ for the complex formation (PVF$^+_a$:X$_b$) on the surface of the electrode;
$^5$Free energy variations accompanied the interaction of the ferrocenium cation with the anions.

However, in both cases the $[Fe^{3+}(Cp)_2]^+$-carboxylate interactions were sufficiently strong and occurred spontaneously (see $\Delta G$, Table 4) to facilitate a unique pattern of molecular selectivity for each anion. The similar stoichiometry of complexation for both carboxylates with $[Fe^{3+}(Cp)_2]^+$, was promoted by their Y-shape (trigonal planar geometry)[63] and the fact that are conjugated bases of similar ionic radius and ion mobility in CAN Cathodic Electrode and its Selectivity Towards Cations The cathodic electrode is a hybrid, derived through the redox grafting of diazotated anthraquinone (AQ) moieties from vertically aligned carbon nanotubes (VACNTs), grown on stainless steel. The electrografting process was more efficient at lower scan rates and upon the formation of the more delocalized AQ radical anions[64] (−1.7-0.8 V), compared to the AQ radical dianions (−2.2-0.5 V), which are weaker electron donors. This resulted in a chemically attached poly(anthraquinone) (PAQ) coating on the surfaces of the CNT forest, with a composition of 40.3% carbon and 6.1% oxygen, which is in agreement with the chemical formula of the AQ unit ($C_{14}H_8O_2$). This PAQ film, constituted 23.7% of the nanocomposite by weight, with a corresponding surface coverage of 2.1 µmoles AQ/cm$^2$, as indicated by thermogravimetric analysis. The substantial loading of the cathode with electrografted PAQ chains, similar to that reported for other carbonaceous materials,[65-67] was achieved through the high surface area provided by the VACNT forest.

Electrochemical characterization of the cathode indicated that all the grafted AQ units were accessible by the electrolyte and participated in the charging process. More specifically, electrochemical measurements of the cathode indicated a PAQ charge of 253 mC (FIG. 81), which corresponds to the stimulation of 2.62 µmoles of AQ, in good agreement with the total amount of AQ species loaded on the surface determined by TGA measurements. This PAQ film also showed good structural and electrochemical stability, as suggested by the slight decrease in its charge (1.3%) after 160 sweeps at a scan rate of 0.4 V/s.

The structural characterization of the cathode by SEM suggested that the vertical alignment of the CNTs was unaffected by the surface functionalization with PAQ. This can be seen from comparison of the SEM images of the hybrid PAQ-VACNTs nanostructures (FIG. 78C), with those of the precursor VACNT substrate. This is particularly significant for the electrochemical performance of the cathode since the vertical alignment of the CNTs promotes low contact resistances and high electrolyte-accessible surface area. This can also explain the high charging efficiency of the cathode discussed above.

Selective Mechanism of the Cathode Towards Cations

Electrical stimulation of the cathodic electrode causes the AQ moieties of the polymer to undergo two successive, one-electron reductions to form the AQ radical anions and the dianions, respectively (FIG. 78A). However, the type of the AQ anions produced seemed to be affected by their selective interactions with monovalent cationic species, such as Li$^+$ or K$^+$, even at high concentration of the background electrolyte (TBAPF$_6$, 0.1 M), which exhibits negligible ion-pair interactions with the radical anions/dianions of AQ.

The smaller-sized Li$^+$ cation shows stronger ion-pair interactions with AQ than does the larger K$^+$ cation. This was indicated by electrochemical measurements and the appearance of a single AQ reduction wave in the presence of Li$^+$ which was shifted by −253 mV after 22 mins of complexation. On the other hand, in the presence of K$^+$ cations, the AQ moieties undergo two successive one-electron reductions to form the AQ radical anions and dianions, with potentials shifted by only −80 and −170 mV, respectively, after 780 s of complexation. This shift of the AQ reduction waves to less negative potentials suggested that the formation of the AQ anions was thermodynamically more favorable in the presence of the cations due to ion-pairing interactions.[68] In addition, the complexation of PAQ with the Li$^+$ cation induced a much more significant attenuation of the AQ peak current than did K$^+$, which suggests elimination of the repulsive forces in the PAQ film due to stronger ion-pair interactions.

High resolution (HR) X-ray photoelectron (XP) spectra of the electrode, in the presence of Li$^+$ cations suggested a 1:1 Li:O complexation and thus the formation of $(Li^+)_2AQ^{2-}$ complexes due to coalescence of the two reduction waves of AQ into a single two electron reduction. Thus, in organic media Li$^+$ acts as a Lewis acid and interacts with the basic AQ dianions to form the $(Li^+)_2AQ^{2-}$ complexes.[68] However, in the presence of K$^+$ cations, XPS analysis indicated a 1:2 K:O complexation, which suggests that only half of the oxygen atoms participate in the association process. Thus this cathodic electrode can serve efficiently for targeted cation capture in the separation of lithiated carboxylates during electrocatalytic $CO_2$ conversion processes[2,16-17] and to a less extent hydrogenation reactions of $CO_2$[55] carried out in the presence of K$^+$ cations.[18,55]

Reversible Separation of Lithiated Carboxylates with a PVF$_{50}$-MWCNT$_{50}$-PAQ-VACNTs Electrochemical Cell The separation of three different carboxylate salts (acetates, benzoates and formates) from a 95:5 vol % ACN:water solution phase, was evaluated experimentally upon electrochemical stimulation of the asymmetric PVF$_{50}$-MWCNT$_{50}$//PAQ-VACNT pseudocapacitive cell, as discussed above (FIG. 78A). A low fraction of water (5 vol %) was added to the solvent to ensure good solubility of the lithiated carboxylates in the organic ACN phase. Our cell design targeted the quantitative separation of the lithium carboxylate salts from the solution through the molecular selectivity of the anode for the organic anions upon oxidation, and the capture of the $Li^+$ counterions by the PAQ-cathode upon reduction, as discussed above. For this purpose, the carboxylated moieties were added to the solution phase, at a concentration of 3.66 mM in their lithiated form (23.1 μmoles in 6.3 mL, 6.1 times in excess with respect to the 3.77 μmoles ferrocene on the electrode).

During the development of the electrochemical cell, a slight excess of pseudocapacitive charge on the cathode (253 mC), with respect to the anode (229 mC), was ensured. This was indicated by the areas under the cyclic voltammograms collected for the anodic and cathodic electrodes individually (FIG. 81). The establishment of such a charge balance on the two sides of the cell was important to ensure the stable operation of the system; all the electrons produced by the oxidation of PVF would then be employed in the reduction of the AQ moieties of the cathode, and none would be available to induce side-reactions, e.g., electro-mediated decomposition of the carboxylates or the electrolyte.

Electrosorption Capacities of the Cell Towards Single Carboxylates

The capacity of the electrochemical cell to separate lithiated carboxylates was evaluated via $^1H$ NMR spectroscopy upon characterization of the solution phases before and after the electrosorption/electrodesorption processes. For this purpose, after electrical stimulation of the system at 0.68 V (vs $Ag/AgNO_3$) for 1 h, the carboxylate concentrations were determined by comparison of their integrated characteristic proton chemical shifts to those of a reference compound of known concentration (maleic acid, 23.1 μmoles in 6.6 mL). As such, when the integrals of the $^1H$ NMR bands of acetate (1.97 ppm, 3H), benzoate (7.39-7.44 ppm, 2H) and formate (8.12 ppm, 1H), detected in the solution phase following the electrochemical stimulation of the cell, were subtracted from those of the control sample which did not undergo any electromediated separation process, the electrosorption capacities of the cell were defined. The results suggest that a substantial fraction of the carboxylates were removed from solution; 9.6, 9.3 and 3.7 μmoles of formate, acetate and benzoate, respectively (FIG. 82).

As discussed earlier, the nature of the interactions between the $[Fe^{3+}(Cp)_2]^+$ and the carboxylates is mainly electrostatic, in agreement with the principle of association between hard and soft acids and bases (HSAB). The separation of a higher amount of $AcCOO^-$ compared to $BzCOO^-$ was driven by its higher affinity for the $[Fe^{3+}(Cp)_2]^+$ species (Table 4) and the fact that $AcCOO^-$ is a more basic anion.[69] This is promoted by its methyl functionality, which is an electron donating group that modulates its basicity and capability for ion pair interactions with $[Fe^{3+}(Cp)_2]^+$. On the other hand, $BzCOO^-$ carries an aryl electron withdrawing group, which stabilizes the carboxylate conjugate base, renders it more acidic and induces weaker interactions with the $[Fe^{3+}(Cp)_2]^+$ species of the anodic electrode. The higher affinity of the more hydrophilic carboxylates (acetate and formate) towards the $[Fe^{3+}(Cp)_2]^+$ species of the electrode is also favored by their polar nature and preference for the electrode surface over the organic ACN phase. This explains the higher amount of formate adsorbed compared to benzoate despite the fact that the former species are less basic. For the same reason, the more hydrophobic benzoate anions show a higher preference towards the organic medium than the organometallic polymer.

The adsorbed quantities of carboxylates determined in these studies suggest that the more basic and hydrophilic carboxylates were taken up by the electrochemical cell in greater amounts than anticipated based on charge and stoichiometric considerations (Table 4). It is likely that this was due to the fact, that the porous and swollen cationic hybrid functionalized with the hydrophilic ferrocenium cations facilitated the penetration and accumulation of a higher fraction of water and solvated anions (acetates or formates, either due to electrostatic (Donnan domains) or non ion-pairing interactions (non-Donnan domains).[70] Such a behavior was favored by the presence of the low fraction of water in the solvent medium, which is likely to have been taken up preferentially by the charged electrode matrix. This is also consistent with the higher degree of polymer charging (63%) observed in the binary mixture than in pure ACN (58%, FIG. 79A).

The quantities of the carboxylates captured by the electrochemical system correspond to electrosorption capacities for the cell of 127.9 mg/g for formate and 157.4 mg/g for acetate (FIG. 83). The more hydrophobic benzoate anion showed strictly electrostatic interactions (3.7 μmoles, 121.5 mg/g) and exhibited no tendency to be trapped by the hydrophilic composite, i.e., partitioned more strongly to the hydrophobic solution phase. The electrosorption capacities of PSST are much higher than those recorded to date for traditional and modern CDI-based systems, as is evident from the comparisons shown in FIG. 83 (light symbols), particularly at the solution concentration of 470 mg/L used in this work.

When the electrochemical cell was tested for the adsorption of acetate in the absence of the PVF and PAQ on the anode and cathode, respectively, only 0.6 μmoles (15.5 mg/g) of the species were adsorbed (FIG. 83), which is in good agreement with values reported in the literature for other CDI systems (FIG. 83, blue bullet).[33] In the absence of the polymers the system is based only on capacitive charge for separation and lacks molecular selectivity. As such, the carboxylates and the anions of the background electrolyte ($PF_6$) show similar propensity for capture by the electrochemical cell.

Competitive Separation of Carboxylates

To evaluate the capabilities of PSST to distinguish between carboxylates that differ in terms of basicity and hydrophobicity, the competitive discrimination between benzoate and acetate or formate anions, in $TBAPF_6$ solutions (0.1 M) where the two species coexisted at equal concentrations, was investigated. The relative amounts of the carboxylates adsorbed by the cell reflected the relative binding affinities determined for the individual carboxylate-$[Fe^{3+}(Cp)_2]^+$ interactions (Table 4) and the effect of the anion hydrophilicity. Moreover, the reduced but stoichiometric electrosorption capacity of the cell for acetate (5.5 μmoles, 93.1 mg/g) or formate (6.4 μmoles, 85.3 mg/g) anions in the presence of benzoate (FIG. 82), is the direct result of the competition of these species for capture by the ferrocenium sites. In particular, the more basic and hydrophilic anions (acetates) have higher affinity for interaction with the $[Fe^{3+}(Cp)_2]^+$ moieties of the film than the more acidic and hydrophobic benzoate species (Table 4). This is in agreement with the electrochemical characterization of the anode, discussed above, which showed that the coordination of the more basic $AcCOO^-$ with the $[Fe^{3+}(Cp)_2]^+$ species induced significantly more prominent cathodic shifts (~133 mV) and binding constants (FIG. 80A-80B, log $K_a$=8.7) compared to more acidic $BzCOO^-$ species (54 mV and log $K_a$=4.8, Table 4).

The quantities of the carboxylates captured by PSST during the competitive separation also indicated that the trapping of the more hydrophilic anions (formate and acetate) in the film due to non-electrostatic interactions was reduced compared to those determined for the separation of the single carboxylates (FIG. 82). This is possibly due to the increase in hydrophobicity within the electrode matrix induced by the non-polar benzoate species. Moreover, the decreased capacity of the cell for benzoate capture, which was determined to be 1.9 µmoles-62.4 mg/g and 1.6 µmoles-52.5 mg/g, in the presence of the more hydrophilic acetate and formate species, respectively, suggests the fine selectivity mechanism established by the polymer units in the electrochemical cell.

This ion-specific molecular selectivity of the cell, even among carboxylate salts of similar trigonal planar geometry, which differ only in terms of basicity and hydrophobicity, renders our system a powerful separation "tool" for many synthetic processes. This includes the separation of small carboxylates, such as formates and/or acetates, during photo-triggered and/or hydride transfer reactions, which are carried out in the presence of an excess of benzoate catalyst.[47]

Contribution of the Polymer in the Electrosorption Capacities of the Cell

The capacities reported above were determined based on the total mass of the composite electrodes. When based on the overall mass of the polymer on the anodic and cathodic electrodes and the carboxylate uptake by PVF and PAQ, the electrosorption capacities are exceptionally high; 426.8, 341.4 and 322.8 mg/g for acetate, formate and benzoate, respectively (FIG. 83, green bullets). The mass of the carboxylate salt adsorbed by PVF and PAQ was determined when the mass of the ions adsorbed by the carbon component itself (FIG. 83, blue bullet) was subtracted from the overall mass of carboxylates taken up by the cell. These results indicate once more, that the good separation efficiency of the electrochemical cell originates from the selective capture of the ions by the electroactive species, and that the electric-double layer capacitance provided by the CNTs alone is not sufficient for the separation of a substantial amount of the carboxylates from solution. One aspect provided herein relates to the design and development of an electrochemical cell with such a high electrosorption capacity, and which can separate ionic species with high degree of molecular selectivity.

Release of Adsorbed Species

The ability to regenerate the electrochemical cell and recover the adsorbed species was evaluated by electrical stimulation at −0.37 V for 2 hours (FIG. 78A), following which the moles of the desorbed carboxylates were determined by $^1H$ NMR spectroscopy, as discussed above. A high degree of recovery of the adsorbed anionic species was achieved, with good regeneration of the electrode surface (FIG. 82). In particular, 6.6 µmoles acetate (111.7 mg/g, FIG. 82), 3.0 µmoles benzoate (98.5 mg/g, FIG. 82) and 7.4 µmoles formate (98.6 mg/g, FIG. 82) were desorbed, which correspond to 71.2, 81.4 and 76.9% recovery of the respective adsorbed anions. This implied almost full anion recovery based on stoichiometric interactions, whereas the remaining ions were assumed to be retained within the electrode matrix due to non-electrostatic interactions. Good regeneration of the cell was also observed upon desorption of the formate (4.2 µmoles, 55.9 mg/g, 65% recovery) and acetate anions (4.9 µmoles, 82.9 mg/g, 88% recovery) when in competition with the benzoate (1.2 µmoles, 39.4 mg/g, in the presence of formate and 2 µmoles, 65.6 mg/g in the presence of acetate) (FIG. 82).

Cyclic Stability of the Pseudocapacitor During Carboxylate Separation

To be effective in long-term process applications, the pseudocapacitive cell used for separations should be stable over a large number of sorption/desorption cycles. The stability of the cell during benzoate adsorption/desorption was evaluated over 5 consecutive charge/discharge cycles carried out in a 5 hour period (FIG. 84).

The µmoles of benzoate adsorbed/desorbed by the electrodes was determined from the intensity of the characteristic absorption band of benzoate at 221.4 nm, as monitored by UV/vis spectroscopy following each adsorption/desorption cycle. For this purpose, a calibration curve was first prepared over the benzoate concentration range between 0 and 0.12 mM.

The absorption capacity of the $PVF_{50}$-$MWCNT_{50}$//PAQ-VACNT cell, was maintained at 90% after 5 adsorption cycles (3.87 to 3.47 µmoles; 127.1 to 113.9 mg/g, FIG. 84). The retention of selectivity and efficiency of the pseudocapacitor, over several separation cycles (18,000 s of operation), is particularly promising for the longer-term stability of the electrosorption capacity of the cell. Moreover, given that PSST is based on pseudocapacitance to achieve high electrosorption capacities, its fairly high separation efficiency even after 18,000s of continuous operation, suggests that the polymer units are electro-/chemically stable and maintain their selectivity towards carboxylates.

Conclusions

In summary, one aspect presented herein is based on a new, electro-mediated approach for the separation of value-added carboxylates using a pseudocapacitive $PVF_{50}$-$MWCNT_{50}$//PAQ-VACNTs cell. This was achieved via the design and nanostructuring of the anodic and cathodic electrodes that carry PVF- and PAQ-based functionalities, respectively, to capture/release molecularly the carboxylates and their lithium counterions in a selective and remote manner. The anodic $PVF_{50}$-$MWCNT_{50}$ electrode shows elegant molecular affinity towards carboxylates based on their basicity and hydrophobicity, even in the presence of excess background electrolyte, as suggested by electrochemical characterization. On the other hand, XPS analysis and electrochemical characterization indicate that the cathodic PAQ-VACNTs electrode captures lithium cations in a selective manner despite the high concentration of the ions of the background electrolyte.

The $PVF_{50}$-$MWCNT_{50}$//PAQ-VACNTs cell exhibited higher separation efficiency towards the more basic and hydrophilic carboxylates, with a remarkable electrosorption capacity in the range of 121.5 to 157.4 mg/g based mainly on pseudocapacitance. During the competitive separation of carboxylates, when formates or acetates coexisted in solution with benzoates, the former species were still adsorbed in an almost stoichiometric manner, despite the fact that their separation was hindered molecularly by benzoates. This result is particularly important considering that formates and acetates are of high environmental, biological and industrial significance and derive from catalytic or electrocatalytic processes in which they often coexist with benzoates. Moreover, the cell retained 90% of its electrosorption capacity and selectivity, even after 5 consecutive adsorption/desorption cycles (18,000s of continuous operation). This suggests the chemical robustness of the PVF and PAQ functionalities during separation and it is also promising for the longer-term stability of the separation process. It is contemplated that this approach opens new possibilities for the design and development of electrochemical cells for the removal of valuable ions based on molecular selectivity, in a reversible, remote and controlled manner.

REFERENCES (1) Goossen, L. J.; Rodriguez, N.; Goossen, K. Corboxylic acids as substrates in homogeneous catalysts. *Angew. Chem. Int. Ed.* 2008, 47, 3100-3120.

(2) Angamuthu, R.; Byers, P.; Lutz, M.; Spek, A. L.; Bouwman, E. Electrocatalytic CO2 conversion to oxalate by a copper complex. *Science* 2010, 327, 313-315.

(3) Hull, J. F.; Himeda, Y.; Wang, W. H.; Hashiguchi, B.; Periana, R.; Szalda, D. J.; Muckerman, J. T.; Fujita, E. Reversible hydrogen storage using CO2 and a proton-switchable iridium catalyst in aqueous media under mild temperatures and pressures. *Nature Chem.* 2012, 4, 383-388.

(4) Kurioka, M.; Nakata, K.; Jintoku, T.; Taniguchi, Y.; Takaki, K.; Fujiwara, Y. Palladium catalyzed acetic-acid synthesis from methane and carbon monoxide or dioxide. *Chem. Lett.* 1995, 244-244.

(5) Reis, P. M.; Silva, J. A. L.; Palavra, A. F.; Fraisto da Silva, J. J. R.; Kitamura, T.; Fujiwara, Y.; Pombeiro, A. J. L. Single-pot conversion of methane into acetic acid in the absence of CO and with vanadium catalysts such as amavadine. *Angew. Chem. Int. Ed.* 2003, 42, 821-823.

(6) Kirillova, M. V.; da Silva, J. A. L.; Fraisto da Silva, J. J. R.; Pombeiro, A. J. L. Direct and efficient transformation of gaseous alkanes into carboxylic acids catalyzed by vanadium containing heteropolyacids. *Appl. Catal., A* 2007, 332, 159-165.

(7) León, T.; Correa, A.; Martin, R. Ni-Catalyzed Direct Carboxylation of Benzyl Halides with CO2. *J. Am. Chem. Soc.* 2013, 135, 1221-1224.

(8) Isse, A. A.; Gennaro, A. Electrocatalytic carboxylation of benzyl chlorides at silver cathodes in acetonitrile. *Chem. Commun.* 2002, 2798-2799.

(9) Bessel, C. A.; Rolison, D. R. Electrocatalytic Reactivity of Zeolite-Encapsulated Co(salen) with Benzyl Chloride. *J. Am. Chem. Soc.* 1997, 119, 12673-12674.

(10) *Anti-inflammatory-Antirheumatic Drugs*; Hinz, B.; Dorn, C. P.; Shen, T. Y.; Brune, K., Eds.; Wiley-VCH Verlag GmbH & Co. KGaA: Weinheim, 2012; Vol. 3.

(11) Williams, C. M.; Johnson, J. B.; Rovis, T. Nickel-catalyzed reductive carboxylation of styrenes using CO2. *J. Am. Chem. Soc.* 2008, 130, 14936-14937.

(12) Yu, D.; Zhang, Y. Copper- and copper-N-heterocyclic carbene-catalyzed C—H activating carboxylation of terminal alkynes with CO2 at ambient conditions. *Proc. Natl. Acad. Sci. U.S.A* 2010, 107, 20184-20189.

(13) Fujihara, T.; Nogi, K.; Xu, T.; Terao, J.; Tsuji, Y. Nickel-catalyzed carboxylation of aryl and vinyl chlorides employing carbon dioxide. *J. Am. Chem. Soc.* 2012, 134, 9106-9109.

(14) Zhu, Y.; Ding, G.; Zhu, S.; Zheng, H.; Li, Y. Highly selective synthesis of ethylene glycol and ethanol via hydrogenation of dimethyl oxalate on Cu catalysts: Influence of support. *Appl. Catal., A*, 2013, 468, 296-304.

(15) *Ullmann's encyclopedia of industrial chemistry*; Cheungh, H.; Tanke, R. S.; Torrence, G. P., Eds.; Wiley-VCH Verlag GmbH & Co. KGaA: Weinheim, 2012; Vol. 1.

(16) Kushi, Y.; Nagao, H.; Nishioka, T.; Isobe, K.; Tanaka, K. Remarkable decrease in overpotential of oxalate formation in electrochemical CO2 reduction by a metal-sulfide cluster. *J. Chem. Soc., Chem. Commun.* 1995, 1223-1224.

(17) Zhang, A.; Zhang, W.; Lu, J.; Wallace, G. G.; Chen, J. Electrocatalytic reduction of carbon dioxide by cobalt-phthalocyanine-incorporated polypyrrole. *Electrochem. Solid-State Lett.* 2009, 12, E17-E19.

(18) Takahashi, I.; Koga, O.; Hoshi, N.; Hori, Y. Electrochemical reduction of CO2 at copper single crystal Cu(S)-[n(111)×(111)] and Cu(S)-[n(110)×(100)] electrodes. *J. Electroanal. Chem.* 2002, 533, 135-143.

(19) Aydin, R.; Köleli, F. Electrocatalytic conversion of CO2 on a polypyrrole electrode under high pressure in methanol. *Synth. Met.* 2004, 144, 75-80.

(20) Fujihara, T.; Xu, T.; Semba, K.; Terao, J.; Tsuji, Y. Copper-catalyzed hydrocarboxylation of alkynes using carbon dioxide and hydrosilanes. *Angew. Chem. Int. Ed.* 2011, 50, 523-527.

(21) Jitaru, M.; Lowy, D. A.; Toma, M.; Toma, B. C.; Oniciu, L. Electrochemical reduction of carbon dioxide on flat metallic cathodes. *J. Appl. Electrochem.* 1997, 27, 875-889.

(22) Damodar, J.; Krishna Mohan, S. R.; Jayarama Reddy, S. R. Synthesis of 2-arylpropionic acids by electrocarboxylation of benzylchlorides catalysed by PdCl2(PPh3)2. *Electrochem. Commun.* 2001, 3, 762-766.

(23) Niu, D. F.; Xiao, L. P.; Zhang, A. J.; Zhang, G. R.; Tan, Q. Y.; Lu, J. X. Electrocatalytic carboxylation of aliphatic halides at silver cathode in acetonitrile. *Tetrahedron* 2008, 64, 10517-10520.

(24) Beer, P. D.; Gale, P. A. Anion recognition and sensing: The state of the art and future perspectives. *Angew. Chem. Int. Ed.* 2001, 40, 486-516.

(25) Porada, S.; Zhao, R.; van der Wal, A.; Presser, V.; Biesheuvel, P. M. Review on the science and technology of water desalination by capacitive deionization. *Progress in Materials Science* 2013, 58, 1388-1442.

(26) Oren, Y. Capacitive deionization (CDI) for desalination and water treatment—past, present and future (a review). *Desalination* 2008, 228, 10-29.

(27) Subramani, A.; Jacangelo, J. G. Emerging desalination technologies for water treatment: A critical review. *Water Res.* 2015, 75, 164-187.

(28) Kim, T.; Yoon, J. CDI ragone plot as a functional tool to evaluate desalination performance in capacitive deionization. *RSC Advances* 2015, 5, 1456-1461.

(29) Biesheuvel, P. M.; van der Wal, A. Membrane capacitive deionization. *J. Membr. Sci.* 2010, 346, 256-262.

(30) Suss, M. E.; Baumann, T. F.; Bourcier, W. L.; Spadaccini, C. M.; Rose, K. A.; Santiago, J. G.; Stadermann, M. Capacitive desalination with flow-through electrodes. *Energy & Environmental Science* 2012, 5, 9511-9519.

(31) Porada, S.; Sales, B. B.; Hamelers, H. V. M.; Biesheuvel, P. M. Water desalination with wires. *Journal of Physical Chemistry Letters* 2012, 3, 1613-1618.

(32) Forrestal, C.; Xu, P.; Ren, Z. Sustainable desalination using a microbial capacitive desalination cell. *Energy & Environmental Science* 2012, 5, 7161-7167.

(33) Lee, J.; Kim, S.; Kim, C.; Yoon, J. Hybrid capacitive deionization to enhance the desalination performance of capacitive techniques. *Energy & Environmental Science* 2014, 7, 3683-3689.

(34) Pasta, M.; Wessells, C. D.; Cui, Y.; La Mantia, F. A desalination battery. *Nano Lett.* 2012, 12, 839-843.

(35) Yang, Z.-Y.; Jin, L.-J.; Lu, G.-Q.; Xiao, Q.-Q.; Zhang, Y.-X.; Jing, L.; Zhang, X.-X.; Yan, Y.-M.; Sun, K.-N. Sponge-Templated Preparation of High Surface Area Gra-

(36) Lin, Z.; Li, Z.; Moon, K.-s.; Fang, Y.; Yao, Y.; Li, L.; Wong, C.-p. Robust vertically aligned carbon nanotube-carbon fiber paper hybrid as versatile electrodes for supercapacitors and capacitive deionization. *Carbon* 2013, 63, 547-553.

(37) El-Deen, A. G.; Choi, J.-H.; Kim, C. S.; Khalil, K. A.; Almajid, A. A.; Barakat, N. A. $TiO_2$ nanorod-intercalated reduced graphene oxide as high performance electrode material for membrane capacitive deionization. *Desalination* 2015, 361, 53-64.

(38) Laxman, K.; Myint, M. T. Z.; Khan, R.; Pervez, T.; Dutta, J. Improved desalination by zinc oxide nanorod induced electric field enhancement in capacitive deionization of brackish water. *Desalination* 2015, 359, 64-70.

(39) Yin, H.; Zhao, S.; Wan, J.; Tang, H.; Chang, L.; He, L.; Zhao, H.; Gao, Y.; Tang, Z. Three-dimensional graphene/metal oxide nanoparticle hybrids for high-performance capacitive deionization of saline water. *Adv. Mater.* 2013, 25, 6270-6276.

(40) Gu, X.; Yang, Y.; Hu, Y.; Hu, M.; Huang, J.; Wang, C. Facile fabrication of graphene-polypyrrole-Mn composites as high-performance electrodes for capacitive deionization. *Journal of Materials Chemistry A* 2015, 3, 5866-5874.

(41) Trócoli, R.; Battistel, A.; Mantia, F. L. Selectivity of a Lithium-Recovery Process Based on LiFePO4. *Chemistry-A European Journal* 2014, 20, 9888-9891.

(42) Lee, J.; Yu, S.-H.; Kim, C.; Sung, Y.-E.; Yoon, J. Highly selective lithium recovery from brine using a [small lambda]-MnO2-Ag battery. *Phys. Chem. Chem. Phys.* 2013, 15, 7690-7695.

(43) Zhao, R.; Van Soestbergen, M.; Rijnaarts, H.; Van der Wal, A.; Bazant, M.; Biesheuvel, P. Time-dependent ion selectivity in capacitive charging of porous electrodes. *J. Colloid Interface Sci.* 2012, 384, 38-44.

(44) Avraham, E.; Yaniv, B.; Soffer, A.; Aurbach, D. Developing ion electroadsorption stereoselectivity, by pore size adjustment with chemical vapor deposition onto active carbon fiber electrodes. Case of Ca2+/Na+ separation in water capacitive desalination. *J. Phys. Chem. C* 2008, 112, 7385-7389.

(45) Kim, Y.-J.; Choi, J.-H. Selective removal of nitrate ion using a novel composite carbon electrode in capacitive deionization. *Water Res.* 2012, 46, 6033-6039.

(46) Kim, Y.-J.; Kim, J.-H.; Choi, J.-H. Selective removal of nitrate ions by controlling the applied current in membrane capacitive deionization (MCDI). *J. Membr. Sci.* 2013, 429, 52-57.

(47) Ohtsu, H.; Tanaka, K. An Organic Hydride Transfer Reaction of a Ruthenium NAD Model Complex Leading to Carbon Dioxide Reduction. *Angew. Chem. Int. Ed.* 2012, 51, 9792-9795.

(48) Anzenbacher Jr, P.; Palacios, M. A.; Jursíková, K.; Marquez, M. Simple electrooptical sensors for inorganic anions. *Org. Lett.* 2005, 7, 5027-5030.

(49) D. Beer, P.; Timoshenko, V.; Maestri, M.; Passaniti, P.; Balzani, V. Anion recognition and luminescent sensing by new ruthenium(II) and rhenium(I) bipyridyl calix[4]diquinone receptors. *Chem. Commun.* 1999, 1755-1756.

(50) Das, S.; Saha, D.; Bhaumik, C.; Dutta, S.; Baitalik, S. Ru(ii) and Os(ii) mixed-chelates derived to from imidazole-4,5-dicarboxylic acid and 2,2[prime or minute]-bipyridine as colorimetric sensors for anions: synthesis, characterization and binding studies. *Dalton Trans.* 2010, 39, 4162-4169.

(51) Tomapatanaget, B.; Tuntulani, T.; Chailapakul, O. Calix[4]arenes containing ferrocene amide as carboxylate anion receptors and sensors. *Org. Lett.* 2003, 5, 1539-1542.

(52) Sola, A.; Orenes, R. 1. A.; Garcia, M. a. A. n.; Claramunt, R. M.; Alkorta, I.; Elguero, J.; Tárraga, A.; Molina, P. Unprecedented 1,3-Diaza[3]ferrocenophane Scaffold as Molecular Probe for Anions. *Inorg. Chem.* 2011, 50, 4212-4220.

(53) Su, X.; Kulik, H.; Jamison, T.; Hatton, T. Anion-selective redox-electrodes: electrochemically-mediated separation with heterogeneous organometallic interfaces. *Adv. Funct. Mater.* 2016 (accepted).

(54) Takahashi, I.; Koga, O.; Hoshi, N.; Hori, Y. Electrochemical reduction of CO2 at copper single crystal Cu(S)-[n(111)×(111)] and Cu(S)-[n(110)×(100)] electrodes. *J. Electroanal. Chem.* 2002, 533, 135-143.

(55) Schmeier, T. J.; Dobereiner, G. E.; Crabtree, R. H.; Hazari, N. Secondary Coordination Sphere Interactions Facilitate the Insertion Step in an Iridium(III) CO2 Reduction Catalyst. *J. Am. Chem. Soc.* 2011, 133, 9274-9277.

(56) Echegoyen, L.; Gustowski, D. A.; Gatto, V. J.; Gokel, G. W. Electrochemical switching of lariat ethers: enhanced cation binding by one$^-$ and two-electron reduction of an anthraquinone sidearm. *J. Chem. Soc., Chem. Commun.* 1986, 220-223.

(57) Mao, X.; Simeon, F.; Achilleos, D. S.; Rutledge, G. C.; Hatton, T. A. Metallocene/carbon hybrids prepared by a solution process for supercapacitor applications. *J. Mater. Chem. A.* 2013, 1, 13120-13127.

(58) Chen, T.; Wang, L.; Jiang, G.; Wang, J.; Dong, X.; Wang, X.; Zhou, J.; Wang, C.; Wang, W. Electrochemical Behavior of Poly(ferrocenyldimethylsilane-b-dimethylsiloxane) Films. *J. Phys. Chem. B* 2005, 109, 4624-4630.

(59) Villena, C.; Losada, J.; Garcia-Armada, P.; Casado, C. M.; Alonso, B. Synthesis and electrochemical anion-sensing properties of a biferrocenyl-functionalized dendrimer. *Organometallics* 2012, 31, 3284-3291.

(60) Nikitina, V. A.; Kislenko, S. A.; Nazmutdinov, R. R.; Bronshtein, M. D.; Tsirlina, G. A. Ferrocene/Ferrocenium Redox Couple at Au(111)/Ionic Liquid and Au(111)/Acetonitrile Interfaces: A Molecular-Level View at the Elementary Act. *J. Phys. Chem. C* 2014, 118, 6151-6164.

(61) Gray, H. B.; Sohn, Y. S.; Hendrickson, N. Electronic structure of metallocenes. *J. Am. Chem. Soc.* 1971, 93, 3603-3612.

(62) Masson, G.; Herbert, D. E.; Whittell, G. R.; Holland, J. P.; Lough, A. J.; Green, J. C.; Manners, I. Synthesis and Reactivity of a Strained Silicon-Bridged [1]Ferrocenophanium Ion. *Angew. Chem. Int. Ed.* 2009, 48, 4961-4964.

(63) Bondy, C. R.; Loeb, S. J. Amide based receptors for anions. *Coord. Chem. Rev.* 2003, 240, 77-99.

(64) Vase, K. H.; Holm, A. H.; Norrman, K.; Pedersen, S. U.; Daasbjerg, K. Electrochemical Surface Derivatization of Glassy Carbon by the Reduction of Triaryl- and Alkyldiphenylsulfonium Salts. *Langmuir* 2007, 24, 182-188.

(65) Pognon, G.; Brousse, T.; Belanger, D. Effect of molecular grafting on the pore size distribution and the double layer capacitance of activated carbon for electrochemical double layer capacitors. *Carbon* 2011, 49, 1340-1348.

(66) Kalinathan, K.; DesRoches, D. P.; Liu, X.; Pickup, P. G. Anthraquinone modified carbon fabric supercapacitors with improved energy and power densities. *J. Power Sources* 2008, 181, 182-185.

(67) Le Comte, A.; Chhin, D.; Gagnon, A.; Retoux, R.; Brousse, T.; Belanger, D. Spontaneous grafting of 9,10- phenanthrenequinone on porous carbon as an active electrode material in an electrochemical capacitor in an alkaline electrolyte. *Journal of Materials Chemistry A* 2015, 3, 6146-6156.
(68) Wain, A. J.; Wildgoose, G. G.; Heald, C. G. R.; Jiang, L.; Jones, T. G. J.; Compton, R. G. Electrochemical ESR and Voltammetric Studies of Lithium Ion Pairing with Electrogenerated 9,10-Anthraquinone Radical Anions Either Free in Acetonitrile Solution or Covalently Bound to Multiwalled Carbon Nanotubes. *J. Phys. Chem. B* 2005, 109, 3971-3978.
(69) Izutsu, K. *Acid-base Dissociation Constants in Dipolar Aprotic Solvents*; Blackwell Scientific Publications, 1990.
(70) Anson, F. C.; Saveant, J. M.; Shigehara, K. New model for the interior of polyelectrolyte coatings on electrode surfaces. Mechanisms of charge transport through protonated poly (L-lysine) films containing FeIII (edta)- and FeII (edta) 2-as counterions. *J. Am. Chem. Soc.* 1983, 105, 1096-1106.

Example 4: Electrochemically-Mediated Adsorptive Processes for Water-Remediation Efficient, affordable and robust purification technologies are needed for a range of separation contexts, from point-of-source treatment or remote in-situ purification devices to large-scale, centralized wastewater treatment facilities.[1] Chemical pollutants in ultra-dilute concentrations (micropollutants, e.g., organic endocrine disruptors, pesticides, household chemicals, dyes and heavy metal cations), which are classified by the EPA as contaminants of emerging concern, pose a particularly vexing problem in wastewater treatment, since current technologies suffer from high energetic penalties and performance limitations when confronted with pollutants at these very low concentrations (nM to μM) in an excess of competing species. These compounds often originate from high-level chemical manufacturing, and can have a strong detrimental impact on the aquatic environment and human health. An electrochemically-assisted, chemically tunable, highly selective, and inexpensive platform technology that exploits nanostructured electrodes was developed to selectively remove harmful contaminants at the nano- to micro-pollutant level,[2] modulated solely by electrical potential and with no need for chemical regenerants. The current proposal addresses (i) extension of this platform to small-scale device implementation through the scaling and optimization of a flow-electrochemical process, and (ii) the robustness and optimization the materials chemistry of the system for practical wastewater streams. A larger demonstration unit may be constructed to explore commercial application opportunities.

Micro-Pollutant Removal of Organic Contaminants of Emerging Concern

Organic ions are contaminants of emerging concern to researchers and to the EPA,[3, 4] and present a worldwide problem for both human health and the aquatic ecosystem in first-world and developing countries alike.[5] A majority of these toxic compounds are anionically charged endocrine-disrupting compounds (EDCs), pharmaceutical and personal care products (PPCPs),[4] and highly toxic pesticides and herbicides[3, 4] with dangerous concentration levels close to agricultural streams and urban drinking water sources.[6] Compounds such as halocarboxylates and various sulfonate and phosphonate organic compounds are highly soluble, polar and charged.[7, 8] Sulfonate groups in particular feature in numerous highly toxic agricultural pesticides, and in environmentally stable surfactant contaminants which accumulate in the ecosystem.[8] Concentrations of such organic pollutants range from a few millimolar down to the nanomolar range in natural aqueous environments, and, in the presence of natural hardness and other ions, are extremely challenging to separate selectively by traditional adsorption or fixed-bed ion-exchange methods.[3, 4] Strict concentration limits have been set by the EPA for a number of these compounds due to their long-term carcinogenic effects, with regulations to maintain them under 0.05 mg/L (EPA organic drinking water standards).[9] At such concentrations, reverse osmosis (RO) and other pressure or electrical methods (e.g., electrodialysis, capacitive deionization) are energetically costly (>1 kWh/m$^3$). Thus, at a large centralized scale, there is a crucial need for the development of systems for reducing energetic costs with easily-scalable materials—especially if such processes can be done purely through electrical swing and with high separation factors towards organic anions.

Control of Water Chemistry for Large-Scale Electrochemical Systems.

Water chemistry reactions, which produce $H^+/OH^-$ inadvertently, have been highlighted as major sources of performance loss in recent electrochemical separations reviews.[10, 11 12] In capacitive deionization (CDI), for example, due to the high voltage windows required, water splitting has been a strong challenge for cathode design, with a significant current leak going towards this side-reaction and affecting the pH of the system.[11, 13] Thus, minimization of water chemistry reactions is a core aim in the design of more efficient electrochemical separation devices, and as an extension, any selective ion-binding process. Such a challenge can be resolved through redox-control by surface functionalization, in which the redox-binding event sustains a high current density towards ion-adsorption and thereby maintains the overpotential below that of water splitting, thus improving the performance of the system tremendously both by reducing current losses to solvent destruction, and by suppressing $OH^-$ or $H^+$ production which would otherwise lead to lowering of the selectivity of the ion-specific electrodes.

Heavy Metal Contaminants in Micropollutant Levels.

Transition metals such as lead or mercury can have acute toxic effects, and many others such as aluminum, chromium, and zirconium, among others, have long-term health effects if bio-accumulated—and are major cation pollutants from various chemical manufacturing industries.[14, 15] Heavy-metal contaminants in low amounts share many of the separation challenges faced by organic anion micropollutants, except from an electrochemical perspective the materials development is focused on the cathode. Redox-selective cathode materials are investigated for removal of a wide variety of heavy-metal contaminants, in tandem with anionic contaminant removal by the anode, and for development of integrated platforms for environmental remediation of, e.g., lead, mercury, chromium and other compounds.

Low-Water Usage for Point-of-Source Chemical Wastewater Treatment

With tightening EPA regulations for various organic precursors, reduction of energetic and chemical costs at the point-of-source streams for a range of industries becomes very important. Two special cases are the agrochemical and the pharmaceutical industries,[9, 16] in which the removal of various chemical compounds relies on the use of water itself, such as in extraction, or chemical regenerants such as pH buffers, to purify their wastestreams. These are costly and can result in very poor water usage ratios; purification steps in many organic synthesis processes require large amounts of process water (e.g. paracetamol synthesis has ~0.5 water usage, much of it due to solvent extraction processes).[9] Chemical-swing or pH-swing type methods are very chemically costly and require large amounts of regenerants. Pressure-based membrane systems on the other hand are too energetically costly—thus making selective electrochemical systems, based on electrochemically-based control solely, very attractive for various ranges of chemical pollutant for the chemical wastewater market.

Applications of the Electrode Systems Described Herein

The industrial wastewater market around the world is growing (estimated by Frost & Sullivan to be around $35 billion, with the wastewater treatment equipment market itself being ~$15 billion).[17] Within the chemical manufacturing sector. the pharmaceutical and biotech wastewater treatment needs for the U.S. alone total >$2 billion annually. The electrode systems described herein can be useful especially for point-of-source wastewater treatment from chemical industries, starting with pharmaceutical, biotech and chemical research laboratories. First, the devices can be implemented at the exit of a chemical purification stream, e.g. organic synthesis waste, and reduce chemical, energetic and water usage costs. Resource recovery of complex chemicals is also a possibility due to the large separation costs (>80% of total cost of producing pharmaceuticals) and losses in traditional separation methods. This will impact directly the >$400 billion size pharmaceutical market in the U.S (WHO, Pharmaceutical Industry). Furthermore, there is a large premium for treated water with dilute concentrations due to the inefficiencies of current separation methods to target dilute streams. Eventually, scale-up and demonstration for industrial wastewater treatment can lead to entry into municipal centralized systems through addressing upcoming problems of emerging concern (U.S. market >$10 billion, global market >$30 billion). The platform can be used to address municipal wastewater treatment or to address to highly-targeted problems of water remediation of micro and nano-pollutants. Collaboration with local centers (New England Water Innovation Network, university research labs, EPA branches) as well as chemical, pharma and biotech companies can lead to validation of the system for relevant problems and contribute to de-risking. The platform can be extended to small-scale device implementation through the scaling and optimization of a flow-electrochemical process, and (ii) the process parameters as well as the materials chemistry of the system can be optimized for practical wastewater streams.

An Exemplary Electrochemical Platform

An electrochemically-assisted, chemically tunable, highly selective, and inexpensive platform technology that exploits nanostructured electrodes was developed to selectively remove harmful contaminants at the nano- to micro-pollutant level,[2] modulated solely by electrical potential. The technology has been developed, showing that redox-electrodes were able to remove, with exceptional separation factors and consistent reversibility, a range of organic contaminants including carboxylates, sulfonates and phosphonates which are pesticides, endocrine inhibitors etc., as well as heavy metal cations including chromium, zirconium among others.

An electro-swing operation where the adsorption depends on the redox state of the functionalized electrodes is utilized, and the release of the captured contaminants relies on simple electrochemical swings with minimal or no pH, temperature or other changes in solution conditions. Based purely on the electrical potential, the adsorption and desorption onto the electrodes can be fully controlled (FIGS. 85A-85B). This method combines the advantages of electrochemical methods, including high capacity, fast kinetics and modularity, without the selectivity limitations present in traditional capacitive deionization. As can be seen, capacitive-type electrochemical methods adsorb ions based purely on electrostatics with low selectivity, whereas the presence of a redox-receptor can introduce the molecular selectivity towards dangerous contaminants. Advantages of the system include:

1. Electrochemical nature and full reversibility of system over multiple charge/discharge cycles. This results in no need for chemical regenerants, which for many organic contaminant removal cases, results in a much more efficient water usage ratio than other techniques including chemical swing or solvent extraction.
2. High selectivity and uptake capacity based on specific chemical interactions towards pollutants of concern. Chemical functionalization allows for tuning of molecular chemistry towards a wide library of contaminants ranging from ionic to neutral. These were accomplished with asymmetric eletrochemical capacitances of >480 F/g, separation factors >180 towards dilute contaminants and almost ten-fold lower energetic costs (<0.1 kWh/m$^3$) than standard, non-redox capacitive methods (1-5 kWh/m$^3$).
3. Low electrical potentials (<0.6 V swing window) for adsorption results in low energy costs, and when combined with high separation factors results in low total costs. Traditional methods such as capacitive deionization (CDI) require much larger voltage windows (1.5-2 V) and in addition, have much lower current performance due to water splitting such that their ion-adsorption current efficiencies are only about 20-30%. In some embodiments, redox-based electrochemical method results in energetically efficient systems (0.3 kWh/m$^3$ based on effluent volume) especially when compared to membrane-driven processes for micromolar concentrations (2-5 kWh/m$^3$) or CDI (>1 kWh/m$^3$). When compared to batch systems such as IEX, the chemical cost of the electrochemical systems described herein is minimal, with a much lower water usage ratio (m$^3$ process water for treatment/m$^3$ of purified water), being ~0.05 for the redox-electrochemical systems according to one set of embodiments described herein vs 0.3-0.5 for various extractions and adsorbent beds).[9]
4. Controlled water chemistry due to the absence of parasitic reactions at either electrode because of the implementation of an asymmetric redox configuration. Side-reactions, which normally occur at the counter-electrode and change solution pH, are suppressed by the self-exchange reaction at the surface of the electrodes, which lowers the overpotential and two-electrode cell-voltage needed for the process and maximizes ion-binding capacity.

FIG. 86 shows a multi-electrode bench-top cell, with redox-functionalized electrodes successfully targeting micromolar regime contaminants. FIG. 87A-87B shows the successful separation of chemical precursors dependent on specific interactions with the functional groups. Heterogeneous metallocene electrodes have been developed to target sulfonates, phosphonates, and carboxylates against 30 to 100-fold competing inert electrolyte concentrations (phosphate, chlorides, perchlorates among others). A library of heterogeneous electrodes targeting a variety of cation analytes, with very high transition heavy-metal adsorption capacities, in the presence of competing alkaline cations (sodium and magnesium) are also developed-initial results show a strong selectivity for Zr and Al over the other ions in solution (FIG. 87C), with current targets also including Pb, Cu and Hg. The combined two-electrode system is extremely efficient for capturing emerging pollutants in the micromolar range (~250 uM), including toxic pesticides, detergents and endocrine disruptors such as quinchlorac, sodium dodecyl benzoate, ibuprofen and 2,4,5-trichlorophenoxyacetic acid (2,4,5-T) (FIG. 88A). The asymmetric electrochemical cell enabled pollutant separation factors of >200 against an almost three hundred-fold excess of background salts with constant pH over a wide range of current densities (0.8-8 A/cm$^2$) at close to 98% current efficiency. The system has been cycled for >800 cycles with less than 5% loss in electrochemical charge (FIG. 88B).

Wastewater Treatment of Chemical and Pharmaceutical Industries at Point-of-Source The electrochemical platform technology described herein can be used for chemical wastewater treatment in a point-of-source context. Pharmaceutical, chemical and biotech are highly attractive target markets. According to a recent review in IE&C journal on pharmaceutical wastewater treatment,[9] large quantities of process water are utilized in removing organic contaminants, often close to a 0.5 water ratio (5 gallons used per 10 gallons of purified water), thus incurring large environmental costs. The total equipment and process costs of wastewater treatment around the world is estimated to be $15 billion annually,[17] with $5.7 billion composing the chemical wastewater market in the U.S. alone (Freedonia Group analysis, Water Treatment of Chemicals Report, 2013). Regulatory demands and development of new plants are expected to increase this value tremendously, by over 15% over the next few years. The systems described herein may be used by industrial customers and/or municipalities.

Electrochemical units have been shown to be performance-wise efficient (electrodialysis has benchmark >90% efficiency)[9] for ethinylestradiol removal. The systems described herein can potentially achieve much higher recovery efficiencies with an over tenfold decrease in electrochemical potential.

Wastewater Treatment at Small-Scale for General Water Source Purification

Centralized.

One of the strengths of the systems and methods described herein is to be able to remove pollutants in the nanomolar to micromolar range. The EPA has strict regulations for various common organic contaminants (<0.05 g/L—accessible online at epa.gov/your-drinking-water/table-regulated-drinking-water-contaminants), and the systems described herein can achieve these strict standards at much lower costs. Once demonstration and validation at industrial scale has been successful, the electrochemical platform technology can be used to address specific problems in wastewater treatment of rivers, lakes and rural streams, in which the pollutants, e.g., detergents, personal care products, and estrogen-active contaminants, are persistent but of low concentration and thus cost savings for addressing them will be of primary concern.

The devices/systems described herein can easily be deployable due to the modular and reversible nature of the electro-swing. The total potential of municipal wastewater treatment is tremendous (USGS 2005) worldwide, with over 16,000 wastewater treatment plants operational in the U.S. alone (accessible online at dhs.gov/water-and-wastewater-systems-sector) and a projected implementation of an additional 10.7 million m$^3$ capacity by the end of 2018 (Azocleantech, TechSciResearch forecast). In China and India, the equipment for water treatment processes is expected to grow by $1.2 billion, with a large share being municipal networks (~15% and infrastructure >39%). An exact valuation of this market is hard to predict due to the sheer size (>$15 billion worldwide), with specific markets (rural, urban) splitting the various sources of revenues.

Impact

Market Impact.

The systems and methods described herein can make a direct impact on the water treatment and re-use market for fine chemical production. Dilute concentrations of contaminants from chemical manufacturing streams require large energy and chemical costs, thus placing purified water from those concentration margins at a premium. Reducing this economic stress can lead to easier compliance with regulations, both domestically in the U.S. and worldwide, with cost-savings being the main driver for implementation. Fundamental, disruptive technologies are necessary in addressing those problems, and the redox-based electrochemical separations described herein address this crucial challenge in separation science. Since systems and methods described herein have the benefits of fast kinetics, selectivity and low energy costs, is expected to acquire 5% of the fragmented market by the fifth year ($50 million revenue), they can be applied to the pharmaceutical sector. The high value of the recovered ions can be a major disruptor even in their downstream purification processes, making resource recovery a crucial element in fine chemical purification.

Societal Impact.

The reduction of endocrine disruptors and heavy metal contaminants has direct impact in both the domestic environmental landscape as well as worldwide (EPA contaminants of emerging concern).[16, 18] The strict regulations that the EPA has been placing on these organic contaminants can lead to direct improvement of social welfare and reduce long-term chronic problems associated with slow intake of complex bioactive molecules. The removal of dilute amounts of heavy metals such as lead, mercury and chromium can lead to huge improvements in health especially in countries such as China, India and the African continent due to their still growing wastewater market.[15] Furthermore, the lowering in energy corresponds to a huge decrease in carbon footprint (~70 tons of reduced $CO_2$ footprint/chemical process of 10,000 gallons/day).

Issues of Existing Separation Technologies

Traditional methods for wastewater treatment, such as physiochemical adsorption, coagulation, capacitive deionization, chemical oxidation, and membrane processes (reverse osmosis, nano-filtration, electro-dialysis), usually suffer from one or more of the following drawbacks: low ion specificity and selectivity, lack of regenerability of adsorbent materials, requirement for high temperature and/or pressure, high operating costs, and generation of secondary pollutants in the process.[19-21] In industrial wastewater treatment, especially chemical manufacturing facilities, ion-exchange (IEX) and reverse osmosis (RO) are two of the major established methods for point-of-source treatment. Their economic analysis has been studied at length (DOW economic analysis of liquid separations, RO & IEX), with their main difference being the concentration ranges over which they can efficiently target contaminant removal. However, over the entire micromolar to low millimolar range, their costs are still quite high—stemming from high chemical or energetic costs.

| Costs<br>(~10,000 gallons/day) | Redox<br>Technology | IEX | RO |
|---|---|---|---|
| Total Cost | $0.3/m$^3$ | $1.5/m$^3$ | $3/m$^3$ |
| Energetic Costs | $0.1 kWh/m$^3$ | — | 2-5 kWh/m$^3$ |
| Chemical Costs | $0.03/m$^3$ | $0.8/m$^3$ | — |

Electrochemical swing methods such as CDI have been touted for their application in the brackish regime (10-30 mM). However, their lack of selectivity makes them highly inefficient for anything other than bulk desalination, especially the specialty wastewater treatment for chemical manufacturing. For micromolar pollutants, CDI energetic costs are >2 kWh/m$^3$, high relative to the 0.2-0.3 kWh/m$^3$ based on selective redox-swings from the electrochemical platform according to one set of embodiments described herein. Finally, CDI current efficiencies vary (60-80%) due to large current losses due to the water reduction reaction. In the case of the exemplary asymmetric redox system described herein, high energy storage capabilities (>400 F/g) and very high current efficiencies (>95% towards contaminant removal) due to suppression of any side-reactions are achieved. Thus, the system combines the advantages of CDI and ion-exchange to make a reversible process with low energy requirements and non-existent chemical costs (FIG. 90A). Furthermore, the ion-capacity level of the systems of some embodiments described herein when compared to literature values is almost tenfold higher due to the high pseudocapacitance and nanostructure of the electrodes described herein (FIG. 90B). Finally, due to both the molecular selectivity at low concentrations, and pseudocapacitance at high electrolyte concentrations, the systems described herein are significantly superior across a wide concentration range than either IEX or RO (FIG. 90C). The following patent applications and scientific references are incorporated herein by reference in their entireties Su, X.; Achilleos, D.; Hatton, T. A. "Redox-Functionalized Electrodes for Selective Electrochemical Separation, Molecular Recognition and Energy Storage as Well as Other Related Applications". U.S. Application No. 62/246,718, filed Oct. 27, 2015.

Akhoury, A. Bromberg; L.; Hatton, T. A. "Responsive Materials for Isolating Organic Compounds" U.S. patent Ser. No. 12/395,004. Publication Number US20100222519A1. Also published as U.S. Pat. No. 8,436,116. Sep. 10, 2010.

Mao, X.; Tian, W.; Wu, J.; Rutledge, G. C.; Hatton, T. A., "Electrochemically Responsive Composites of Redox Polymers and Conducting Fibers', U.S. Provisional Application. Ser. No. 62/079,951, filed on Nov. 14, 2014.

X. Su, H. Kulik, T. F. Jamison and T. A. Hatton, *Advanced Functional Materials*, 2016. [Advance Article]. Redox-selective adsorption of charged organic contaminants.

X. Su and T. A. Hatton, *Advances in Colloid and Interface Science*, 2016. Under Review. Review of redox-electrochem separation methods.

X. W. Mao, F. Simeon, D. S. Achilleos, G. C. Rutledge and T. A. Hatton, *Journal of Materials Chemistry A*, 2013, 1, 13120-13127. Non-covalent method for electrode preparation.

W. D. Tian, X. W. Mao, P. Brown, G. C. Rutledge and T. A. Hatton, *Advanced Functional Materials*, 2015, 25, 4803-4813. Electrochemical polymerization of nanostructured electrodes.

A. Akhoury, L. Bromberg and T. A. Hatton, *Acs Applied Materials & Interfaces*, 2011, 3, 1167-1174. Redox-selective separation of solvents.

Development of an Exemplary Electrochemical Separation System

Prototype Development and Scale-Up.

A small bench-scale prototype (10 cm$^2$) is integrated with an automatic pump and HPLC system (see FIG. 89). Two asymmetric electrodes, an anode based on poly(vinyl)ferrocene and cathode based on a novel cobaltocenium polymer, form the active components for contaminant removal. A combination of simulations and laboratory-fabrication are employed to optimize the creation of a final prototype. Some of the design parameters include optimal dimensions and quantitative parameters for the redox-separation device: redox-material (ferrocene or cobaltocene-polymer) loading, electrode dimensions and form factor. Examples of performance metrics under scale up include, but are not limited to breakthrough and regeneration time, current efficiency and separation factor.

In one example, the approach include the application engineering principles and simulation (COMSOL+MATLAB) to design an optimal cell. A coupled reaction/flow model has been developed based on the Nernst-Planck equation to help simulate the flow and contaminant adsorption at various conditions relevant to commercial-scale (>100 gallons/day) conditions. In parallel, scale-up of the electrode fabrication procedure is studied—in one embodiment, the analytical scale system is based on a 2 cm$^2$ electrode area, and the initial bench scale electrode system has 10 cm$^2$. The scale can be increased to multi-stacks of 100 cm$^2$ (with 5-10 cells, total electrode area between 500 cm$^2$-1 m$^2$) (see an example form factor in FIG. 89), with the technical target of achieving current efficiencies of up to 95% and to maintain separation factors towards target ions (organic first) >100 under realistic flow conditions. The asymmetric electrode configurations can be assembled in series vs parallel and mass-transfer parameters can be optimized.

Target Contaminants of Interest (Heavy Metal Contaminants, Organic Anions and Cations) and Study Co-Selectivity Under Realistic Process Conditions.

To separate a target species from multiple contaminant, complex waste-streams present in real systems rather than from binary solutions, the electrochemical separation platform can be configured to include an integrated flow, electrochemical control and multiple monitoring probes at the exit of the electrochemical assembly in order to track the adsorption performance of the unit.

In some embodiments, the electrochemical separation devices or systems can be configured to include pre-filter or sedimentation.

Examples of micro-pollutant contaminants in chemical manufacturing include, but are not limited to: pharmaceutical molecules (carboxylates and pyridiniums), pesticide chemicals (e.g. methyl viologen, quinchlorac), heavy metal cations (mercury, cadmium, lead, copper among others) and various detergents (sulfonates and phosphonates).

Electrode Materials Optimization.

Gas diffusion electrodes (1 cm$^2$ in area) based on carbon fibers (Fuel Cell, Inc) are used as the conductive substrates for the active material, and the redox-polymers are coated in a 1:1 polymer/CNT ratio by di-coating. To optimize the fabrication process onto larger electrode substrates while maintaining both macro and micro-porosity, the formulation of carbon-nanotube/binder/redox-active polymer electrode materials is optimized and more efficient dip-coating methods is developed for the >10 cm² and especially the target 100 cm²/electrode stacks. The electrode performance and stability is evaluated under flow conditions, and the results guide changes in chemical fabrication and form factor to improve robustness, and to identify optimal binders and chemical cross-linking strategies. For targeting multiple contaminants, chemical tuning of the functional groups of the redox-species and even co-polymerization of distinct active sites can be evaluated to address streams with multiple characteristics (e.g. some chemical industries may have both heavy-metal contaminants as well as organic anions in their effluent streams).

Cost and Energetic Analysis for Integrated System.

A full analysis of the chemical, manufacturing and operational costs is carried out for both the hardware components as well as the advanced materials fabrication (chemical costs of producing medium-scale redox-polymers and scalable coating methods). Energetic performance analysis serves to further support the advantages of the systems described herein over those of competitors (the goal is to be able to maintain low <0.3 kWh/m³ for selective ion removal).

Exemplary Improvements:

(1) High current efficiencies inflow can be achieved by using a computational simulation model to help specify cell dimensions and optimize electrochemical parameters (potential and current densities).

(2) Interference of competing molecular species can be minimized by determining how efficient the system can perform in the presence of complex mixtures (similar byproducts, more than 2 competing salt compositions, varying pH). Detection arrays with contaminant, ionic strength and pH sensors will be implemented to diagnose the performance. pH controls help in gauging side-reactions and current efficiencies due to water splitting.

(3) The stability of the electrochemical separation devices or systems under high content of salts and particulate content can be improved by optimization of materials design and integration with other methods of purification (e.g. an electrocoagulation step before reaching molecular separation stage, coupling with membrane bio-reactors among others (MBR)).

REFERENCES

1. M. A. Shannon, P. W. Bohn, M. Elimelech, J. G. Georgiadis, B. J. Marinas and A. M. Mayes, *Nature*, 2008, 452, 301-310.
2. X. Su, H. Kulik, T. F. Jamison and T. A. Hatton, *Advanced Functional Materials*, 2016.
3. D. Minakata, W. Song and J. Crittenden, *Environmental Science & Technology*, 2011, 45, 6057-6065.
4. P. Westerhoff, Y. Yoon, S. Snyder and E. Wert, *Environmental Science & Technology*, 2005, 39, 6649-6663.
5. S. A. Snyder and M. J. Benotti, *Water Science and Technology*, 2010, 61, 145-154.
6. M. Grassi, L. Rizzo and A. Farina, *Environmental Science and Pollution Research*, 2013, 20, 3616-3628.
7. M. S. Rodriguez-Cruz, M. J. Sanchez-Martin and M. Sanchez-Camazano, *Chemosphere*, 2005, 61, 56-64.
8. J. Margot, L. Rossi, D. A. Barry and C. Holliger, *Wiley Interdisciplinary Reviews-Water*, 2015, 2, 457-487.
9. C. Gadipelly, A. Perez-Gonzilez, G. D. Yadav, I. Ortiz, R. Ibfiiez, V. K. Rathod and K. V. Marathe, *Industrial & Engineering Chemistry Research*, 2014, 53, 11571-11592.
10. M. E. Suss, S. Porada, X. Sun, P. M. Biesheuvel, J. Yoon and V. Presser, *Energy & Environmental Science*, 2015.
11. S. Porada, R. Zhao, A. van der Wal, V. Presser and P. M. Biesheuvel, *Progress in Materials Science*, 2013, 58, 1388-1442.
12. J.-H. Lee, W.-S. Bae and J.-H. Choi, *Desalination*, 2010, 258, 159-163.
13. R. Zhao, O. Satpradit, H. H. Rijnaarts, P. M. Biesheuvel and A. van der Wal, *Water Res*, 2013, 47, 1941-1952.
14. G. H. Chen, *Separation and Purification Technology*, 2004, 38, 11-41.
15. F. L. Fu and Q. Wang, *Journal of Environmental Management*, 2011, 92, 407-418.
16. A. Butkovskyi, L. H. Leal, H. H. M. Rijnaarts and G. Zeeman, *Water Research*, 2015, 85, 384-392.
17. F. Royan, *Sustainable Water Treatment Technologies in the 2020 Global Water Market*, Frost & Sullivan, 2012.
18. A. Alsbaiee, B. J. Smith, L. L. Xiao, Y. H. Ling, D. E. Helbling and W. R. Dichtel, *Nature*, 2016, 529, 190-U146.
19. J. Grimm, D. Bessarabov and R. Sanderson, *Desalination*, 1998, 115, 285-294.
20. M. E. Suss, T. F. Baumann, W. L. Bourcier, C. M. Spadaccini, K. A. Rose, J. G. Santiago and M. Stadermann, *Energy & Environmental Science*, 2012, 5, 9511-9519.
21. A. Subramani, M. Badruzzaman, J. Oppenheimer and J. G. Jacangelo, *Water Research*, 2011, 45, 1907-1920.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present disclosure, and without departing from the spirit and scope thereof, can make various changes and modifications of the disclosure to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method of separating at least one target molecule from a fluid source comprising:
   a. placing in a fluid source (i) a first electrode comprising a first solid substrate and a first redox species immobilized to the first solid substrate; and (ii) a second electrode comprising a second solid substrate and a second redox species immobilized to the second solid substrate, wherein the first redox species and the second redox species comprise chemically different metallocenes; and
   b. applying an electrical potential across the first electrode and the second electrode such that the first redox species transforms to an oxidized state and selectively binds to a target electron-donating functional group of a target molecule present in the fluid source,
   thereby separating at least one target molecule comprising the target electron-donating functional group from the fluid source.

2. The method of claim 1, wherein the second redox species selectively captures a cationic species present in the fluid source.

3. The method of claim 2, wherein the cationic species is selected from the group consisting of heavy metals, transition metals, lanthanides, organic cations, inorganic cations, metal-organic cations, metal-inorganic cations, alkali metal ions, alkaline earth metal ions, and rare earth metal ions.

4. The method of claim 2, wherein the target molecule and/or the cationic species is a micropollutant or a nanopollutant.

5. The method of claim 2, further comprising reversing the applied electrical potential to release the bound target molecule and/or the captured cationic species from the electrodes.

6. The method of claim 1, wherein the target molecule is an organic anion, an inorganic anion, a neutral molecule, or an oxygen-containing complex.

7. The method of claim 1, wherein the target molecule comprises a carboxylate, sulfonate, phosphonate, carbonate, carbamate, phosphate, sulfate, chromate, vanadate, manganate, and/or selenate.

8. The method of claim 1, wherein that target molecular is or comprises paraquat, quinclorac, sodium dodecyl benzoate, ibuprofen, or 2,45-trichlorophenoxyacetic acid.

9. A method of increasing separation efficiency of a target molecule from a fluid source or increasing energy storage performance of an electrochemical device or system comprising:
   a. placing in a fluid source (i) a first electrode comprising a first solid substrate and a first redox species immobilized to the first solid substrate; and (ii) a second electrode comprising a second solid substrate and a second redox species immobilized to the solid second solid substrate, wherein the first redox species and the second redox species comprise chemically different metallocenes; and b. applying an electrical potential across the first electrode and the second electrode such that the first redox species transforms to an oxidized state and selectively binds to a target electron-donating functional group of a target molecule present in the fluid source and the second redox species undergoes a self-exchange reaction within the second electrode, thereby increasing the separation efficiency or energy storage performance of the electrochemical device or system by diverting at least a portion of electron transfer toward the self-exchange reaction of the second redox species and reducing electron transfer toward the fluid source.

10. The method of claim 9, wherein the fluid source is an aqueous fluid or an organic fluid.

\* \* \* \* \*